(12) United States Patent
Maki

(10) Patent No.: US 11,780,475 B2
(45) Date of Patent: Oct. 10, 2023

(54) TENSION LOCK ASSEMBLY FOR CHAIN TIE DOWN ASSEMBLY

(71) Applicant: Ireco, LLC, Elmhurst, IL (US)

(72) Inventor: Brian G. Maki, Wood Dale, IL (US)

(73) Assignee: Ireco, LLC, Elmhurst, IL (US)

( * ) Notice: Subject to any disclaimer, the term of this patent is extended or adjusted under 35 U.S.C. 154(b) by 421 days.

(21) Appl. No.: 17/206,196

(22) Filed: Mar. 19, 2021

(65) Prior Publication Data

US 2021/0206401 A1 Jul. 8, 2021

Related U.S. Application Data

(63) Continuation of application No. 16/194,672, filed on Nov. 19, 2018, now Pat. No. 10,988,148.

(51) Int. Cl.
*B61D 45/00* (2006.01)
*B60P 7/08* (2006.01)

(52) U.S. Cl.
CPC .......... *B61D 45/001* (2013.01); *B60P 7/0815* (2013.01); *B60P 7/0823* (2013.01); *B61D 45/008* (2013.01)

(58) Field of Classification Search
CPC ... B61D 45/001; B61D 45/008; B60P 7/0815; B60P 7/0823
USPC ......................................................... 410/12
See application file for complete search history.

(56) References Cited

U.S. PATENT DOCUMENTS

| | | | | |
|---|---|---|---|---|
| 2,560,695 A | * | 7/1951 | Huber | B60P 7/0823 410/23 |
| 2,848,259 A | * | 8/1958 | Huber | B61D 45/001 403/46 |
| 2,865,308 A | * | 12/1958 | Gutridge | B61D 45/008 410/57 |
| 2,966,321 A | | 12/1960 | Blattner | |
| 3,402,925 A | | 9/1968 | Schwiebert | |
| 3,462,137 A | * | 8/1969 | Grube | B60P 7/0823 410/41 |
| 3,601,864 A | | 8/1971 | Roberts et al. | |
| 4,044,691 A | * | 8/1977 | Kilgus | B60P 3/073 410/12 |
| 4,335,489 A | * | 6/1982 | Muller | F16G 11/12 403/166 |
| 4,525,900 A | * | 7/1985 | Muller | F16G 11/12 24/68 CD |
| 4,606,096 A | * | 8/1986 | Wood | F16G 15/00 24/68 CD |

(Continued)

*Primary Examiner* — Hilary L Gutman
(74) *Attorney, Agent, or Firm* — Cook Alex Ltd.

(57) ABSTRACT

A universal chain tie down assembly includes an anchor base and an associated turret, with a cannon pivotally connected to the turret. The proximal portion of a tensioning rod is associated with the cannon. The tensioning rod further includes a distal portion associated with a hub, along with a tool attachment portion that is configured for engagement by a tool for rotation of the tensioning rod. First and second arms of a constant tensioning device extend from proximal ends associated with the hub to distal ends spaced distally of the hub. A chain is associated with a distal end of the constant tensioning device, such as by being linked to the curved portion of a U-bolt of the constant tensioning device. A tension lock assembly and/or an anti-vibration assembly may be employed to prevent a vibration-induced change in the tension in the universal chain tie down assembly.

11 Claims, 95 Drawing Sheets

(56) References Cited

U.S. PATENT DOCUMENTS

| | | | | |
|---|---|---|---|---|
| 6,666,633 B2* | 12/2003 | Hsieh | ................ | B60P 7/13 |
| | | | | 410/96 |
| 7,014,399 B1* | 3/2006 | Hsieh | ................ | B63B 25/004 |
| | | | | 410/85 |
| 7,399,148 B2 | 7/2008 | Bruun | | |
| 7,585,140 B1* | 9/2009 | Howes | ................ | B60P 3/075 |
| | | | | 410/12 |
| 7,887,272 B2* | 2/2011 | Bohman | ................ | B63B 25/004 |
| | | | | 410/100 |
| 8,961,084 B1* | 2/2015 | Anderson | ................ | B61D 45/001 |
| | | | | 410/23 |
| 9,102,259 B2 | 8/2015 | Brewster et al. | | |
| 9,333,896 B2* | 5/2016 | Dunmire | ................ | B60P 7/083 |
| 9,637,041 B2 | 5/2017 | Brewster | | |
| 9,669,753 B1* | 6/2017 | Royt | ................ | B60P 7/0823 |
| 10,029,604 B2* | 7/2018 | Brewster | ................ | B60P 7/083 |
| 11,305,684 B1* | 4/2022 | Szeglin | ................ | B60P 7/083 |
| 2015/0063937 A1* | 3/2015 | Brewster | ................ | B60P 7/0823 |
| | | | | 410/103 |
| 2016/0090021 A1* | 3/2016 | Dunmire | ................ | B60P 7/0823 |
| | | | | 410/103 |
| 2016/0339828 A1 | 11/2016 | Brewster | | |
| 2017/0182927 A1* | 6/2017 | Brewster | ................ | B60P 7/083 |
| 2017/0203680 A1* | 7/2017 | Mahaffey | ................ | F16M 7/00 |
| 2019/0338831 A1 | 11/2019 | Squires | | |
| 2019/0351809 A1* | 11/2019 | Liu | ................ | B60P 7/0823 |

* cited by examiner

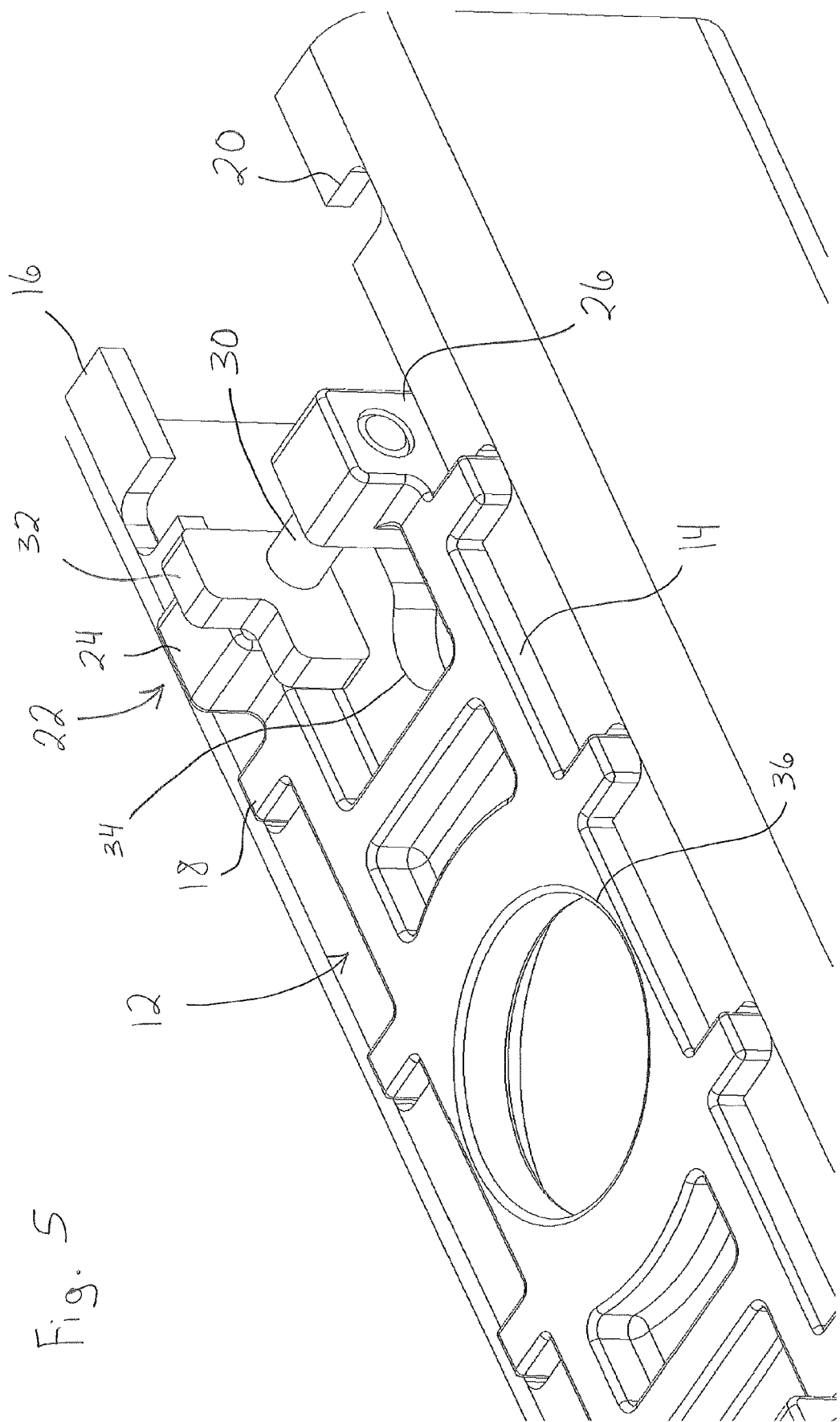

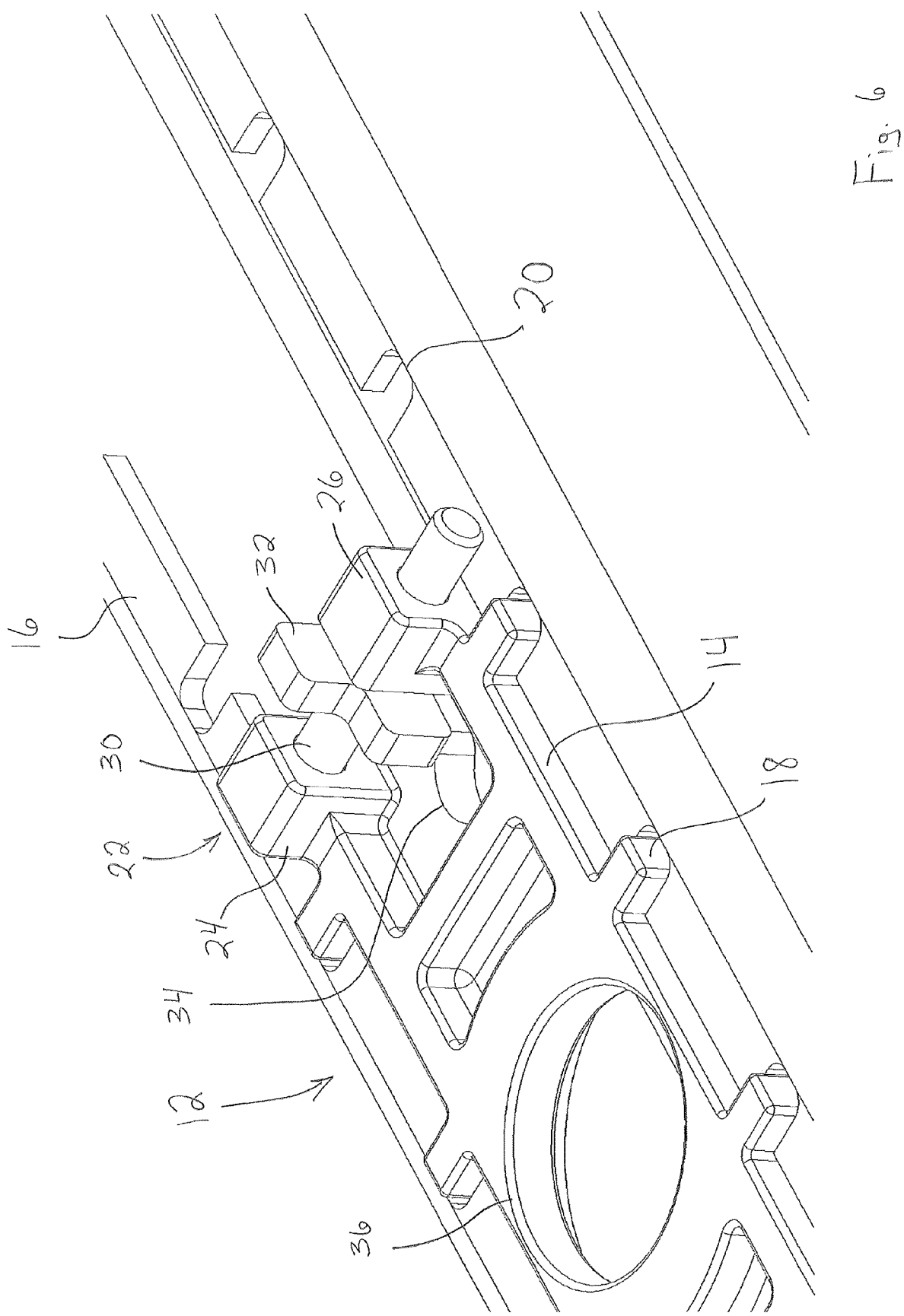

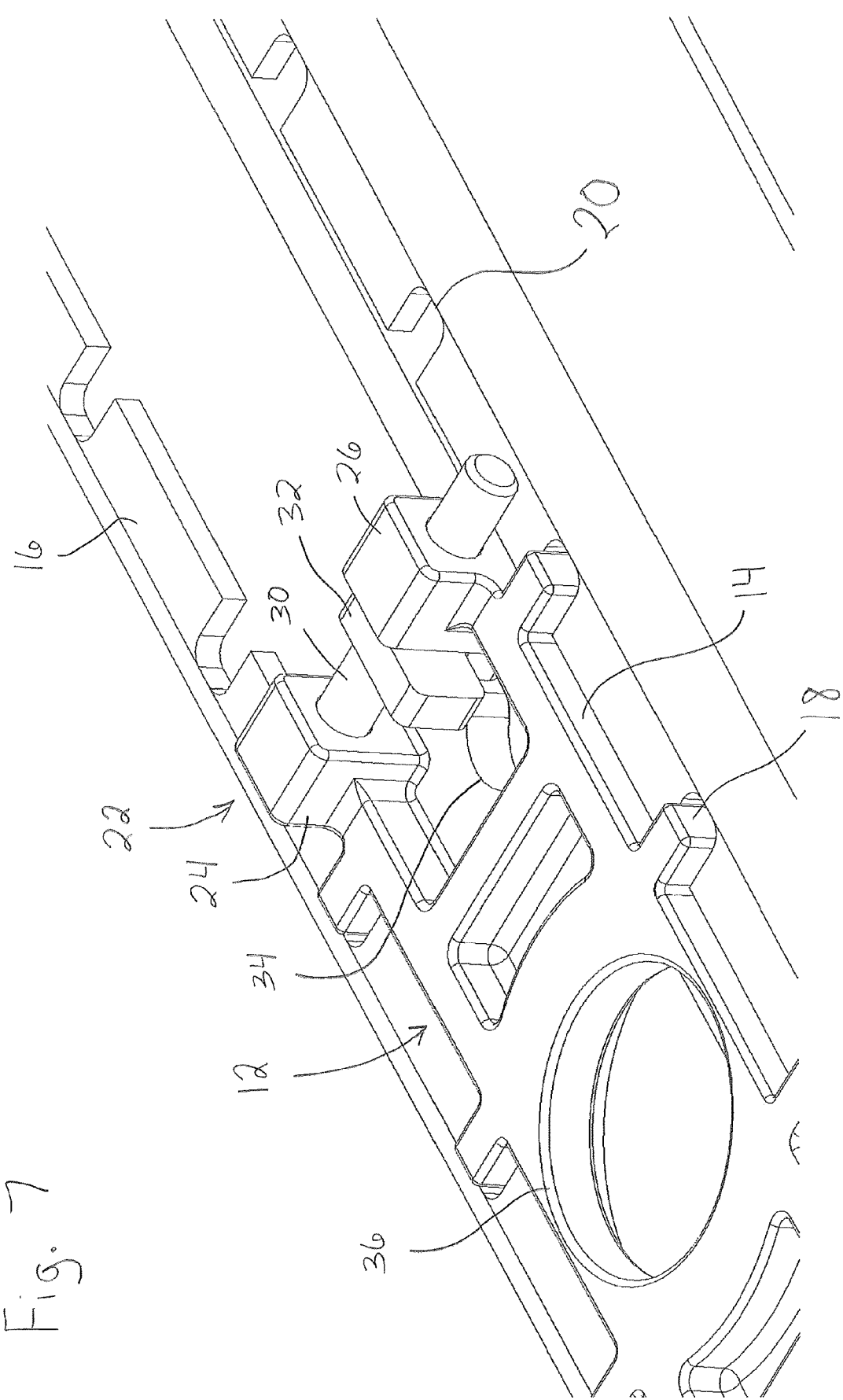

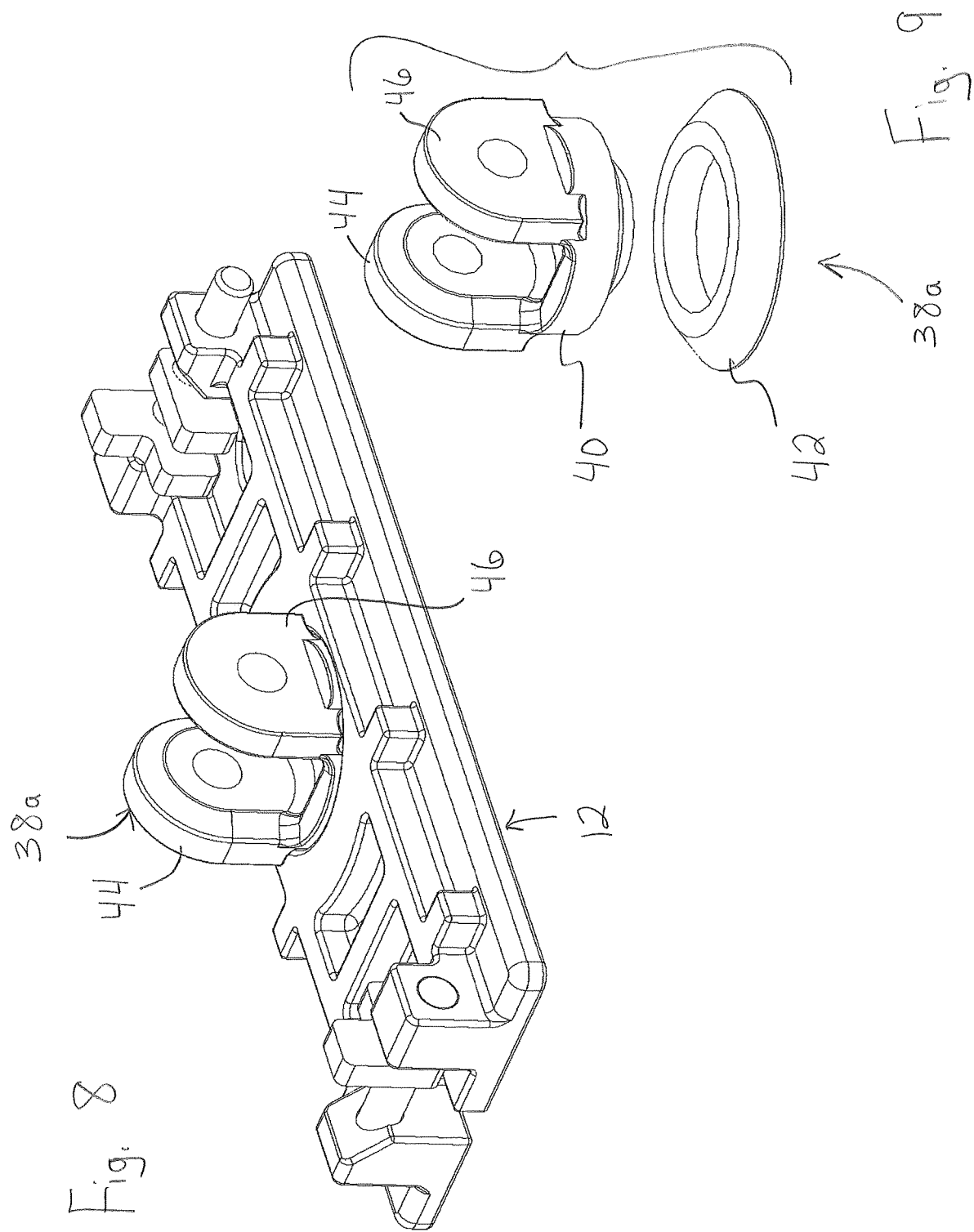

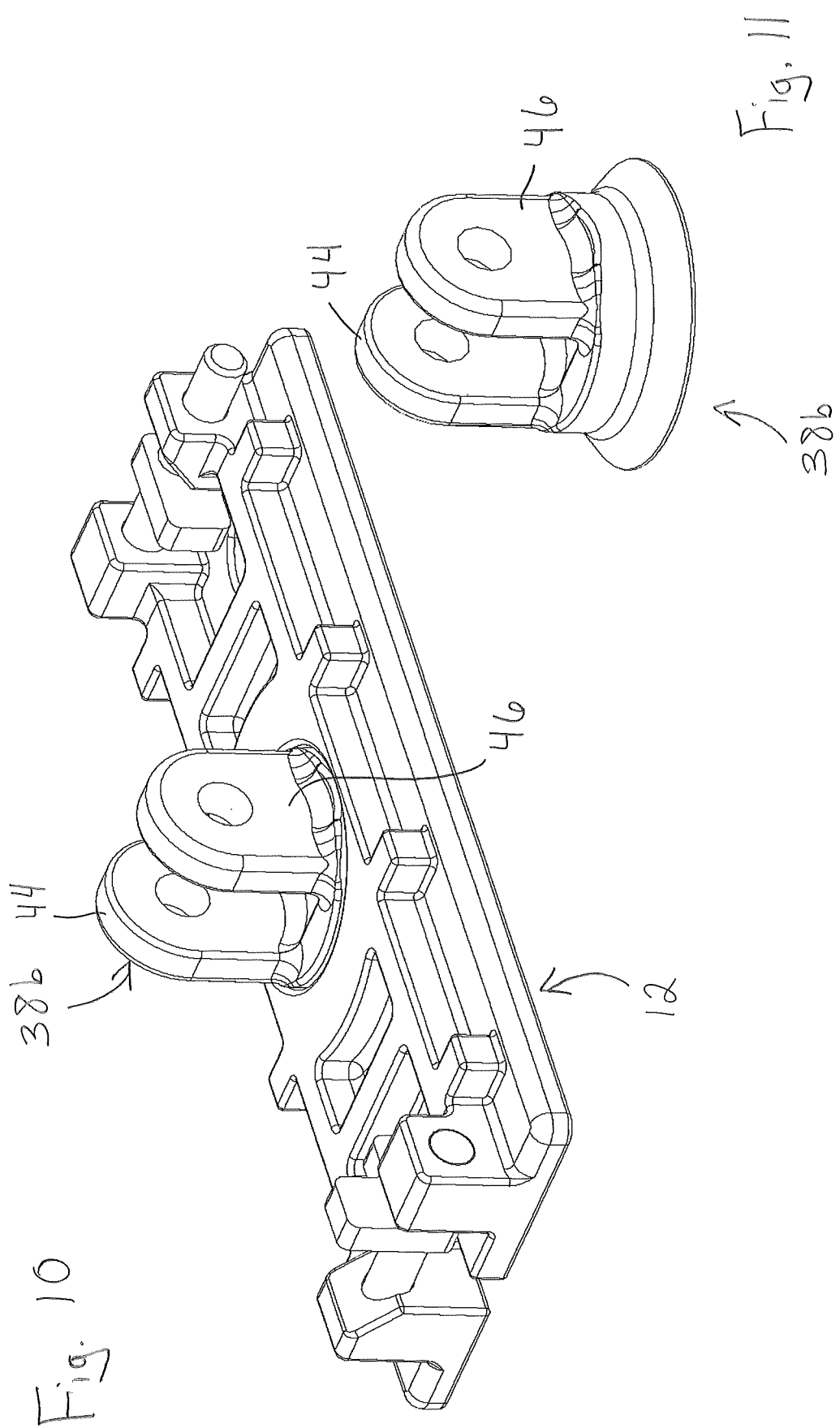

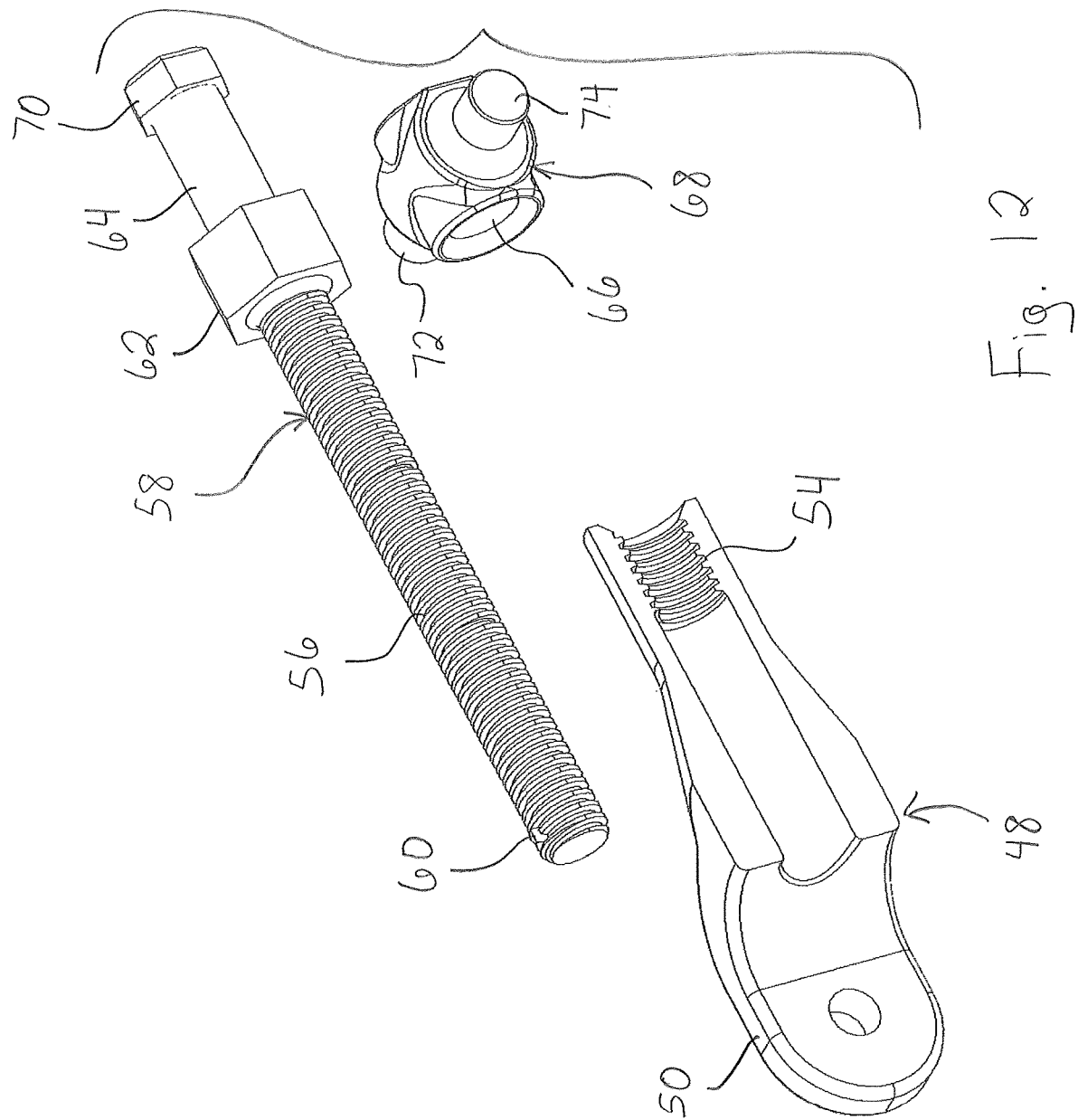

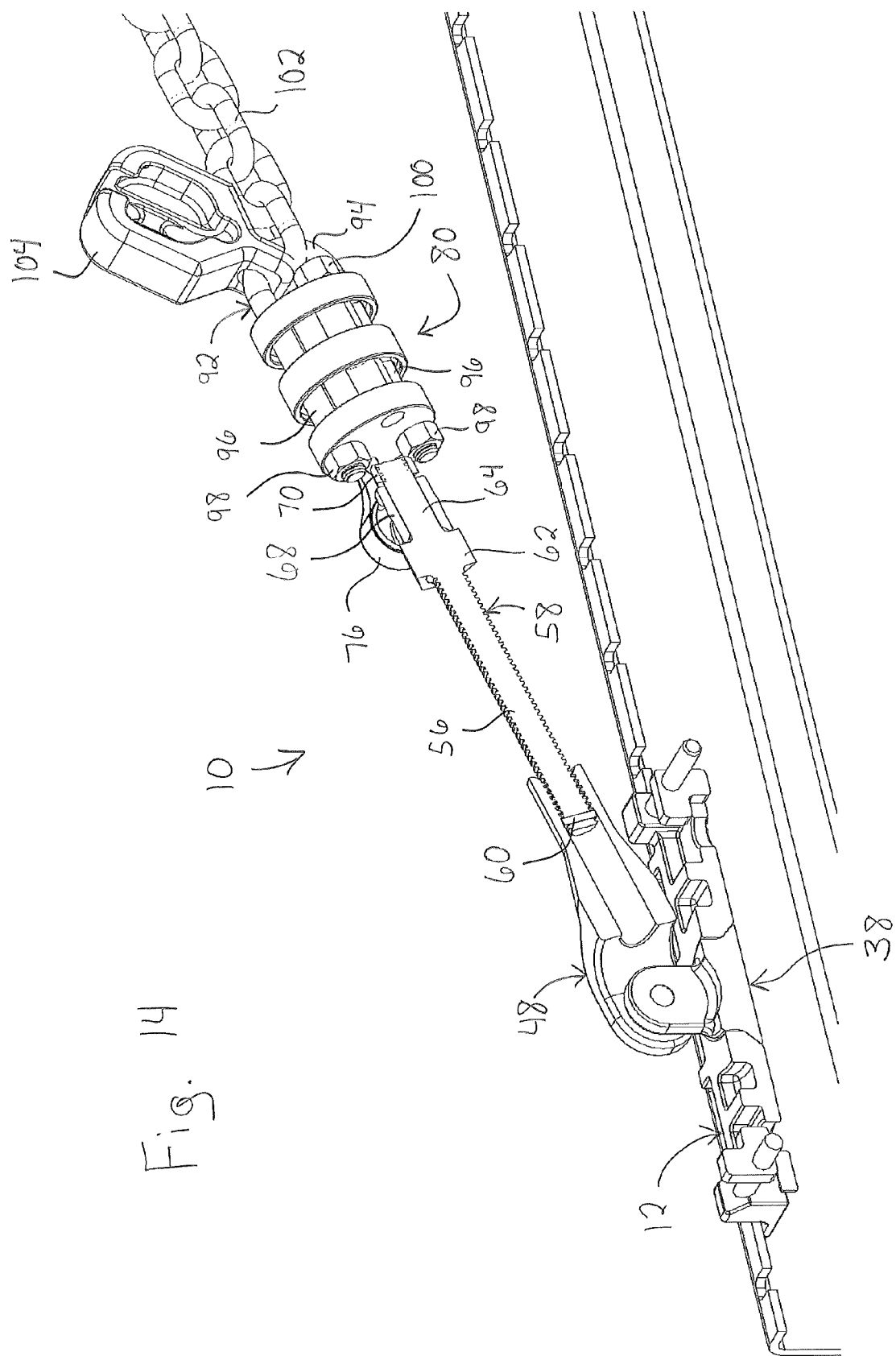

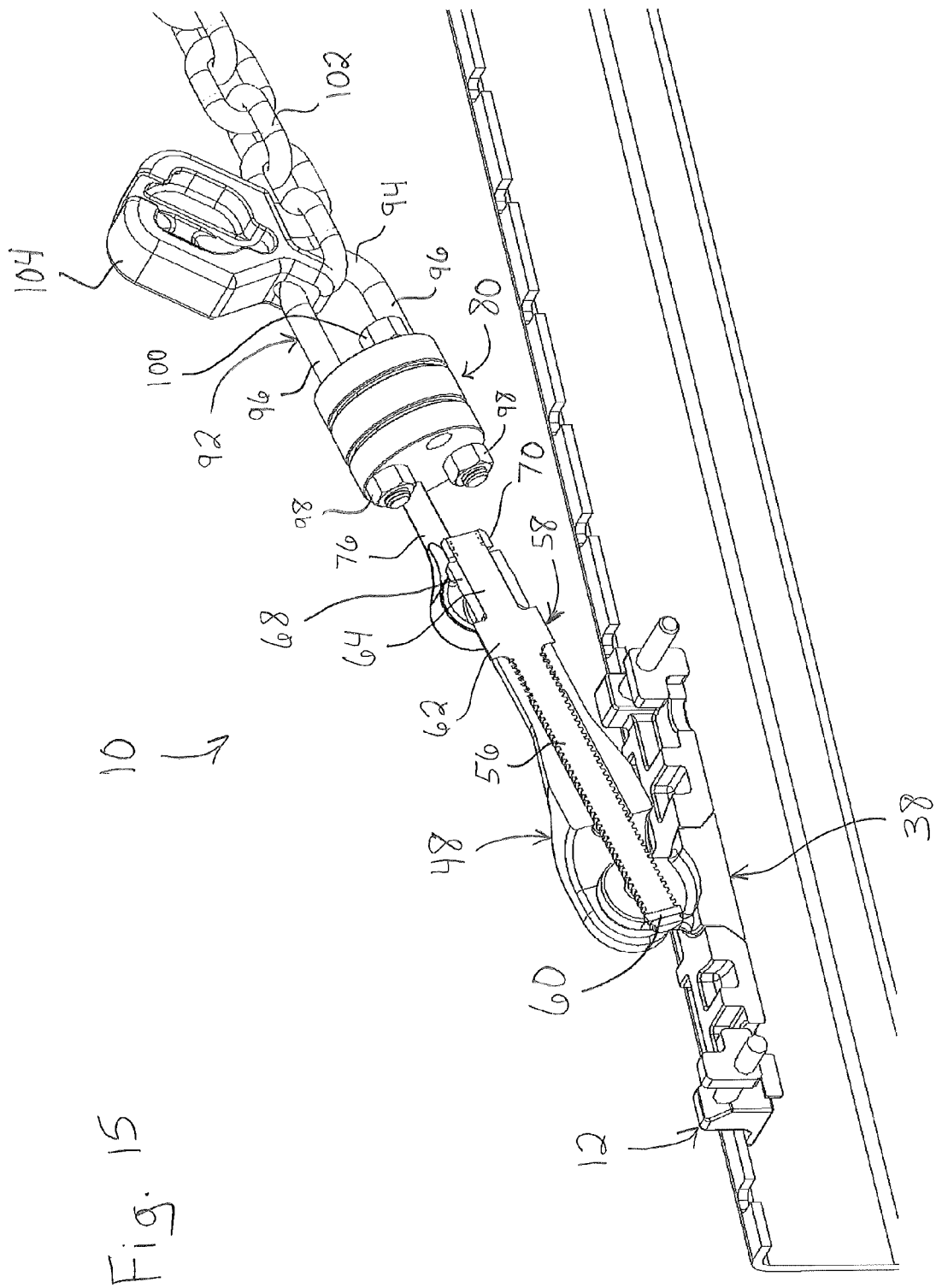

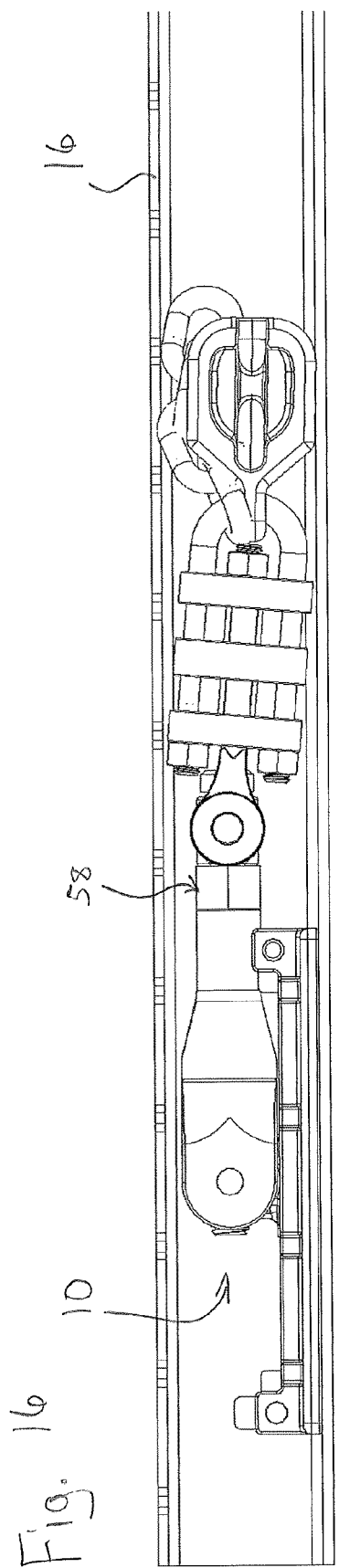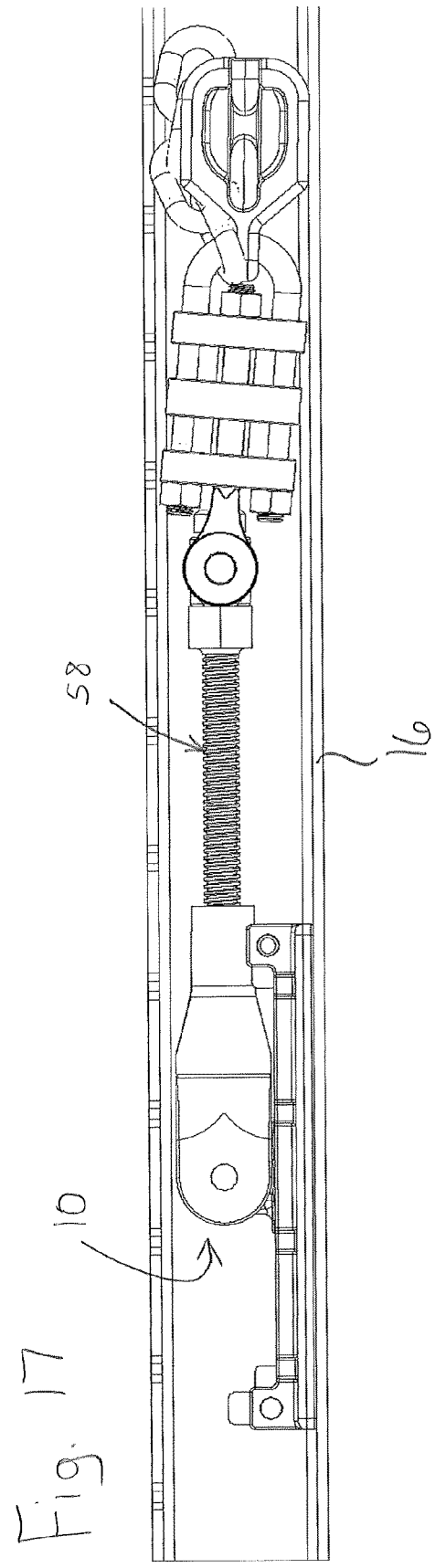

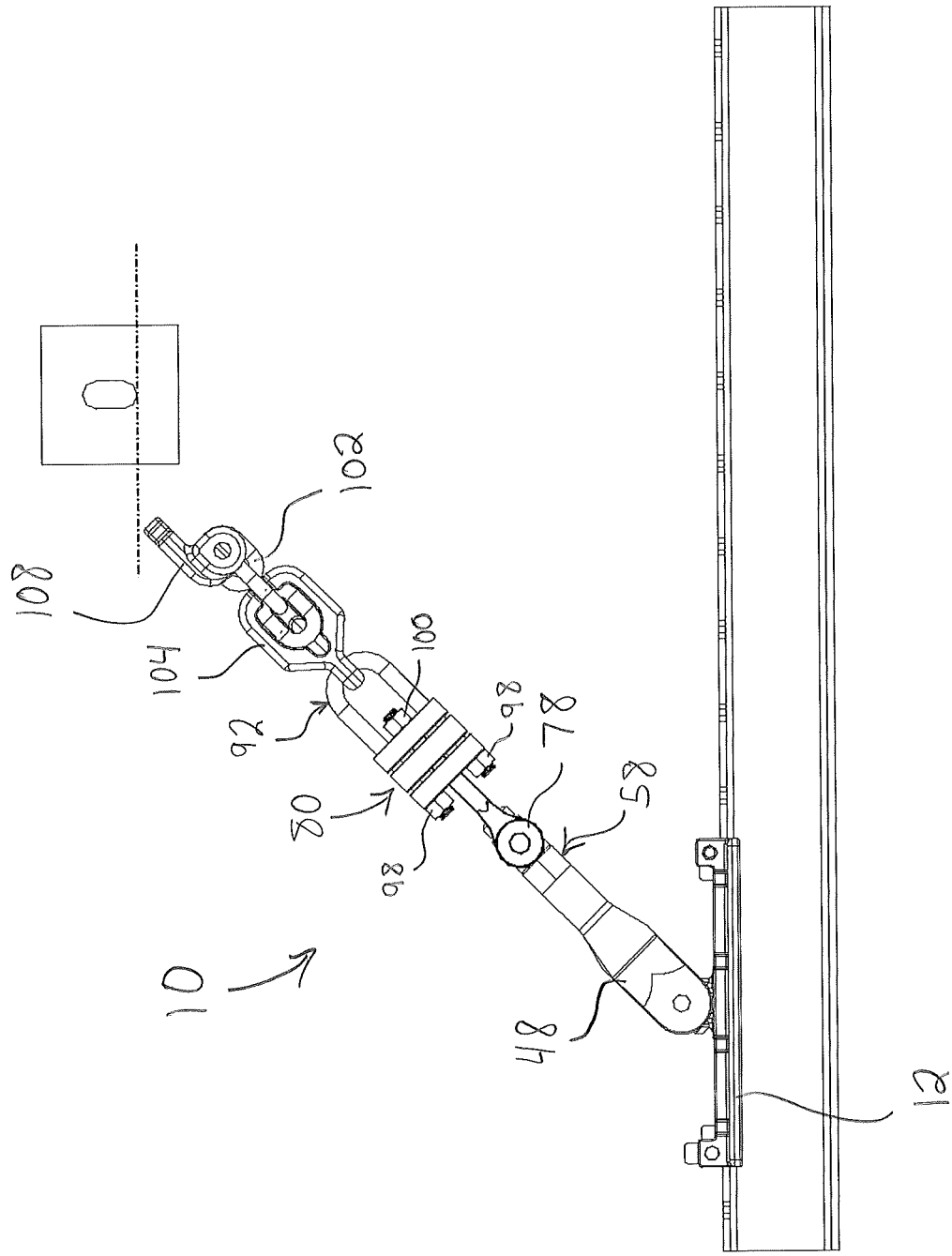

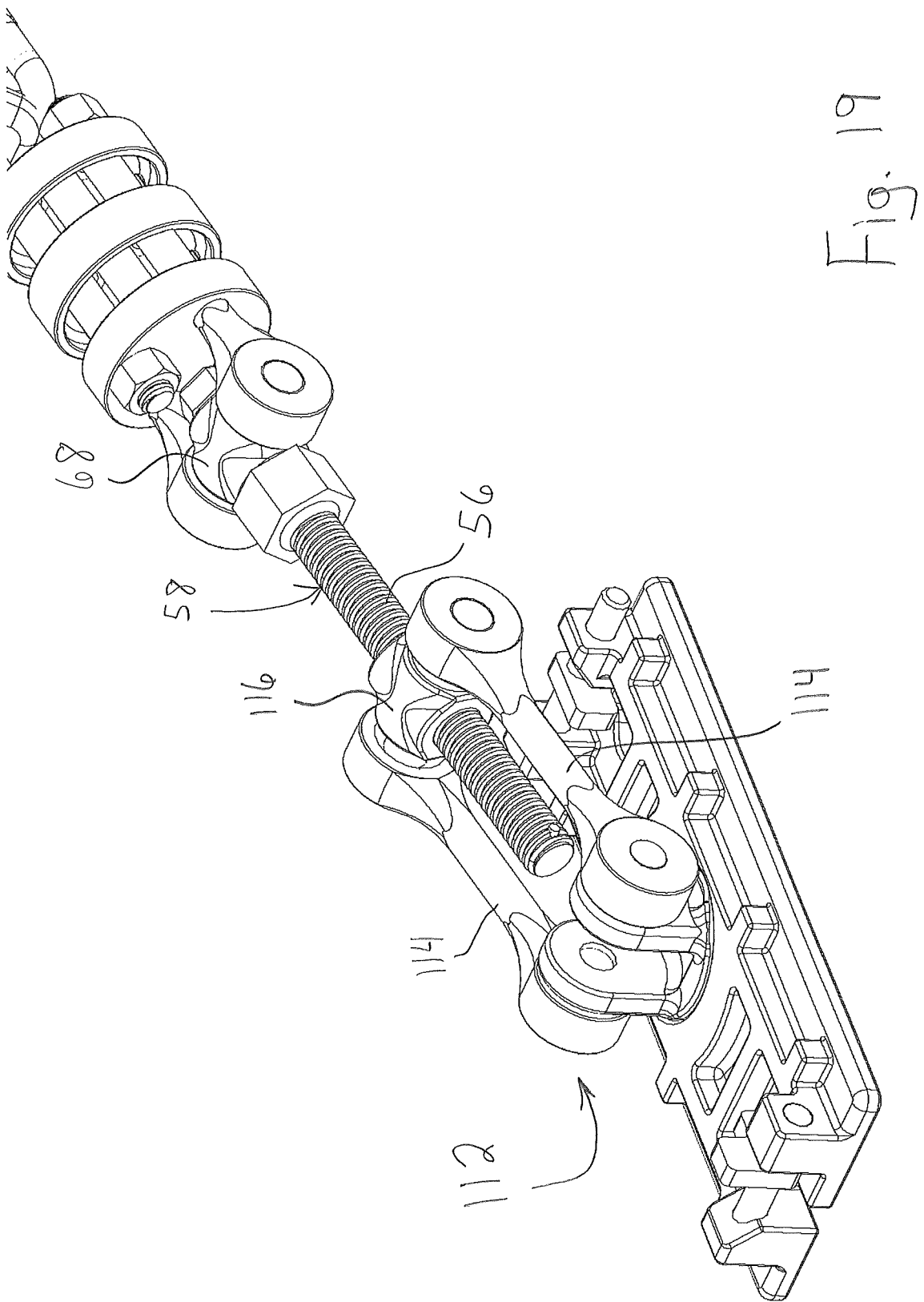

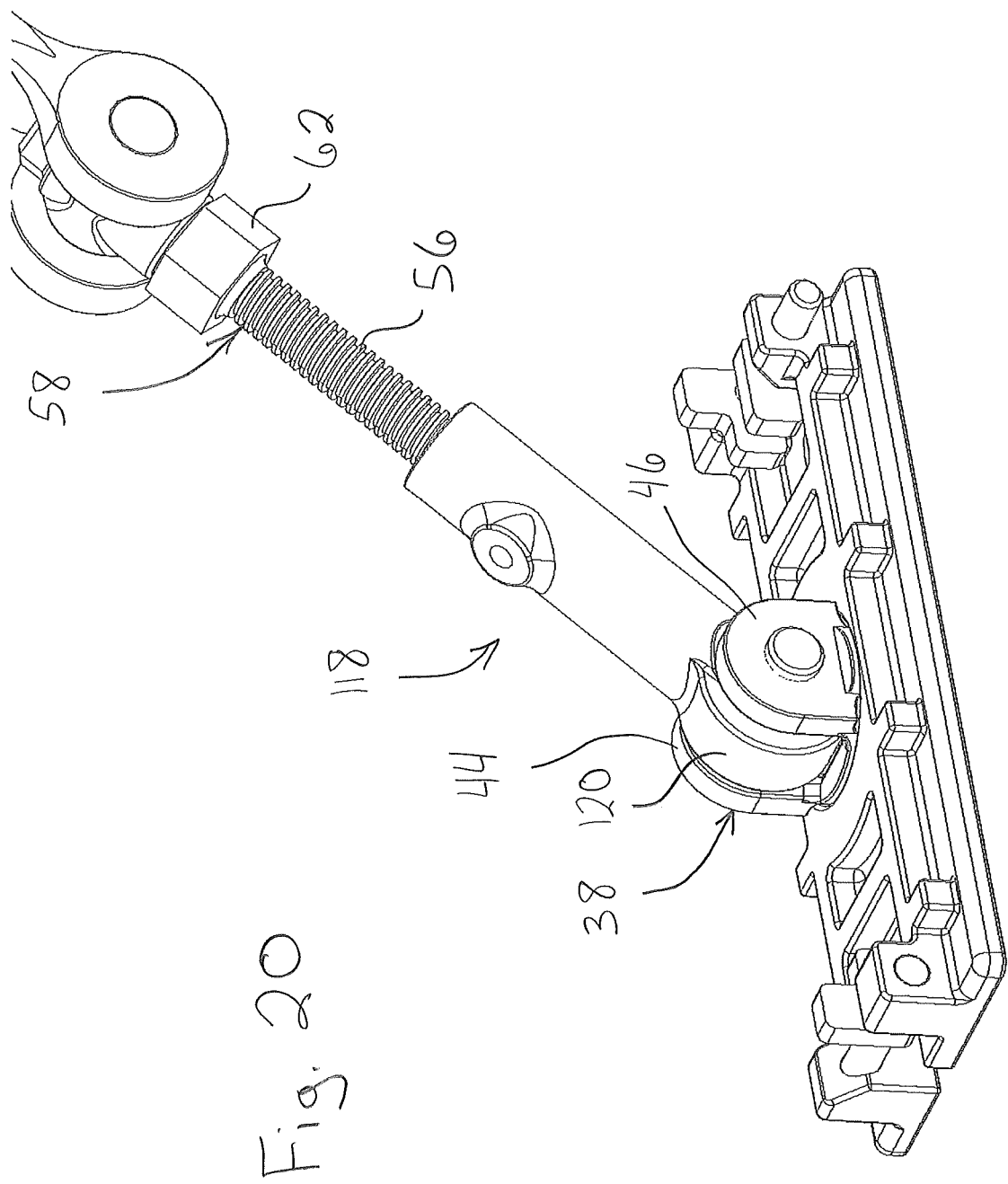

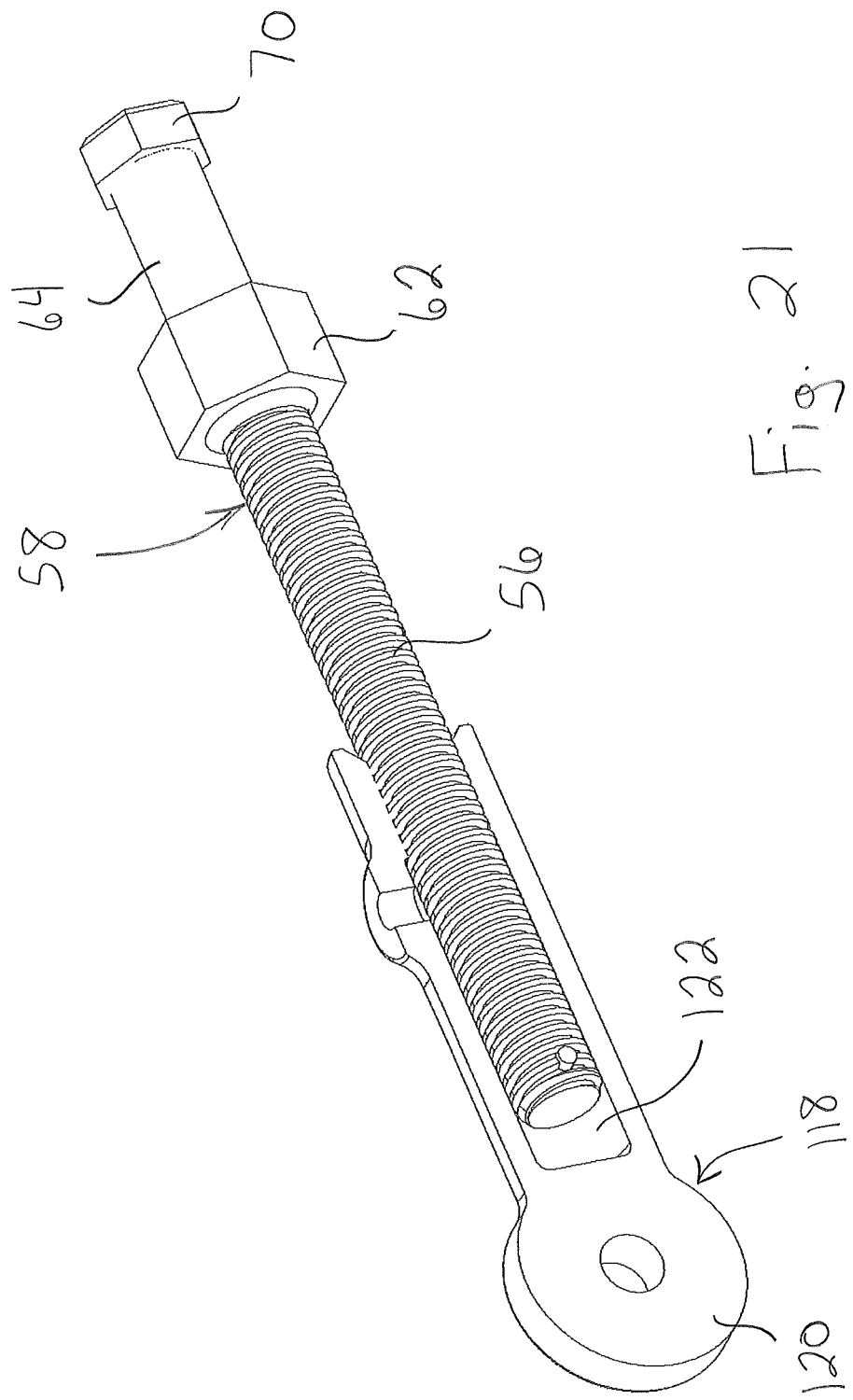

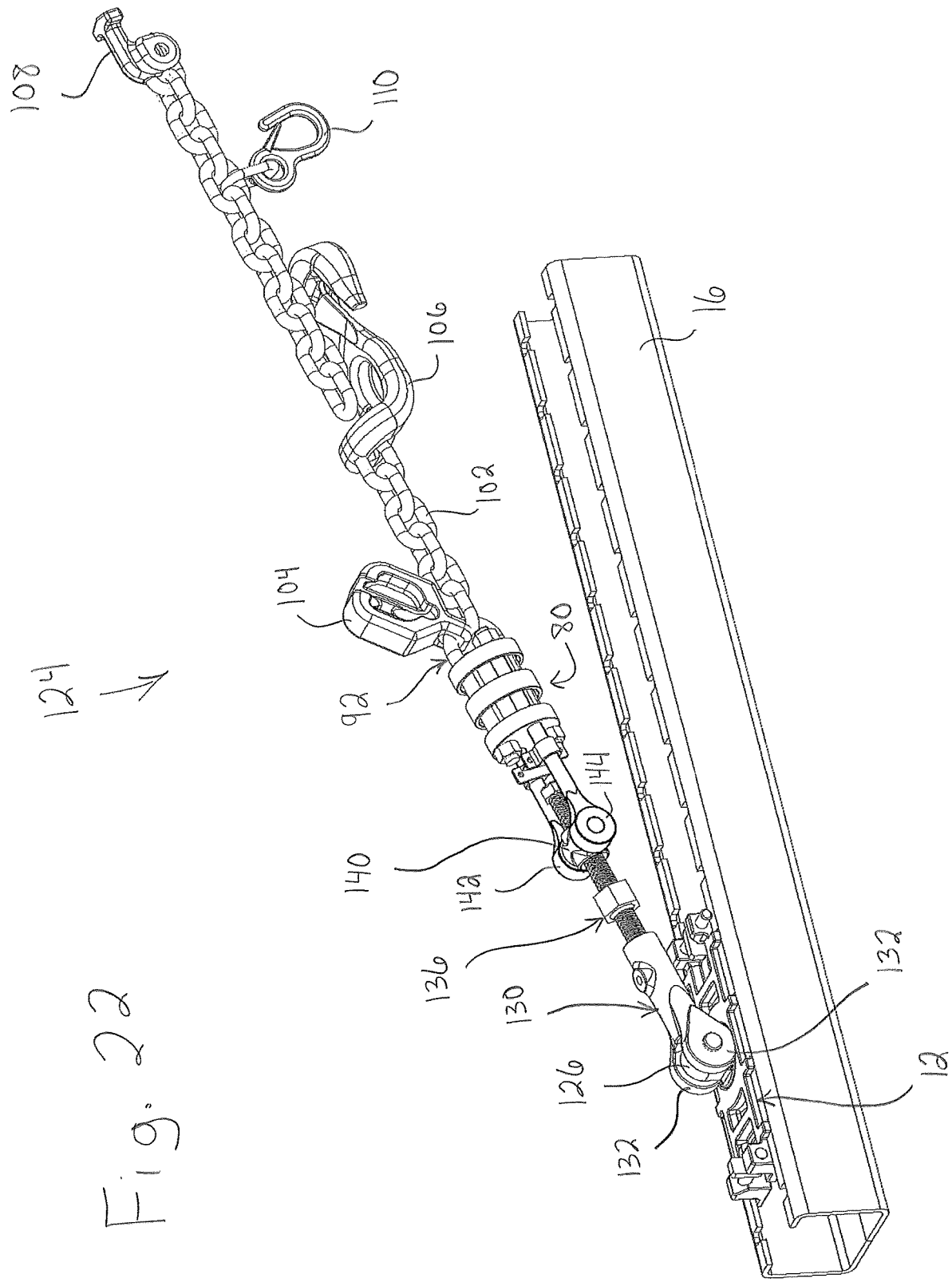

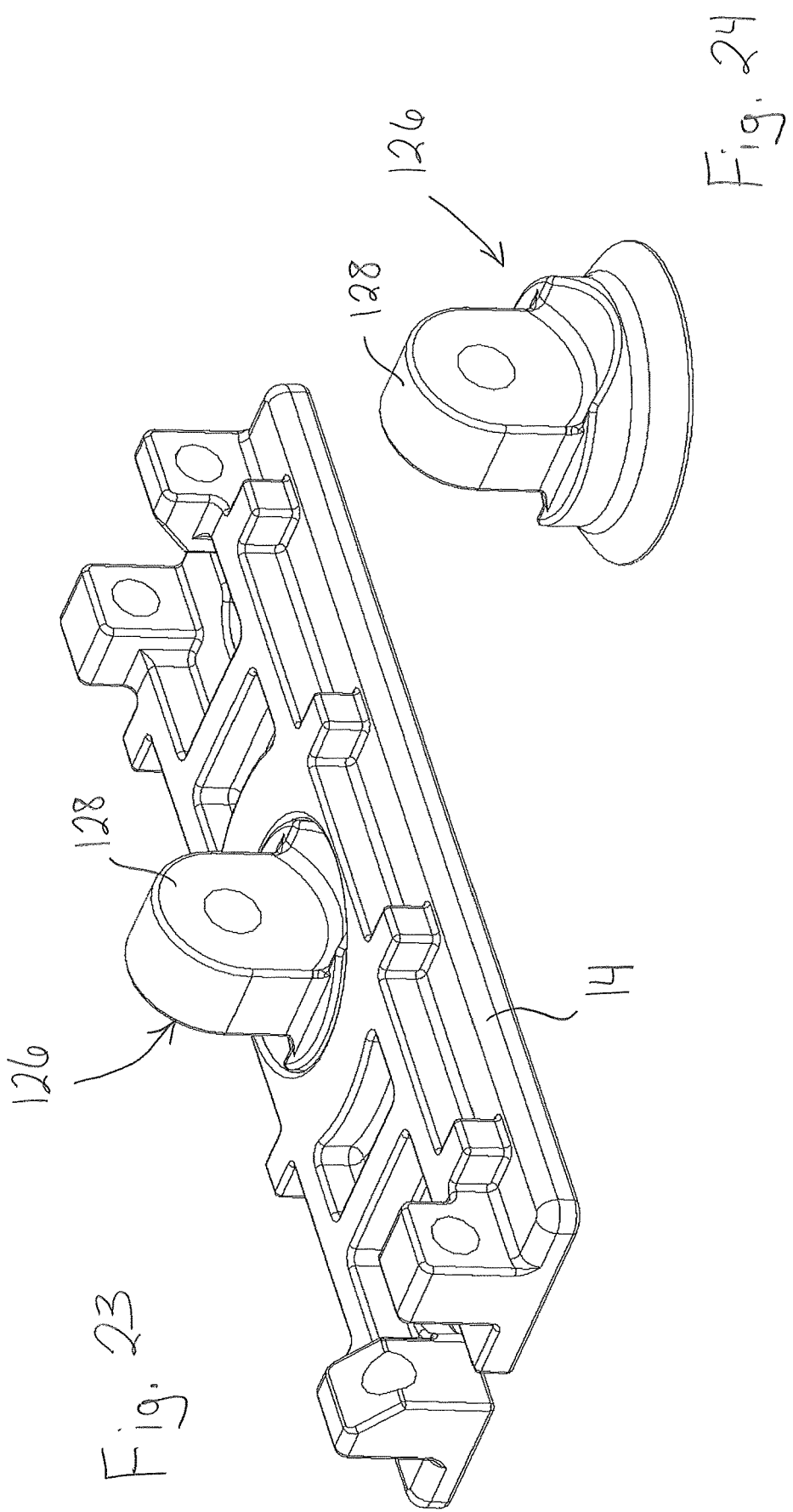

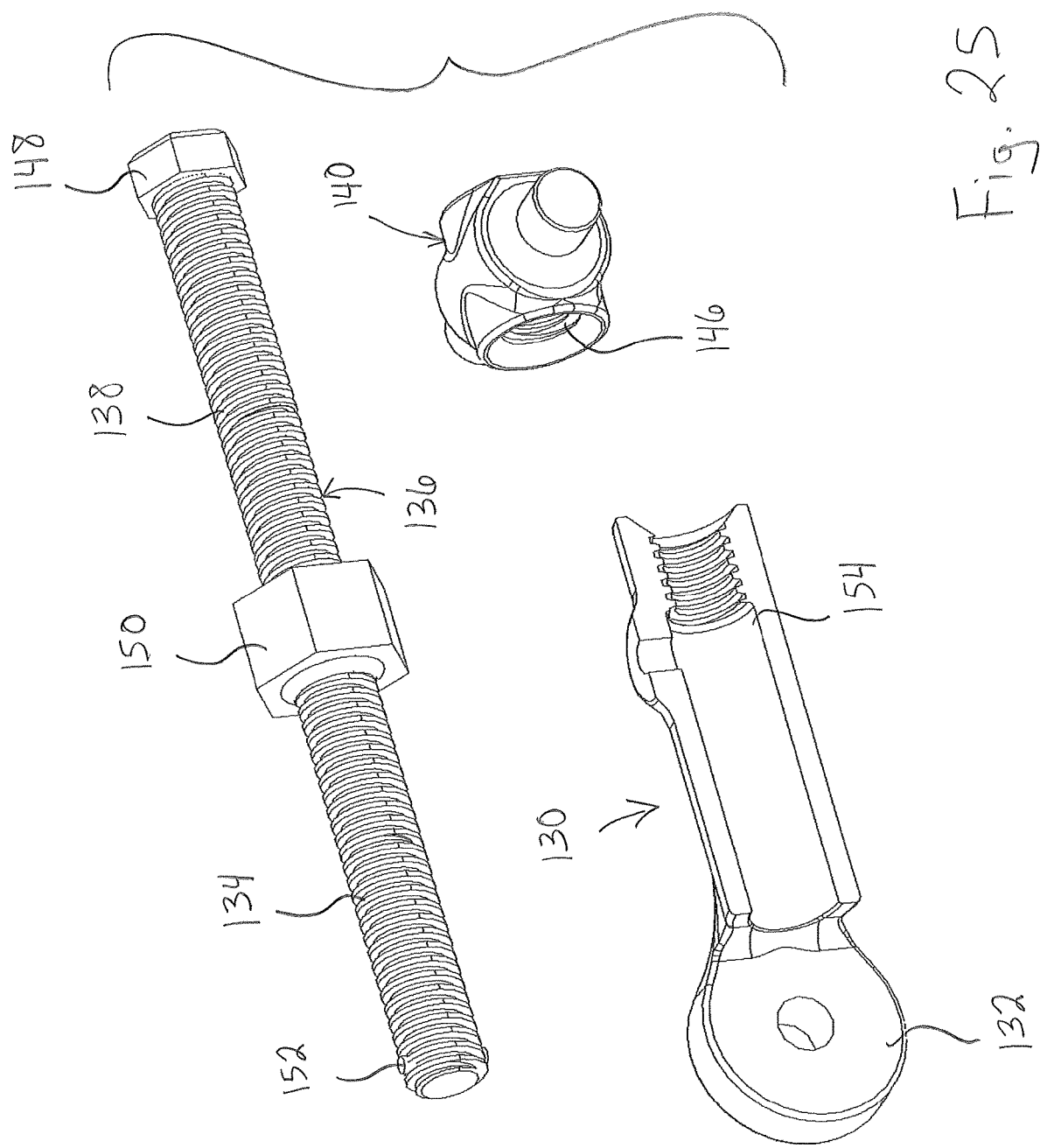

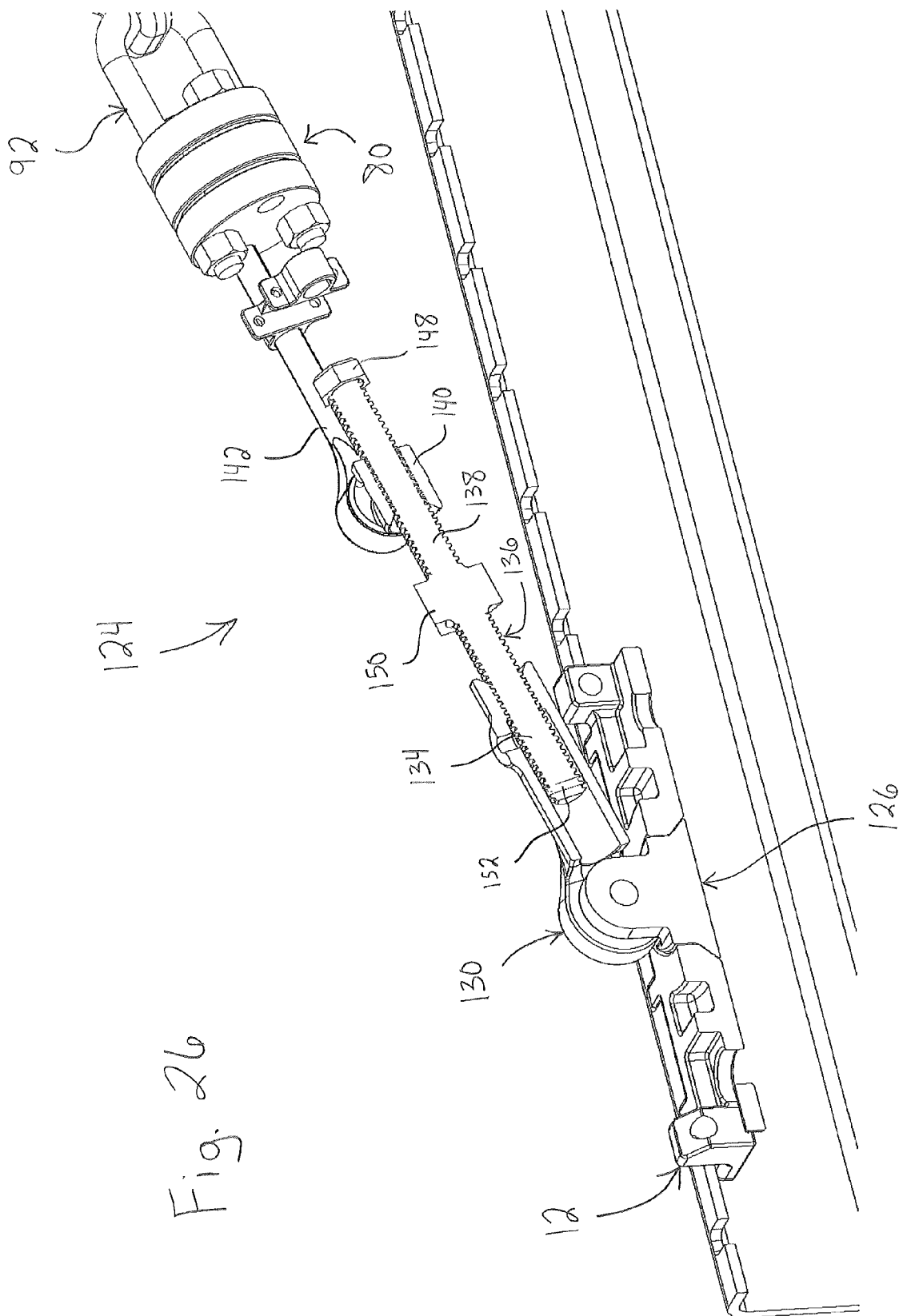

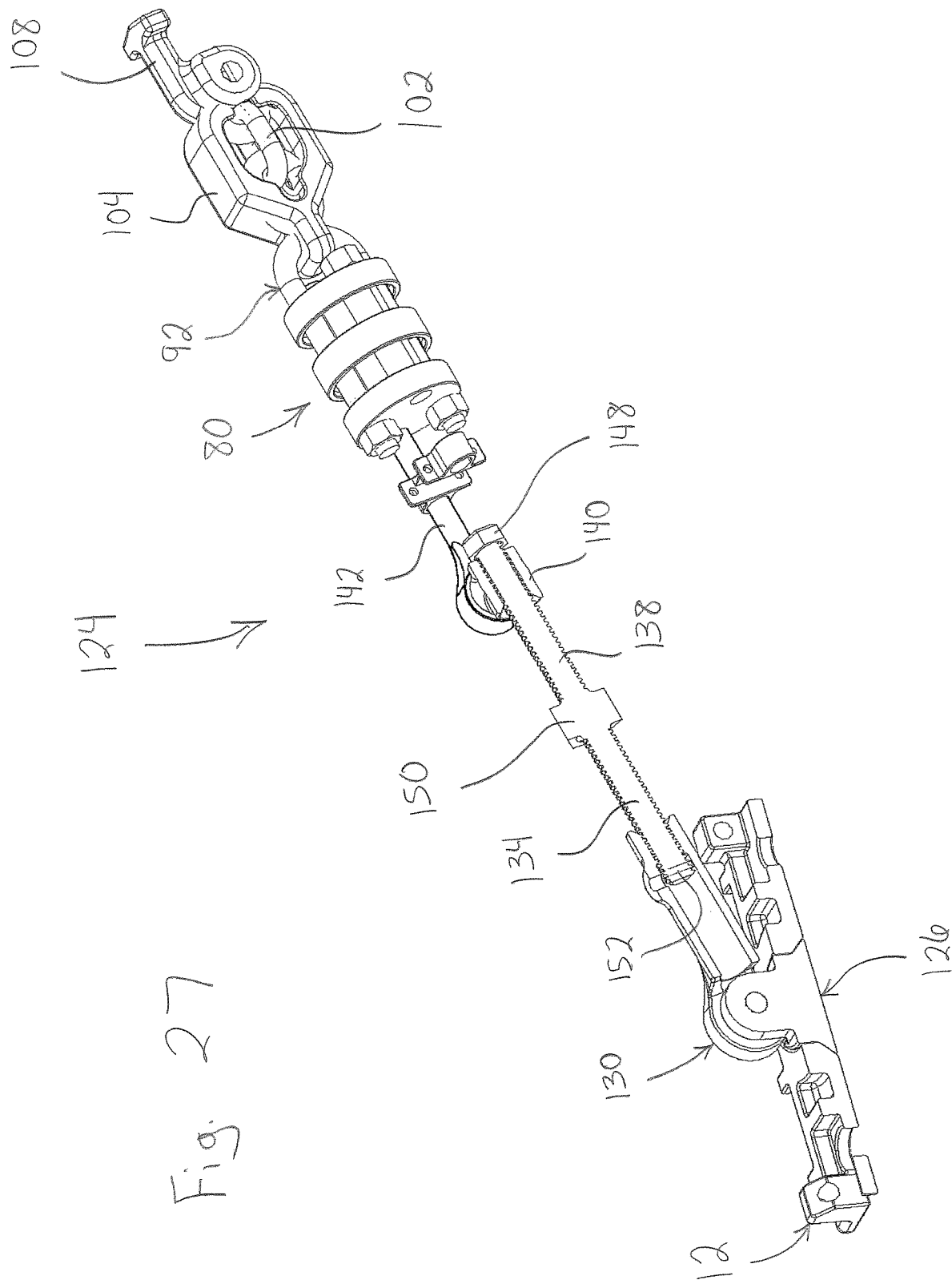

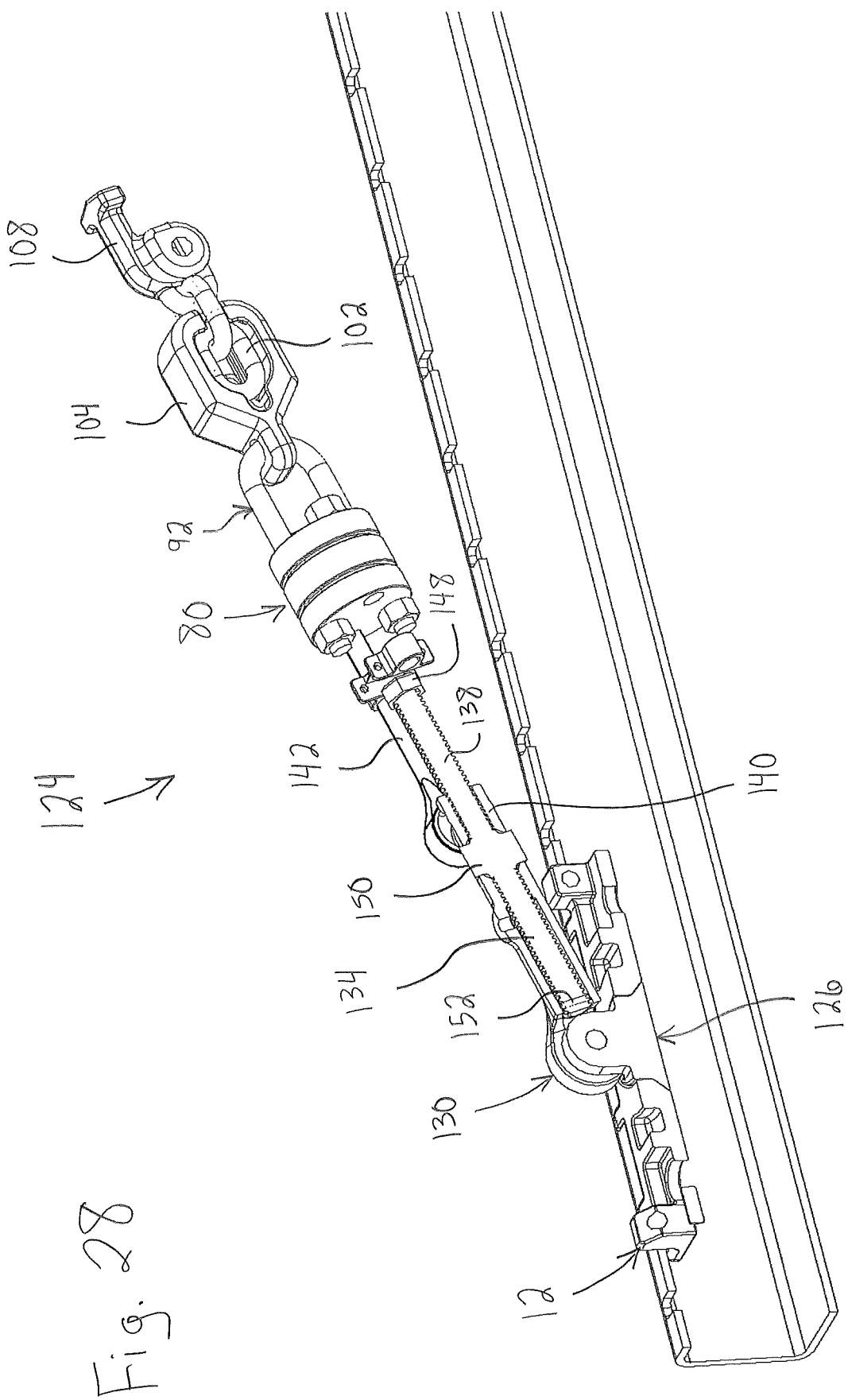

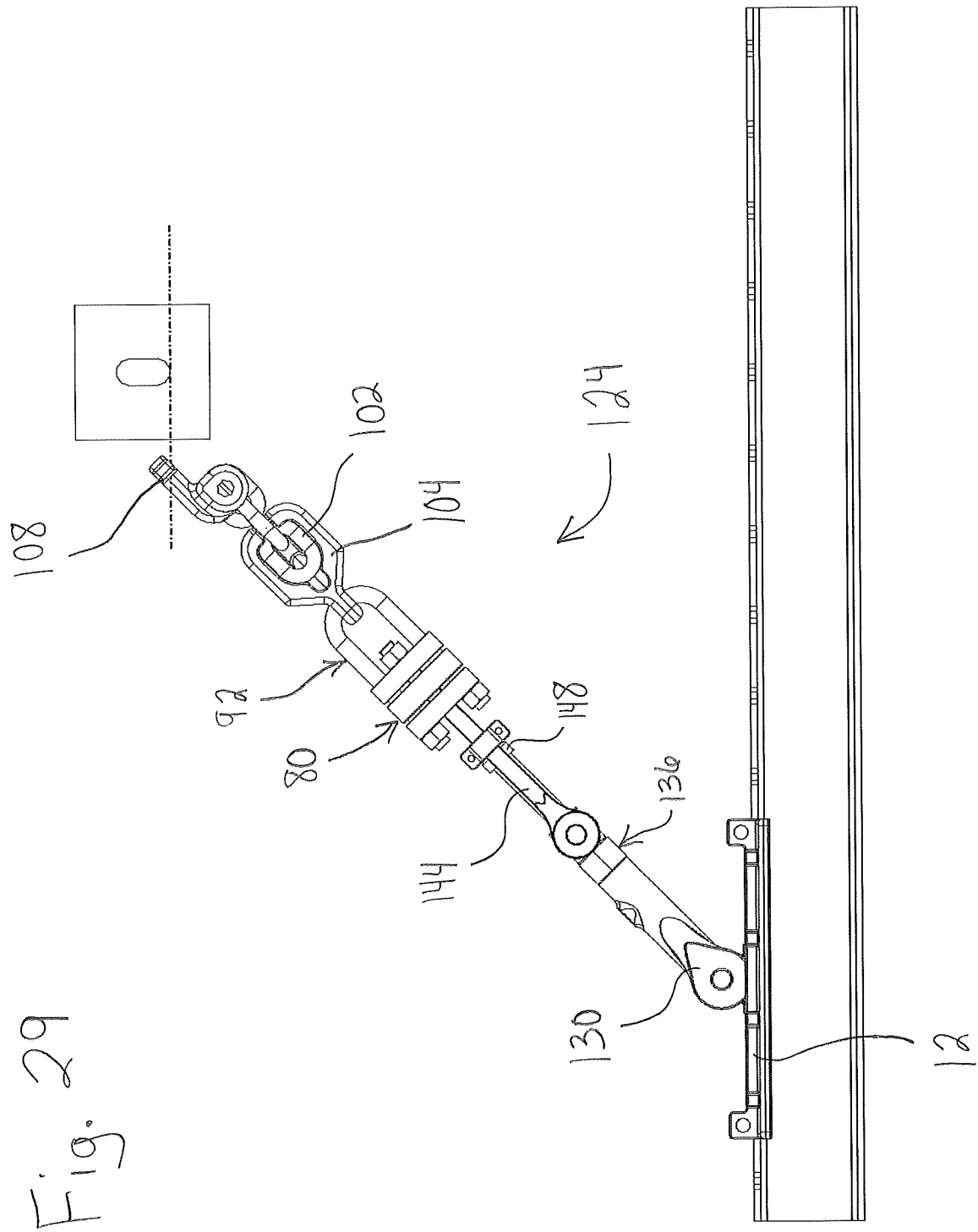

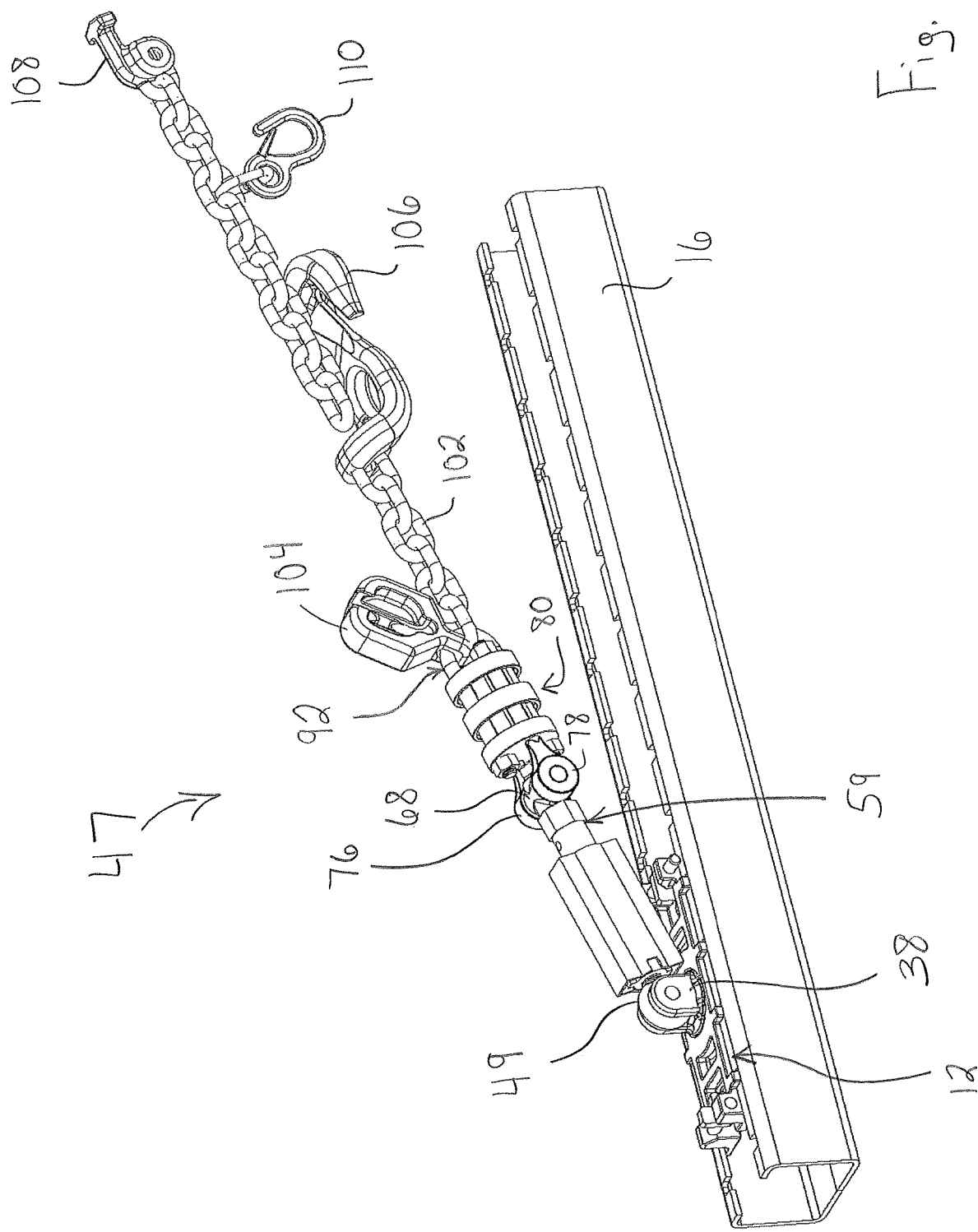

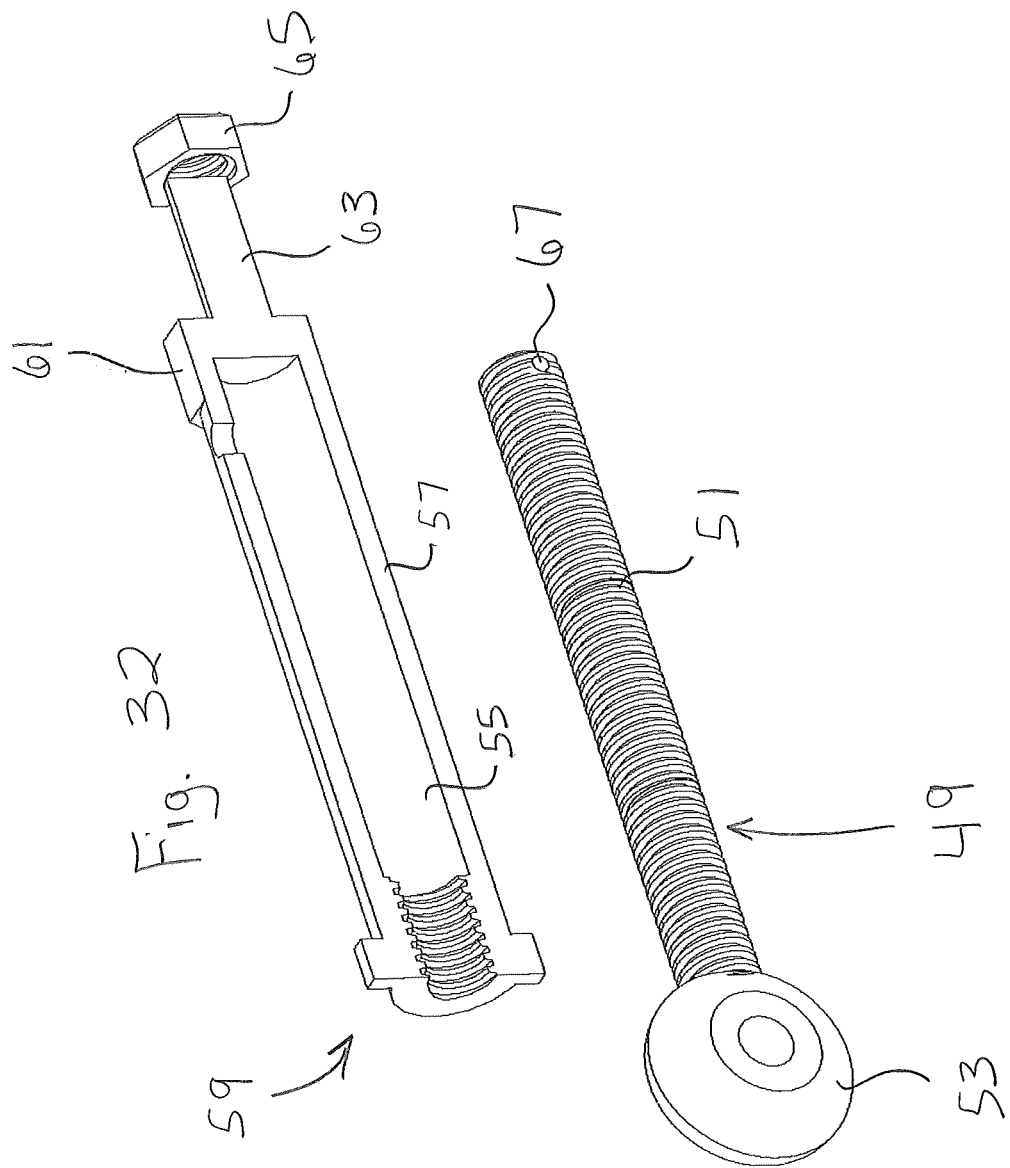

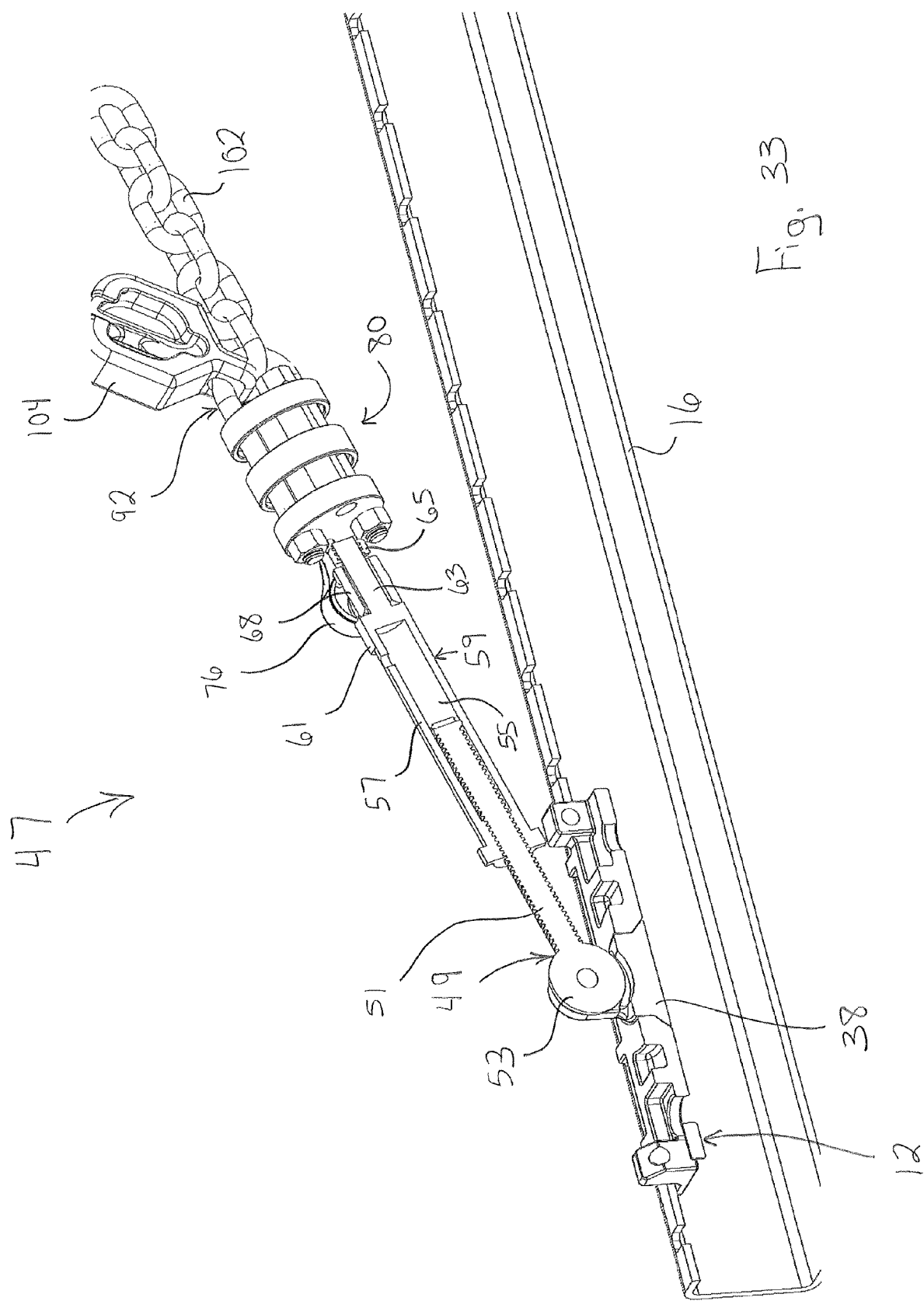

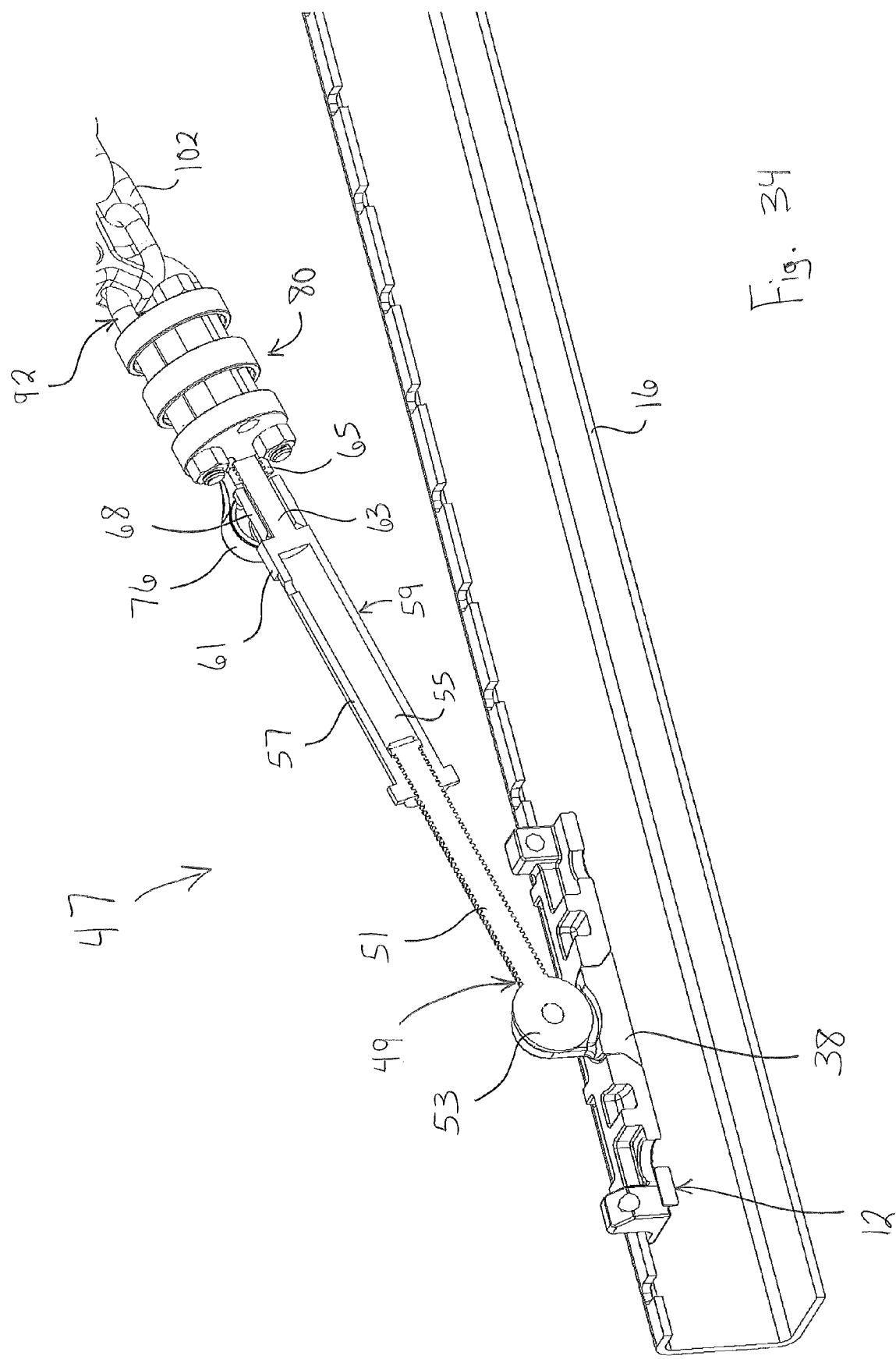

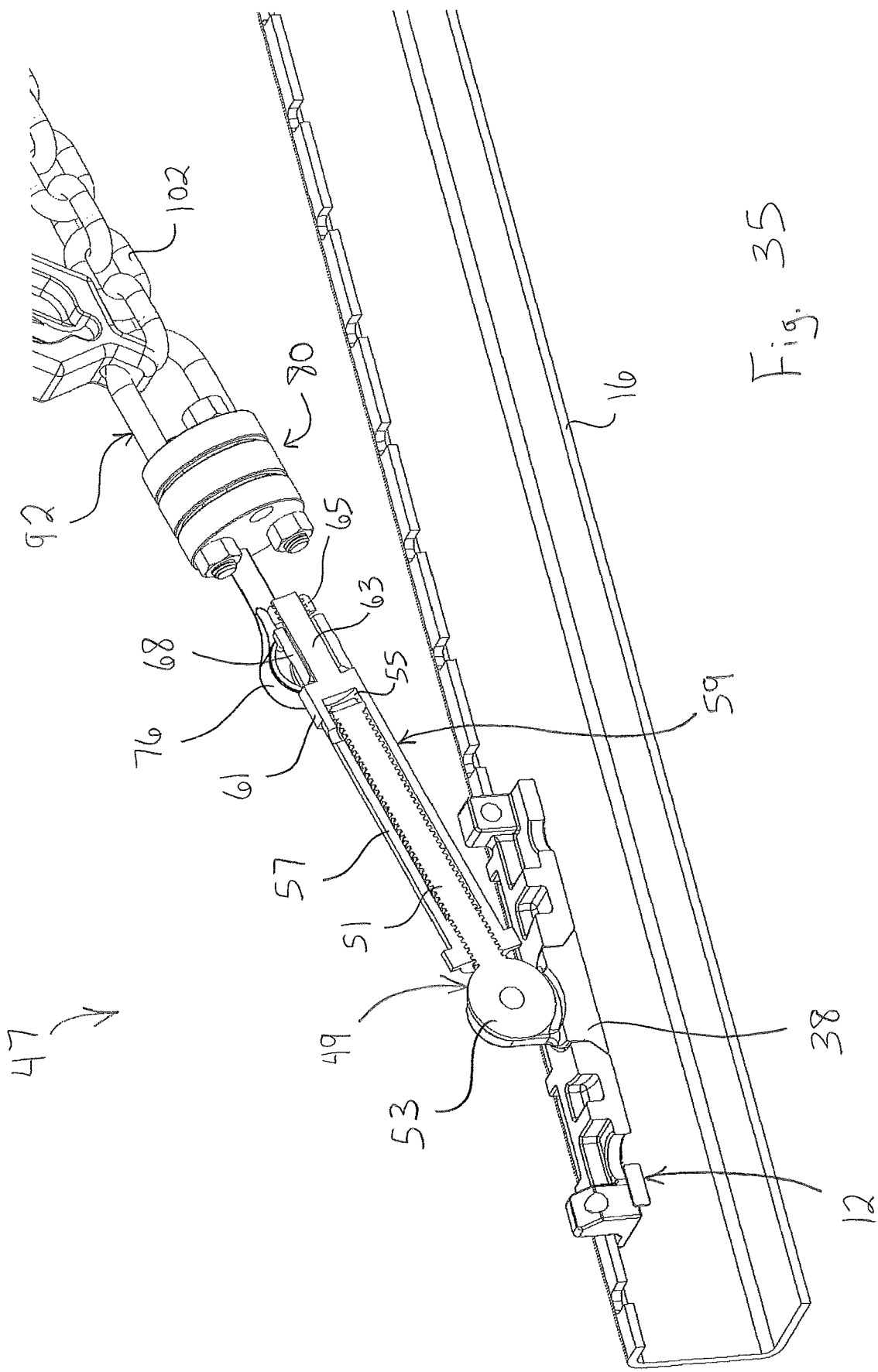

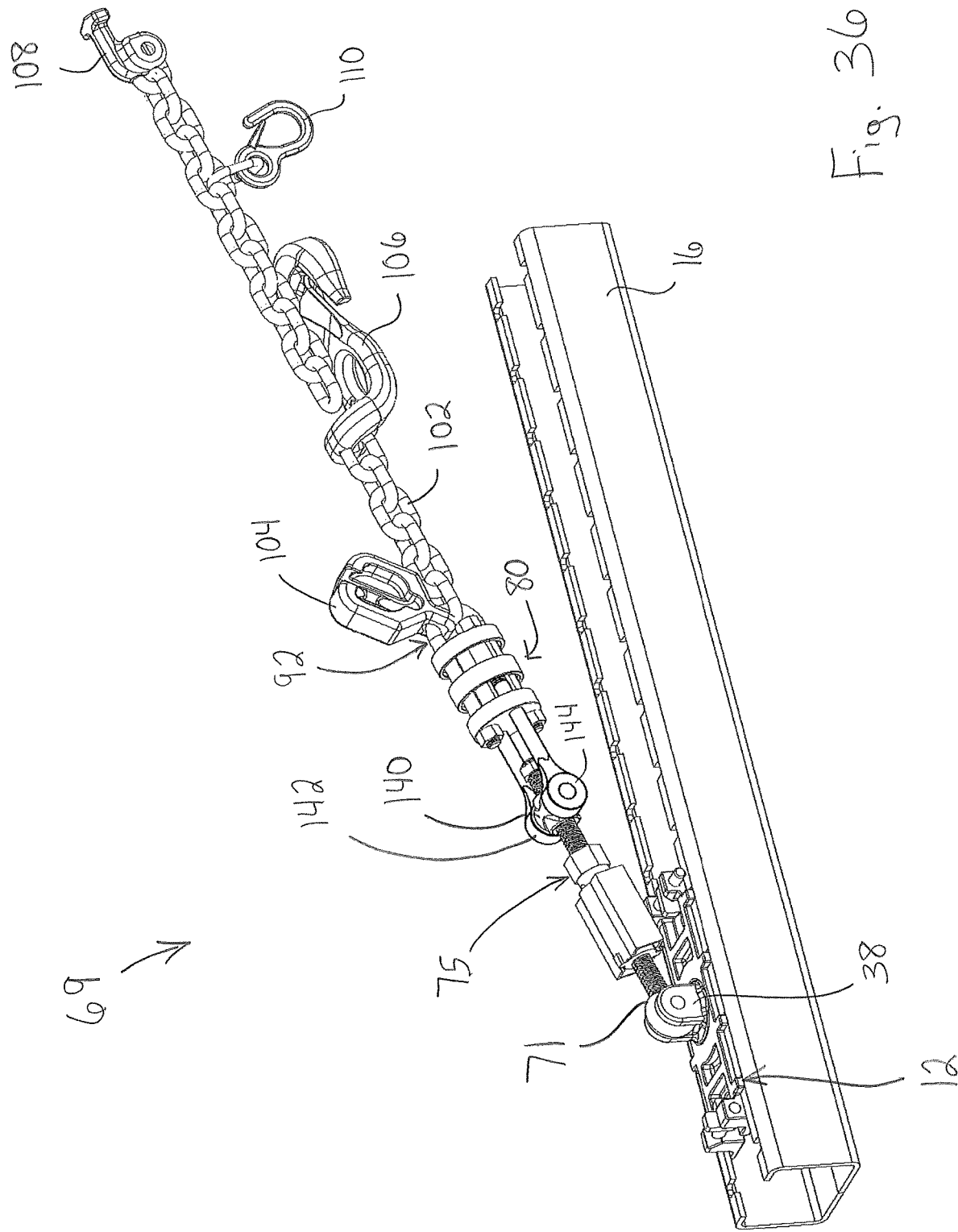

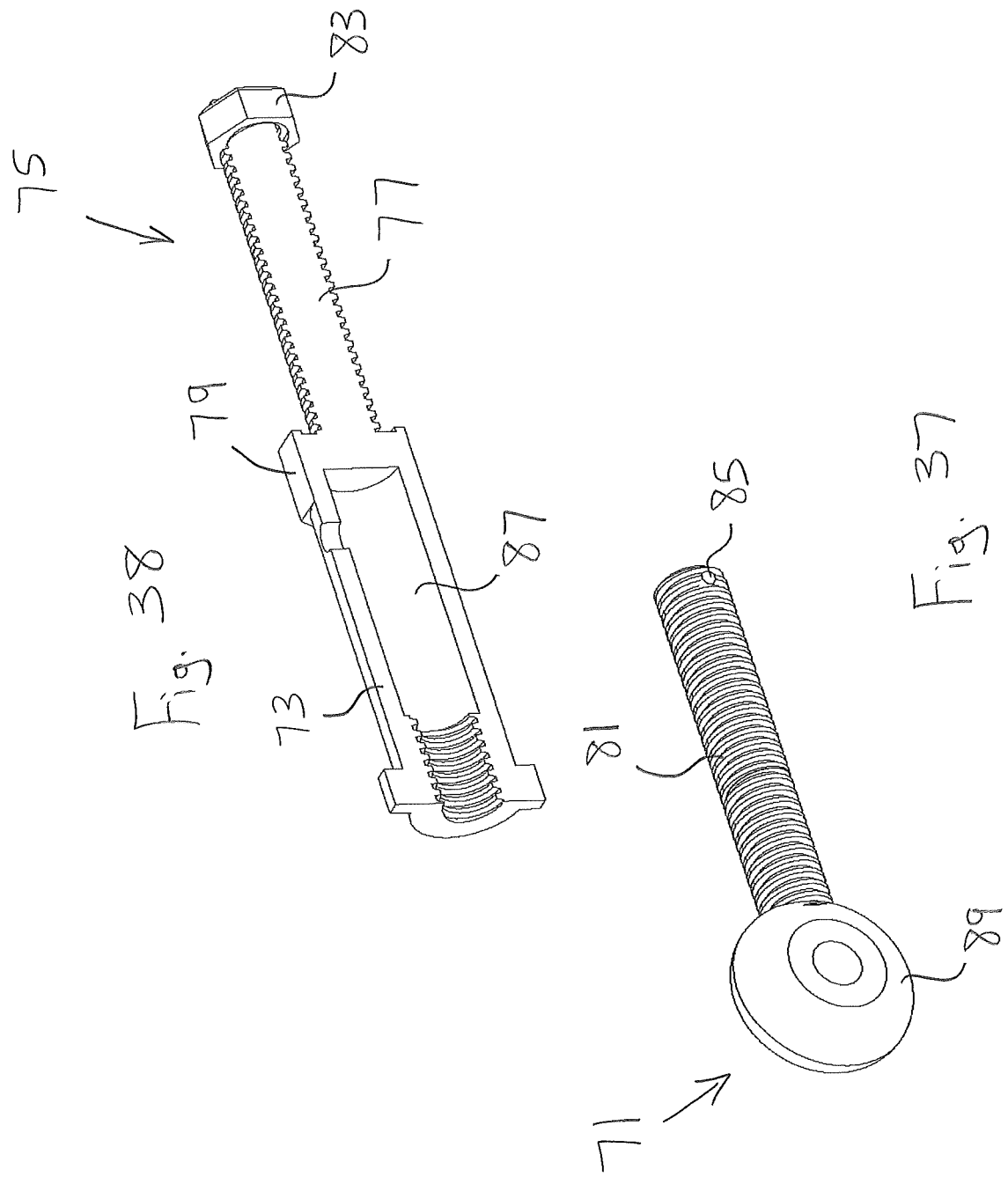

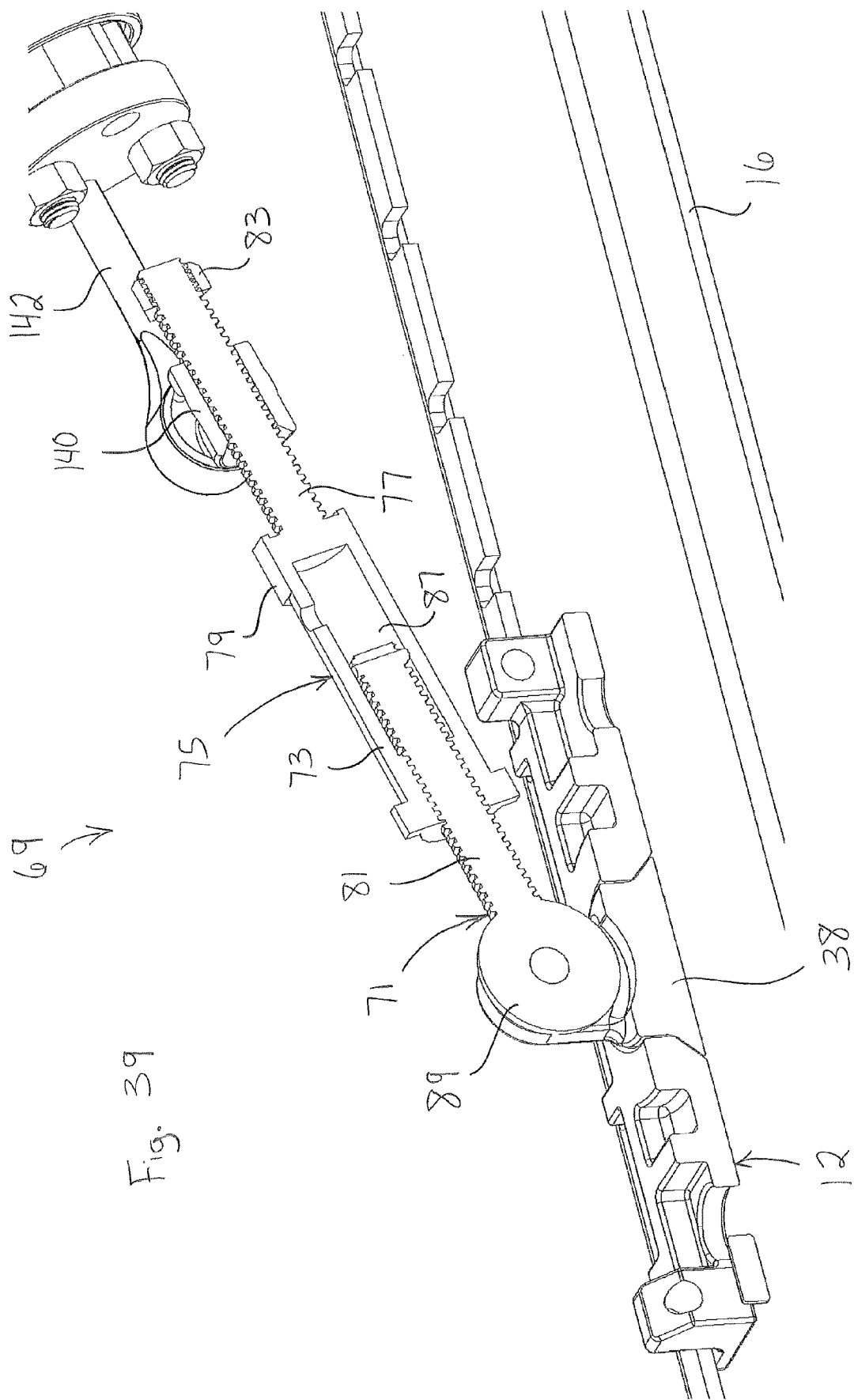

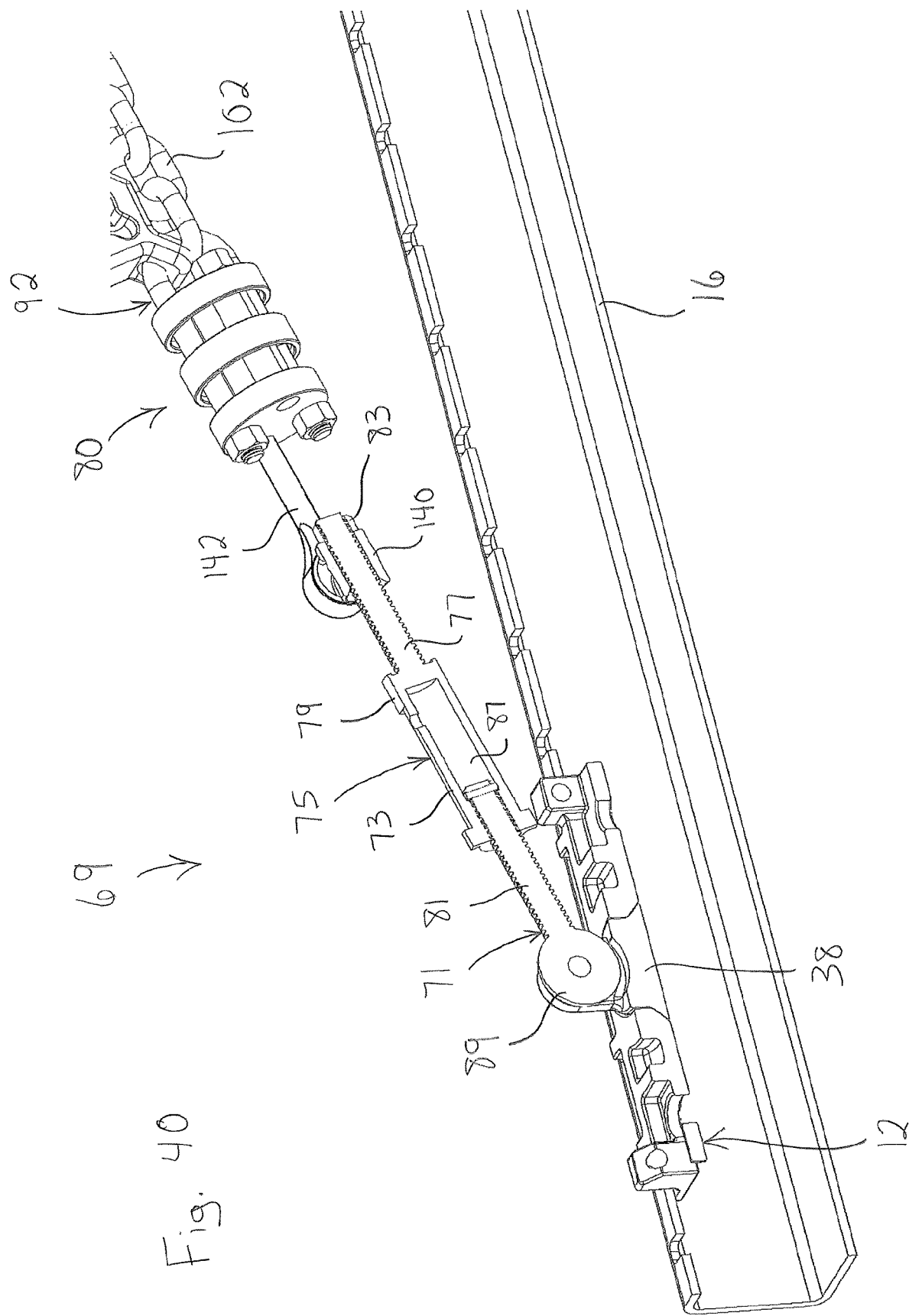

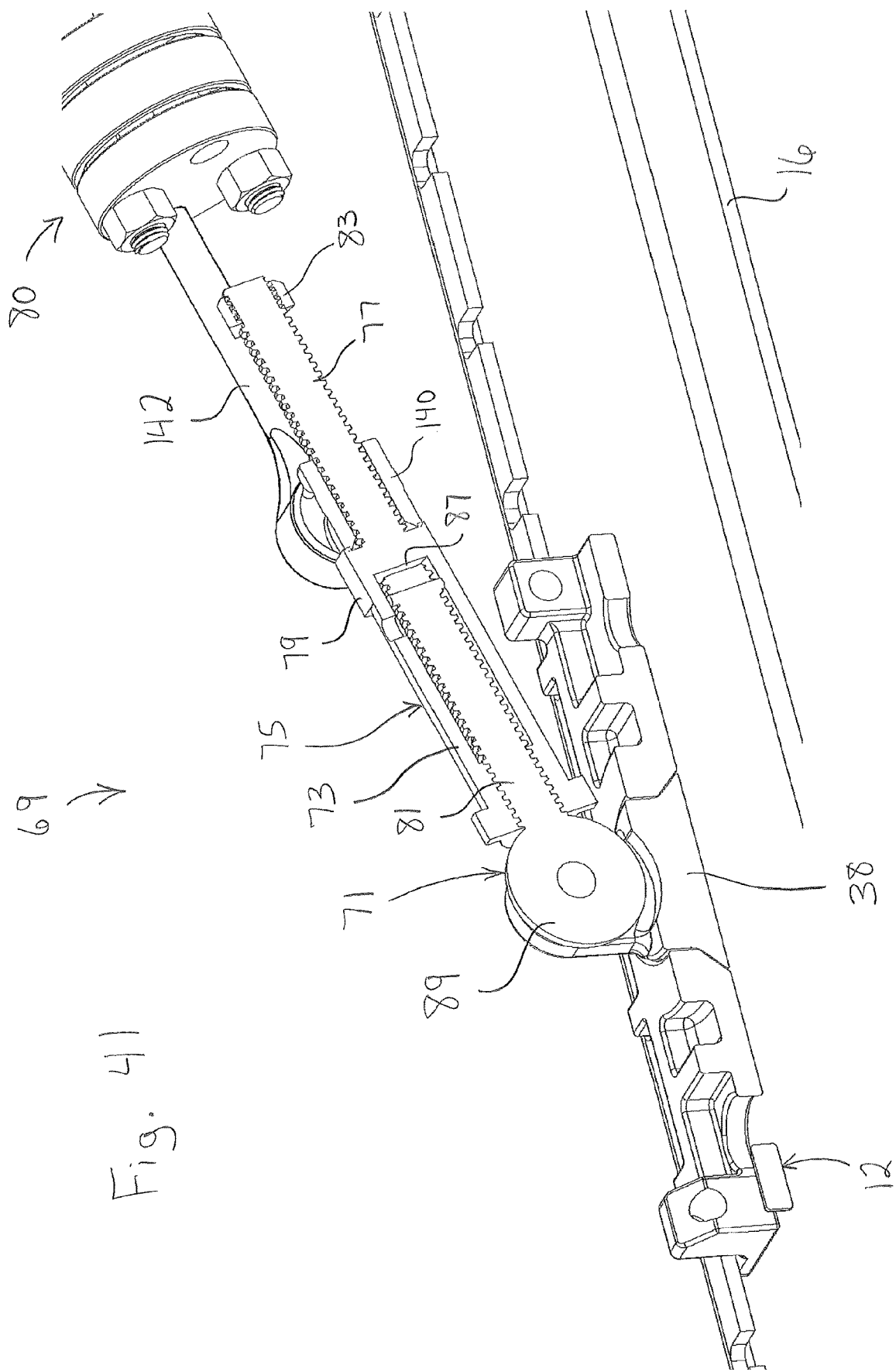

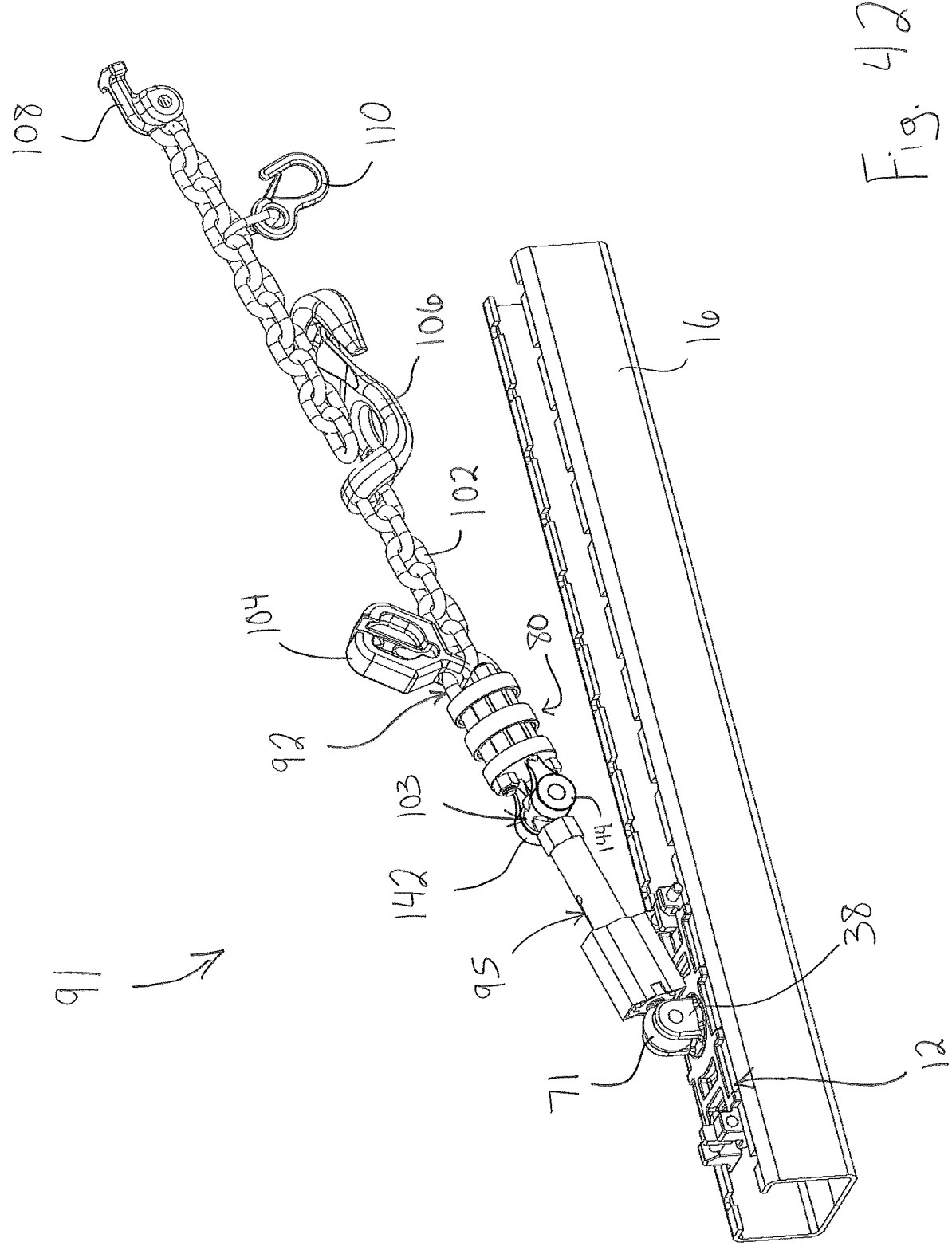

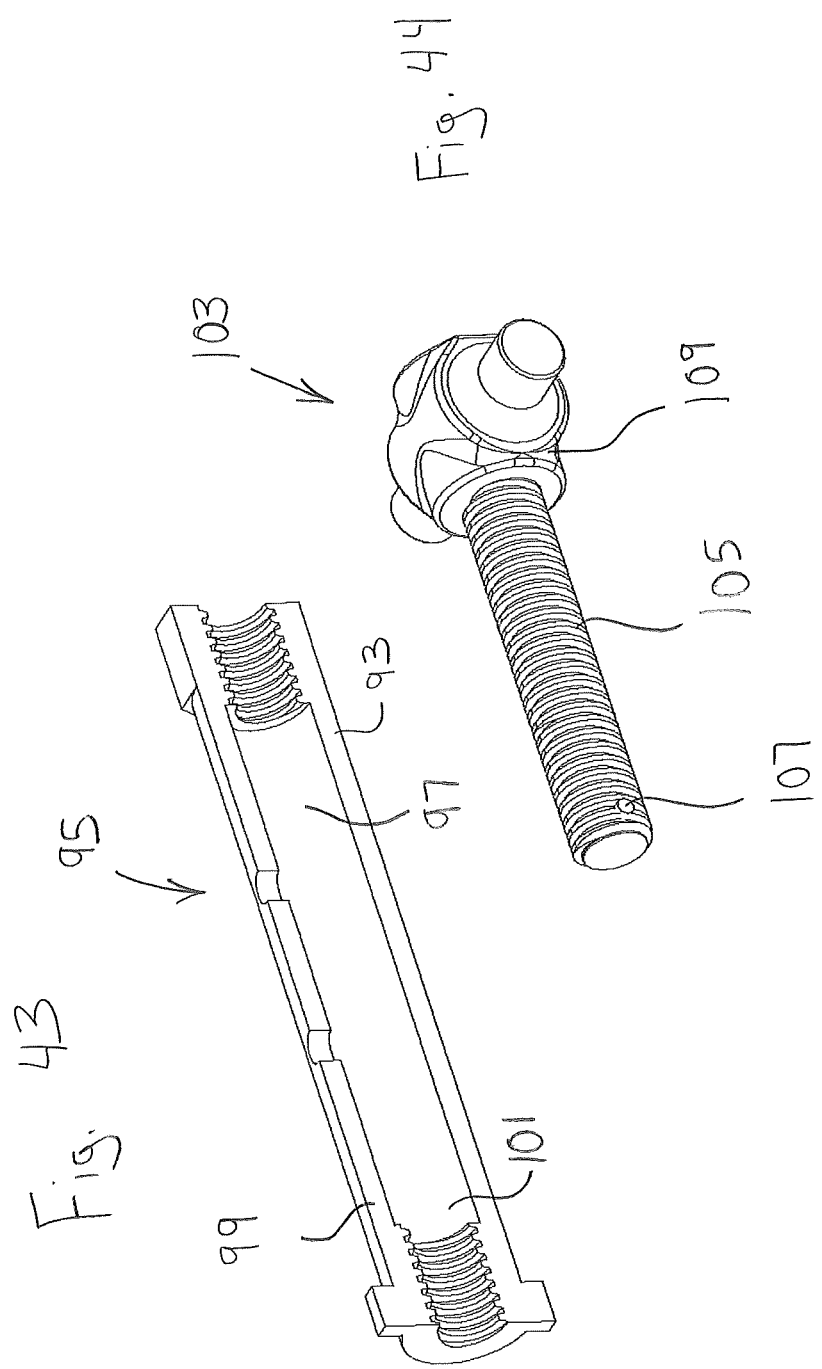

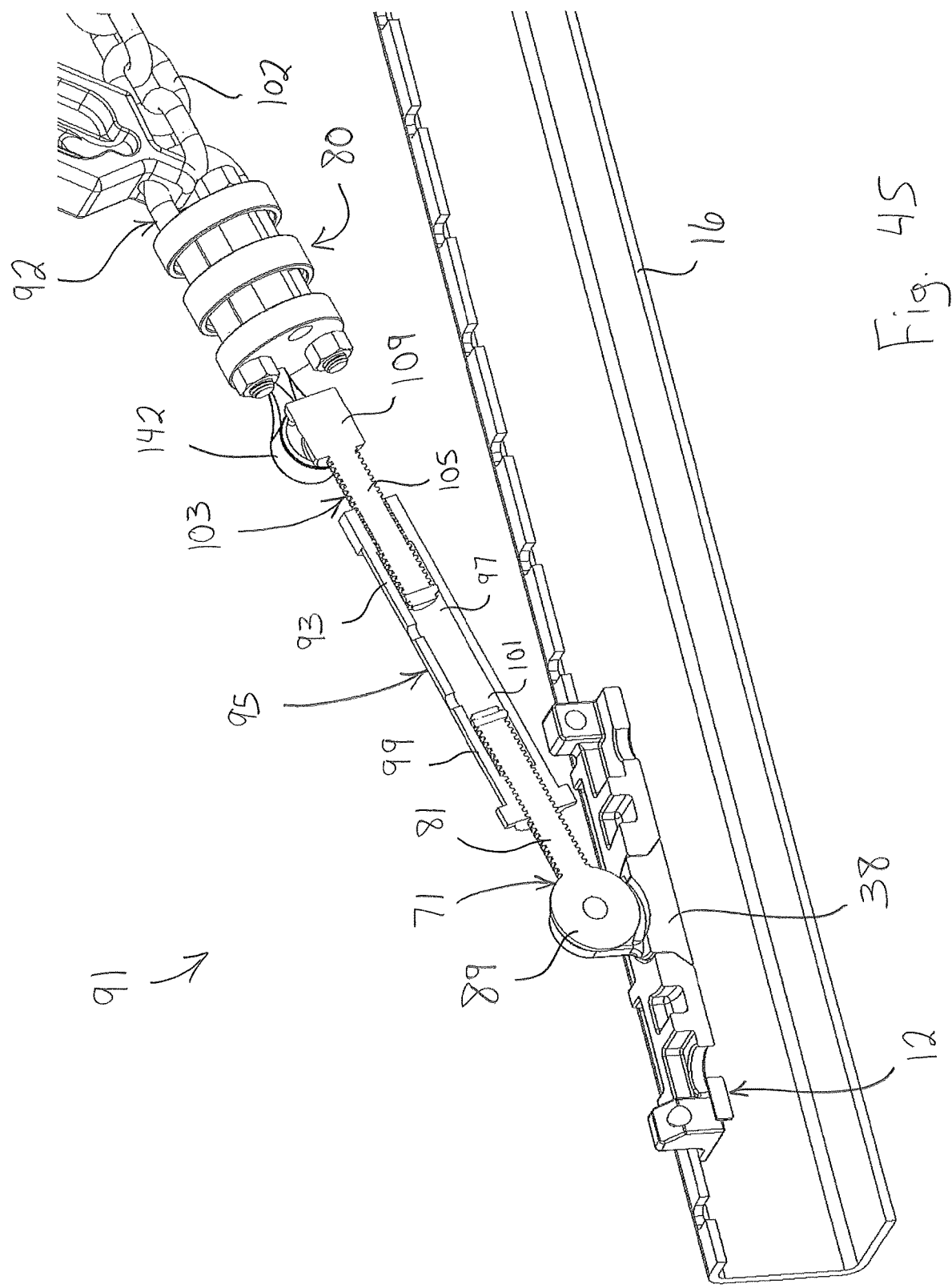

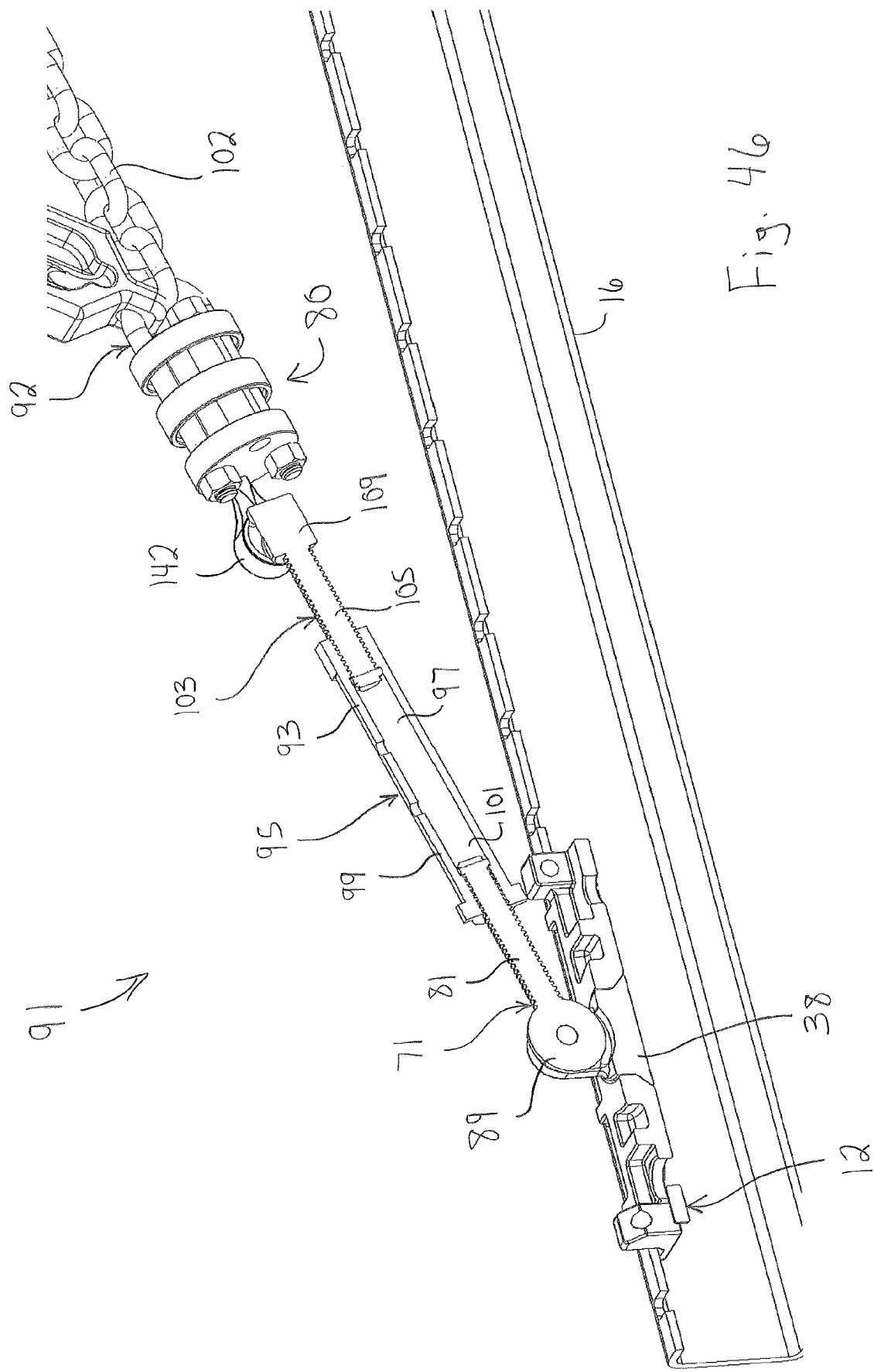

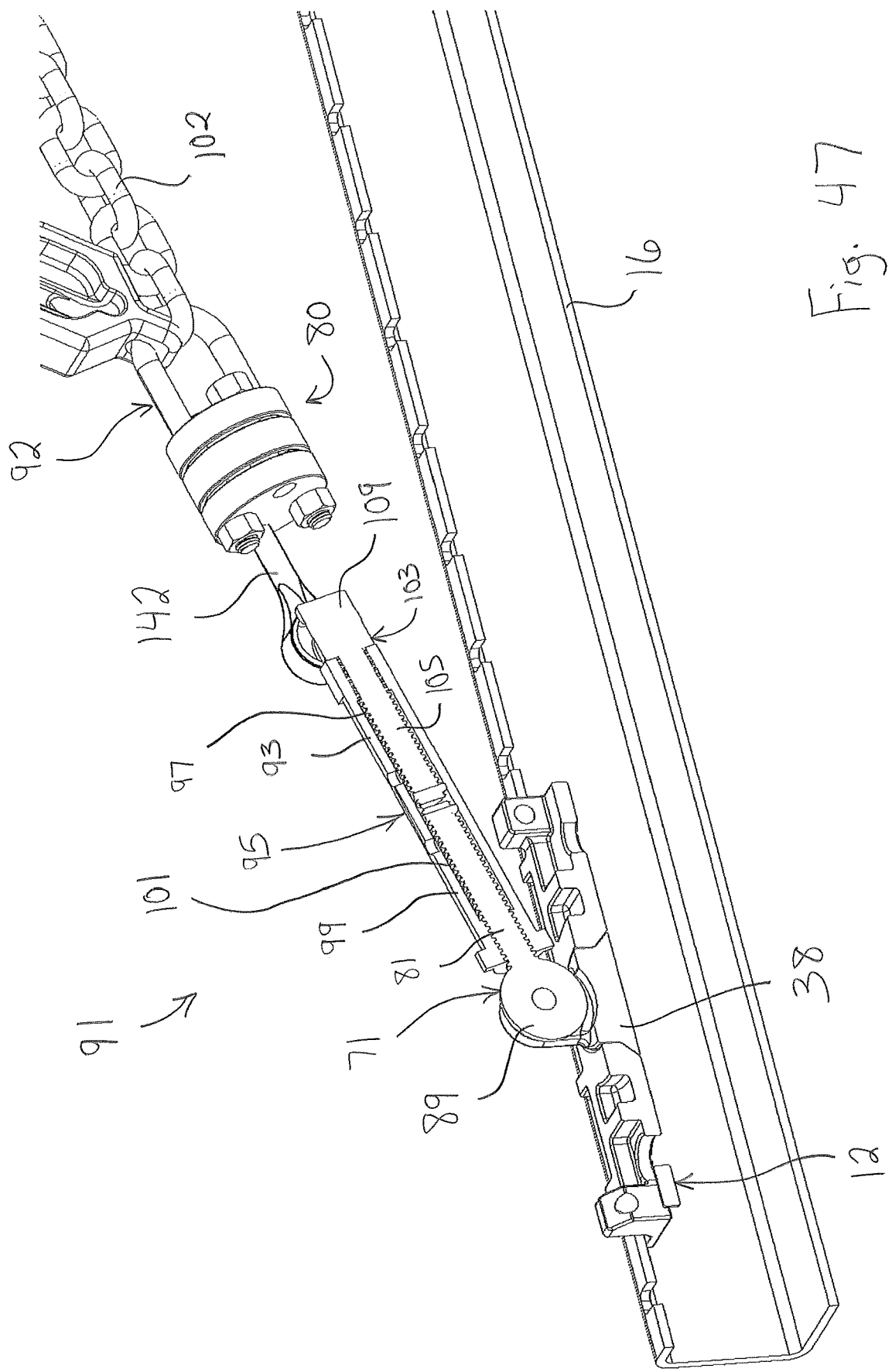

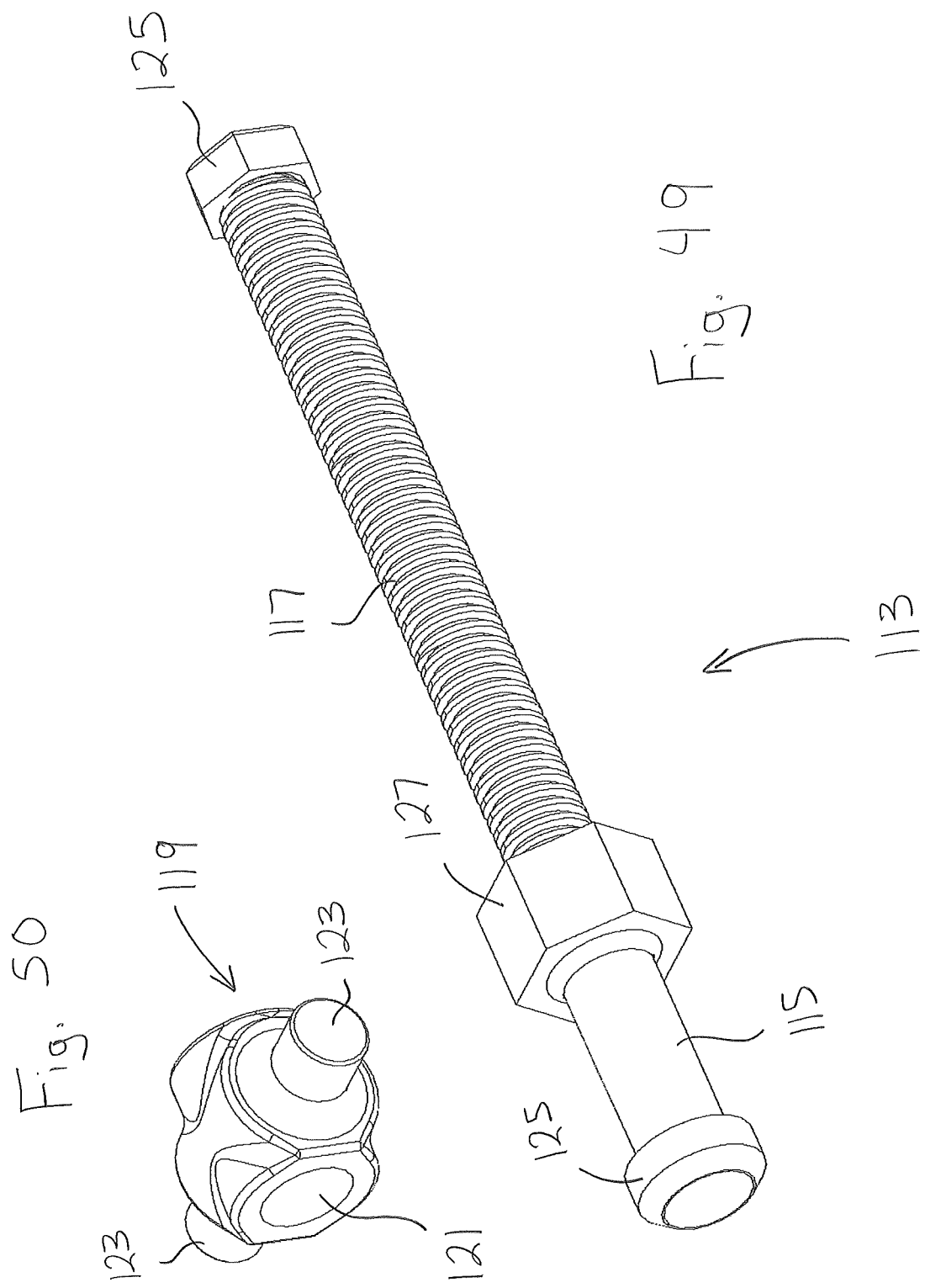

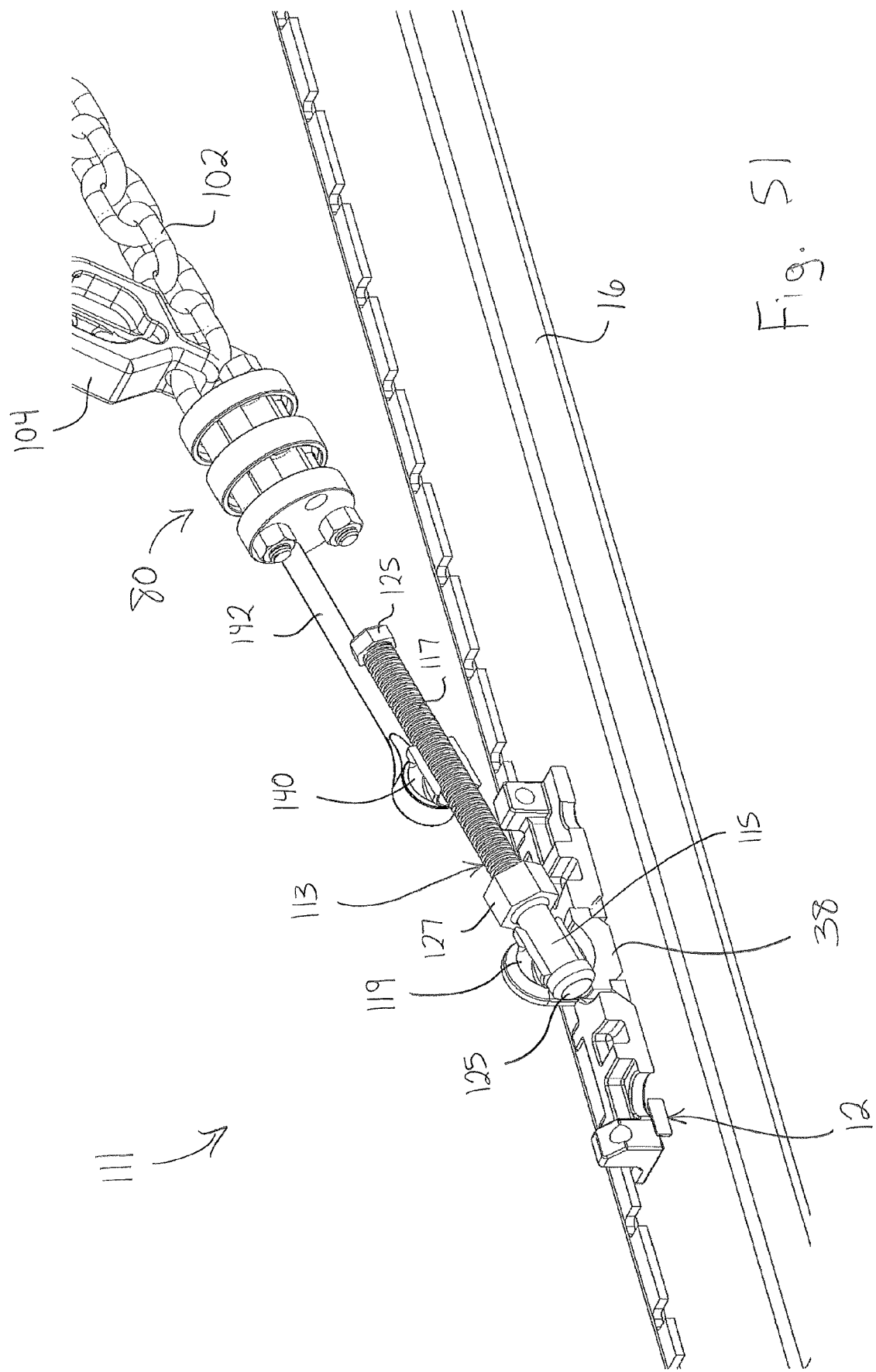

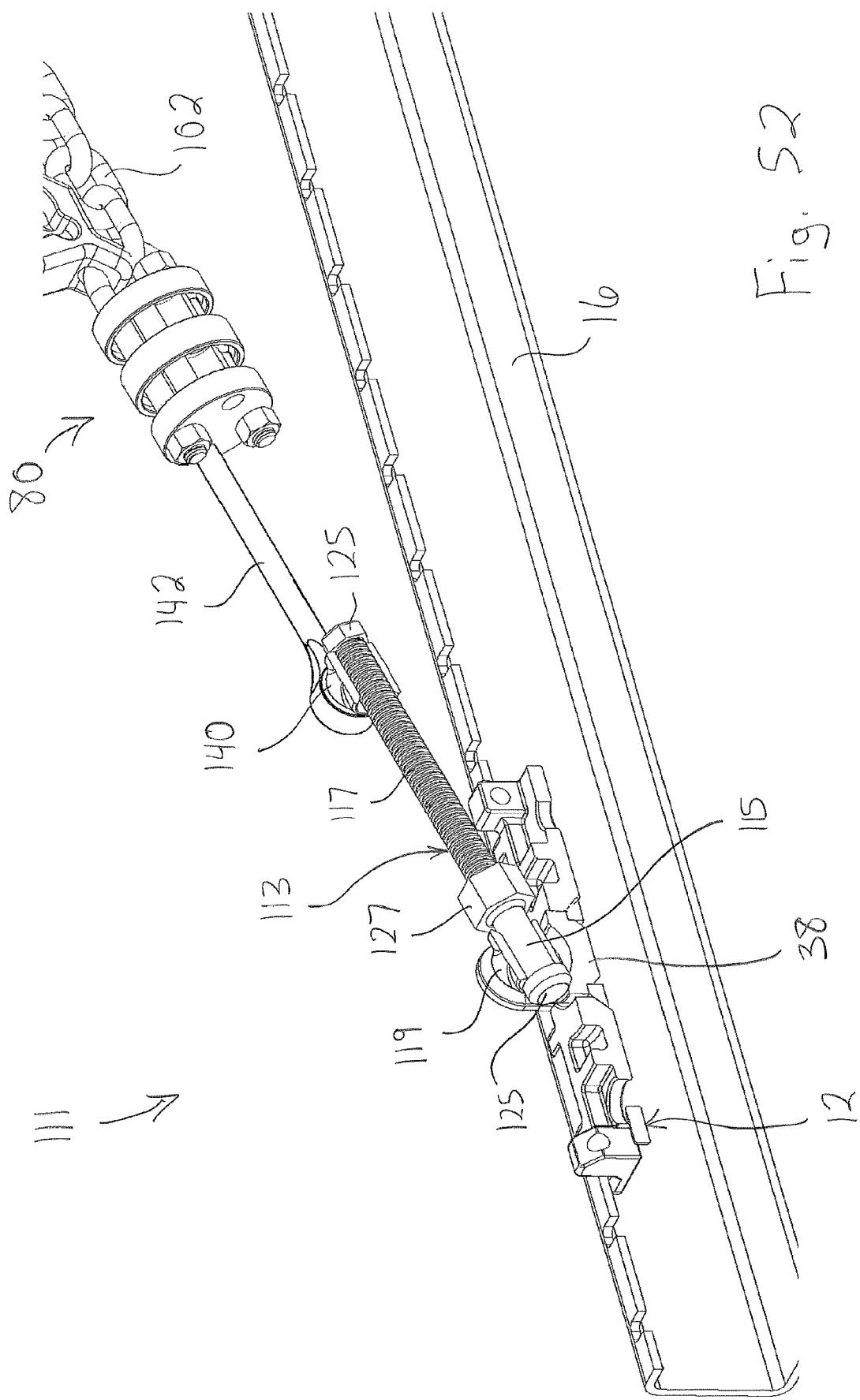

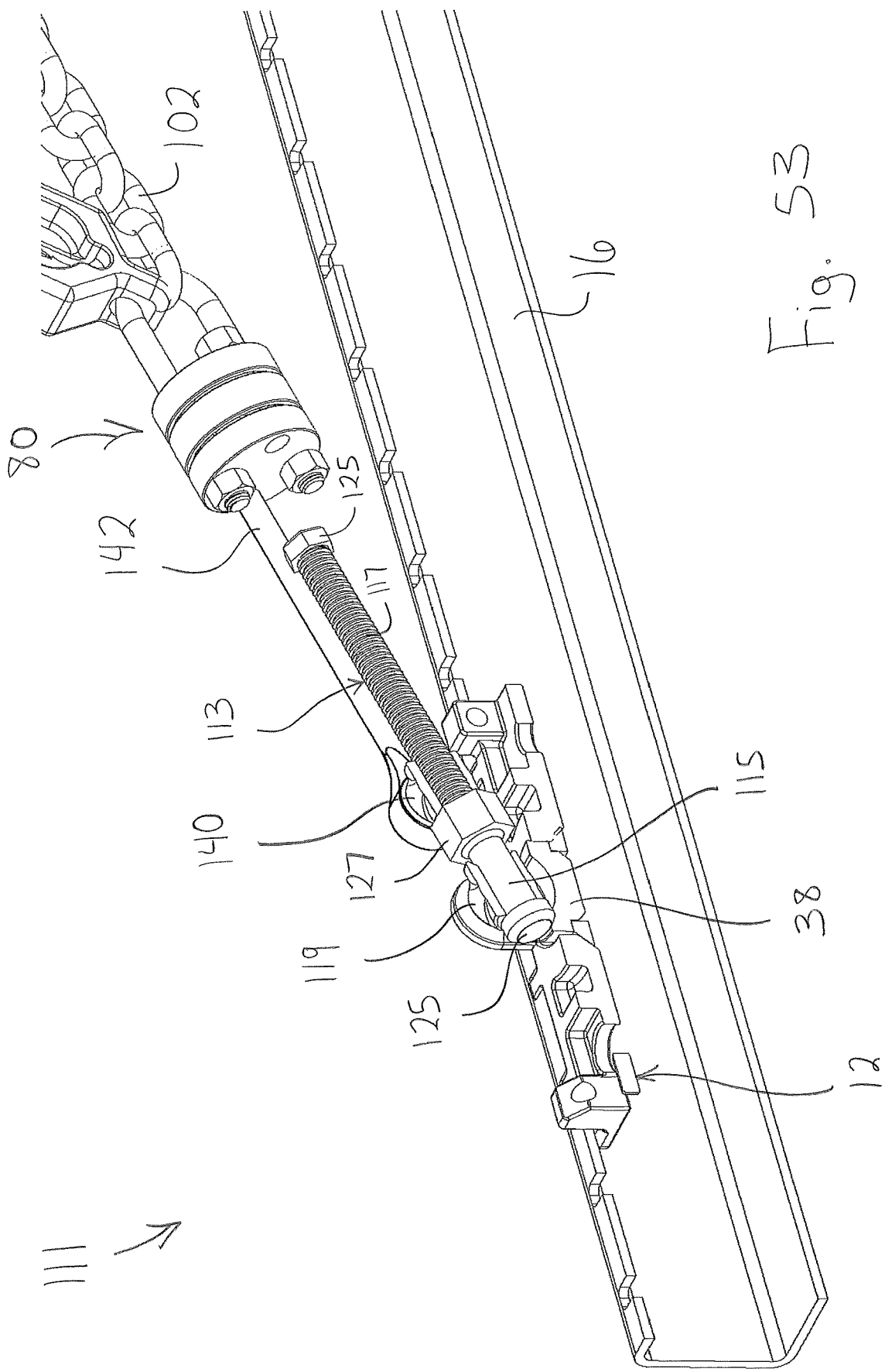

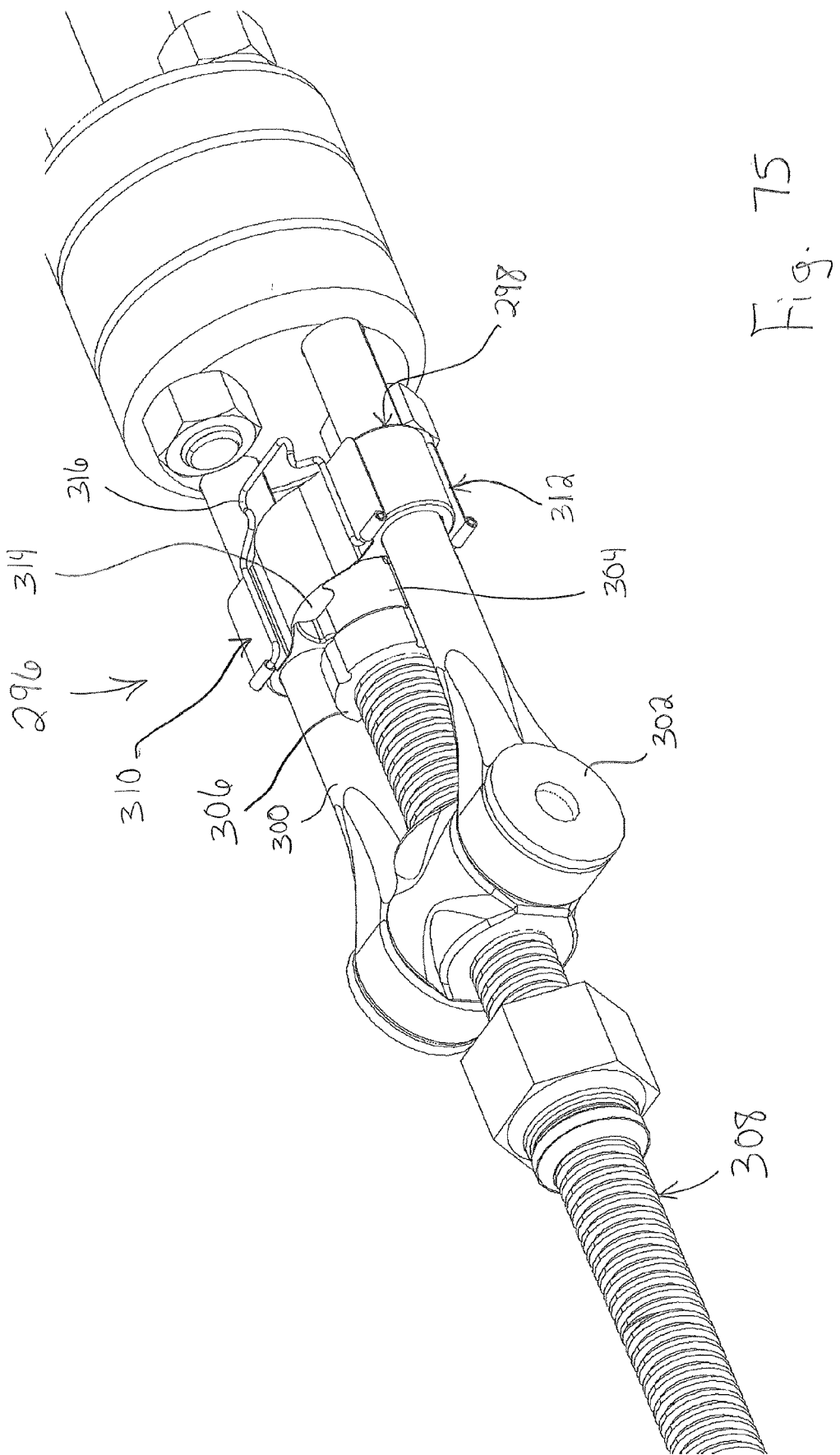

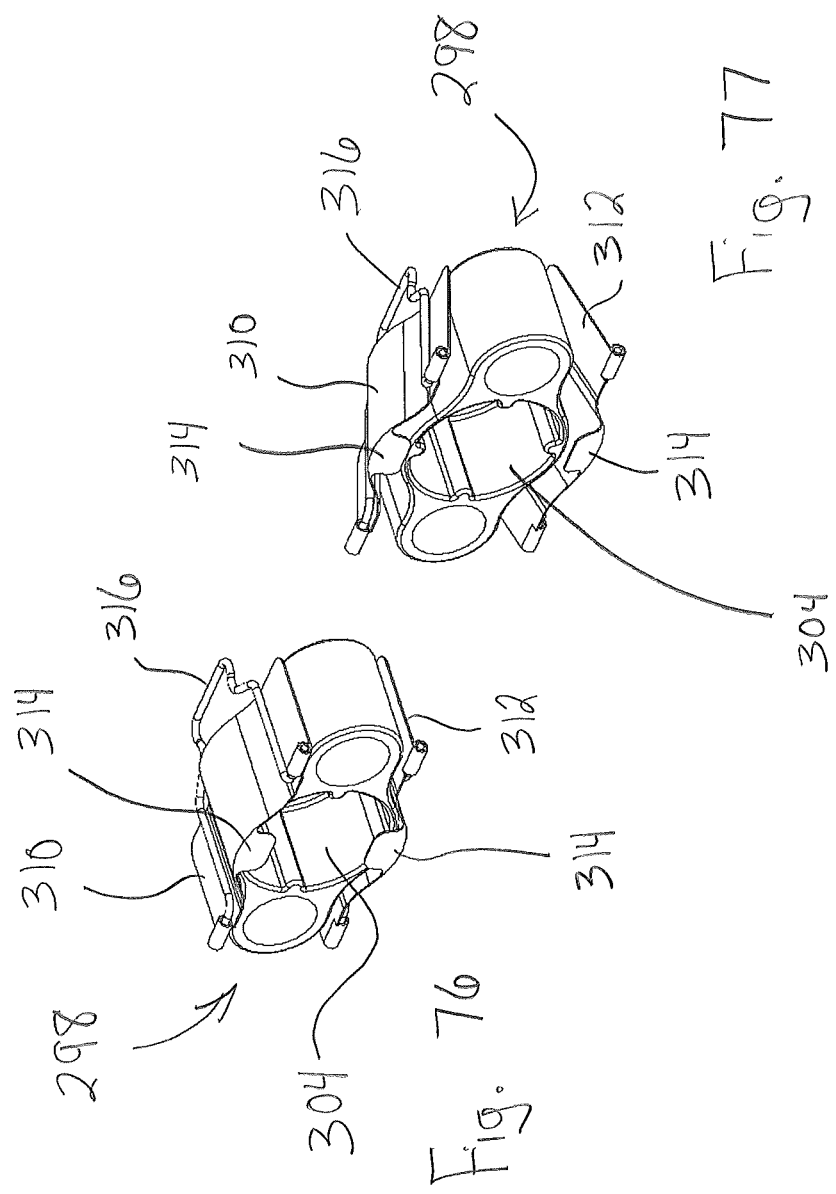

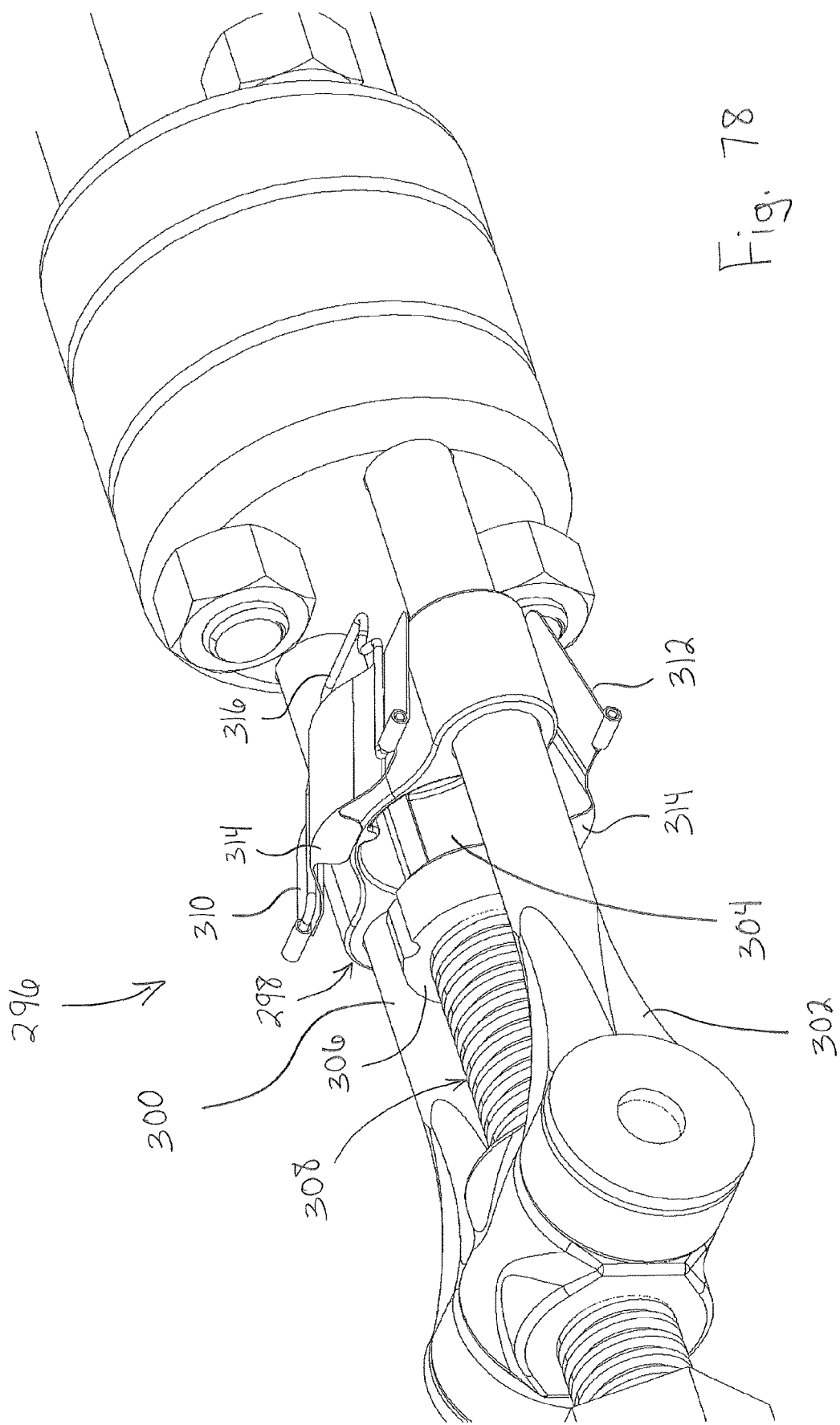

TENSION LOCK ASSEMBLY FOR CHAIN TIE DOWN ASSEMBLY

This application is a continuation of U.S. patent application Ser. No. 16/194,672, filed on Nov. 19, 2018, the contents of which are incorporated by reference herein.

BACKGROUND

Field of the Disclosure

The present disclosure relates to chain tie down assemblies for securing articles, such as vehicles, on a railway flatcar or the like. More particularly, the present disclosure relates to universal chain tie down assemblies that are suitable for securing differently configured articles that are conventionally secured using differently configured chain tie down assemblies.

Description of Related Art

Large articles or loads, such as vehicles, are commonly transported via rail. Typically, a railway flatcar is provided with a plurality of channels positioned within its deck. The channels may be configured to extend above the deck of the flatcar or may have a lower profile, with the tops of the channels being substantially flush with the top of the deck. Regardless of the height of the channels, each channel includes a plurality of notches spaced along its length (e.g., spaced approximately three inches apart), with each notch facing an opposing notch on the opposite side of the channel.

One or more anchor bases are partially received within each channel. The anchor bases are configured to be positioned along the length of the associated channel (to accommodate differently sized articles), with upwardly extending protrusions of an anchor base being received in notches of the channel. When an anchor base has been properly positioned, an anchor lock is employed to retain the anchor base in position, with a rod of the anchor lock overhanging the channel to prevent the anchor base from falling into the channel.

The configuration of the anchor base and the associated chain tie down assembly will vary depending on whether they are to be used to secure a smaller article (e.g., an agricultural vehicle, such as a tractor) or a larger article (e.g., a military vehicle, such as a tank). For a smaller load, a winch may be associated with the anchor base. The winch may be rotatably or pivotally associated with the anchor base to allow the winch to be rotated about a vertical axis with respect to the anchor base, which allows for the winch to be properly oriented with respect to an article to be secured to the flatcar.

A length of ⅜" chain (having a minimum breaking strength of approximately 36,000 pounds) extends from the winch, with an opposite end of the chain being secured to a constant tensioning device, which allows for shock absorption of impacts and, in the event of load shift, allows the chain tie down assembly to retain at least some amount of tension. The constant tensioning device may be variously configured, with an exemplary constant tensioning device being described in U.S. Pat. No. 3,402,925, which is hereby incorporated herein by reference. A conventional constant tensioning device includes a pair of endcaps, with an intermediate cap positioned therebetween. Spring elements (e.g., coil springs or urethane or rubber inserts) are positioned between each endcap and the intermediate cap. A pair of U-bolts extends through the caps and the spring elements, with the U-bolts facing in opposite directions and oriented at a 90° angle with respect to each other. One of the U-bolts is associated with the chain extending from the winch, while the other U-bolt is associated with a second chain, which is typically longer than the chain extending from the winch. When tension is applied to the chain tie down assembly (e.g., by operating the winch after securing the assembly to an article), the spring elements are compressed, which brings the endcaps closer to the intermediate cap.

The second chain extends from the constant tensioning device to a T-hook that is configured to be secured to the article or to be wrapped around a portion of the article (e.g., a vehicle axle or a slot defined in the frame of a vehicle) and secured to the second chain to affix the second chain to the article. When the second chain has been secured with respect to the article, the winch is actuated to compress the constant tensioning device until an appropriate level of tension has been applied to the chain tie down assembly. The minimum length of the chain tie down assembly from the anchor base to the attachment point of the article is approximately 28", with the length of the second chain being selected to accommodate articles having a greater length. Accordingly, excess slack in the second chain may be taken up by a claw hook or grab hook associated with the second chain, with claw or grab hooks typically being linked to the T-hook and to the same U-bolt of the constant tensioning device as the second chain.

As for a larger load, the chain tie down assembly may omit a winch and instead employ a turnbuckle connected to the anchor base by a hammerlock or the like. The opposite end of the turnbuckle is connected to one of the U-bolts of a constant tensioning device. A ½" chain with a minimum breaking strength of approximately 55,000-60,000 pounds is linked to the other U-bolt of the constant tensioning device. The minimum length of the chain tie down assembly from the anchor base to the attachment point of the article is approximately 45", with the length of the chain being selected to accommodate articles having a greater length. A sliding adjustable hook is linked to the chain to take up excess slack in the chain before the turnbuckle has been actuated to apply an appropriate level of tension to the chain tie down assembly.

Any given flatcar will include a plurality of chain tie down assemblies configured to secure a smaller load or a plurality of assemblies configured to secure a larger load, but not both types of assemblies. This limits the types of commodities that any given railcar can carry and reduces the utility of the railcar.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a universal chain tie down assembly includes an anchor base and an associated turret, with a cannon pivotally connected to the turret. A tensioning rod includes a proximal portion associated with the cannon. The tensioning rod also includes a distal portion and a tool attachment portion that is configured for engagement by a tool for rotation of the tensioning rod. The distal portion of the tensioning rod is associated with a hub. First and second arms of a constant tensioning device each extend between a proximal end associated with the hub and a distal end spaced distally of the hub. A chain is associated with a distal end of the constant tensioning device.

In another aspect, a chain takeup device includes a T-hook formation.

In yet another aspect, a chain tie down assembly includes an elongated tensioning member configured to be rotated about a central axis to vary the tension in the chain tie down assembly. The chain tie down assembly also includes a tension lock assembly configured to be moved between an unlocked condition allowing rotation of the tensioning member about the central axis and a locked condition preventing rotation of the tensioning member about the central axis.

In another aspect, an anchor base for a chain tie down assembly includes a body having upwardly extending first and second supports, with a slot defined between the first and second supports. An anchor lock including an elongated rod is rotatably received by holes defined in each of the first and second supports, with there being a stop associated with the rod. The rod is laterally movable with respect to the first and second supports to move the stop into and out of alignment with the slot. An anti-vibration assembly is configured to be moved between an unlocked condition allowing longitudinal movement and rotation of the rod and a locked condition limiting or preventing longitudinal movement and/or rotation of the rod to prevent the stop from being moved out of alignment with the slot.

These and other aspects of the present subject matter are set forth in the following detailed description of the accompanying drawings.

BRIEF DESCRIPTION OF THE DRAWINGS

FIG. 5 is perspective view of the anchor base of FIG. 4, with an anchor lock in an unlocked or misaligned condition;

FIG. 6 is a perspective view of the anchor base of FIG. 4, with an anchor lock in an aligned condition;

FIG. 7 is a perspective view of the anchor base of FIG. 4, with an anchor lock in a locked condition;

FIG. 8 is a perspective view of the anchor base of FIG. 4, along with an associated turret;

FIG. 9 is an exploded view of the turret of FIG. 8;

FIG. 10 is a perspective of the anchor base of FIG. 4, along with an alternative embodiment of an associated turret;

FIG. 11 is a perspective view of the turret of FIG. 10;

FIG. 12 is a perspective view of a cannon, tensioning rod, and hub of the universal chain tie down assembly of FIG. 1, with the cannon shown in section;

FIG. 14 is a perspective, partial sectional view of a portion of the universal chain tie down assembly of FIG. 1, with a tensioning rod in a fully extended condition;

FIG. 15 is a perspective, partial sectional view of a portion of the universal chain tie down assembly of FIG. 1, with a tensioning rod in a fully compressed condition;

FIG. 16 is a side or elevational view of a portion of the universal chain tie down assembly of FIG. 1 in a stowed condition, with a tensioning rod in a fully compressed condition;

FIG. 17 is a side or elevational view of a portion of the universal chain tie down assembly of FIG. 1 in a stowed condition, with a tensioning rod in a fully extended condition;

FIG. 18 is an elevational view of the universal chain tie down assembly of FIG. 1;

FIG. 19 is a perspective view of an alternative embodiment of a cannon suitable for incorporation into universal chain tie down assemblies according to the present disclosure;

FIG. 20 is a perspective view of another alternative embodiment of a cannon suitable for incorporation into universal chain tie down assemblies according to the present disclosure;

FIG. 21 is a perspective view of the cannon of FIG. 20 and an associated tensioning rod, with the cannon shown in section;

FIG. 22 is a perspective view of another embodiment of a universal chain tie down assembly according to aspects of the present disclosure;

FIG. 23 is a perspective view of an anchor base of the universal chain tie down assembly of FIG. 22, along with an associated turret;

FIG. 24 is a perspective view of the turret of FIG. 23;

FIG. 25 is a perspective view of a cannon, tensioning rod, and hub of the universal chain tie down assembly of FIG. 22, with the cannon shown in section;

FIG. 26 is a perspective, partial sectional view of a portion of the universal chain tie down assembly of FIG. 22;

FIG. 27 is a perspective, partial sectional view of a portion of the universal chain tie down assembly of FIG. 22, with a tensioning rod in a fully extended condition;

FIG. 28 is a perspective, partial sectional view of a portion of the universal chain tie down assembly of FIG. 22, with a tensioning rod in a fully compressed condition;

FIG. 29 is an elevational view of the universal chain tie down assembly of FIG. 22;

FIG. 30 is a perspective view of another embodiment of a universal chain tie down assembly according to aspects of the present disclosure;

FIG. 31 is a perspective view of a cannon of the universal chain tie down assembly of FIG. 30;

FIG. 32 is a perspective, partial sectional view of the tensioning rod of the universal chain tie down assembly of FIG. 30;

FIG. 33 is a perspective, partial sectional view of a portion of the universal chain tie down assembly of FIG. 30;

FIG. 34 is a perspective, partial sectional view of a portion of the universal chain tie down assembly of FIG. 30, with a tensioning rod in a fully extended condition;

FIG. 35 is a perspective, partial sectional view of a portion of the universal chain tie down assembly of FIG. 30, with a tensioning rod in a fully compressed condition;

FIG. 36 is a perspective view of another embodiment of a universal chain tie down assembly according to aspects of the present disclosure;

FIG. 37 is a perspective view of a cannon of the universal chain tie down assembly of FIG. 36;

FIG. 38 is a perspective, partial sectional view of the tensioning rod of the universal chain tie down assembly of FIG. 36;

FIG. 39 is a perspective, partial sectional view of a portion of the universal chain tie down assembly of FIG. 36;

FIG. 40 is a perspective, partial sectional view of a portion of the universal chain tie down assembly of FIG. 36, with a tensioning rod in a fully extended condition;

FIG. 41 is a perspective, partial sectional view of a portion of the universal chain tie down assembly of FIG. 36, with a tensioning rod in a fully compressed condition;

FIG. 42 is a perspective view of another embodiment of a universal chain tie down assembly according to aspects of the present disclosure;

FIG. 43 is a perspective, sectional view of a tensioning rod of the universal chain tie down assembly of FIG. 42;

FIG. 44 is a perspective view of a hub of the universal chain tie down assembly of FIG. 42;

FIG. 45 is a perspective, partial sectional view of a portion of the universal chain tie down assembly of FIG. 42;

FIG. 46 is a perspective, partial sectional view of a portion of the universal chain tie down assembly of FIG. 42, with a tensioning rod in a fully extended condition;

FIG. 47 is a perspective, partial sectional view of a portion of the universal chain tie down assembly of FIG. 42, with a tensioning rod in a fully compressed condition;

FIG. 49 is a perspective view of a tensioning rod of the universal chain tie down assembly of FIG. 48;

FIG. 50 is a perspective view of a cannon of the universal chain tie down assembly of FIG. 48;

FIG. 51 is a perspective, partial sectional view of a portion of the universal chain tie down assembly of FIG. 48;

FIG. 52 is a perspective, partial sectional view of a portion of the universal chain tie down assembly of FIG. 48, with a tensioning rod in a fully extended condition;

FIG. 53 is a perspective, partial sectional view of a portion of the universal chain tie down assembly of FIG. 48, with a tensioning rod in a fully compressed condition;

FIG. 75 is a perspective view of another alternative embodiment of a tension lock assembly suitable for incorporation into a chain tie down assembly having an elongated tensioning member, shown in an unlocked condition;

FIG. 76 is a perspective view of a retainer of the tension lock assembly of FIG. 75, in a closed condition;

FIG. 77 is a perspective view of the retainer of FIG. 76, in an open condition;

FIG. 78 is a perspective view of the tension lock assembly of FIG. 75, in an intermediate condition;

DESCRIPTION OF THE ILLUSTRATED EMBODIMENTS

The embodiments disclosed herein are for the purpose of providing a description of the present subject matter, and it is understood that the subject matter may be embodied in various other forms and combinations not shown in detail. Therefore, specific designs and features disclosed herein are not to be interpreted as limiting the subject matter as defined in the accompanying claims.

Chain tie down assemblies according to the present disclosure are referred to herein as "universal" because they can be used to secure either smaller loads (i.e., articles typically being secured using a ⅜" chain, such as agricultural vehicles) or larger loads (i.e., articles typically being secured using a ½" chain, such as military vehicles). Such universal chain tie down assemblies may be differently configured, as will be described in greater detail herein, but share certain properties that allow for universal application. In particular, universal chain tie down assemblies according to the present disclosure are strong enough to secure heavy loads, so they employ a ½" chain with a minimum breaking strength of approximately 55,000-60,000 pounds. They also are provided with the peripheral devices required for securing both types of loads and/or taking up excess slack in a chain, which may include a claw hook, adjustable grab hook, T-hook, and swivel snap hook. Additionally, they have a low enough deck clearance (which is the distance between the top of the deck of the flatcar and the attachment point of the article) to accommodate loads that are conventionally secured using ⅜" chain tie down assemblies (which have a minimum length of approximately 28").

Figure 1:
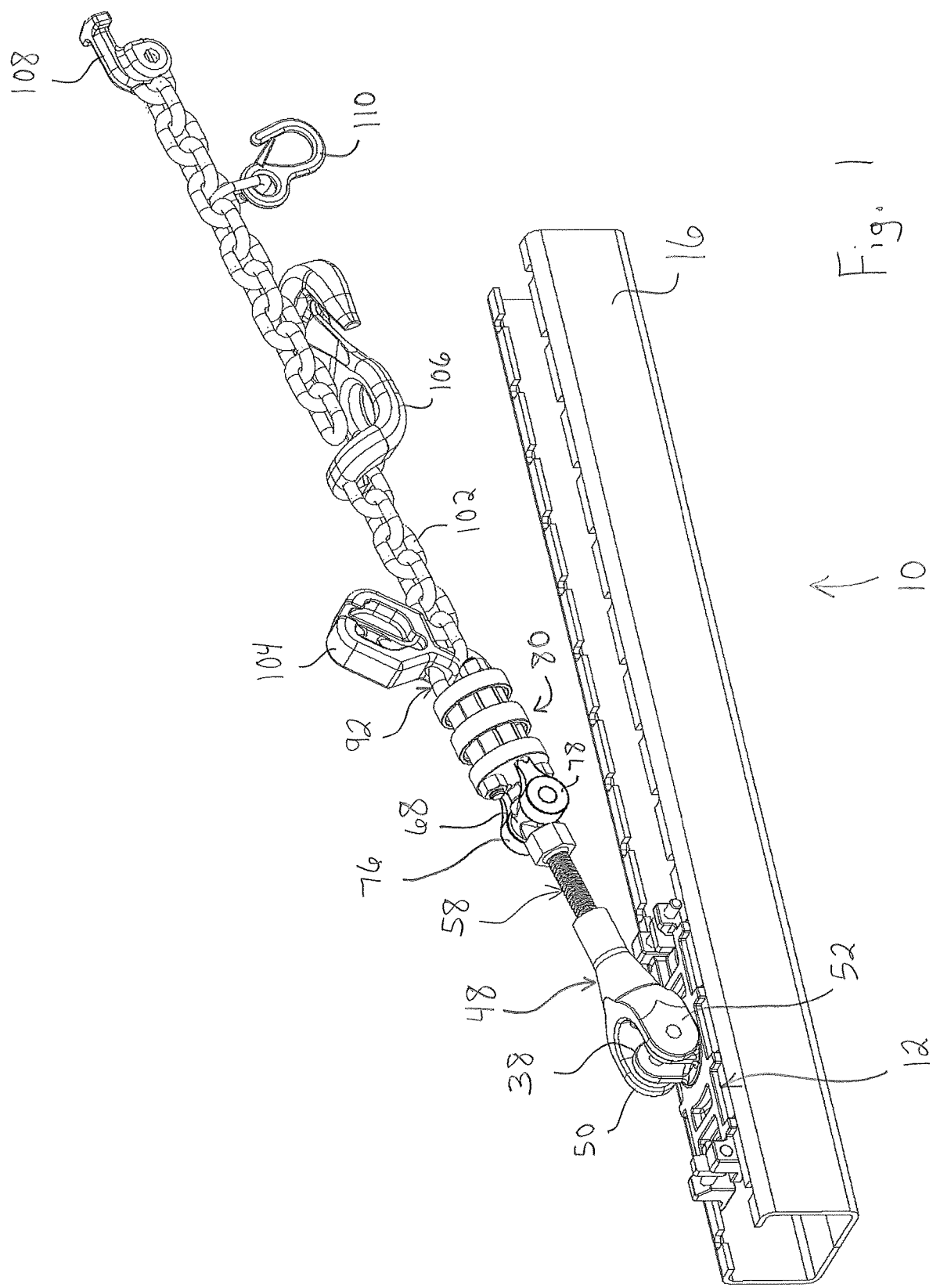
FIG. 1 is a perspective view of a universal chain tie down assembly according to aspects of the present disclosure.
Figure 2:
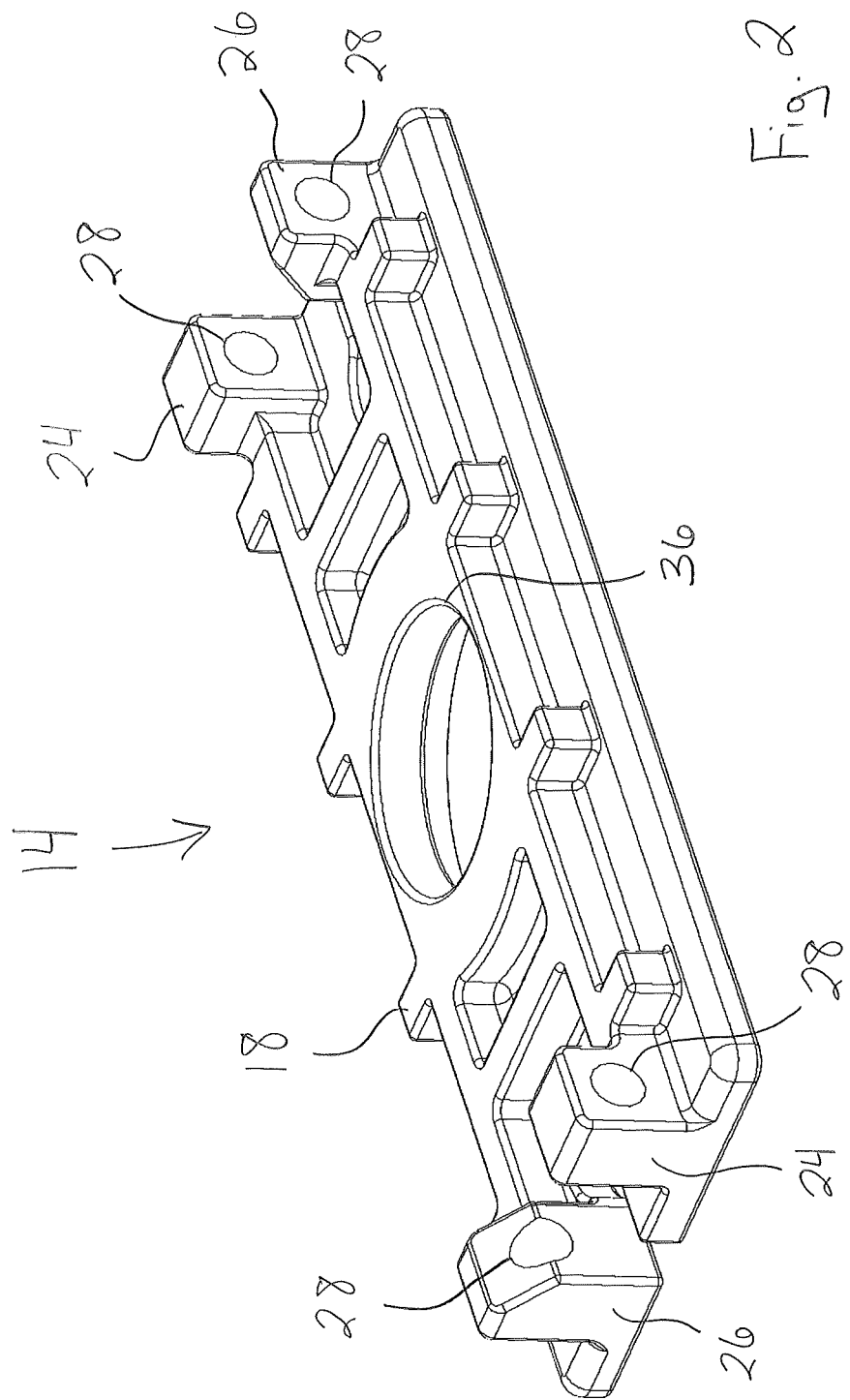
FIG. 2 is a perspective view of a body of an anchor base of the universal chain tie down assembly of FIG. 1.
Figure 3:
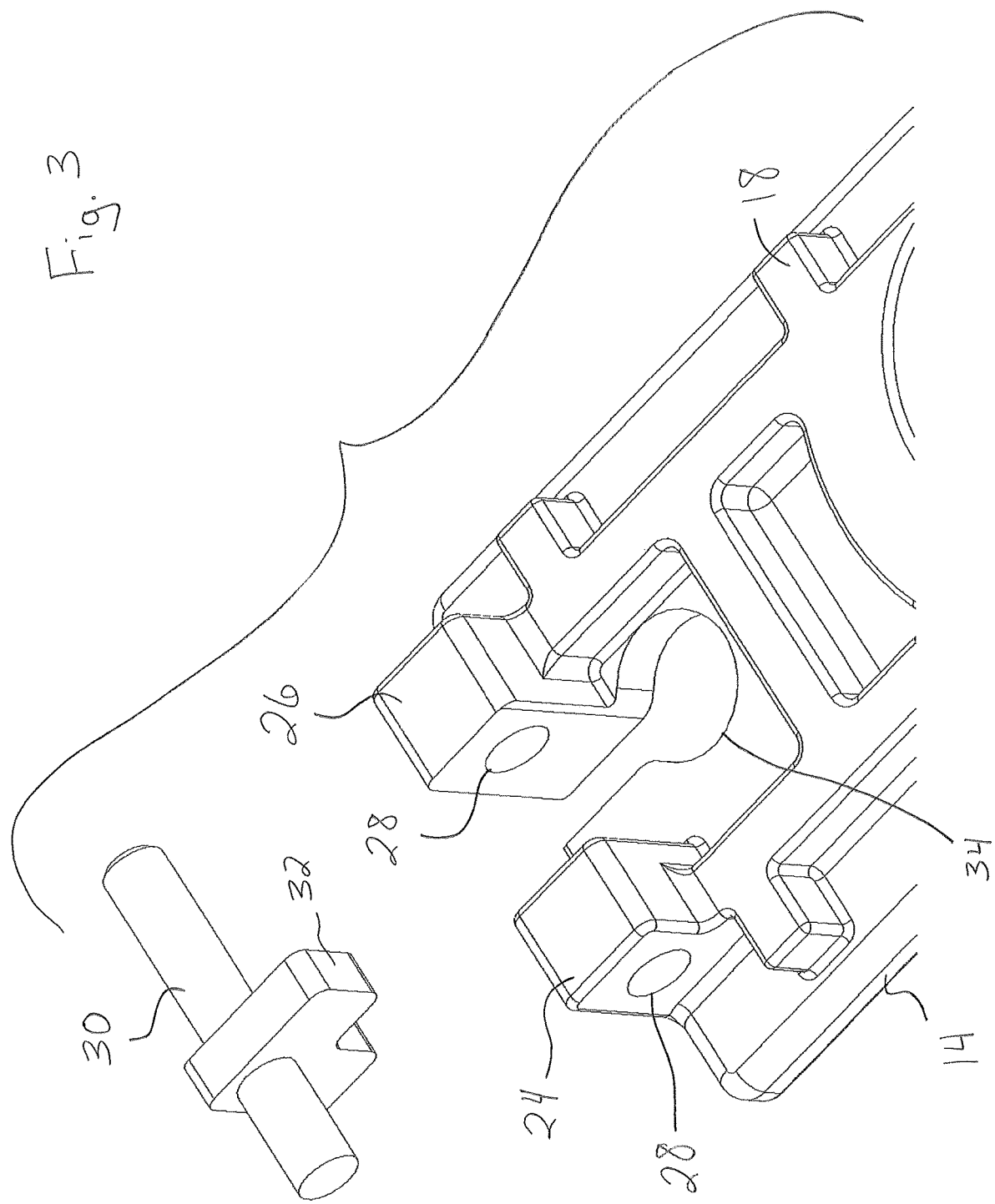
FIG. 3 is an exploded view of the anchor base body of FIG. 2 and an associated anchor lock.
Figure 4:
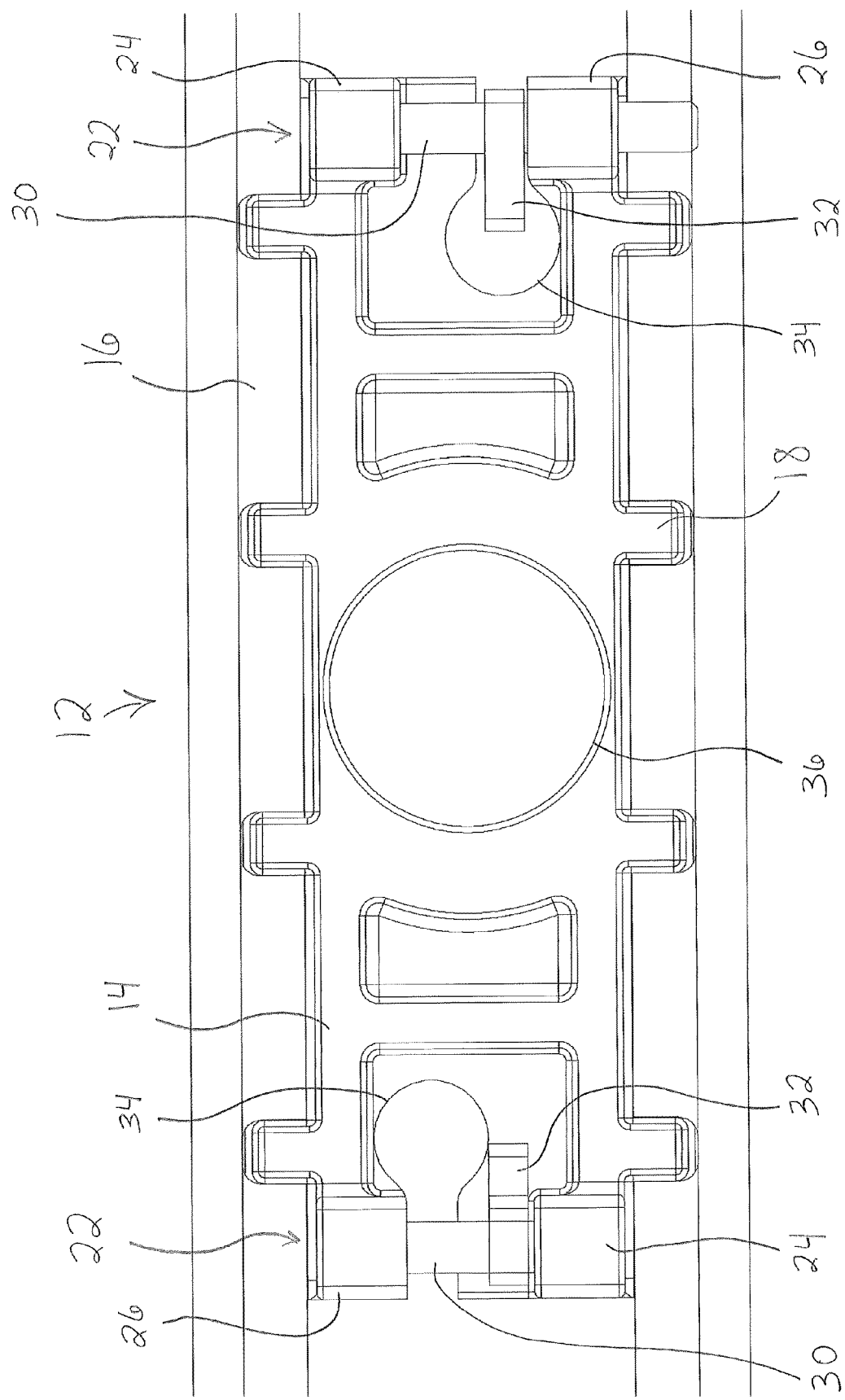
FIG. 4 is a top plan view of the anchor base of the universal chain tie down assembly of FIG. 1.

FIG. 1 shows an exemplary universal chain tie down assembly 10 according to the present disclosure. The universal chain tie down assembly 10 includes an anchor base 12, which is shown in greater detail in FIGS. 2-7. It should be understood that the illustrated anchor base 12 is merely exemplary and that universal chain tie down assemblies according to the present disclosure may employ differently configured anchor bases without departing from the scope of the present disclosure.

The illustrated anchor base 12 is provided generally according to conventional design, with a generally rectangular body 14 formed of a metallic material. The body 14 is configured to be associated with a channel 16 of a deck of a flatcar, including having a plurality of upwardly extending projections 18 configured to be received in notches 20 of the channel 16. When the anchor base 12 has been properly positioned, a pair of anchor locks 22 of the anchor base 12 are actuated to secure the anchor base 12 in place and prevent it from falling into the channel 16.

Per conventional design, each anchor lock 22 may include a pair of upwardly extending supports 24 and 26 positioned at or adjacent to an end of the body 14 of the anchor base 12. Each support 24, 26 defines a hole 28 that is aligned with the hole 28 of the other support 24, 26 positioned at the same end of the anchor base 12, with an elongated rod 30 of an anchor lock 22 being rotatably received by the holes 28 of each pair of supports 24 and 26. Each anchor lock 22 is initially provided in an unlocked or misaligned condition (FIG. 5), in which a stop 32 associated with the rod 30 is positioned laterally of a slot 34 defined in the body 14 of the anchor base 12. When the anchor base 12 has been properly positioned, the rod 30 is moved laterally with respect to the associated supports 24 and 26 so as to move the stop 32 into alignment with the associated slot 34 (FIG. 6), which may be referred to herein as the aligned condition of the anchor lock 22. In this position, one end of the rod 30 overhangs the channel 16 to prevent the anchor base 12 from falling into the channel 16.

To prevent the rod 30 from returning to the unlocked or misaligned condition of FIG. 5, the rod 30 may be rotated to move the stop 32 into the slot 34 (FIG. 7), which is referred to herein as the locked condition of the anchor lock 22. With the stop 32 in the slot 34, the rod 30 is prevented from moving back to the unlocked or misaligned condition of FIG. 5, thus retaining the anchor base 12 in place in the channel 16. Vibration of the flatcar and a lack of sufficient tension in the associated universal chain tie down assembly 10 may cause an anchor lock 22 to move from the locked condition (FIG. 7) to the aligned condition (FIG. 6) and then to the unlocked condition (FIG. 5), which can cause the anchor base 12 to fall into the channel 16 and dissociate the universal chain tie down assembly 10 from its load. Accordingly, the anchor base 12 may be provided with an anti-vibration assembly to retain the anchor lock 22 in its locked condition, as will be described in greater detail herein.

The illustrated anchor base 12 defines a centrally located bore or aperture or opening 36 configured to receive a turret 38*a* of the universal chain tie down assembly 10 (FIGS. 8 and 9). The turret 38*a* is configured to be rotatably received within the opening 36, which allows for adjustment of the orientation of the associated universal chain tie down assembly 10 with respect to its load. In the embodiment of FIGS. 8 and 9, the turret 38*a* is comprised of an upper portion 40 and a lower portion 42, with the upper portion 40 positioned at least primarily above the body 14 of the anchor base 12 and the lower portion 42 positioned at least primarily below the body 14 of the anchor base 12. When the upper and lower portions 40 and 42 of the turret 38*a* have been properly positioned with respect to the body 14 of the anchor base 12 and each other, they may be secured to each other (e.g., by a weld) to prevent dissociation of the upper and lower portions 40 and 42 from each other, while still allowing for rotation of the assembled turret 38*a* in the opening 36 with respect to the body 14 of the anchor base 12.

FIGS. 10 and 11 illustrate an alternative embodiment of a turret 38*b* that may be associated with the anchor base 12. In contrast to the embodiment of FIGS. 8 and 9, the turret 38*a* of FIGS. 8 and 9, the turret 38*b* of FIGS. 10 and 11 is provided with a unitary or monolithic construction. Such a turret 38*b* may be positioned within the opening 36 of the body 14 of the anchor base 12 and then associated with the anchor base 12 by any suitable approach that allows for the turret 38*b* to be rotated within the opening 36 with respect to the body 14 of the anchor base 12 without becoming dissociated from the body 14 of the anchor base 12. It should be understood that the turrets 38*a* and 38*b* (collectively identified herein as 38) are merely exemplary and that differently configured turrets may also be employed without departing from the scope of the present disclosure.

The illustrated turret 38 includes upwardly extending, substantially parallel first and second yokes 44 and 46, which define a gap therebetween. A cannon 48 of the universal chain tie down assembly 10 (FIG. 1) includes first and second arms 50 and 52 also defining a gap therebetween. The arms 50 and 52 of the cannon 48 are positioned outwardly of the yokes 44 and 46 of the turret 38, with the first arm 50 of the cannon 48 being pivotally connected to the first yoke 44 of the turret 38 and the second arm 52 of the cannon 48 being pivotally connected to the second yoke 46 of the turret 38 (e.g., using pivot pins or the like). While the arms 50 and 52 of the cannon 48 are positioned outwardly of the yokes 44 and 46 of the turret 38 in the illustrated embodiment, it should be understood that the arms 50 and 52 of the cannon 48 may be positioned inwardly of the yokes 44 and 46 of the turret 38 or one of the arms 50, 52 of the cannon 48 may be positioned outwardly of the associated yoke 44, 46 of the turret 38, while the other arm 50, 52 of the cannon 48 is positioned inwardly of the associated yoke 44, 46 of the turret 38.

The arms 50 and 52 of the cannon 48 meet at a distal portion of the cannon 48, which defines an internally threaded bore 54 (FIG. 12). As shown, it may be advantageous for only a distal portion of the bore 54 to be internally threaded, while a more proximal portion of the bore 54 is unthreaded and may be counterbored equal to or larger than the major thread diameter, for reasons that will be described in greater detail herein.

Figure 13:
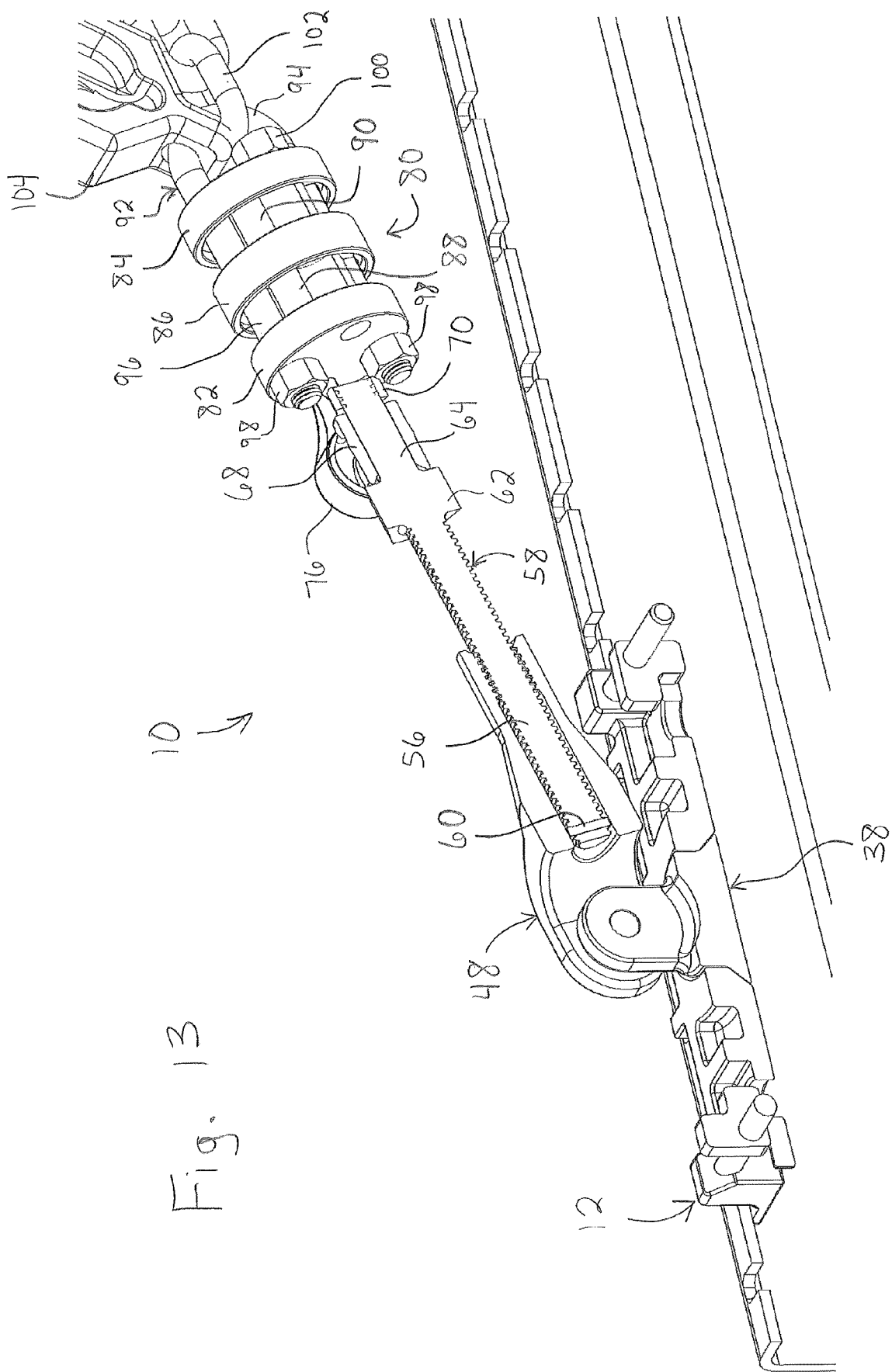
FIG. 13 is a perspective, partial sectional view of a portion of the universal chain tie down assembly of FIG. 1.

The internally threaded bore 54 receives an externally threaded proximal portion 56 of a tensioning rod 58 of the universal chain tie down assembly 10 (FIG. 13). The threads of the bore 54 mate with the threads of the proximal portion 56 of the tensioning rod 58, such that rotation of the tensioning rod 58 about its central axis causes the tensioning rod 58 to be moved proximally and distally with respect to the cannon 48. For example, FIG. 14 shows the tensioning rod 58 in a fully extended condition (in which the tensioning rod 58 has been moved as far distally with respect to the cannon 48 as it can be) and FIG. 15 shows the tensioning rod 58 in a fully compressed condition (in which the tensioning rod 58 has been moved as far proximally with respect to the cannon 48 as it can be), while FIG. 13 shows the tensioning rod 58 in an intermediate condition between the fully extended and fully compressed conditions.

As can be seen in FIGS. 12-15, a retaining pin 60 may be associated with the threaded proximal portion 56 of the tensioning rod 58. The unthreaded portion of the bore 54 of the cannon 48 has sufficient clearance to allow for the retaining pin 60 to move therethrough, but sufficient distal movement of the tensioning rod 58 with respect to the cannon 48 causes the retaining pin 60 to contact the threads of the bore 54 (as in FIG. 14). Interference between the retaining pin 60 and the threads of the bore 54 or the bottom of the counterbore prevents further distal movement of the tensioning rod 58 with respect to the cannon 48, thus defining the fully extended condition of the tensioning rod 58 and preventing complete dissociation of the tensioning rod 58 from the cannon 48.

As will be described in greater detail herein, movement of the tensioning rod 58 with respect to the cannon 48 varies the amount of tension in the universal chain tie down assembly 10. To that end, the tensioning rod 58 is preferably provided with a tool attachment portion 62 positioned distally of the threaded proximal portion 56. The tool attachment portion 62 is configured for engagement by a tool for rotation of the tensioning rod 58 about its central axis to vary the tension in the universal chain tie down assembly 10. In the illustrated embodiment, the tool attachment portion 62 is configured as a hex nut, which is suitable for engagement by a wrench or the like, but other configurations suitable for use in combination with differently configured tools may also be employed without departing from the scope of the present disclosure.

Regardless of the particular configuration of the tool attachment portion 62, it is preferably larger than the diameter of the threaded bore 54 of the cannon 48. By such a configuration, continued proximal movement of the tensioning rod 58 with respect to the cannon 48 will eventually move the tool attachment portion 62 into engagement with the distal end of the cannon 48 (as in FIG. 15), thus defining the fully compressed condition of the tensioning rod 58 and preventing further proximal movement of the tensioning rod 58 with respect to the cannon 48.

It will be seen that part of the threaded proximal portion 56 of the tensioning rod 58 extends into the gap defined between the yokes 44 and 46 of the turret 38 when the tensioning rod 58 is in its fully compressed condition. The degree to which the proximal portion 56 of the tensioning rod 58 extends into the gap in the fully compressed condition is a function of the length of the proximal portion 56 with respect to the bore 54 of the cannon 48. A relatively elongated proximal portion 56 allows for a greater degree of travel for the tensioning rod 58 and, thus, a wider range of possible tension that may be imparted to the universal chain tie down assembly 10, but may require clearance for the proximal portion 56 in the fully compressed condition (as in FIG. 15). In other embodiments, the threaded proximal portion 56 of the tensioning rod 58 may be shorter such that, even in the fully compressed condition, the proximal portion 56 does not extend into the vicinity of the yokes 44 and 46 of the turret 38. In such embodiments there is more freedom in designing the turret 38, as it is unnecessary to create a gap to accommodate the proximal portion 56 of the tensioning rod 58 in the fully compressed condition.

A distal portion 64 of the tensioning rod 58 (which is separated from the threaded proximal portion 56 by the tool attachment portion 62) is unthreaded, as can be seen in FIG. 12. The unthreaded distal portion 64 of the tensioning rod 58 is received by an unthreaded bore 66 of a hub 68, as can be seen in FIGS. 13-15. While the distal portion 64 of the tensioning rod 58 and the bore 66 of the hub 68 are shown as being unthreaded, it should be understood that they may be differently configured, provided that they do not engage diametrically (e.g., by providing the distal portion of the tensioning rod 58 with a right-hand ¾" thread and the bore 66 of the hub 68 with a 1" left-hand thread). The distal end of the tensioning rod 58 (which extends distally of the hub 68) may be enlarged to prevent dissociation of the tensioning rod 58 from the hub 68. This may be achieved by securing an end stop or mechanical fastener 70 (shown as a nut) to the distal end of the tensioning rod 58 after the hub 68 has been properly positioned on the tensioning rod 58 or by any other suitable approach. By such a configuration, the unthreaded distal portion 64 of the tensioning rod 58 may freely rotate within the unthreaded bore 66 of the hub 68 without the tensioning rod 58 becoming dissociated from the hub 68.

The hub 68 is shown in greater detail in FIG. 12, with a central bore 66 and a pair of lateral extensions 72 and 74 projecting from opposing sides of the central bore 66. A first of the lateral extensions 72 is associated with a proximal end of a first arm 76, while the other one of the lateral extensions 74 is associated with a proximal end of a second arm 78. It should be understood that the illustrated configuration (in which a bore or hole in the proximal end of each arm 76, 78 receives an associated lateral extension 72, 74 of the hub 68) is merely exemplary and that the hub 68 and/or the arms 76 and 78 may be differently configured to differently associate the arms 76 and 78 to the hub 68. However, it may be advantageous for the arms 76 and 78 to be pivotally connected to the hub 68 to allow for an additional degree of flexibility or adjustability in the configuration of the universal chain tie down assembly 10. This may allow for improved storage of the universal chain tie down assembly 10 when not in use. For example, FIGS. 16 and 17 show the universal chain tie down assembly 10 (with the tensioning rod 58 in fully compressed and fully extended conditions, respectively) in stowed conditions within a channel 16 of the associated flatcar. As can be seen, allowing the arms 76 and 78 to be pivoted with respect to the hub 68 may allow for improved storage of the universal chain tie down assembly 10.

Each arm 76, 78 extends from its proximal end to a distal end that is spaced away from the hub 68. The arms 76 and 78 may be considered to be components of a constant tensioning device 80 of the universal chain tie down assembly 10, which extend at least partially through the constant tensioning device 80. It should be understood that the other components of the constant tensioning device 80 may be variously configured without departing from the scope of the present disclosure. However, in the illustrated embodiment, the constant tensioning device 80 is shown as including proximal and distal end caps 82 and 84, an intermediate cap 86 positioned between the end caps 82 and 84, a proximal spring element 88 (shown as an elastomeric insert) positioned between the proximal end cap 82 and the intermediate cap 86, and a distal spring element 90 (shown as an elastomeric insert) positioned between the intermediate cap 86 and the distal end cap 84 (FIG. 13). These components of the constant tensioning device 80 may be substantially configured according to conventional design.

The constant tensioning device 80 further includes a U-bolt 92 having a curved portion 94 and a pair of legs 96. The curved portion 94 is positioned distally of the distal end cap 84, with the legs 96 extending proximally away from the curved portion 94 and through the various caps of the constant tensioning device 80. In particular, the end caps 82 and 84 and the intermediate cap 86 may each define four opening or apertures, which may be equally spaced about a central axis of the constant tensioning device 80. Two of the apertures of each cap (referred to herein as first and second apertures) are spaced 180° from each other and receive the first and second arms 76 and 78, while the other two apertures of each cap (referred to herein as the third and fourth apertures) are spaced 180° from other and receive the legs 96 of the U-bolt 92. The spring elements 88 and 90 may have a relatively small diameter, such that they are positioned radially inwardly of the arms 76 and 78 and legs 96 or may be configured to define voids allowing for passage of the arms 76 and 78 and legs 96 therethrough.

Ends of the legs 96 of the U-bolt 92 are positioned proximally of the proximal end cap 82, with each end having an associated leg fastener 98 (e.g., a nut) configured to prevent distal movement of the associated end through the associated aperture of the proximal end cap 82. Similarly, the distal ends of the first and second arms 76 and 78 positioned distally of the distal end cap 84 may each have an associated arm fastener 100 (e.g., a nut) configured to prevent proximal movement of the associated distal end through the associated aperture of the distal end cap 84. In other embodiments, the constant tensioning device 80 may be differently configured, such as by omitting an intermediate cap, having a plurality of intermediate caps (in which case additional spring elements may be provided), having an elastomeric spring element that is bonded to a cap, and/or having a non-elastomeric spring element (e.g., a spring element configured as a coil spring). Other variations to the configuration of the constant tensioning device 80 may also be employed without departing from the scope of the present disclosure.

A chain 102 is associated with the distal end of the constant tensioning device 80, such as being linked to the curved portion 94 of the U-bolt 92. Preferably, the chain 102 is a ½" chain to render the universal chain tie down assembly 10 sufficiently strong to secure a larger load (e.g., a military vehicle). One or more hooks are associated with the chain 102 and/or the curved portion 94 of the U-bolt 92 to allow for the universal chain tie down assembly 10 to be connected to a load and/or to take up slack in the chain 102. In the illustrated embodiment, a claw or grab hook 104 is associated with the curved portion 94 of the U-bolt 92, while an adjustable grab hook 106, a T-hook 108, and a (non-load-bearing) swivel snap hook 110 are associated with the chain 102 (FIG. 1). These hooks may be conventionally configured or provided according to novel design.

In use, the chain 102 and one or more of the hooks of the universal chain tie down assembly 10 are used to attach the chain 102 to a load, as conventionally done with the distal chain of a chain tie down assembly. The tool attachment portion 62 is then manipulated using an appropriate tool to move the tensioning rod 58 proximally with respect to the cannon 48, thus increasing the tension in the universal chain tie down assembly 10. As the tension in the universal chain tie down assembly 10 increases, the various caps of the constant tensioning device 80 compress the spring elements 88 and 90, with the separation of the adjacent caps decreasing until a target separation (corresponding to a particular tension in the universal chain tie down assembly 10) is achieved. One or more of the hooks may be used at an appropriate time to take up slack in the chain 102, as conventionally done with a chain tie down assembly.

By such a configuration, the universal chain tie down assembly 10 may be used to secure larger loads (due to its strength), while being short enough to be used for smaller loads (see FIG. 18). The reduced length of the universal chain tie down assembly 10 (with respect to the length of a conventional chain tie down assembly for a larger load) is made possible in part by the omission of a proximal U-bolt from the constant tensioning device 80. In such a conventional chain tie down assembly, a proximal U-bolt has a curved portion positioned proximally of the proximal end cap, with legs extending distally away from the curved portion (where the first and second arms 76 and 78 are positioned in the universal chain tie down assembly 10). The curved portion of the proximal U-bolt must be attached to an elongated tensioning member (e.g., a turnbuckle), which necessarily increases the minimum length of the chain tie down assembly and makes such a chain tie down assembly incompatible with a smaller load.

It should be understood that the illustrated configurations of the universal chain tie down assembly 10 and its individual components may vary without departing from the scope of the present disclosure. For example, FIG. 19 shows a differently configured cannon 112 that may be incorporated into the universal chain tie down assembly 10 of FIG. 1. In the embodiment of FIG. 19, the cannon 112 is not a unitary or monolithic or single-piece component (as in FIG. 1), but instead is comprised of separate first and second arms 114 and a second hub 116. The second hub 116 may be substantially identical to the hub 68 (i.e., with a central bore and a pair of lateral extensions), but has an internally threaded bore (corresponding to the unthreaded bore 66 of FIG. 12) instead of an unthreaded bore. The internally threaded bore of the second hub 116 cooperates with the threaded proximal portion 56 of the tensioning rod 58 as described above to vary the position of the tensioning rod 58 with respect to the cannon 112 and the tension within the universal chain tie down assembly. The arms 114 of the cannon 112 may be pivotally connected to the second hub 116 of the cannon 112 to provide the universal chain tie down assembly with an additional degree of flexibility or adjustability in its configuration, which may allow for improved storage of the universal chain tie down assembly when not in use.

FIGS. 20 and 21 illustrate another embodiment of a cannon 118 that may be incorporated into the universal chain tie down assembly 10 of FIG. 1. As described above, it may be possible for the threaded proximal portion 56 of the tensioning rod 58 to be short enough that it does not enter into the gap between the yokes 44 and 46 of the turret 38, even when the tensioning rod 58 is in its fully compressed condition. The cannon 118 of FIGS. 20 and 21 (which has a generally tubular configuration, rather than the generally Y-shaped configuration of FIGS. 1 and 19) is suitable for such a modified tensioning rod 58, as its proximal end 120 is positioned in the gap between the yokes 44 and 46 of the turret 38, with its distally threaded counterbore 122 stopping short of the proximal end 120 (FIG. 21). By such a configuration, the tensioning rod 58 may be moved proximally with respect to the cannon 118 until the tool attachment portion 62 contacts the distal end of the cannon 118 and/or the proximal end of the threaded proximal portion 56 contacts the end of the counterbore 122. As in the other cannon embodiments described herein, the cannon 118 of FIGS. 20 and 21 may be pivotally connected to the yokes 44 and 46 of the turret 38 (e.g., using a pivot pin or the like).

FIG. 22 illustrates another embodiment of a universal chain tie down assembly 124 according to the present disclosure. The universal chain tie down assembly 124 of FIG. 22 is similarly configured to the universal chain tie down assembly 10 of FIG. 1, including an anchor base 12 and associated turret 126 (FIGS. 23 and 24). In contrast to the turrets 38 of the preceding embodiment, the turret 126 of FIGS. 23 and 24 has only a single yoke 128, rather than a pair of yokes. The associated cannon 130 may have a pair of arms 132 (as in the previously described cannons), with the arms 132 being positioned on opposing sides of the single yoke 128 and pivotally connected to the single yoke 128 (via a pivot pin or the like, for example).

Due to the omission of a gap in the turret 126, the threaded proximal portion 134 of the associated tensioning rod 136 (FIG. 25) must be relatively short, because the proximal portion 134 must stop short of the single yoke 128 of the turret 126 when the tensioning rod 136 is in its fully compressed condition. To allow for such a shortened proximal portion 134 without limiting the amount of takeup of the universal chain tie down assembly 124, the tensioning rod 136 has a modified distal portion 138. In particular, the distal portion 138 of the tensioning rod 136 of FIG. 25 is externally threaded, with the proximal and distal portions 134 and 138 of the tensioning rod 136 being oppositely threaded. In addition to being threaded, it may be advantageous for the distal portion 138 of the tensioning rod 136 of FIG. 25 to be longer than the distal portion 64 of the tensioning rod 58 of FIG. 12 to allow for travel of the hub 140 along the tensioning rod 136 (as will be described in greater detail herein). If the tensioning rod 136 has an elongated distal portion 138, it may be advantageous for the first and second arms 142 and 144 of the universal chain tie down assembly 124 of FIG. 22 to be similarly longer than the first and second arms 76 and 78 of the universal chain tie down assembly 10 of FIG. 1.

The bore 146 of the hub 140 receiving the distal portion 138 of the tensioning rod 136 is internally threaded, with threads that mate with the threads of the threaded distal portion 138 of the tensioning rod 136. The distal end of the tensioning rod 136 (which extends distally of the hub 140) may be enlarged to prevent dissociation of the tensioning rod 136 from the hub 140. This may be achieved by securing an end stop or mechanical fastener 148 (shown as a nut) to the distal end of the tensioning rod 136 after the hub 140 has been properly positioned on the tensioning rod 136 or by any other suitable approach. By such a configuration, the hub 140 may be advanced distally along the threaded distal portion 138 of the tensioning rod 136 without becoming dissociated from the tensioning rod 136.

Due to the opposite threads of the proximal and distal portions 134 and 138 of the tensioning rod 136, rotating the tool attachment portion 150 of the tensioning rod 136 in a first direction will cause the threads of the tensioning rod 136 to move the tensioning rod 136 proximally with respect to the cannon 130 while also pulling the hub 140 proximally toward the cannon 130. Conversely, rotating the tool attachment portion 150 in the opposite direction will cause the threads of the tensioning rod 136 to move the tensioning rod 136 distally with respect to the cannon 130 while also advancing the hub 140 distally away from the cannon 130. Assuming similarly configured threads of the proximal portions of the tensioning rods and the bores of the associated cannons, the same degree of rotation of the tensioning rod 136 about its central axis will cause a greater degree of the change in the length of the universal chain tie down assembly 124 of FIG. 22 than the universal chain tie down assembly 10 of FIG. 1 (due to the same rotation also causing movement of the hub 140 with respect to the cannon 130). As less rotation is required to effect the same degree of change in the length of the universal chain tie down assembly 124 (and, hence, to vary the degree of tension in the universal chain tie down assembly 124), the proximal portion 134 of the tensioning rod 136 may be relatively short compared to the proximal portion 56 of the tensioning rod 58 of the universal chain tie down assembly 10 of FIG. 1.

FIG. 26 shows the tensioning rod 136 in an intermediate condition, while FIGS. 27 and 28 show the tensioning rod 136 in fully extended and fully compressed conditions, respectively. In the fully extended condition of FIG. 27, the end stop 148 of the tensioning rod 136 bears against the distal end of the hub 140, while a retaining pin 152 of the proximal portion 134 of the tensioning rod 136 bears against the threads of the cannon bore 154 or the end of a counterbore of the cannon bore 154 (as described above with respect to the previous embodiment) to prevent further separation of the hub 140 with respect to the cannon 130. In the fully compressed condition of FIG. 28, the hub 140 bears against a distal surface of the tool attachment portion 150 of the tensioning rod 136, while the cannon 130 bears against a proximal surface of the tool attachment portion 150.

Despite the variations in the configurations of the turret 126, cannon 130, tensioning rod 136, hub 140, and first and second arms 142 and 144, the universal chain tie down assembly 124 of FIG. 22 operates similarly to the universal chain tie down assembly 10 of FIG. 1. More particularly, in use, the chain 102 and one or more of the hooks of the universal chain tie down assembly 124 are used to attach the chain 102 to a load, as conventionally done with the distal chain of a chain tie down assembly. The tool attachment portion 150 is then manipulated using an appropriate tool to move the tensioning rod 136 proximally with respect to the cannon 130 and to draw the hub 140 toward the cannon 130, thus increasing the tension in the universal chain tie down assembly 124. As the tension in the universal chain tie down assembly 124 increases, the various caps of the constant tensioning device 80 compress the spring elements, with the separation of the adjacent caps decreasing until a target separation (corresponding to a particular tension in the universal chain tie down assembly 124) is achieved. One or more of the hooks may be used at an appropriate time to take up slack in the chain 102, as conventionally done with a chain tie down assembly. Similar to the embodiment of FIG. 1, the universal chain tie down assembly 124 of FIG. 22 may be used to secure larger loads (due to its strength), while being short enough to be used for smaller loads (see FIG. 29).

While the embodiments of FIGS. 1-29 show a cannon having an internally threaded bore and a tensioning rod with an externally threaded proximal portion, it should be understood that the cannon and tensioning rod may be differently configured, with an externally threaded cannon and a tensioning rod with a proximal portion defining an internally threaded bore, as in the embodiments of FIGS. 30-47.

The universal chain tie down assembly 47 of FIGS. 30-35 may be understood as a variation of the universal chain tie down assembly 10 of FIG. 1. The embodiment of FIGS. 30-35 differs principally from the embodiment of FIG. 1 in that, rather than the cannon 49 defining an internally threaded bore, it is instead provided with an externally threaded distal portion 51, as can be seen in FIG. 31. In the illustrated embodiment, the cannon 49 is configured similarly to a conventional eyebolt (with a loop 53 at its proximal end being pivotally associated with a turret 38 of the type shown in FIG. 1), but it should be understood that the cannon 49 may be differently configured, as necessary to cooperate with the associated turret.

The externally threaded distal portion 51 of the cannon 49 is configured to be at least partially received by an externally threaded bore 55 defined by the proximal portion 57 of a tensioning rod 59 (FIGS. 32 and 33). As can be seen in FIG. 32, it may be sufficient for only a proximal portion of the bore 55 to be threaded, while the remainder of the inner surface of the bore 55 is unthreaded. Similar to the embodiment of FIG. 1, the tensioning rod 59 includes a tool attachment portion 61, which allows the tensioning rod 59 to be manipulated by a tool (e.g., a wrench) to rotate the tensioning rod 59 about its central axis, which causes the tensioning rod 59 to move proximally and distally with respect to the cannon 49 between a fully extended condition (FIG. 34) and a fully compressed condition (FIG. 35).

Similar to the distal portion 64 of the tensioning rod 58 of FIG. 1, the distal portion 63 of the tensioning rod 59 may be unthreaded (FIG. 32), for receipt within a bore 66 of a hub 68 configured as in FIG. 1. The distal portion 63 of the tensioning rod 59 is configured to rotate freely within the bore 66 of the hub 68, with an enlarged distal end of the tensioning rod 59 (which may be a mechanical fastener comprising an end stop 65) preventing dissociation of the tensioning rod 59 and the hub 68.

A retaining pin 67 may be associated with the threaded portion 51 of the cannon 49, with the unthreaded portion of the bore 55 having sufficient clearance to allow for the retaining pin 67 to move therethrough. Upon sufficient distal movement of the tensioning rod 59 with respect to the cannon 49 (i.e., into the fully extended condition of FIG. 34), the retaining pin 67 contacts the threads of the bore 55 or the bottom of a counterbore of the bore 55 to prevent further distal movement of the tensioning rod 59 with respect to the cannon 49, thus preventing complete dissociation of the tensioning rod 59 from the cannon 49.

The bore 55 may be configured such that a distal end of the cannon 49 contacts the distal end of the bore 55 to define the fully compressed condition (FIG. 35). Alternatively (or additionally), a proximal end of the tensioning rod 59 may be configured to contact the loop 53 of the cannon 49 to define the fully compressed condition.

Accordingly, it will be seen that the reconfiguration of the cannon 49 and the proximal portion 57 of the tensioning rod 59 do not change the fundamental manner in which the universal chain tie down assembly 47 works, compared to the embodiment of FIG. 1.

The universal chain tie down assembly 69 of FIGS. 36-41 may be understood as a variation of the universal chain tie down assembly 124 of FIG. 22. The embodiment of FIGS. 36-41 differs principally from the embodiment of FIG. 22 in that the cannon 71 and proximal portion 73 of the tensioning rod 75 are configured similarly to the cannon 49 and proximal portion 57 of FIGS. 30-35. The cannon 71 (FIG.

37) and proximal portion 73 of the tensioning rod 75 (FIG. 38) may differ from the ones of FIGS. 30-35 by being relatively short, which is possible due to the distal portion 77 of the tensioning rod 75 being threadably connected to the hub 140 (FIG. 39), with the proximal and distal portions 73 and 77 of the tensioning rod 75 being oppositely threaded, as in the embodiment of FIG. 22. Due to this configuration, rotating the tensioning rod 75 using its tool attachment portion 79 will cause the position of the tensioning rod 75 to change with respect to the associated hub 140 (which may be substantially identical to the hub 140 of FIG. 22), meaning that the threaded portion 81 of the cannon 71 and proximal portion 73 of the tensioning rod 75 may be relatively short without sacrificing the full takeup of the universal chain tie down assembly 69.

As in the other universal chain tie down assemblies described herein, the tensioning rod 75 may be rotated about its central axis to move the universal chain tie down assembly 69 between a fully extended condition (FIG. 40) and a fully compressed condition (FIG. 41). The distal end of the tensioning rod 75 may be enlarged (e.g., in the form of a mechanical fastener comprising an end stop 83) to prevent dissociation of the tensioning rod 75 and the hub 140 in the fully extended condition. As in the embodiment of FIGS. 30-35, a retaining pin 85 may be associated with the threaded portion 81 of the cannon 71, with the retaining pin 85 contacting the threads of the bore 87 or the bottom of a counterbore of the bore 87 to prevent further distal movement of the tensioning rod 75 with respect to the cannon 71, thus preventing complete dissociation of the tensioning rod 75 from the cannon 71. Also as in the embodiment of FIGS. 30-35, the bore 87 may be configured such that a distal end of the cannon 71 contacts the distal end of the bore 87 and/or a proximal end of the tensioning rod 75 may be configured to contact the loop 89 of the cannon 71 to define the fully compressed condition.

Accordingly, it will be seen that the reconfiguration of the cannon 71 and the proximal portion 73 of the tensioning rod 75 do not change the fundamental manner in which the universal chain tie down assembly 69 works, compared to the embodiment of FIG. 22.

The universal chain tie down assembly 91 of FIGS. 42-47 may be understood as a variation of the universal chain tie down assembly 69 of FIGS. 36-41. The embodiment of FIGS. 42-47 differs principally from the embodiment of FIG. 36-41 in that, rather than the distal portion 93 of the tensioning rod 95 being externally threaded and received by a threaded bore of a hub, the distal portion 93 instead defines an internally threaded bore 97 (similarly to the proximal portion 99). In the embodiment of FIGS. 42-47, the tensioning rod 95 may be substantially tubular, with the interior of the tensioning rod 95 being open between the proximal and distal ends of the tensioning rod 95 (as in FIG. 43), though it is also within the scope of the present disclosure for there to be an internal barrier separating the proximal and distal bores 101 and 97.

The associated hub 103 (FIG. 44) is provided with an externally threaded proximal extension 105 that is at least partially received by the internally threaded distal bore 97 of the tensioning rod 95 (FIG. 45). Similar to the embodiments of FIGS. 22 and 36-41, the proximal and distal portions 99 and 93 are oppositely threaded, such that rotation of the tensioning rod 95 about its central axis will move the tensioning rod 95 with respect to the associated cannon 71 and hub 103, between a fully extended condition (FIG. 46) and a fully compressed condition (FIG. 47). As in the embodiments of FIGS. 30-41, a retaining pin may be associated with the threaded portion 81 of the cannon 71, with the retaining pin contacting the threads of the proximal bore 101 or the bottom of a counterbore of the proximal bore 101 to prevent further distal movement of the tensioning rod 95 with respect to the cannon 71, thus preventing complete dissociation of the tensioning rod 95 from the cannon 71. A second retaining pin 107 may be associated with the proximal extension 105 of the hub 103, with the second retaining pin 107 contacting the threads of the distal bore 97 or the bottom of a counterbore of the distal bore 97 to prevent further distal movement of the hub 103 with respect to the tensioning rod 95.

As in the embodiments of FIGS. 30-41, the proximal bore 101 may be configured such that a proximal end of the tensioning rod 95 contacts the loop 89 of the cannon 71 to define the fully compressed condition. Similarly, the distal bore 97 may be configured such that a distal end of the tensioning rod 95 contacts an enlarged body 109 of the hub 103 (positioned adjacent to and distally of the proximal extension 105) in the fully compressed condition. If the tensioning rod 95 is provided with an internal barrier separating the proximal and distal bores 101 and 97, a distal end of the cannon 71 may contact the distal end of the proximal bore 101 in the fully compressed condition, while a proximal end of the proximal extension 105 of the hub 103 contacts the proximal end of the distal bore 97. Alternatively, if no such internal barrier is provided, the distal end of the cannon 71 may be configured to contact the proximal end of the proximal extension 105 of the hub 103 in the fully compressed condition.

Thus, while the embodiment of FIGS. 42-47 differs from the other universal chain tie down assemblies described herein due to the reversed configurations of the distal portion 93 of the tensioning rod 95 and the hub 103, it will be seen that the universal chain tie down assembly 91 operates similarly to the embodiments of FIGS. 22 and 36-41.

While the embodiments of FIGS. 1-47 show tensioning rods having proximal portions that are threadably connected to an associated cannon, it should be understood that the tensioning rod of a universal chain tie down assembly according to the present disclosure may be otherwise associated to a cannon. For example, it is within the scope of the present disclosure for the proximal portion of a tensioning rod and an associated cannon to be connected together without engaging diametrically, as is the case when the proximal portion of a tensioning rod is unthreaded and received by an unthreaded bore of the cannon, as in the universal chain tie down assembly 111 of FIG. 48.

Figure 48:
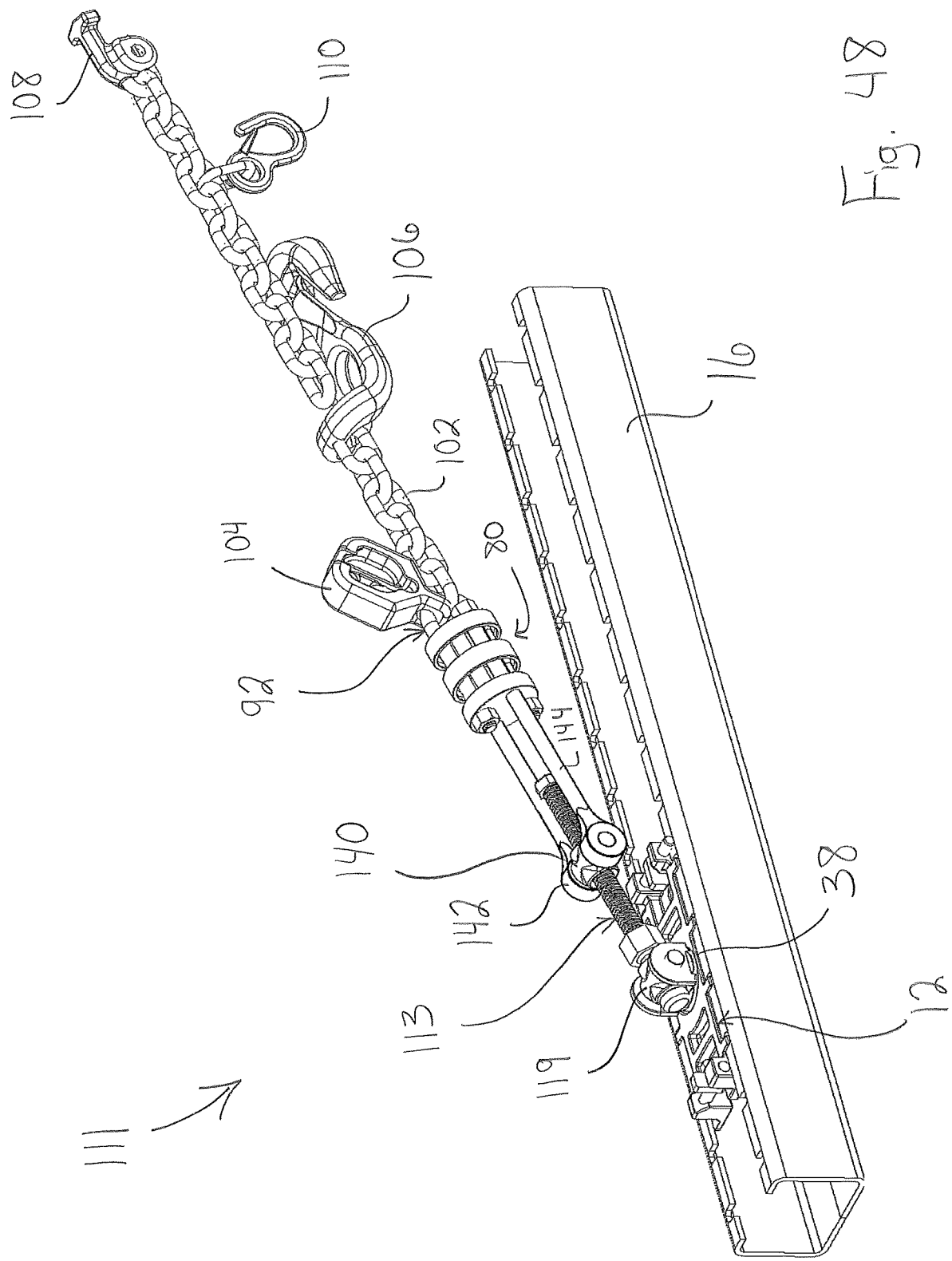
FIG. 48 is a perspective view of another embodiment of a universal chain tie down assembly according to aspects of the present disclosure.

The universal chain tie down assembly 111 of FIG. 48 may be understood as a variation of the universal chain tie down assembly 10 of FIG. 1. The embodiment of FIG. 48 differs principally from the embodiment of FIG. 1 in that the orientation of the tensioning rod 113 is (FIG. 49) is effectively reversed, with an unthreaded proximal portion 115 (instead of a threaded proximal portion 56) and an externally threaded distal portion 117 (instead of an unthreaded distal portion 64). To accommodate the threaded distal portion 117, the hub 140 may have an internally threaded bore (as in FIG. 25), while the cannon 119 (FIG. 50) includes an unthreaded bore 121 configured to receive the proximal portion 115 of the tensioning rod 113. In the illustrated embodiment, the cannon 119 is configured as a second hub that is substantially identical to the hub 140 (apart from the differently configured bores), but it should be understood that the cannon 119 may be differently configured, provided that it defines a suitable bore 121.

As in the other embodiments described herein, it may be advantageous for the cannon 119 to be pivotally connected to the turret 38. While FIG. 48 shows the cannon 119 as being directly connected to the turret 38 via a pair of lateral extensions 123 so as to position the bore 121 within the gap between the yokes of the turret 38, it should be understood that the cannon 119 may be configured or associated to the turret 38 so as to space the bore 121 away from the turret 38. For example, if the cannon 119 is configured as a second hub, it may be incorporated into a multi-piece assembly of the type shown in FIG. 19, which spaces the bore 121 away from the turret 38. However, the illustrated embodiment may be advantageous in terms of limiting the length of the universal chain tie down assembly 111.

As shown in FIG. 51, the proximal end of the tensioning rod 113 (which extends proximally of the cannon 119) may be enlarged to prevent dissociation of the tensioning rod 113 from the cannon 119. Similarly, the distal end of the tensioning rod 113 (which extends distally of the hub 140) may be enlarged to prevent dissociation of the tensioning rod 113 from the hub 140. This may be achieved, for example, by securing end stops or mechanical fasteners 125 to the proximal and distal ends of the tensioning rod 113 or by any other suitable approach. By such a configuration, the proximal and distal portions 115 and 117 of the tensioning rod 113 may rotate within the associated bores (respectively) without the tensioning rod 113 becoming dissociated from the cannon 119 or the hub 140.

As in the other embodiments described herein, the tensioning rod 113 includes a tool attachment portion 127, which may be positioned between the proximal and distal portions 115 and 117 of the tensioning rod 113. The tool attachment portion 127 allows the tensioning rod 113 to be manipulated by a tool (e.g., a wrench) to rotate the tensioning rod 113 about its central axis, which causes the tensioning rod 113 to move the hub 140 proximally and distally along the distal portion 117 of the tensioning rod 113 between a fully extended condition (FIG. 52) and a fully compressed condition (FIG. 53). Accordingly, it will be seen that the removal of threads from the interface between the proximal portion 115 of the tensioning rod 113 and the cannon 119 (with there being a threaded connection between the distal portion 117 of the tensioning rod 113 and the hub 140) does not change the fundamental manner in which the universal chain tie down assembly 111 works compared to the other embodiments described herein, but merely allows for the tension in the universal chain tie down assembly 111 to be varied without the tensioning rod 113 being moved proximally or distally with respect to the turret 38.

It should be understood that the illustrated embodiments are merely exemplary and that variations to the illustrated configurations may be practiced without departing from the scope of the present disclosure. For example, while a particular turret and/or cannon may be described and/or illustrated in the context of one of the embodiments, it is within the scope of the present disclosure for there to be crossover between the components of the embodiments (except where physically incompatible). The illustrated universal chain tie down assemblies may also include additional components without departing from the scope of the present disclosure. For example, FIG. 54 shows an embodiment in which a second T-hook 108 is associated with the curved portion 94 of the U-bolt 92.

Figure 55:
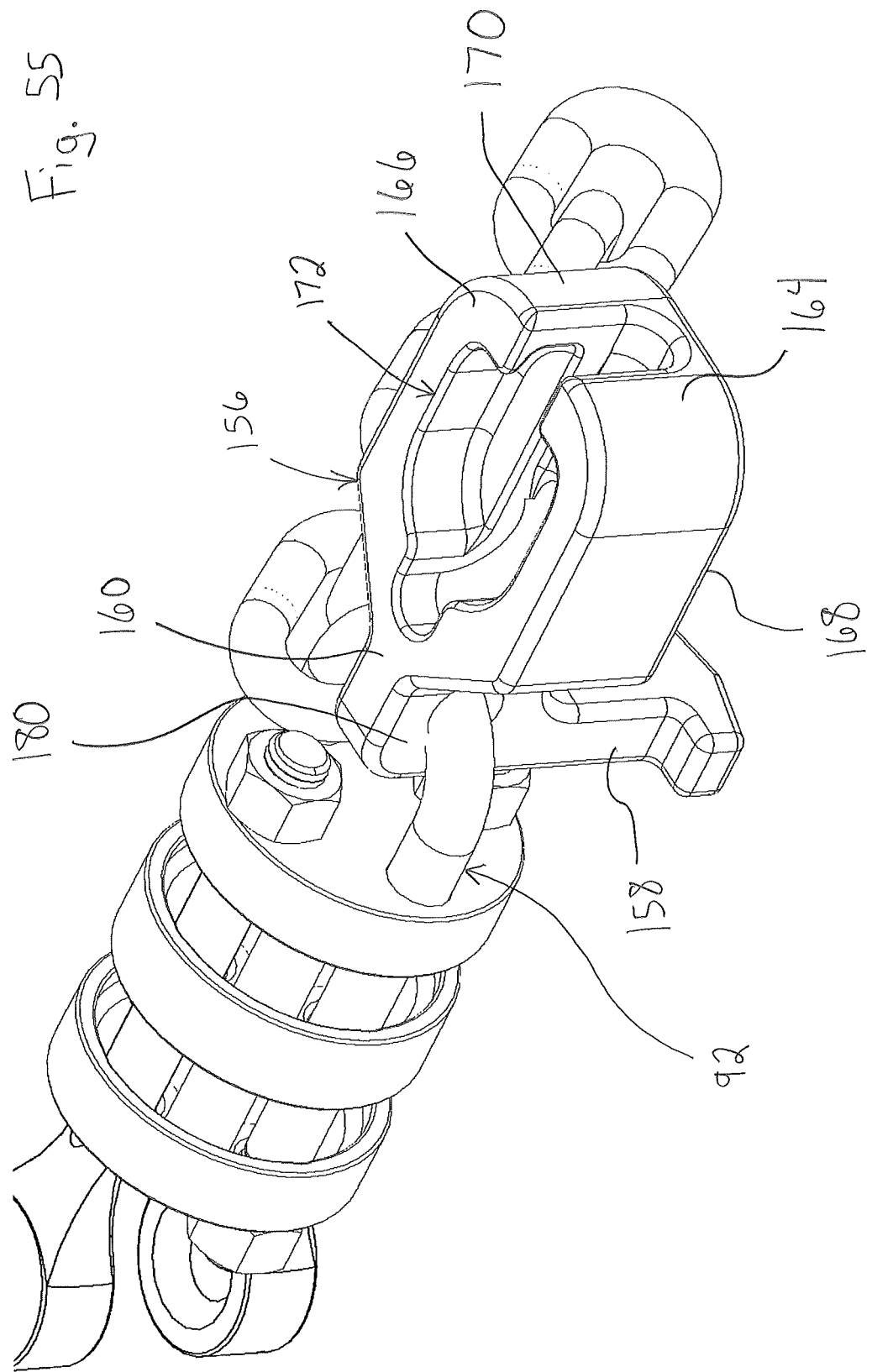
FIG. 55 is a perspective view of a portion of a universal chain tie down assembly according to the present disclosure, with a claw or grab hook including a T-hook formation.
Figure 56:
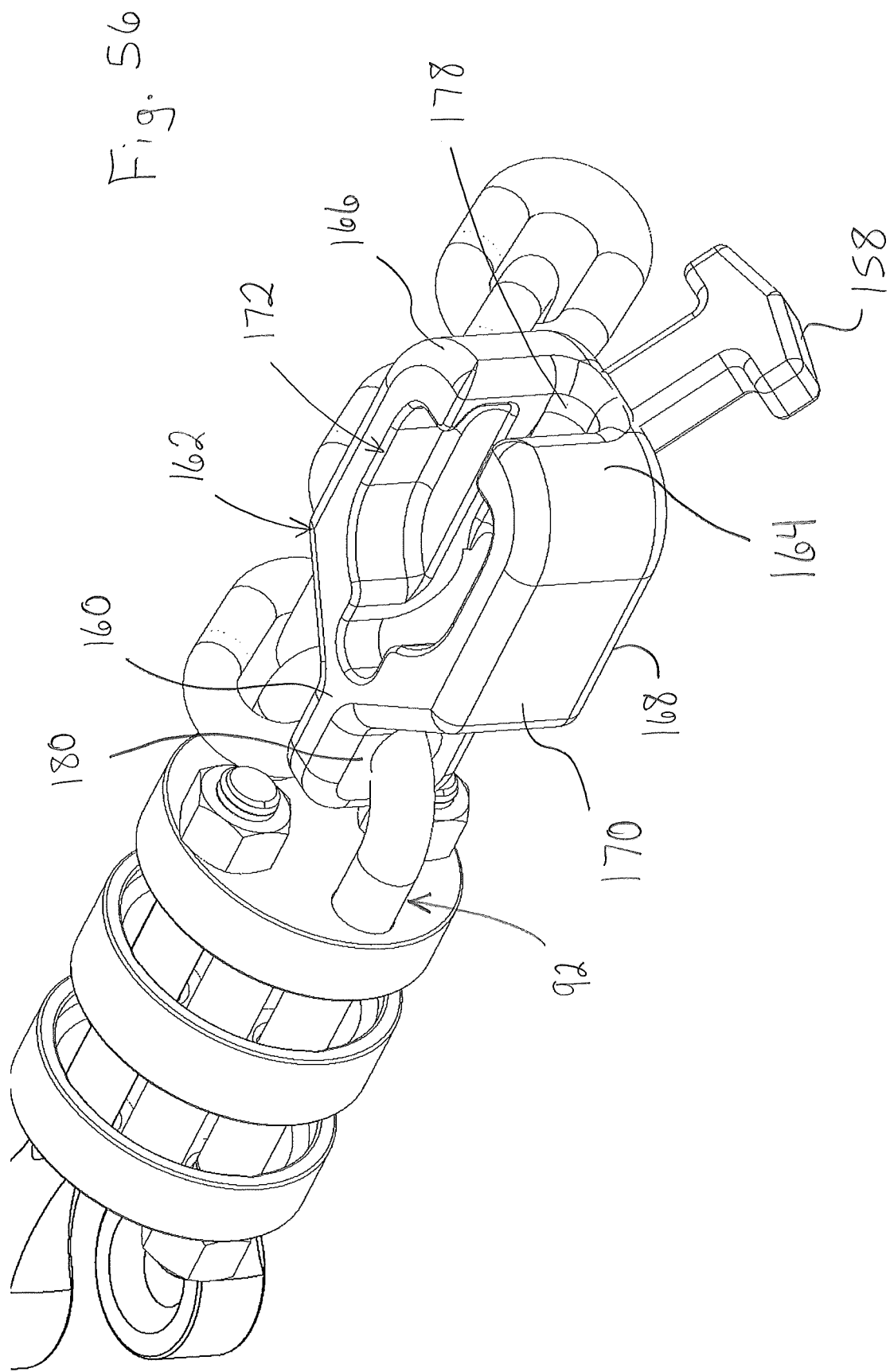
FIG. 56 is a perspective view of a portion of a universal chain tie down assembly according to the present disclosure, with an alternative embodiment of a claw or grab hook including a T-hook formation.

Alternatively, if it would be advantageous for a T-hook to be associated with the curved portion 94 of the U-bolt 92, rather than providing a T-hook, a chain takeup device associated with the curved portion 94 of the U-bolt 92 (e.g., a claw or grab hook) may be modified to include a T-hook formation, as in FIGS. 55 and 56. FIG. 55 shows an embodiment of a claw or grab hook 156 having a T-hook formation 158 associated with a proximal end 160 thereof, while FIG. 56 shows an embodiment of a claw or grab hook 162 having a T-hook formation 158 associated with a distal end 164 thereof.

Figure 54:
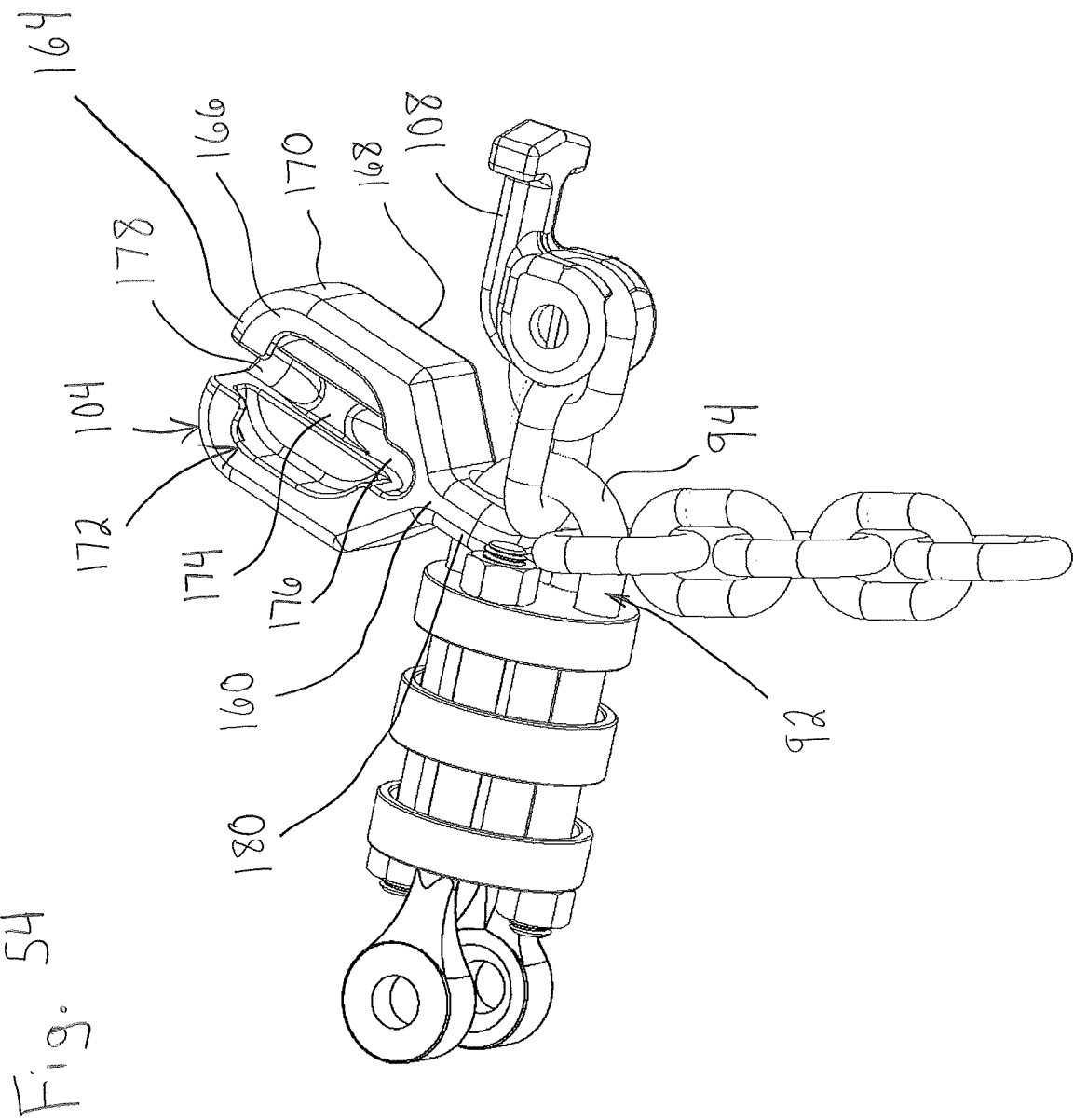
FIG. 54 is perspective view of a portion of a universal chain tie down assembly according to the present disclosure, with a T-hook associated with a U-bolt of a constant tensioning device.

A conventional claw or grab hook 104 (as shown in FIG. 54) has upper and lower surfaces 166 and 168, which are joined by a sidewall 170. The lower surface 168 may be substantially closed or solid, while a cavity 172 is defined in the upper surface 166. A central portion 174 of the cavity 172 is configured to receive one complete link of a chain, with the link being oriented within a plane defined by the sidewall 170. The cavity 172 further includes proximal and distal portions 176 and 178, which are each configured to accommodate a portion of a different chain link that is linked to the chain link positioned within central portion 174 of the cavity 172. The proximal portion 176 of the cavity 172 extends through the upper surface 166 of the claw or grab hook 104 and is spaced from the proximal end 160 of the sidewall 170, in which a link 180 may be defined for associating the claw or grab hook 104 to a U-bolt 92 (as in FIG. 54) or the like. The distal portion 178 of the cavity 172 is defined in the upper surface 166 and in the distal end 164 of sidewall 170 of the claw or grab hook 104. By such a configuration the chain link partially received by the distal portion 178 of the cavity 172 will be oriented substantially co-planar with the chain link received by the central portion 174 of the cavity 172, while the chain link partially received by the proximal portion 176 of the cavity 172 will be generally perpendicular to the other two chain links.

In the embodiment of FIG. 55, the proximal end 160 of the sidewall 170, in addition to defining a link 180, also defines a T-hook formation 158, which is shown as extending generally perpendicularly away from the lower surface 168. Such a configuration may be advantageous for maintaining the accessibility of the cavity 172 via the upper surface 166 while preventing the T-hook formation 158 from interfering with a structure to which the claw or grab hook 156 is linked (which is shown in FIG. 55 as a U-bolt 92). However, it is also within the scope of the present disclosure for the T-hook formation 158 to extend at some other angle from the lower surface 168 of the claw or grab hook 156.

In the embodiment of FIG. 56, the T-hook formation 158 extends from the lower surface 168 of the claw or grab hook 162 at the distal end 164 of the sidewall 170, directly beneath the distal portion 178 of the cavity 172. The T-hook formation 158 is shown as extending at an approximately 45° angle away from the lower surface 168 of the claw or grab hook 162, but it is also within the scope of the present disclosure for the T-hook formation 158 to extend away from the lower surface 168 at some other angle.

While FIGS. 55 and 56 show the T-hook formation 158 extending from the lower surface 168 at the proximal end 160 or distal end 164 of the claw or grab hook 156, 162, it should be understood that the T-hook formation 158 may extend away from the some other region of the lower surface 168 at any angle. Additionally, it is within the scope of the present disclosure for the T-hook formation 158 to extend away from some other surface of the claw or grab hook, such as the sidewall 170. The illustrated configurations, however, may be particularly advantageous in terms of facilitating the passage of the claw or grab hook 156, 162 through a slot defined in the frame of a vehicle or the like.

Furthermore, while the claw or grab hooks 156 and 162 of FIGS. 55 and 56 are shown as being used in combination with a universal chain tie down assembly, it should be understood that a chain takeup device modified to incorporate a T-hook formation may be used in other chain tie down assemblies and in other contexts in which a conventional chain takeup device would be used.

During use of any chain tie down assembly, vibration of the flatcar during transport may cause rotation of a tensioning member, such as the tensioning rod of a universal chain tie down assembly according to the present disclosure. Rotation of the tensioning member may decrease the degree of tension in the chain tie down assembly, which is to be avoided to ensure that a load is adequately secured. Accordingly, a chain tie down assembly (which may be either a universal chain tie down assembly according to the present disclosure or some other chain tie down assembly having an elongated tensioning member that is configured to be rotated about its central axis to vary the tension in the chain tie down assembly) may be provided with a tension lock or anti-vibration assembly. As will be described in greater detail herein, such a tension lock assembly may be variously configured, but is configured to be moved between an unlocked condition allowing rotation of a tensioning member and a locked condition preventing rotation of the tensioning member. Subsequently, the tension lock assembly may be disengaged to allow intentional rotation of the tensioning member.

Figure 57:
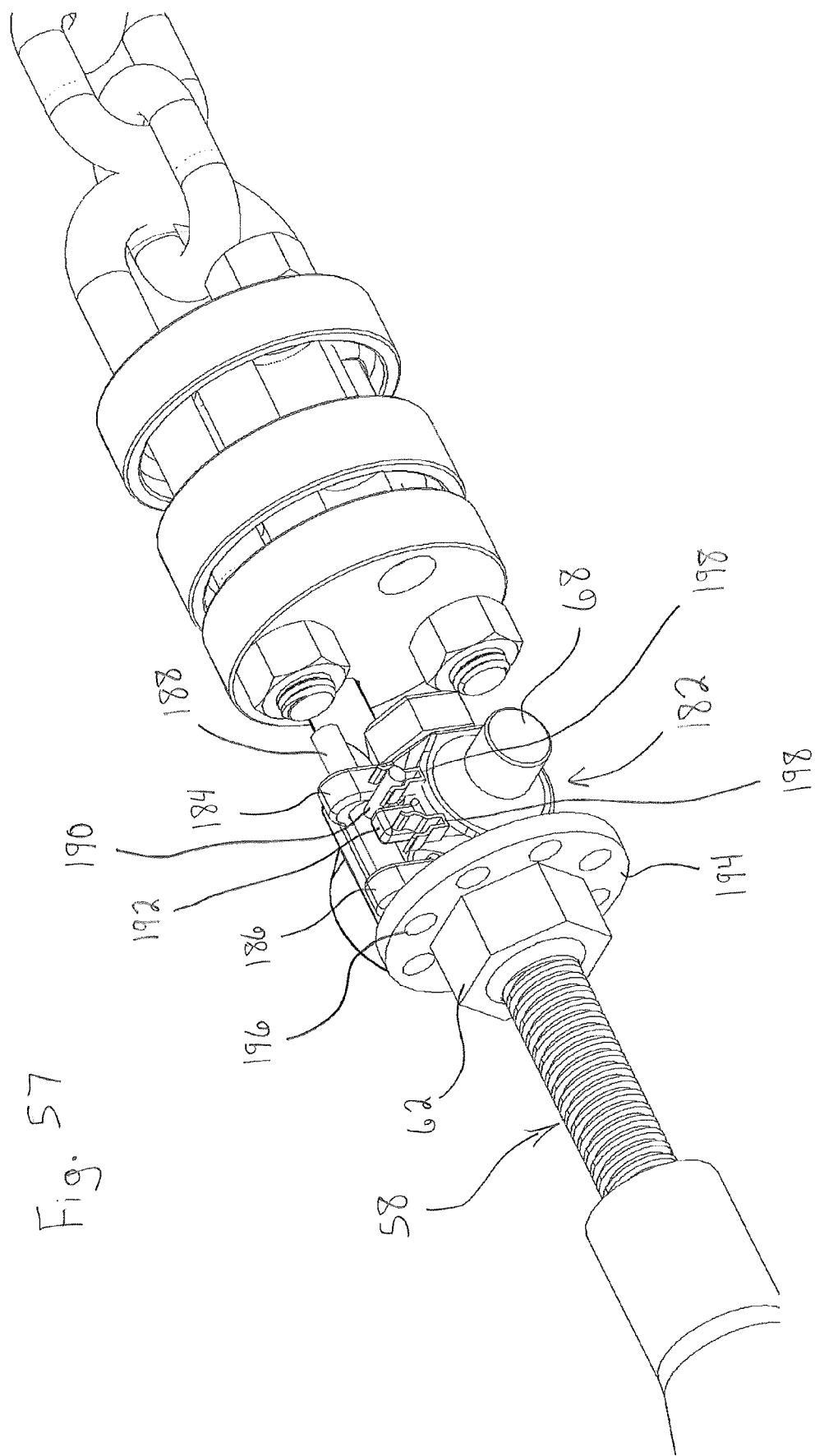
FIG. 57 is a perspective view of a tension lock assembly suitable for incorporation into a chain tie down assembly having an elongated tensioning member, shown in an unlocked condition.
Figure 58:
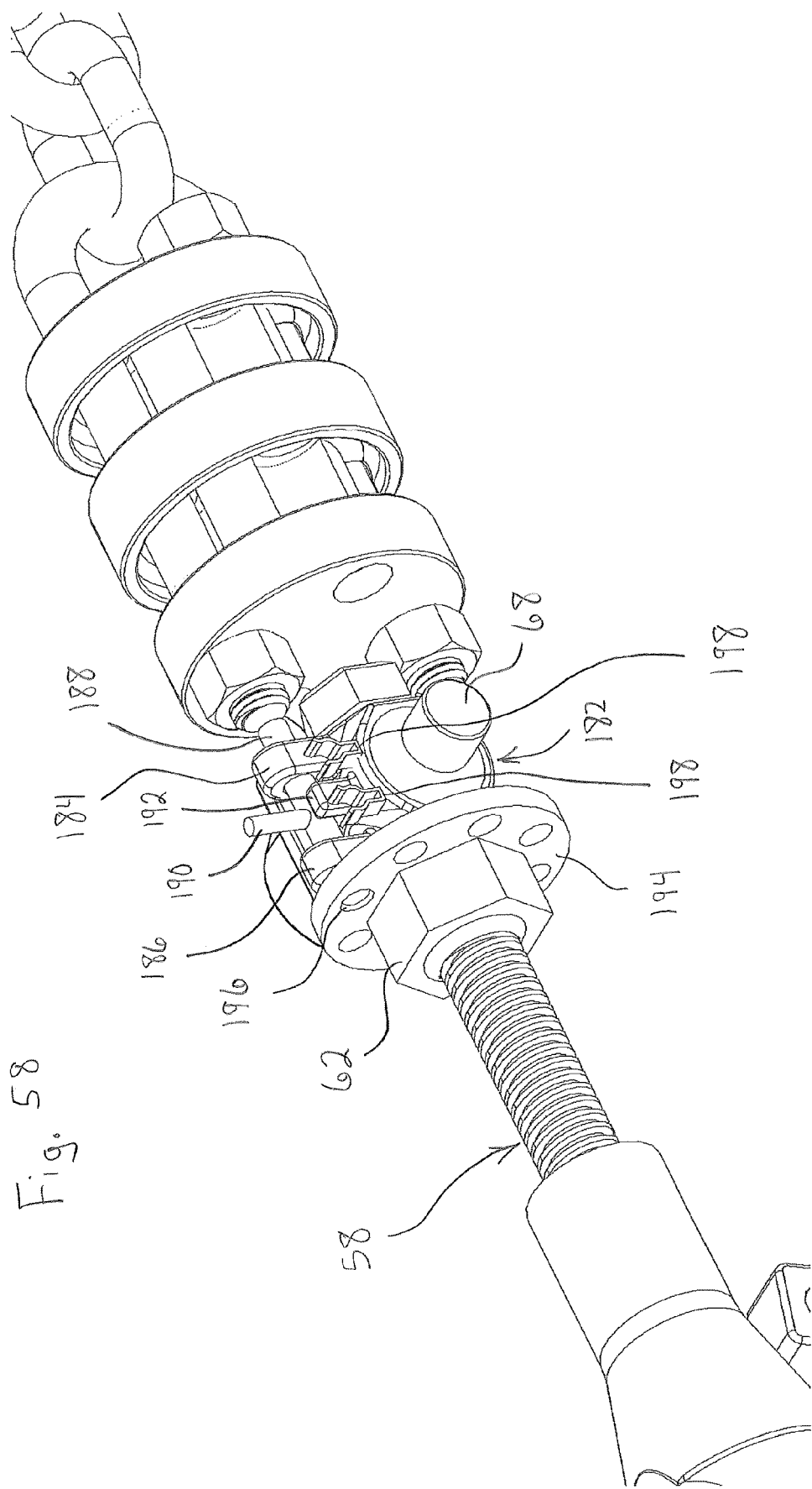
FIG. 58 is a perspective view of the tension lock assembly of FIG. 57, shown in an intermediate condition.
Figure 59:
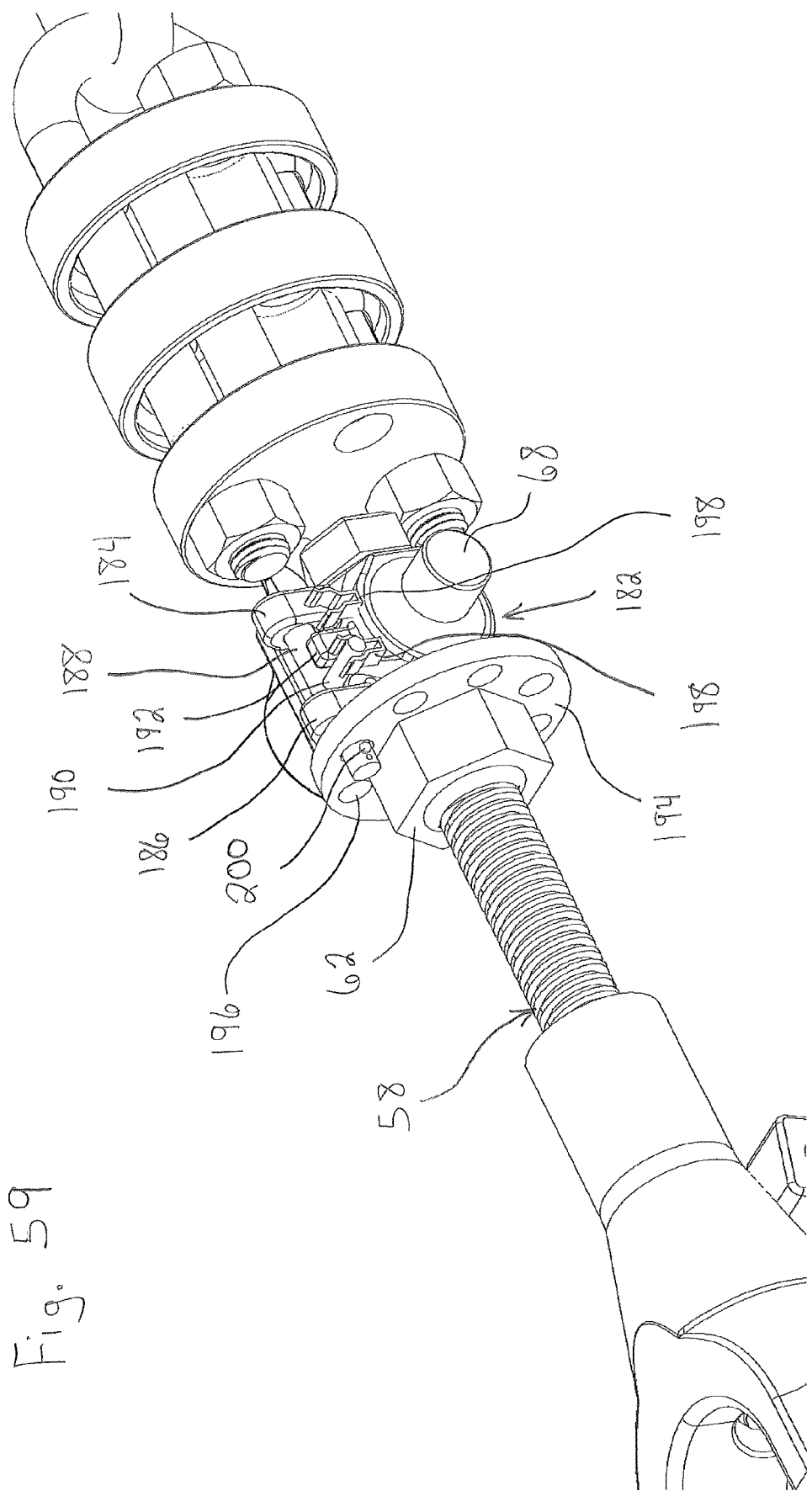
FIG. 59 is a perspective view of the tension lock assembly of FIG. 57, shown in a locked condition.

FIGS. 57-59 illustrate one embodiment of such a tension lock assembly 182. The tension lock assembly 182 is shown as being associated with the hub 68 and the tool attachment portion 62 of the tensioning rod 58 of a universal chain tie down assembly 10 according to FIG. 1. FIG. 57 shows the tension lock assembly 182 in an unlocked condition, while FIG. 58 shows it in an intermediate condition and FIG. 59 shows it in a locked condition. The tension lock assembly 182 may be analogized to a sliding lock (e.g., of a door), with first and second supports 184 and 186 secured to the hub 68. A rod 188 having a radially extending stop 190 is movably and rotatably received by aligned holes defined in the supports 184 and 186. The hub 68 further includes a barrier 192 positioned between the supports 184 and 186, with the gaps between the barrier 192 and adjacent supports 184 and 186 being sufficiently sized to allow receipt of the stop 190 (see FIGS. 57 and 59).

The tool attachment portion 62 of the tensioning rod 58 is provided with a disc 194 defining a plurality of longitudinal openings 196 spaced outwardly of the perimeter of the tool attachment portion 62. The openings 196 are sufficiently sized so as to receive a proximal end of the rod 188 when the tension lock assembly 182 is in its locked condition (FIG. 59).

In use, the rod 188 is oriented so as to position the stop 190 between the barrier 192 and the first support 184 (i.e., in the unlocked condition of FIG. 57). The chain tie down assembly is used to secure a load, including rotating the tensioning rod 158 to increase the tension in the chain tie down assembly. When an appropriate level of tension has been imparted to the chain tie down assembly, the rod 188 is rotated about its central axis to clear the stop 190 of the barrier 192, as in FIG. 58. The rod 188 is then moved proximally toward the tool attachment portion 62 so as to advance a proximal end of the rod 188 through an aligned opening 196 of the disc 194. If there is no opening 196 aligned with the rod 188, the tool attachment portion 62 may be rotated a small amount to bring one of the openings 196 into alignment with the rod 188.

With the proximal end of the rod 188 received by an opening 196 of the disc 194, the rod 188 may be rotated about its central axis to position the stop 190 between the second support 186 and the barrier 192, as in the locked condition of FIG. 59. In such a condition, the presence of the proximal end of the rod 188 in an opening 196 of the disc 194 prevents relative rotation of the tensioning rod 58 with respect to the hub 68, thus preventing the tensioning rod 58 from rotating due to vibrations. It should be understood that the illustrated disc openings 196 are merely exemplary and that the disc 194 may be provided with a comparable formation (e.g., a radial groove extending from the perimeter of the disc 194). Additionally, rather than employing a disc 194, the rod 188 may instead engage the tool attachment portion 62 itself (e.g., being received in a longitudinal groove defined in the tool attachment portion 62 or directly contacting a flat face of the tool attachment portion 62) to prevent unintended rotation of the tensioning rod 58.

The tension lock assembly 182 may include additional components, such as spring clips 198 configured to receive and secure the stop 190 when it is positioned between the barrier 192 and one of the supports 184, 186. The rod 188 may further be provided with a positive locking feature 200 (shown in FIG. 59 as a ball detent, but otherwise configurable, such as a hairpin), which also serves to prevent movement of the rod 188 out of the locked condition. These features may be employed individually or in any combination.

Figure 60:
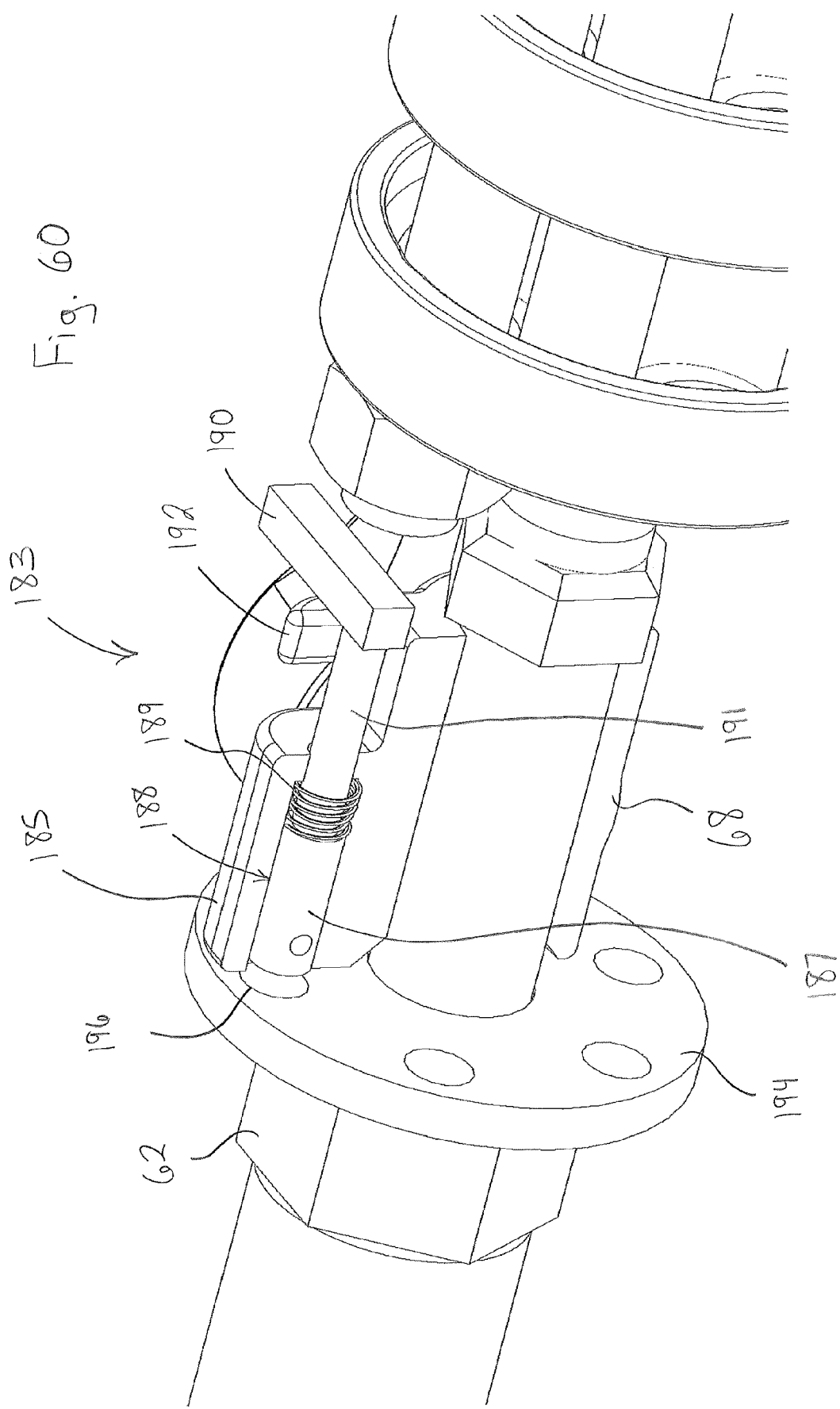
FIG. 60 is a perspective view of an alternative embodiment of a tension lock assembly suitable for incorporation into a chain tie down assembly having an elongated tensioning member, shown in an unlocked condition with portions of the tension lock assembly broken away for illustrative purposes.
Figure 61:
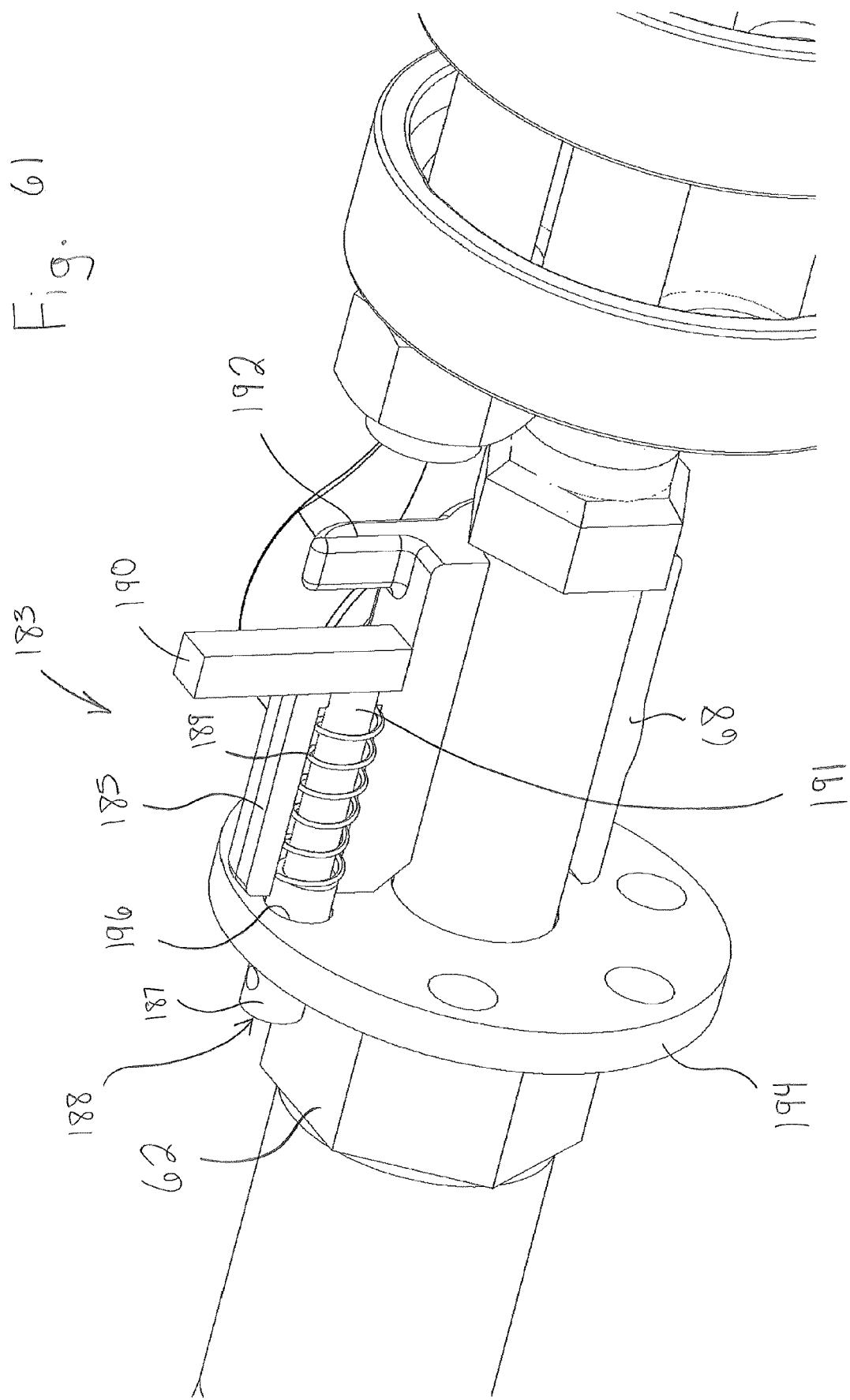
FIG. 61 is a perspective view of the tension lock assembly of FIG. 60, shown in a locked condition.

A spring may also be provided to bias the rod 188 to its proximal or locked condition to prevent movement of the rod 188 out of the locked condition, as shown in FIGS. 60 and 61. The tension lock assembly 183 of FIGS. 60 and 61 is similar to the embodiment of FIGS. 57-59, including a rod 188 having an associated stop 190 and a disc 194 having a plurality of openings 196 configured to receive a proximal end of the rod 188. A portion of the rod 188 is received within a support 185 (which may be considered to be a portion or formation of the hub 68) for longitudinal and rotational movement between an unlocked condition in which the stop 190 is positioned distally of a barrier 192, with the entire rod 188 positioned distally of the disc 194 (FIG. 60) and a locked condition in which the stop 190 is positioned proximally of the barrier 192, with a proximal portion 187 of the rod 188 received by an aligned opening 196 of the disc 194 (FIG. 61).

The support 185 defines an elongated chamber or cavity receiving the spring 189, which is coiled around a distal portion 191 of the rod 188. The proximal portion 187 of the rod 188 has a larger diameter than the distal portion 191 of the rod 188, with the spring 189 being trapped between the proximal portion 187 of the rod 188 and a distal end of the support chamber. By such a configuration, the ends of the spring 189 press against the proximal portion 187 of the rod 188 and the distal end of the support chamber, which biases the rod 188 to the locked condition of FIG. 61.

The stop 190 is gripped and moved distally to compress the spring 189 and move the rod 188 toward the locked condition of FIG. 60. Once the stop 190 has cleared the barrier 192, the rod 188 may be rotated about its central axis toward the barrier 192 to position the stop 190 behind the barrier 192, which retains the rod 188 in the unlocked condition of FIG. 60. Rotation of the rod 188 about its central axis in the opposite direction will move the stop 190 out from behind the barrier 192, thus allowing the spring 189 to expand and move the rod 188 back to the locked condition of FIG. 61.

Figure 62:
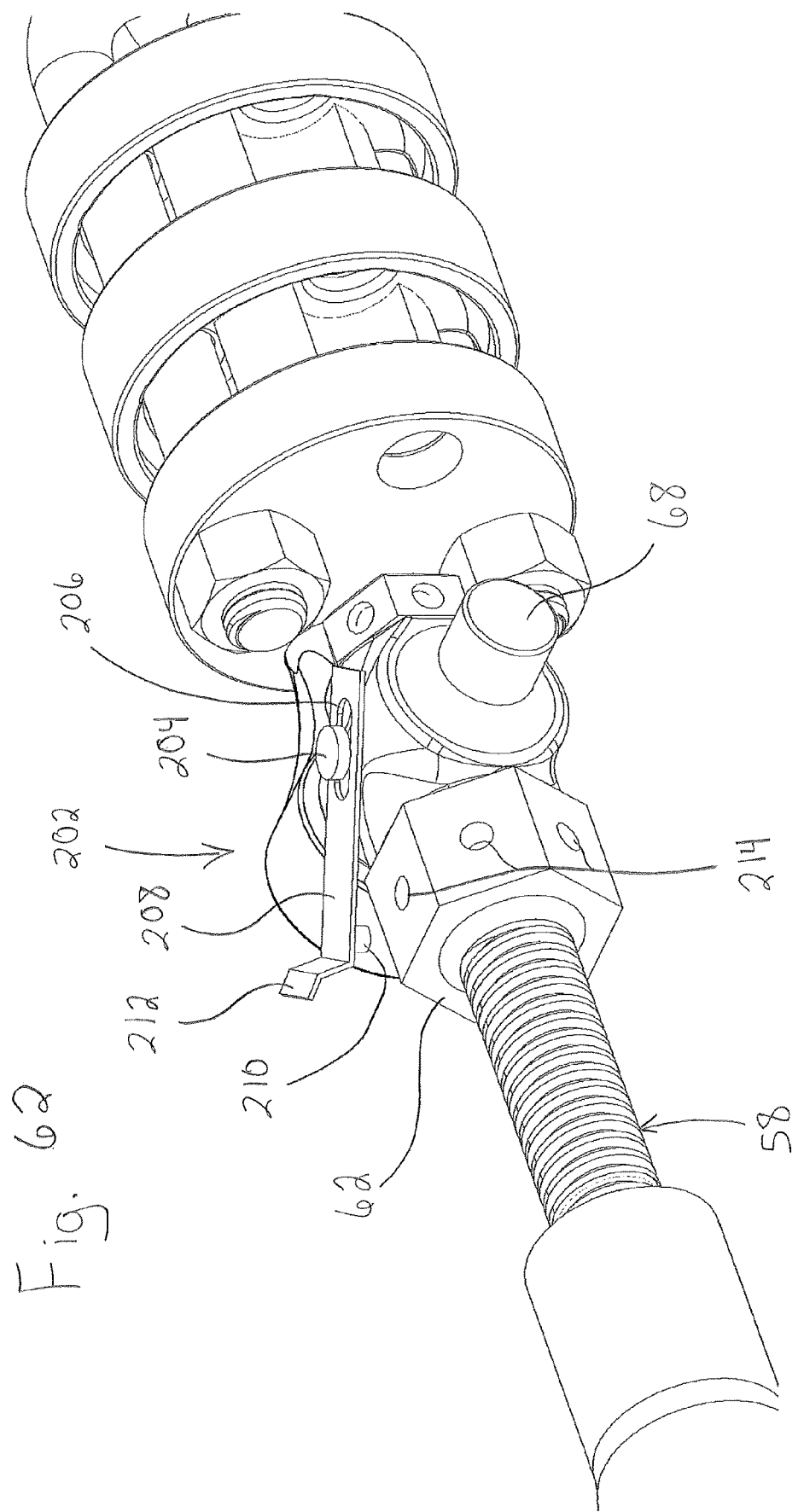
FIG. 62 is a perspective view of an alternative embodiment of a tension lock assembly suitable for incorporation into a chain tie down assembly having an elongated tensioning member, shown in an unlocked condition.
Figure 63:
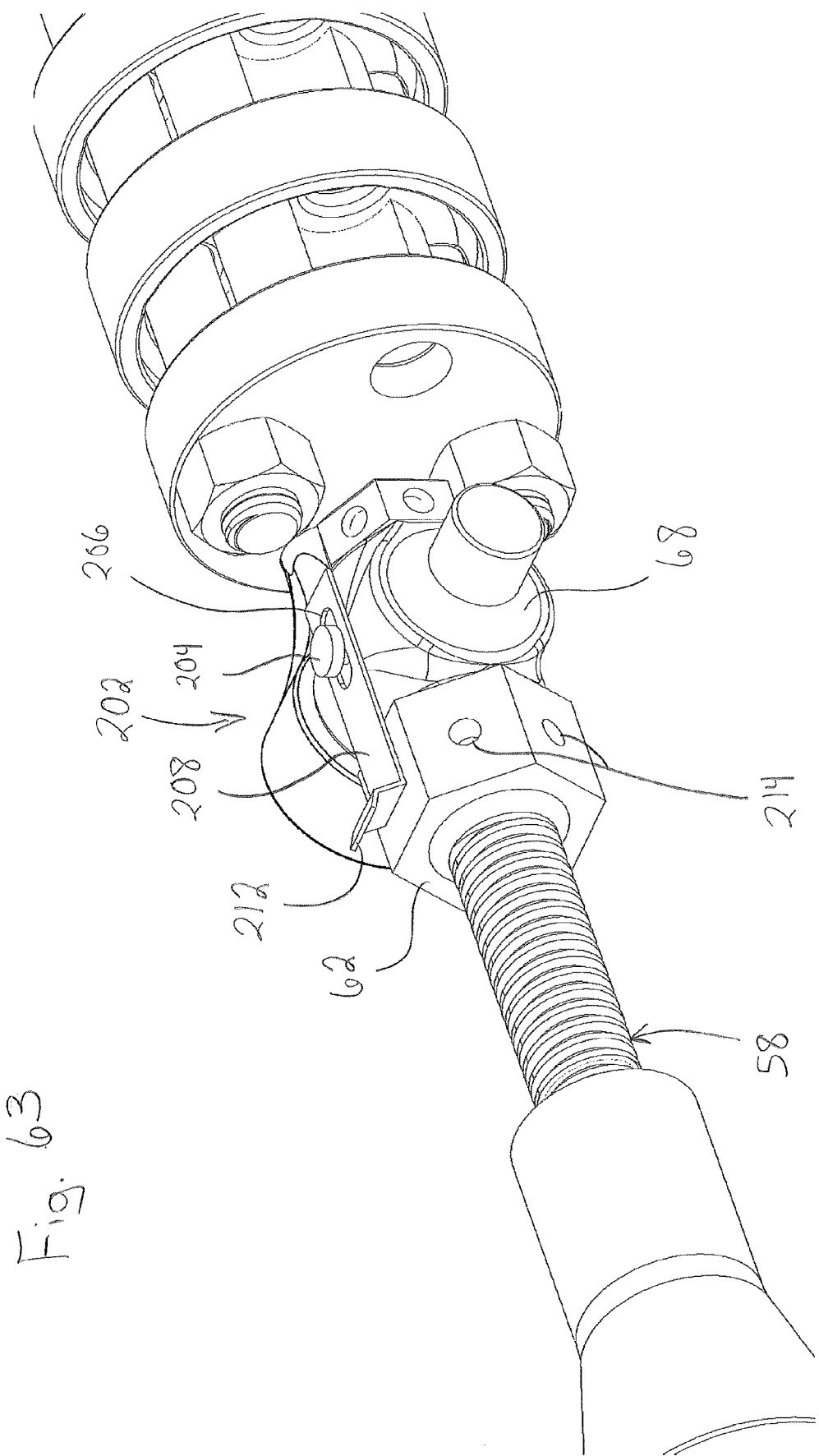
FIG. 63 is a perspective view of the tension lock assembly of FIG. 62, shown in a locked condition.
Figure 64:
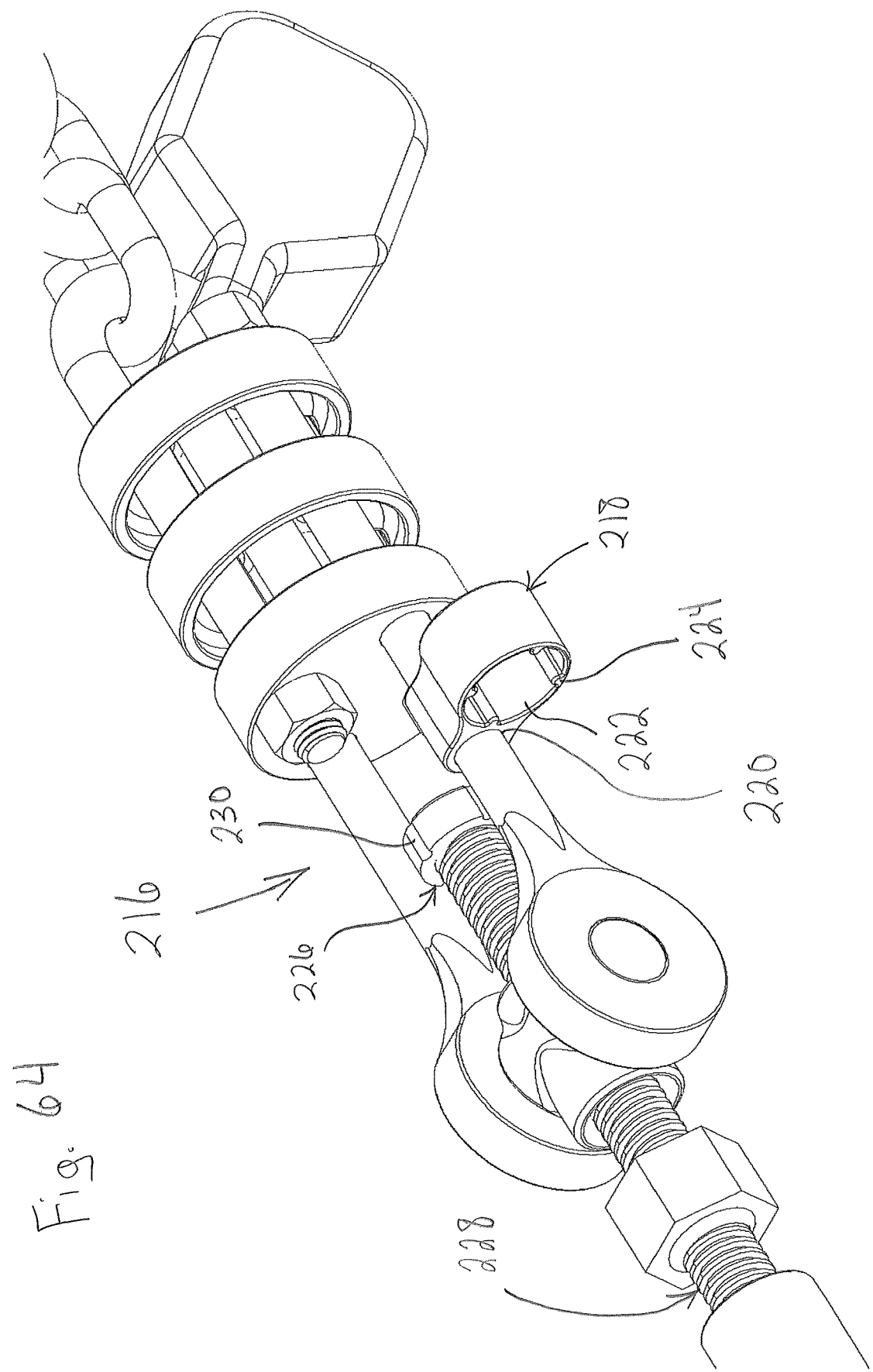
FIG. 64 is a perspective view of another alternative embodiment of a tension lock assembly suitable for incorporation into a chain tie down assembly having an elongated tensioning member, shown in an unlocked condition.
Figure 65:
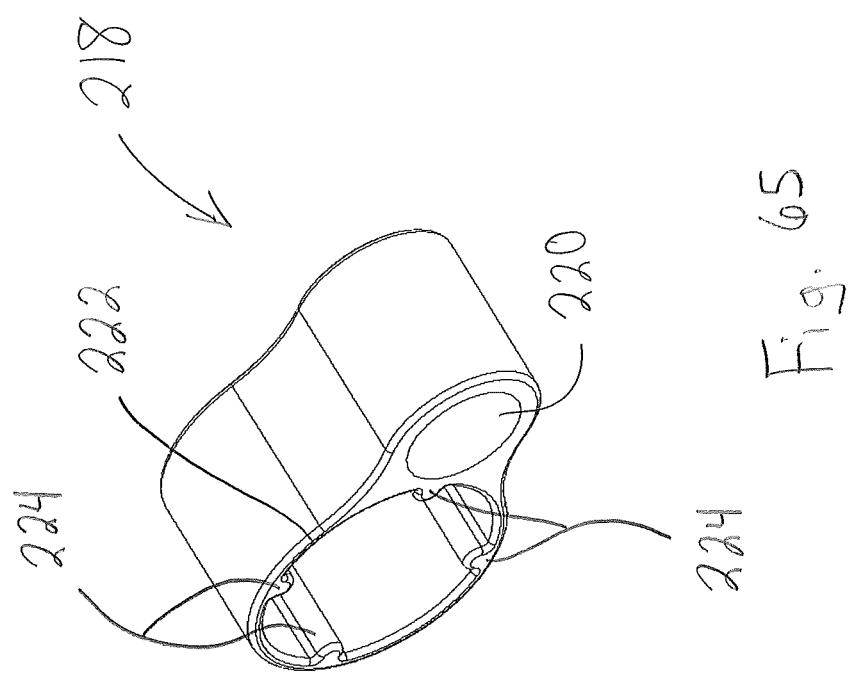
FIG. 65 is a perspective view of a retainer of the tension lock assembly of FIG. 64.

FIGS. 62 and 63 show another embodiment of a tension lock assembly 202. The tension lock assembly 202 is shown as being associated with the hub 68 and the tool attachment portion 62 of the tensioning rod 58 of a universal chain tie down assembly 10 according to FIG. 1. FIG. 62 shows the tension lock assembly 202 in an unlocked condition, while FIG. 63 shows it in a locked condition. The tension lock assembly 202 includes a pivot 204 secured to the hub 68, with the slot 206 of a locking plate 208 receiving the pivot 204. The slot 206 allows the locking plate 208 to be rotated (and optionally slid) with respect to the pivot 204.

A proximal end of the locking plate 208 includes a downwardly extending protrusion 210 and may also include an upwardly extending handle 212 configured to allow a user to manipulate the locking plate 208 (including bending the proximal end of the locking plate 208 upwardly). The tool attachment portion 62 defines a plurality of openings 214 spaced along its perimeter, with each being sized and configured to receive the protrusion 210 of the locking plate 208 (when the two are aligned).

In use, the locking plate 208 is oriented so as to position its proximal end away from the tool attachment portion 62 (i.e., in the unlocked condition of FIG. 62). The chain tie down assembly is used to secure a load, including rotating the tensioning rod 58 to increase the tension in the chain tie down assembly. When an appropriate level of tension has been imparted to the chain tie down assembly, the locking plate 208 is rotated about the pivot 204 to align the protrusion 210 and one of the openings 214 of the tool attachment portion 62, which causes the protrusion 210 to move into the aligned opening 214, as in the locked condition of FIG. 63. As necessary, the handle 212 may be manipulated to lift the proximal end of the locking plate 208 while aligning the protrusion 210 and the opening 214, with the locking plate 208 returning to its initial flat configuration upon release of the handle 212. If there is no opening 214 aligned with the protrusion 210, the tool attachment portion 62 may be rotated a small amount to bring one of the openings 214 into alignment with the protrusion 210. In such a condition, the presence of the protrusion 210 within the opening 214 (and, optionally, the flat bottom surface of the locking plate 208 bearing against a flat surface of the tool attachment portion 62) prevents relative rotation of the tensioning rod 58 with respect to the hub 68, thus preventing the tensioning rod 58 from rotating due to vibrations.

Figure 66:
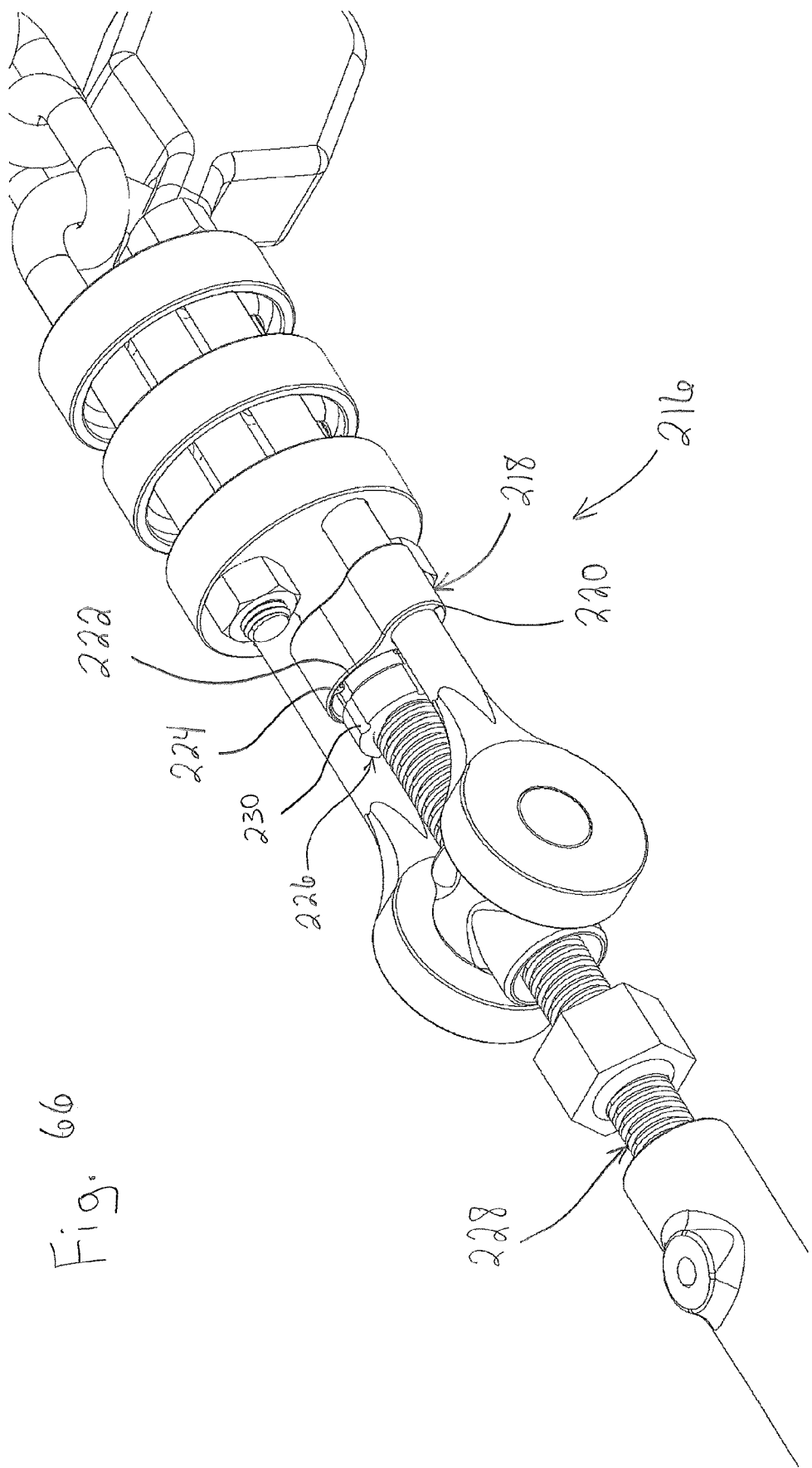
FIG. 66 is a perspective view of the tension lock assembly of FIG. 64, shown in an intermediate condition.
Figure 67:
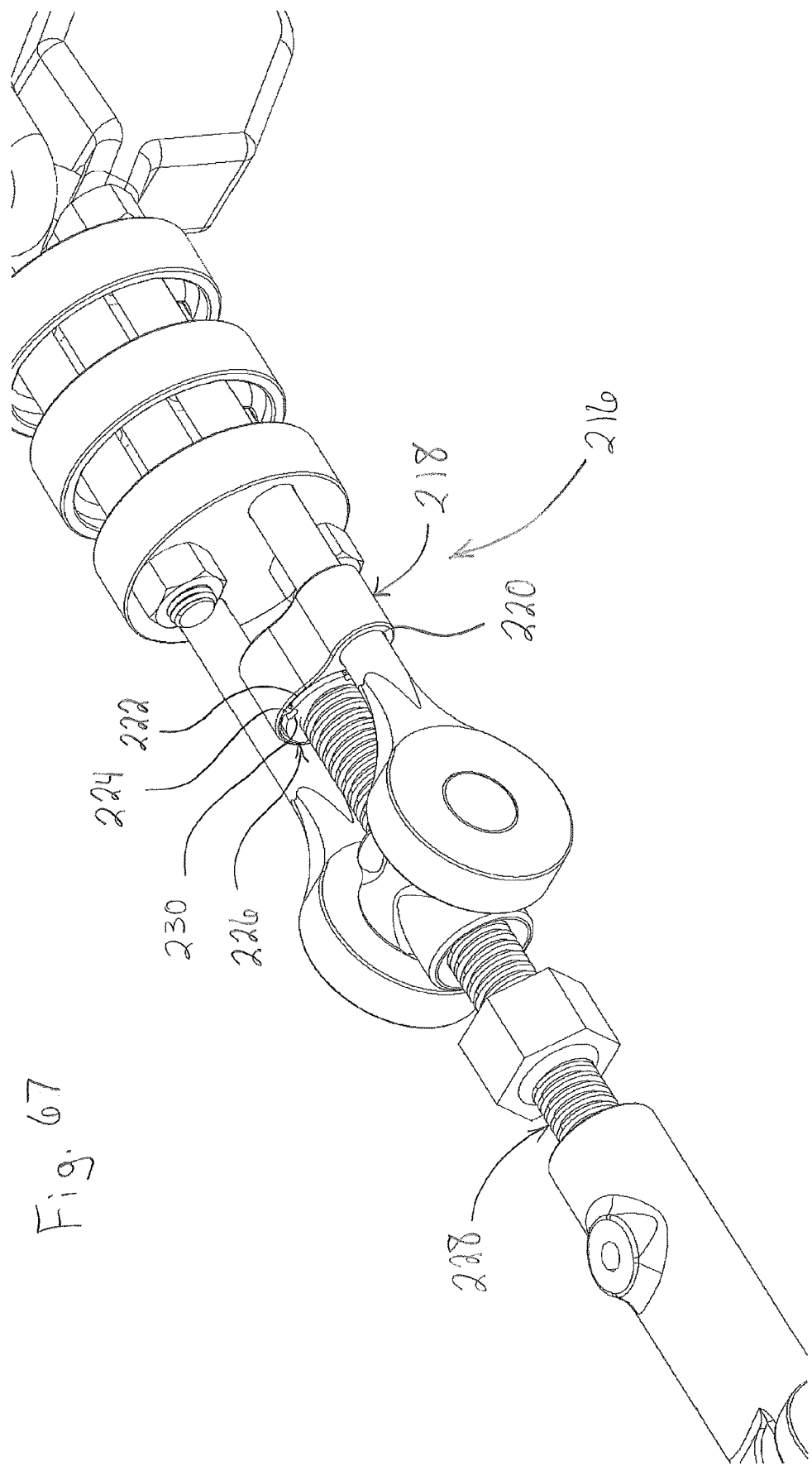
FIG. 67 is a perspective view of the tension lock assembly of FIG. 64, shown in a locked condition.

FIGS. 64-67 show another embodiment of a tension lock assembly 216. A retainer 218 of the tension lock assembly 216 (shown in greater detail in FIG. 65) defines an opening 220 (which extends entirely through the retainer 218) and a cavity or recess 222 (which is open at a proximal surface of the retainer 218 and closed at a distal surface). The opening 220 is rotatably received on one of the arms of the chain tie down assembly to allow the retainer 218 to be rotated between an unlocked condition (FIG. 64) and an intermediate condition (FIG. 66). The retainer 218 is also movable along at least a portion of the length of the associated arm, which allows for movement of the retainer 218 between the intermediate condition of FIG. 66 and the locked condition of FIG. 67.

The cavity 222 includes at least one longitudinal notch 224 extending radially inwardly toward the central axis of the cavity 222. The perimeter of an end stop 226 of a tensioning member 228 defines at least one longitudinal groove 230 that is complementarily configured with respect to the notch 224 of the cavity 222 of the retainer 218. In the illustrated embodiment, the cavity 222 includes four notches 224 spaced evenly apart along the perimeter of the cavity 222, while the end stop 226 defines four grooves 230 each sized and configured to receive a different one of the notches 224 of the cavity 222 of the retainer 218 (as in FIGS. 66 and 67). If a plurality of notches 224 and grooves 230 are provided, it may be advantageous for them to be identically configured to facilitate alignment of the notches 224 and grooves 230.

In use, the retainer 218 is oriented so as to position the cavity 222 out of alignment with the end stop 226 of the tensioning member 228. (i.e., in the unlocked condition of FIG. 64). The chain tie down assembly is used to secure a load, including rotating the tensioning member 228 to increase the tension in the chain tie down assembly. When an appropriate level of tension has been imparted to the chain tie down assembly, the retainer 218 is rotated about the associated arm to align the cavity 222 and the end stop 226 (as in FIG. 66). The retainer 218 is then moved proximally along the associated arm to slide the end stop 226 into the cavity 222 of the retainer 218, with the notches 224 of the second opening 222 being received in the aligned grooves 230 (as in the locked condition of FIG. 67). If the grooves 230 are not aligned with the notches 224, the tensioning member 228 may be rotated a small amount to bring the grooves 230 into alignment with the notches 224. In such a condition, the presence of the notches 224 within the grooves 230 prevents rotation of the end stop 230, thus preventing the tensioning member 228 from rotating due to vibrations. Due to the cavity 222 extending only partially through the retainer 218, a closed or solid surface of the retainer 218 positioned distally of the cavity 222 will contact a distal end of the end stop 226 or tensioning member 228 to prevent the retainer 218 from moving proximally beyond the end stop 226.

Figure 68:
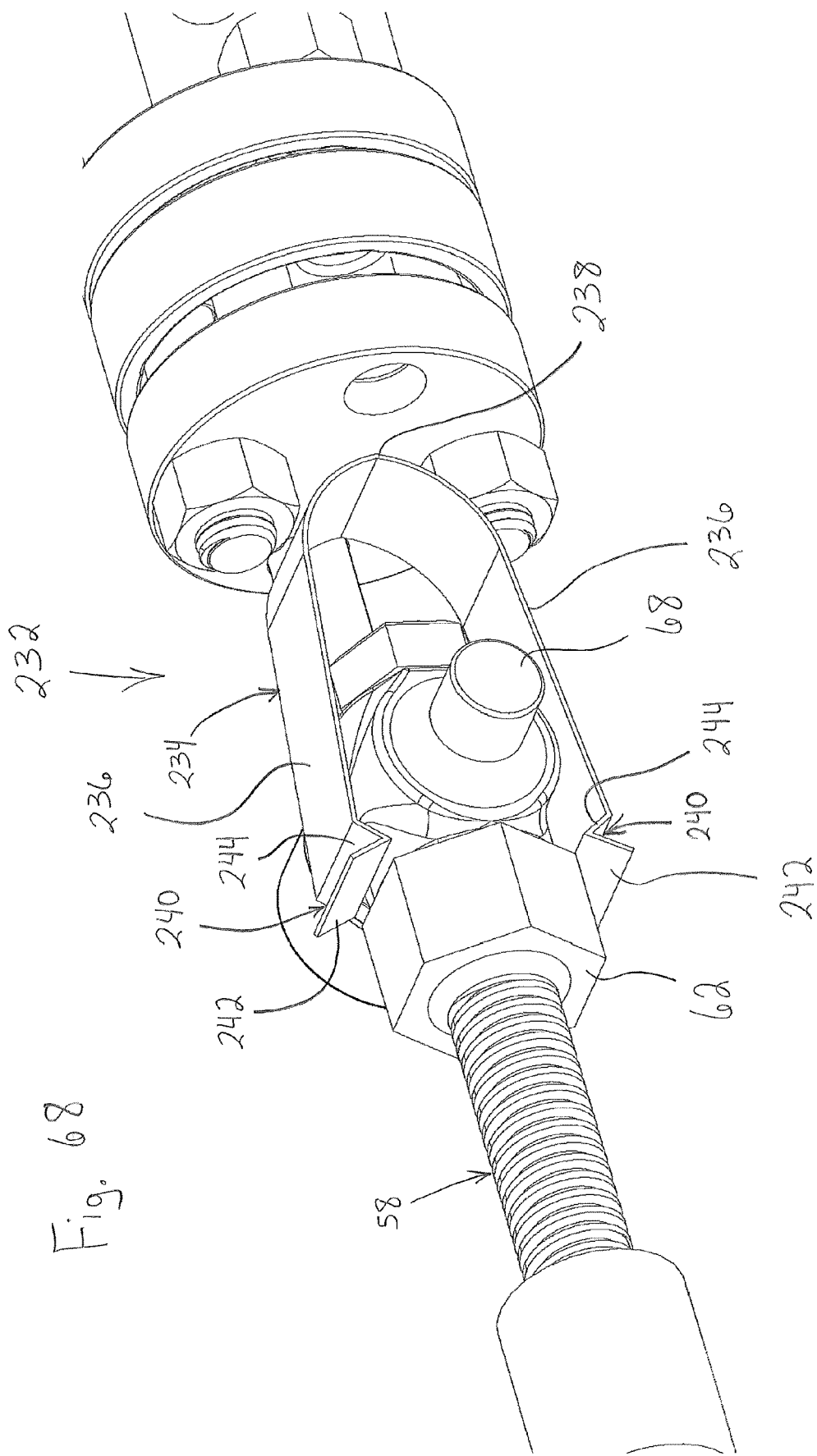
FIG. 68 is a perspective view of another alternative embodiment of a tension lock assembly suitable for incorporation into a chain tie down assembly having an elongated tensioning member, shown in an unlocked condition.
Figure 69:
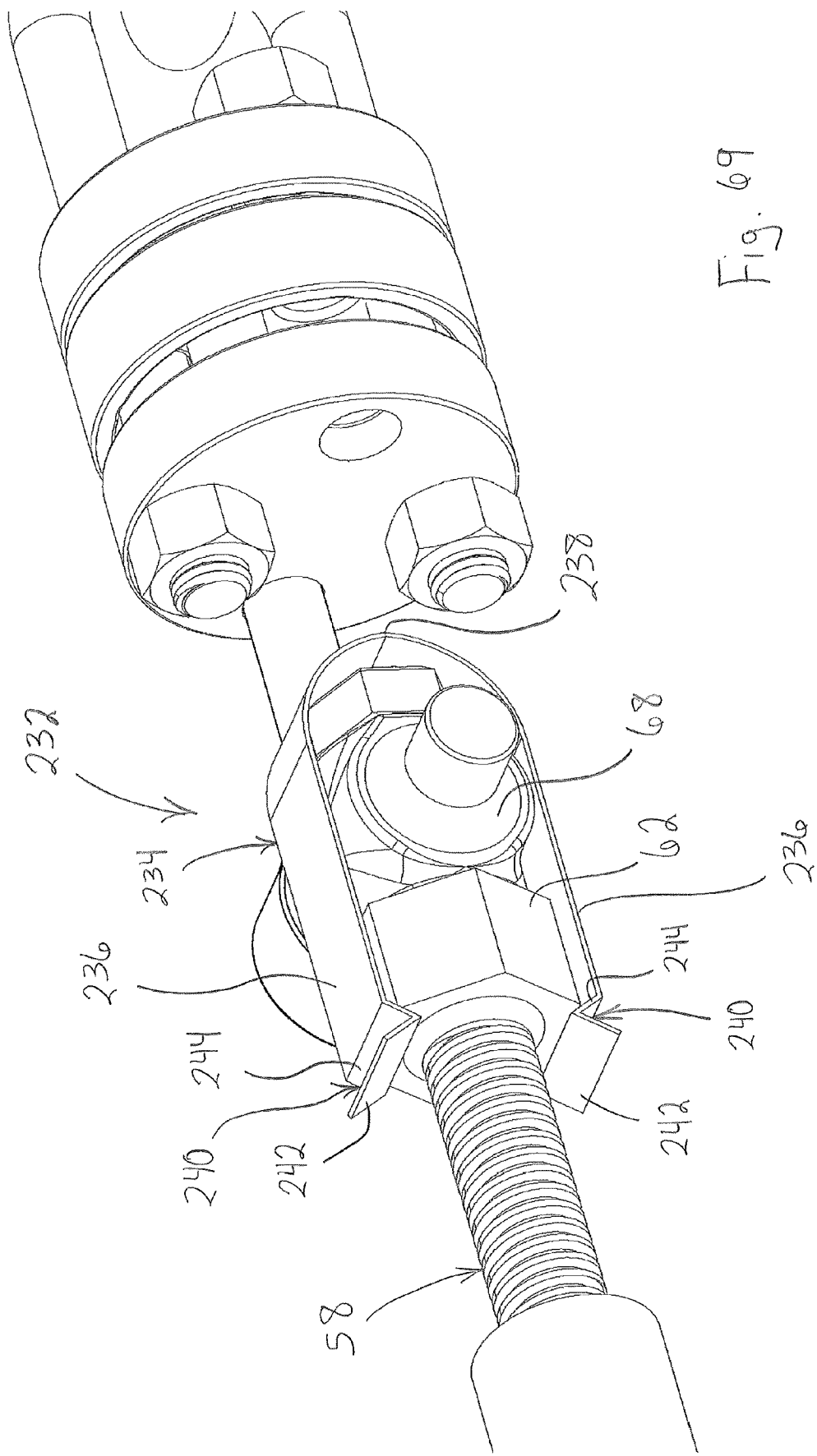
FIG. 69 is a perspective view of the tension lock assembly of FIG. 68, shown in a locked condition.

FIGS. 68 and 69 show another embodiment of a tension lock assembly 232. The tension lock assembly 232 is shown as being associated with the hub 68 of a universal chain tie down assembly 10 according to FIG. 1. FIG. 68 shows the tension lock assembly 232 in an unlocked condition, while FIG. 69 shows it in a locked condition. The tension lock assembly 232 includes a clip 234 configured similarly to a pair of tongs, with a pair of arms 236 extending away from a pivot end 238. The clip 234 is shown as a unitary or monolithically formed component, comprising a piece of metal bent or otherwise formed into the illustrated configuration. Free ends of the arms 236 are biased toward each other, with the clip 234 being sufficiently deformable that the arms 236 may be temporarily moved away from each other before resiliently moving back toward each other upon removal of the separating force. The free ends may each include a handle 240 configured to allow for manipulation of the clip 234.

The clip 234 is mounted onto the hub 68, with the pivot end 238 positioned distally of the hub 68 and the free ends of the arms 236 positioned proximally of the hub 68. The clip 234 is proximally movable from the unlocked condition of FIG. 68 to the locked condition of FIG. 69. In the locked condition, flat inner surfaces of the arms 236 of the clip 234 overlay opposing flat surfaces of the tool attachment portion 62 of the tensioning rod 58, which prevents rotation of the tool attachment portion 62. If there are no flat surfaces of the tool attachment portion 62 aligned with the flat inner surfaces of the arms 236 when the tensioning rod 58 has been rotated to impart the proper amount of tension in the chain tie down assembly, the tensioning rod 58 may be rotated a small amount to bring the flat surfaces of the tool attachment portion 62 into alignment with the flat inner surfaces of the arms 236 of the clip 234.

The handles 240 of the clip 234 may be provided with proximal and distal inclined surfaces 242 and 244. The proximal inclined surface 244 may engage a distal end of the tool attachment portion 62 when the clip 234 is moved proximally, with contact between the tool attachment portion 62 and the proximal inclined surface 242 causing the arms 236 of the clip 234 to resiliently spread apart, which allows the handles 236 to clear the tool attachment portion 62 as the clip 234 is moved proximally from the unlocked condition to the locked condition. The distal inclined surface 244 bears against a proximal end of the tool attachment portion 62 when the handles 240 have fully cleared the tool attachment portion 62 and the arms 236 bend back toward each other, which may help to prevent dissociation of the clip 234 from the tool attachment portion 62.

FIGS. 68 and 69 show the clip 234 with the pivot end 238 positioned distally of the hub 68 and the arms 236 extending in a proximal direction. However, in another embodiment, the orientation of the clip 234 may be reversed, with the pivot end 238 positioned proximally of the arms 236. In such a configuration, the clip 234 may be mounted onto the cannon instead of the hub 68, with the clip 234 being moved distally to engage the arms 236 of the clip 234 to the tool attachment portion 62.

Figure 70:
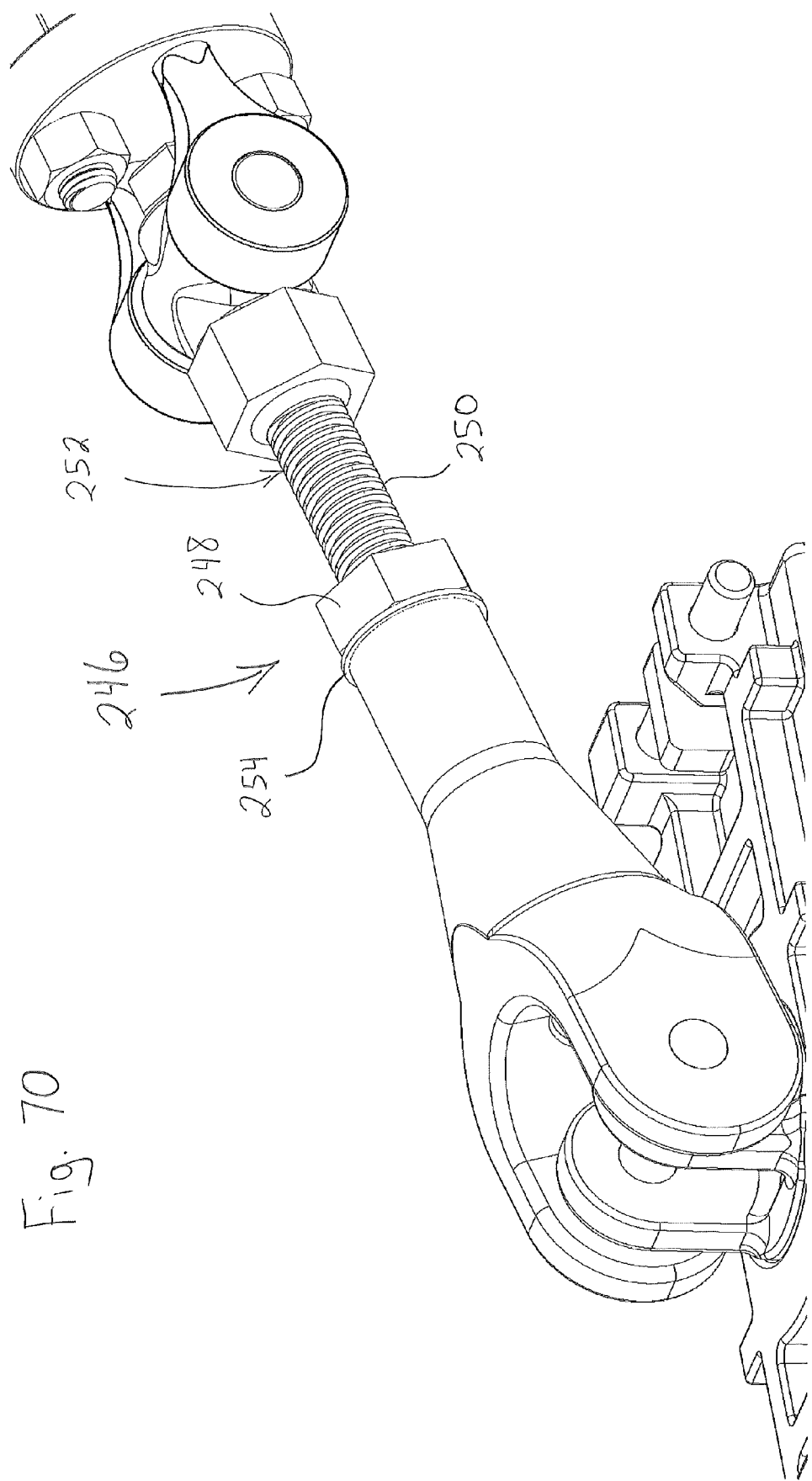
FIG. 70 is a perspective view of another alternative embodiment of a tension lock assembly suitable for incorporation into a chain tie down assembly having an elongated tensioning member.

FIG. 70 shows another embodiment of a tension lock assembly 246, in a locked condition. The tension lock assembly 246 includes a jam nut or locknut 248 associated with a threaded portion 250 of the tensioning member 252 (e.g., the threaded proximal portion of a tensioning rod of the type described herein) of a chain tie down assembly. The jam nut 248 may be rotated to advance it along the threaded portion 250 of the tensioning member 252 and into contact with a stationary component of the chain tie down assembly (e.g., the cannon of a universal chain tie down assembly according to the present disclosure). With the jam nut 248 so positioned, the tensioning member 252 cannot be rotated, thus preventing inadvertent rotation of the tensioning member 252 due to vibrations. In one embodiment, the tension lock assembly 246 may include a lock washer 254 configured to be positioned between the jam nut 248 and the stationary surface toward which the jam nut 248 is advanced to lock the tensioning member 252 in place, with the jam nut 248 pressing the lock washer 254 against the stationary surface, rather than the jam nut 248 itself bearing against the stationary surface.

Figure 71:
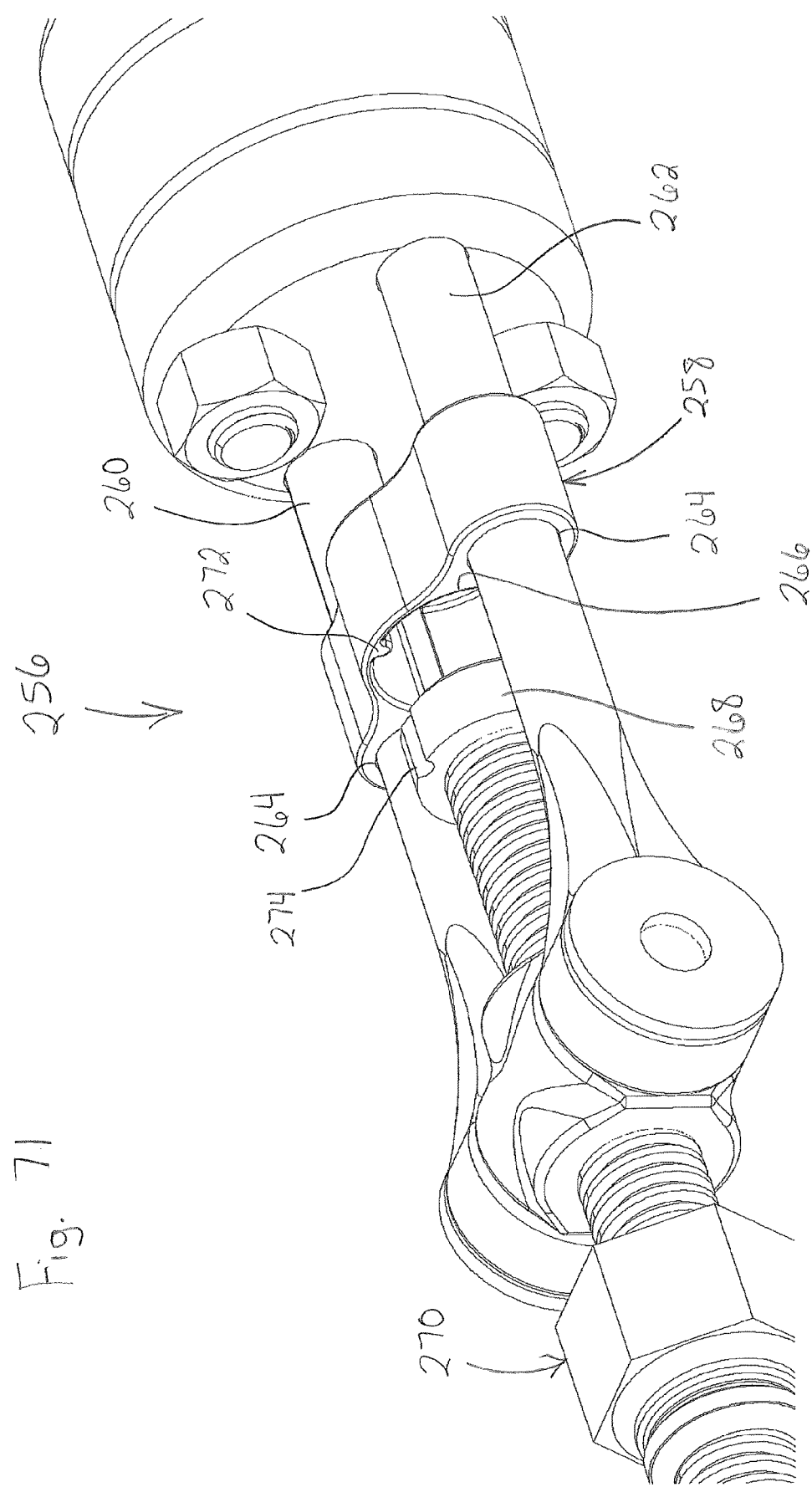
FIG. 71 is a perspective view of another alternative embodiment of a tension lock assembly suitable for incorporation into a chain tie down assembly having an elongated tensioning member, shown in an unlocked condition.
Figure 72:
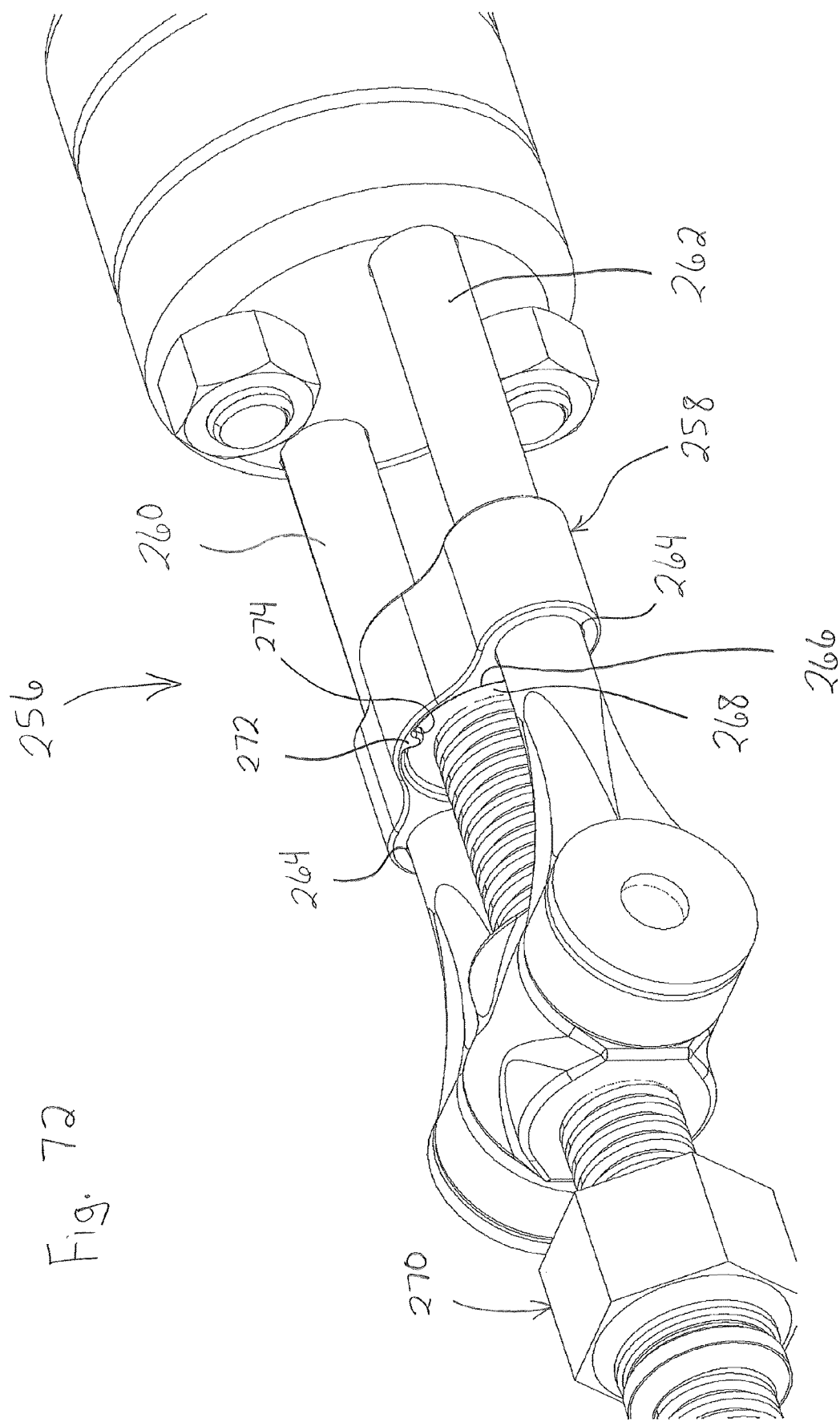
FIG. 72 is a perspective view of the tension lock assembly of FIG. 71, shown in a locked condition.

FIGS. 71 and 72 show another embodiment of a tension lock assembly 256 according to an aspect of the present disclosure. The tension lock assembly 256 may be understood as a variation of the tension lock assembly 216 of FIGS. 64-67, with a retainer 258 that is associated with both arms 260 and 262 of the chain tie down assembly instead of being associated with a single arm. To that end, the retainer 258 of FIGS. 71 and 72 includes a pair of lateral openings 264 (which extend entirely through the retainer 258) and a central cavity or recess 266 (which is open at a proximal surface of the retainer 218 and closed at a distal surface). Each lateral opening 264 is movably mounted to a different one of the arms 260, 262, with the central cavity 266 in alignment with the end stop 268 of a tensioning member 270.

The central cavity 266 includes at least one longitudinal notch 272 extending radially inwardly toward the central axis of the central cavity 266. The perimeter of the end stop 268 of the tensioning member 270 defines at least one longitudinal groove 274 that is complementarily configured with respect to the notch 272 of the central cavity 266 of the retainer 258. In the illustrated embodiment, the notch 272 is associated with the central cavity 266, while the groove 274 is associated with the end stop 268, but it is within the scope of the present disclosure for the notch 272 to be associated with the end stop 268 and the groove 274 to be associated with the central cavity 266. This is also true of the notches 224 and grooves 230 of the retainer 218 of FIGS. 64-67.

In use, the retainer 258 is positioned distally of the end stop 268 of the tensioning member 270. (i.e., in the unlocked condition of FIG. 71). The chain tie down assembly is used to secure a load, including rotating the tensioning member 270 to increase the tension in the chain tie down assembly. When an appropriate level of tension has been imparted to the chain tie down assembly, the retainer 258 is moved proximally along the associated arms 260 and 262 to slide the end stop 268 into the central cavity 266 of the retainer 258, with the notches 272 of the central opening 266 being received in the aligned grooves 274 (as in the locked condition of FIG. 72). If the grooves 274 are not aligned with the notches 272, the tensioning member 270 may be rotated a small amount to bring the grooves 274 into alignment with the notches 272. In such a condition, the presence of the notches 272 within the grooves 274 prevents rotation of the end stop 268, thus preventing the tensioning member 270 from rotating due to vibrations. Due to the central cavity 266 extending only partially through the retainer 258, a closed or solid surface of the retainer 258 positioned distally of the central cavity 266 will contact a distal end of the end stop 268 or tensioning member 270 to prevent the retainer 218 from moving proximally beyond the end stop 268.

Figure 73:
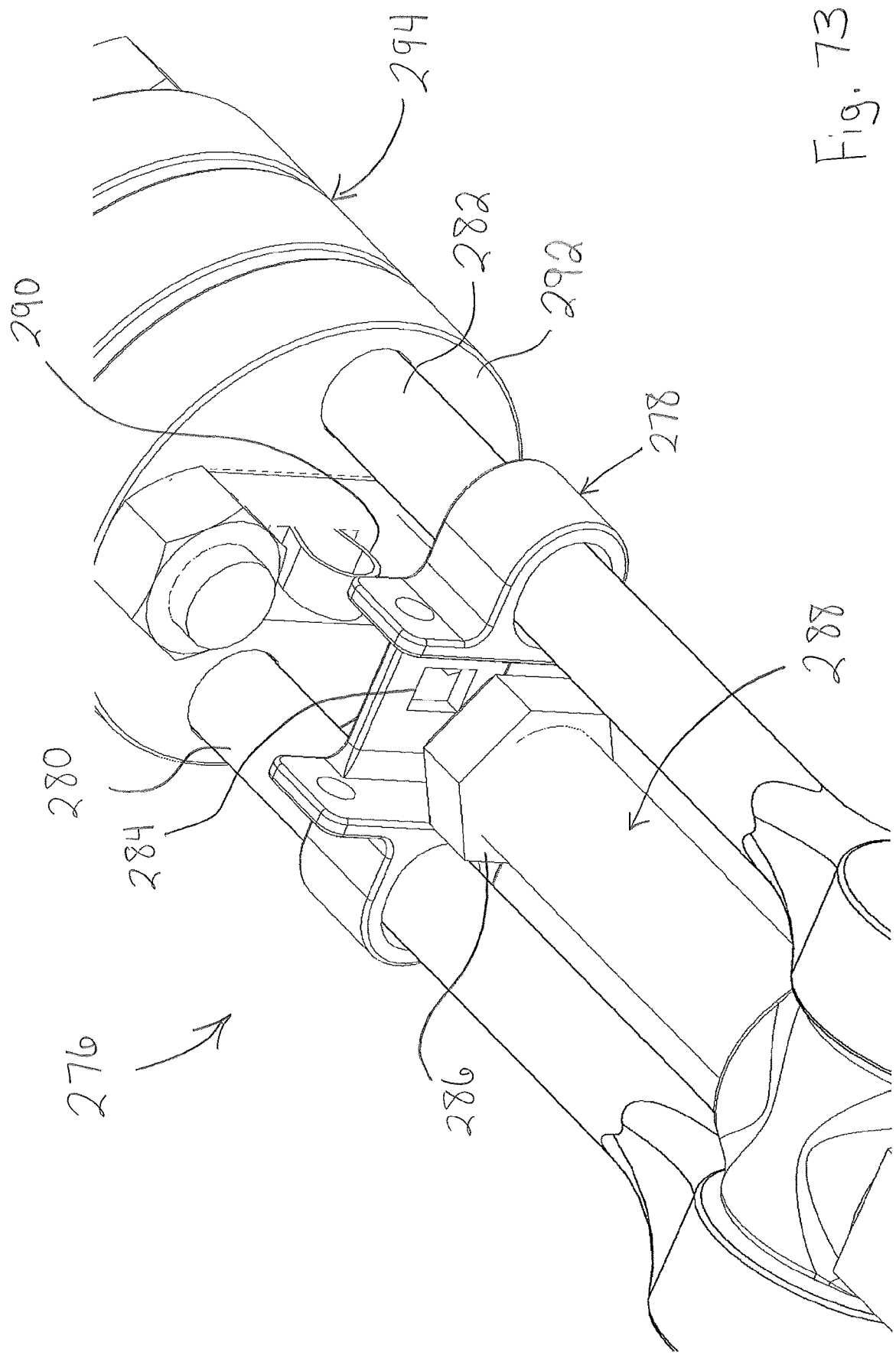
FIG. 73 is a perspective view of another alternative embodiment of a tension lock assembly suitable for incorporation into a chain tie down assembly having an elongated tensioning member, shown in an unlocked condition.
Figure 74:
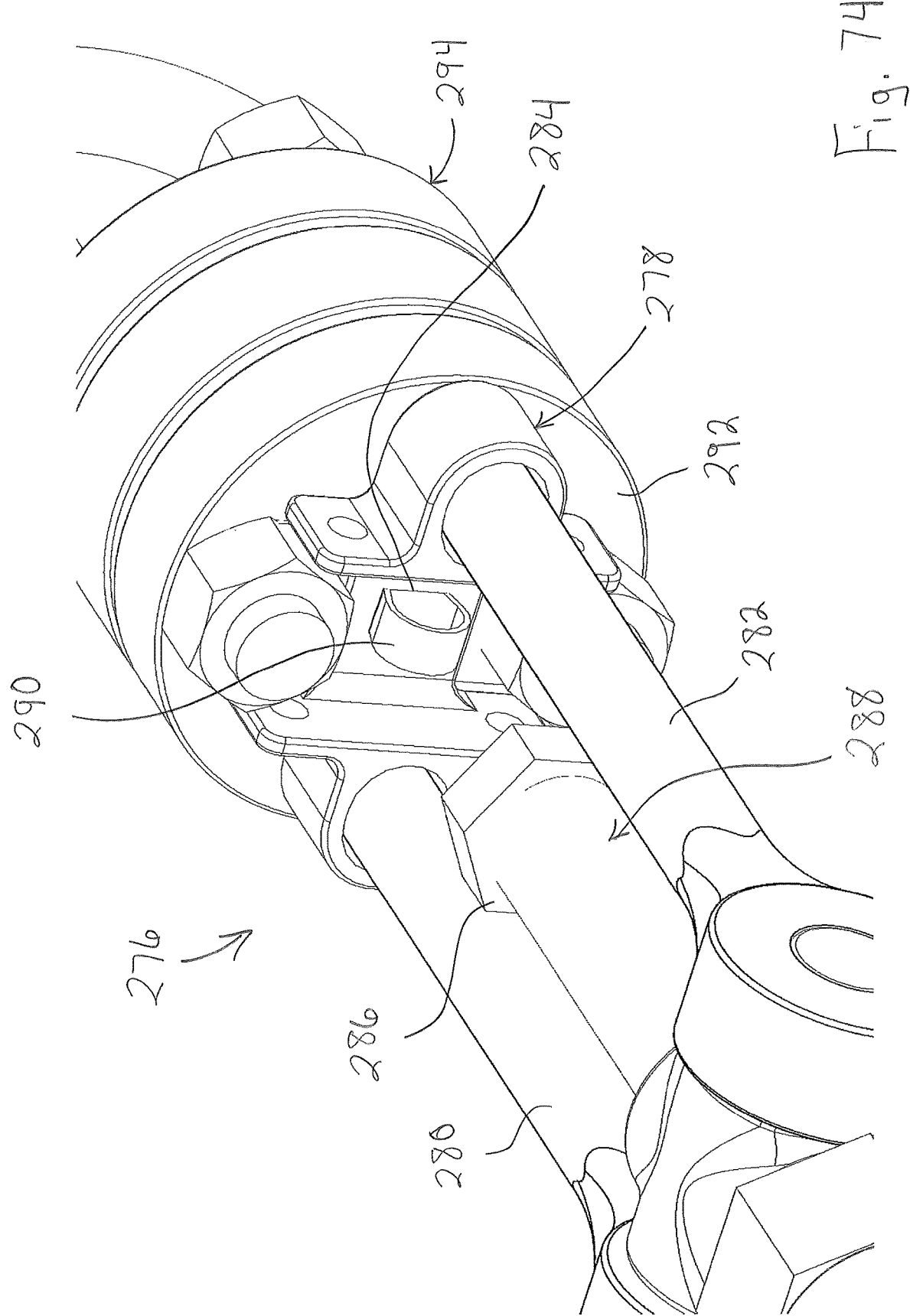
FIG. 74 is a perspective view of the tension lock assembly of FIG. 73, shown in a stored condition.
Figure 79:
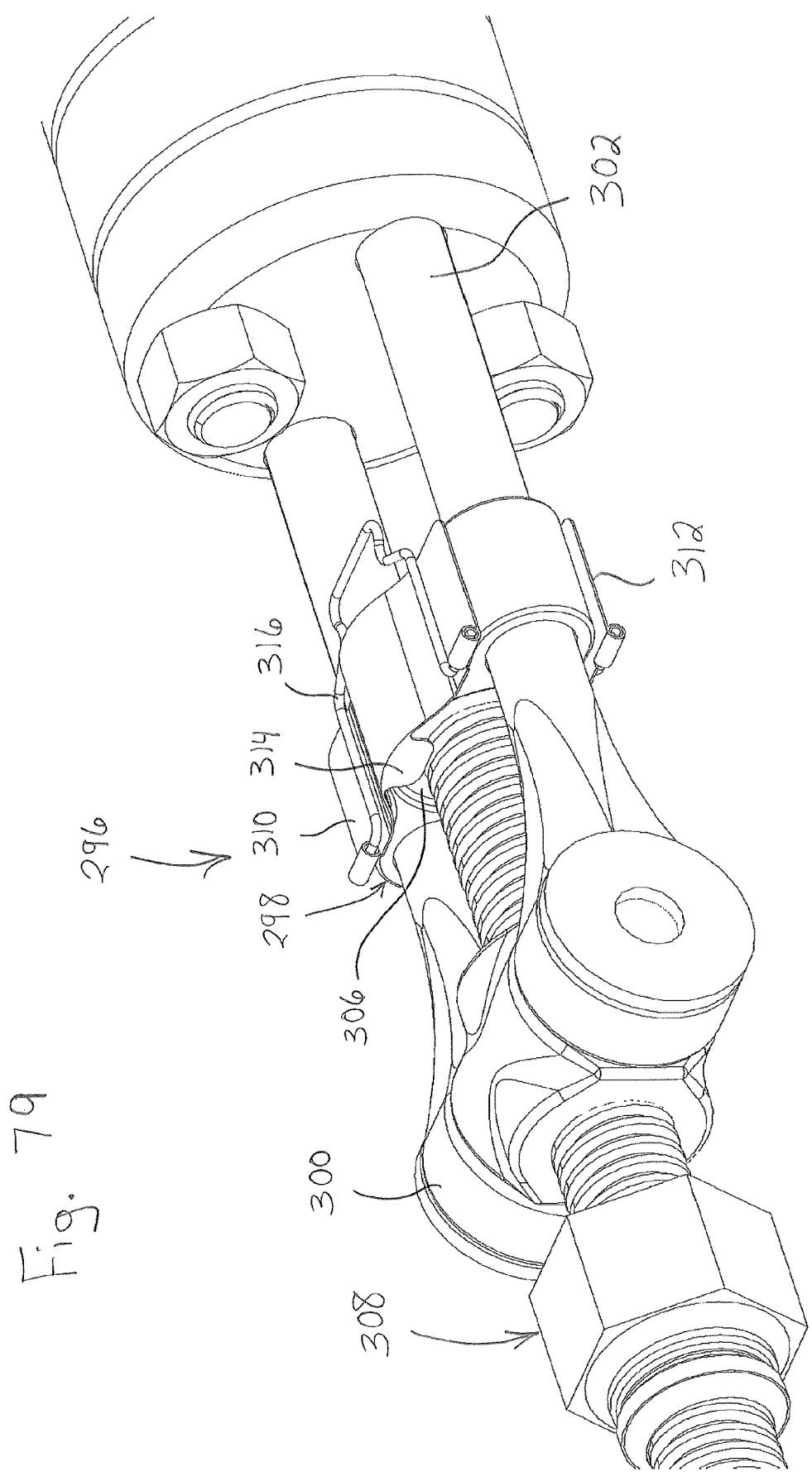
FIG. 79 is a perspective view of the tension lock assembly of FIG. 75, in a locked condition.

FIGS. 73 and 74 show another embodiment of a tension lock assembly 276 according to an aspect of the present disclosure. The tension lock assembly 276 may be understood as a variation of the tension lock assembly 256 of FIGS. 71 and 72, with a retainer 278 that is associated with both arms 280 and 282 of a chain tie down assembly. As in the embodiment of FIGS. 71 and 72, the retainer 278 also includes a central formation 284, which is configured to be selectively associated to the end stop 286 of a tensioning member 288 to alternately allow and prevent rotation of the tensioning member 288, though the formation 284 of FIGS. 73 and 74 is configured as an opening passing entirely through the retainer 278, rather than as a cavity.

The embodiment of FIGS. 73 and 74 further includes a proximally extending spring clip 290 that is associated with the proximal end cap 292 of the constant tensioning device 294 of the chain tie down assembly and aligned with the central opening 284 of the retainer 278. The spring clip 290 presents a convex surface to the retainer 278, with a maximum dimension that is greater than a corresponding dimension of the central opening 284 of the retainer 278. That same dimension at the proximal end of the spring clip 290, however, is less than the corresponding dimension of the central opening 284 of the retainer 278. In the illustrated embodiment, this dimension is the height of the spring clip 290, which has a maximum height that is greater than the height of the central opening 284 of the retainer 278, but with the height of the proximal end of the spring clip 290 being less than the height of the central opening 284. By such a configuration, distal movement of the retainer 278 toward the spring clip 290 allows the proximal end of the spring clip 290 to be received by the central opening 284 of the retainer 278. The spring clip 290 is deformable or flexible in the dimension of interest (i.e., it may be deformed to modify its maximum height in the illustrated embodiment), such that continued movement of the retainer 278 toward the spring clip 290 will cause the spring clip 290 to be deformed by contact with the central opening 284 of the retainer 278, which reduces the maximum height to a sufficient degree that the spring clip 290 is able to move more fully through the central opening 284. In the illustrated embodiment one or both of the upper and lower distal ends of the spring clip 290 may be movable with respect to the proximal end cap 292 (e.g., by being slidably received in a groove or slot) to facilitate this deformation.

The portion of the spring clip 290 distal the point of maximum dimension (i.e., height, in the illustrated embodiment) may be smaller in that dimension, such that continued distal movement of the retainer 278 with respect to the spring clip 290 will allow the point of maximum dimension to return toward its initial configuration (if not all the way to its initial configuration), as in the stored condition of FIG. 74. With the point of maximum dimension of the spring clip 290 positioned proximally of the retainer 278, the retainer 278 is not readily disengaged from the spring clip 290, which holds the retainer 278 in place during torqueing of the tensioning member 288 (whereas the retainer 278 may be free to slide proximally toward the tensioning member 288 if otherwise unrestrained). After the tensioning member 288 has been sufficiently torqued, the retainer 278 may be moved proximally with respect to the spring clip 290 (to deform the spring clip 290 and free the retainer 278 of the spring clip 290) to the unlocked condition of FIG. 73 and then further proximally into locking relationship with the end stop 286 of the tensioning member 288 (as described above with respect to the embodiment of FIGS. 71 and 72). In a preferred embodiment, the end stop 286 may include a spring clip that is a mirror image of (or at least similarly configured to) the spring clip 290 associated with the proximal end cap 292 of the constant tensioning device 294, with the retainer 278 being moved proximally toward the spring clip of the end stop 286 to become temporarily secured thereto in a locked condition, thus reducing the likelihood of the retainer 278 becoming disengaged from the tensioning member 288.

FIGS. 75-79 show another embodiment of a tension lock assembly 296 according to an aspect of the present disclosure. The tension lock assembly 296 may be understood as another variation of the tension lock assembly 256 of FIGS. 71 and 72, with a retainer 298 (FIGS. 76 and 77) that is associated with both arms 300 and 302 of the chain tie down assembly. As described above with respect to the embodiment of FIGS. 71 and 72, the retainer 298 also includes a central cavity 304, which is configured to be selectively associated to the end stop 306 of a tensioning member 308 to alternately allow and prevent rotation of the tensioning member 308.

The retainer 298 of FIGS. 75-79 further includes at least one spring clip 310 pivotally connected to a distal end of the retainer 298 to allow movement of the spring clip 310 between the closed condition of FIG. 70 and the open condition of FIG. 77. FIGS. 75-79 show a retainer 298 having upper and lower spring clips 310 and 312 (which may be identically configured), but it should be understood that the retainer 298 may have only a single spring clip.

Similar to the spring clip 290 associated with the proximal end cap 292 of FIGS. 73 and 74, the spring clip 310, 312 prevents the retainer 298 from sliding proximally toward the end stop 306 of the tensioning member 308 and unintentionally engaging the end stop 306. This is achieved by providing the proximal end of the spring clip 310, 312 with a tab 314 that extends radially inwardly toward the central axis of the central cavity 304 and overlays a portion of the central cavity 304. By such a configuration, proximal movement of the retainer 298 with respect to the tensioning member 308 with the spring clip 310, 312 in its closed condition of FIG. 76 will cause the tab 314 to contact the distal end of the end stop 306 of the tensioning member 308, thus preventing the retainer 298 from unintentionally sliding into engagement with the end stop 306.

When it becomes desirable for the retainer 298 to move to its locked condition (FIG. 79), the spring clip 310, 312 is moved from its closed condition to its open condition (FIGS. 77 and 78), which allows for proximal movement of the retainer 298 without the tab 314 engaging the end stop 306 of the tensioning member 308. The spring clip 310, 312 may include a handle 316 that may be manipulated to cause the spring clip 310, 312 to pivot about its distal end to move from the closed condition to the open condition. In the illustrated embodiment, in which the retainer 298 has upper and lower spring clips 310 and 312, the handles 316 of the two spring clips 310 and 312 may be pinched toward each other to simultaneously pivot both spring clips 310 and 312 to their open condition. When the retainer 298 has been properly positioned on the end stop 306, the spring clips 310 and 312 may be returned to their closed condition, with the tab 314 positioned distally of the end stop 306 (as in FIG. 79), to lock the end stop 306 and prevent rotation of the tensioning member 308 (as described above with respect to the embodiment of FIGS. 71 and 72).

Figure 80:
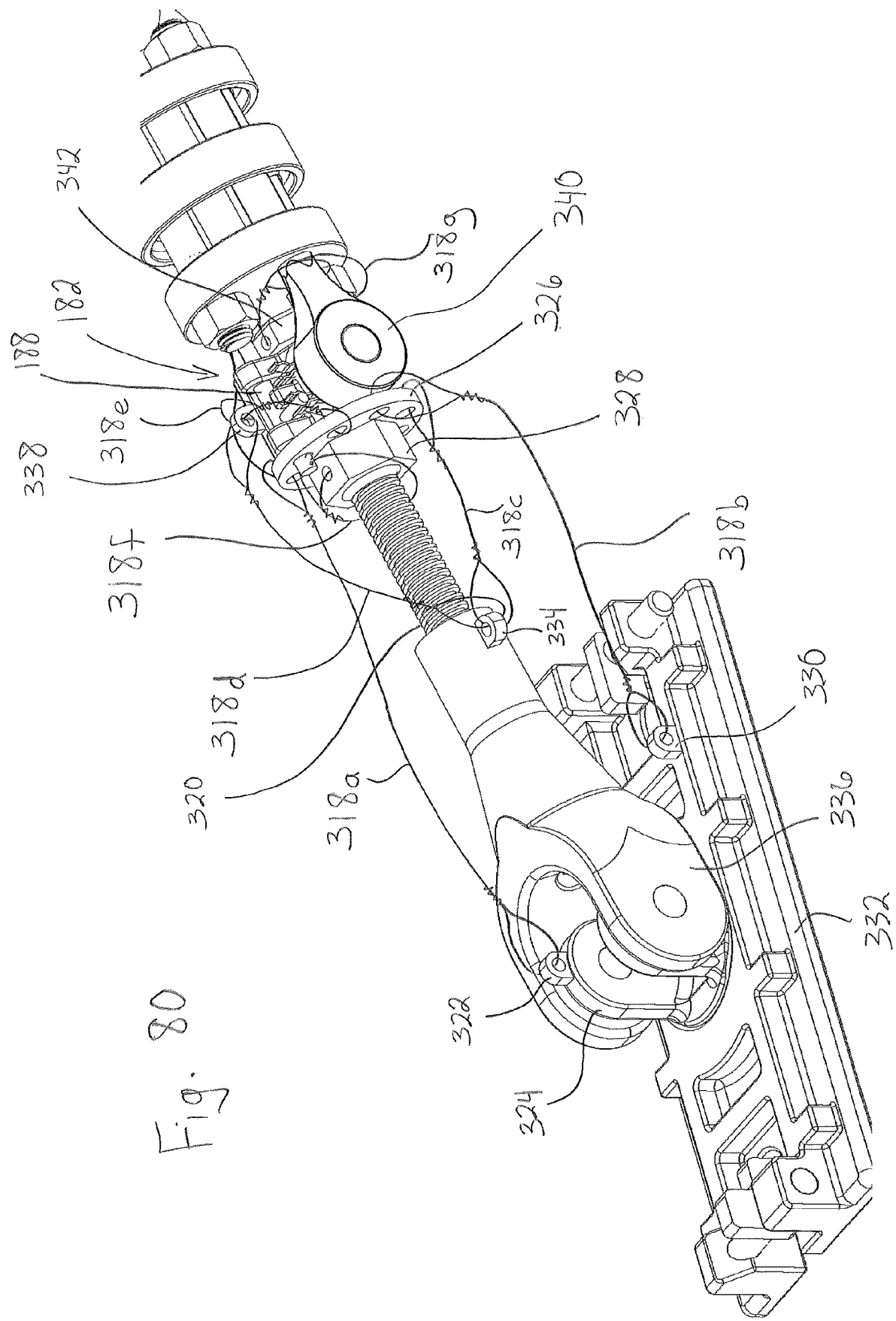
FIG. 80 is a perspective view of another alternative embodiment of a tension lock assembly suitable for incorporation into a chain tie down assembly having an elongated tensioning member.

FIG. 80 illustrates another principle that may be employed as a tension lock feature. FIG. 80 shows a seven tethers 318a-318g that are each associated with a portion of an elongated, rotatable tensioning member 320 (or a component of a chain tie down assembly that is rotatable with the tensioning member 320) and a portion of another component that is stationary or otherwise non-rotatable with the tensioning member 320. By such a configuration, any tendency of the tensioning member 320 to rotate due to vibrations will be prevented by an associated tether being secured to a portion of the chain tie down assembly that does not have the tendency to rotate with the tensioning member 320 due to vibrations. While FIG. 80 shows a chain tie down assembly that is similar to the type shown in FIGS. 57-59 (including the tension lock assembly 182), it should be understood that the principle illustrated in FIG. 80 may be applied to differently configured chain tie down assemblies. Furthermore, while FIG. 80 shows seven different tethers 318a-318g, it should be understood that a single tether may be sufficient to prevent vibration-induced rotation of a tensioning member 320, while it is also within the scope of the present disclosure for any two or more tethers 318a-318g to be used in combination with each other. The tethers 318a-318g may also be used in combination with some other tension lock assembly (e.g., the tension lock assembly 182 shown in FIG. 80) to provide an auxiliary or back-up tension lock feature. Additionally, the tethers 318a-318g may be variously configured without departing from the scope of the present disclosure, such as comprising twist ties or being defined by metal wire or the like.

Considering now the individual tethers, tether 318a is secured to a support 322 of the turret 324 (with a loop of the tether 318a passing through a hole in the support 322) and to the disc 326 associated with the tool attachment portion 328 of the tensioning member 320 (with a second loop of the tether 318a passing through an opening of the disc 326). The disc 326 (if the tension lock assembly 182 is not in the locked condition of FIG. 59) is free to rotate with the tensioning member 320, while the turret 324 will not rotate with the tensioning member 320. Thus, so associating the rotatable disc 326 with the turret 324 via the tether 318a effectively prevents the disc 326 and tensioning member 320 from rotating due to vibrations.

Similar to tether 318a, tether 318b has a loop passing through an opening of the disc 326 associated with the tool attachment portion 328 of the tensioning member 320. The other loop of the tether 318b passes through a hole in a support 330 of the anchor base 332. The disc 326 (if the tension lock assembly 182 is not in the locked condition of FIG. 59) is free to rotate with the tensioning member 320, while the anchor base 332 will not rotate with the tensioning member 320. Thus, so associating the rotatable disc 326 with the anchor base 332 via the tether 318b effectively prevents the disc 326 and tensioning member 320 from rotating due to vibrations.

Tether 318c is a third tether having a loop passing through an opening of the disc 326 associated with the tool attachment portion 328 of the tensioning member 320. The other loop of the tether 318c passes through a hole in a support 334 of the cannon 336. The disc 326 (if the tension lock assembly 182 is not in the locked condition of FIG. 59) is free to rotate with the tensioning member 320, while the cannon 336 will not rotate with the tensioning member 320. Thus, so associating the rotatable disc 326 with the cannon 336 via the tether 318c effectively prevents the disc 326 and tensioning member 320 from rotating due to vibrations.

Similar to tether 318c, tether 318d has a loop passing through a hole in the support 334 of the cannon 336. Rather than being secured to the disc 326 of the tension lock assembly 182, the tether 318d instead has a loop passing through a hole in a support 338 of a portion of the tension lock assembly 182 associated with the hub (not visible). Tether 318e also has a loop passing through the hole of the same support 338, but instead has a second loop passing through an opening of the disc 326 associated with the tool attachment portion 328 of the tensioning member 320.

Tether 318f is secured to yet another portion of the tension lock assembly 182, with a loop passing through a hole passing through the proximal end of the rod 188 of the tension lock assembly 182. The hole is only accessible when the rod 188 is in its locked condition, so the tether 318f (which has a second loop passing through a hole defined in the tool attachment portion 328 of the tensioning member 320) may be considered as a mechanism for preventing unintentional movement of the tension lock assembly 182 from its locked condition to its unlocked condition.

Finally, tether 318g has a loop around one of the arms 340 and a second loop passing through a hole defined in the end stop 342 of the tensioning member 320. It should be understood that the illustrated tethers 318a-318g of FIG. 80 are merely exemplary and that differently configured tethers (such as an illustrated tether having a loop secured to a different support or structure) may also be employed without departing from the scope of the present disclosure.

Figure 81:
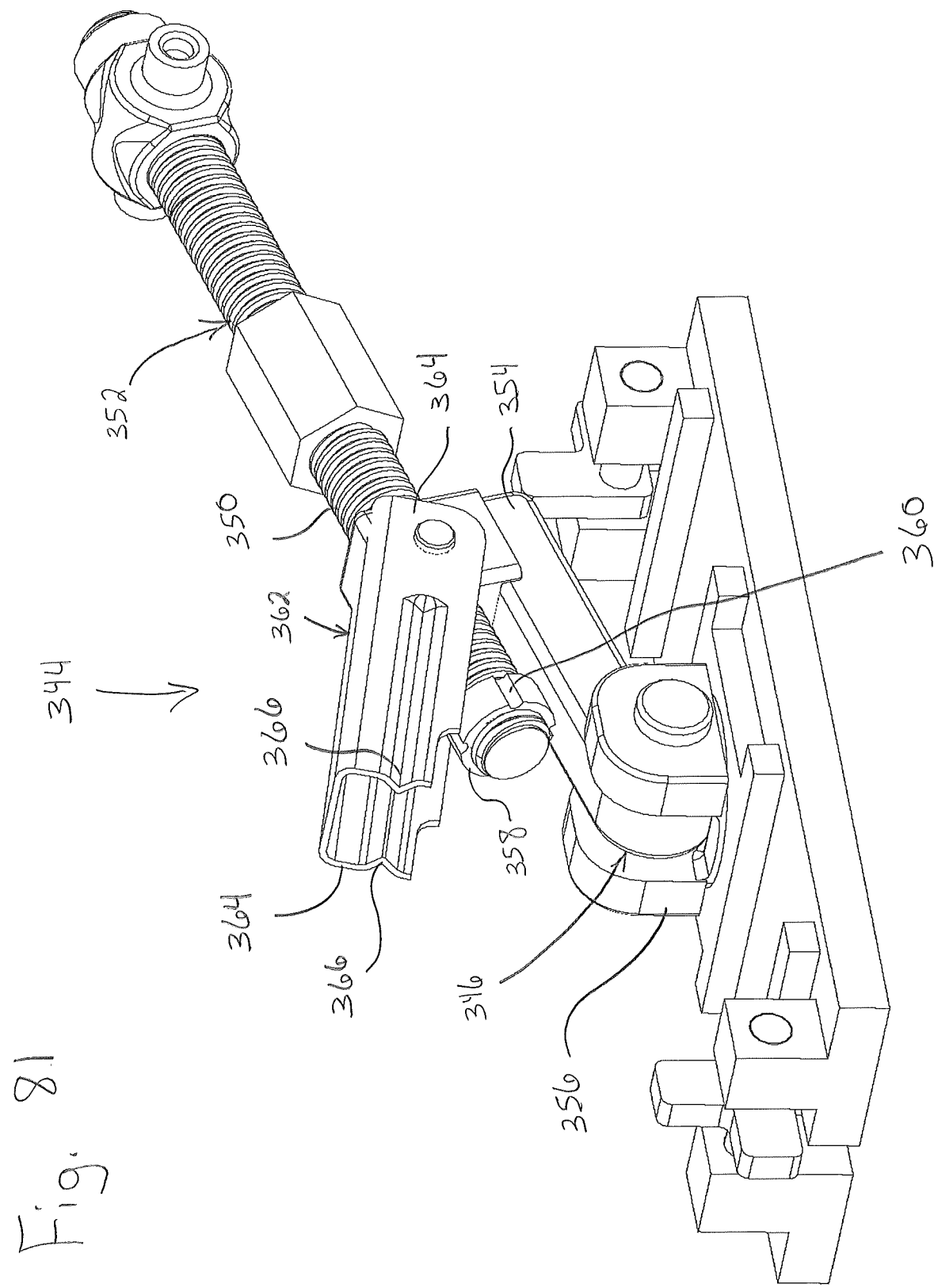
FIG. 81 is a perspective view of another alternative embodiment of a tension lock assembly suitable for incorporation into a chain tie down assembly having an elongated tensioning member, shown in an unlocked condition.
Figure 82:
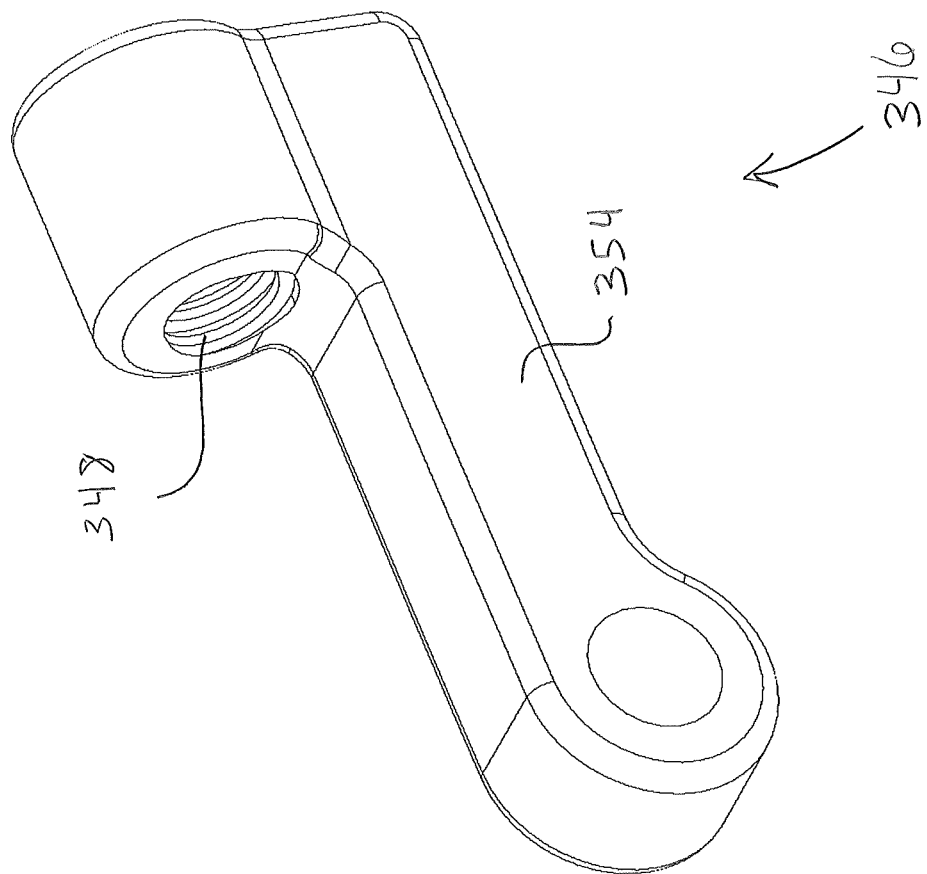
FIG. 82 is a perspective view of a cannon of the tension lock assembly of FIG. 81.
Figure 83:
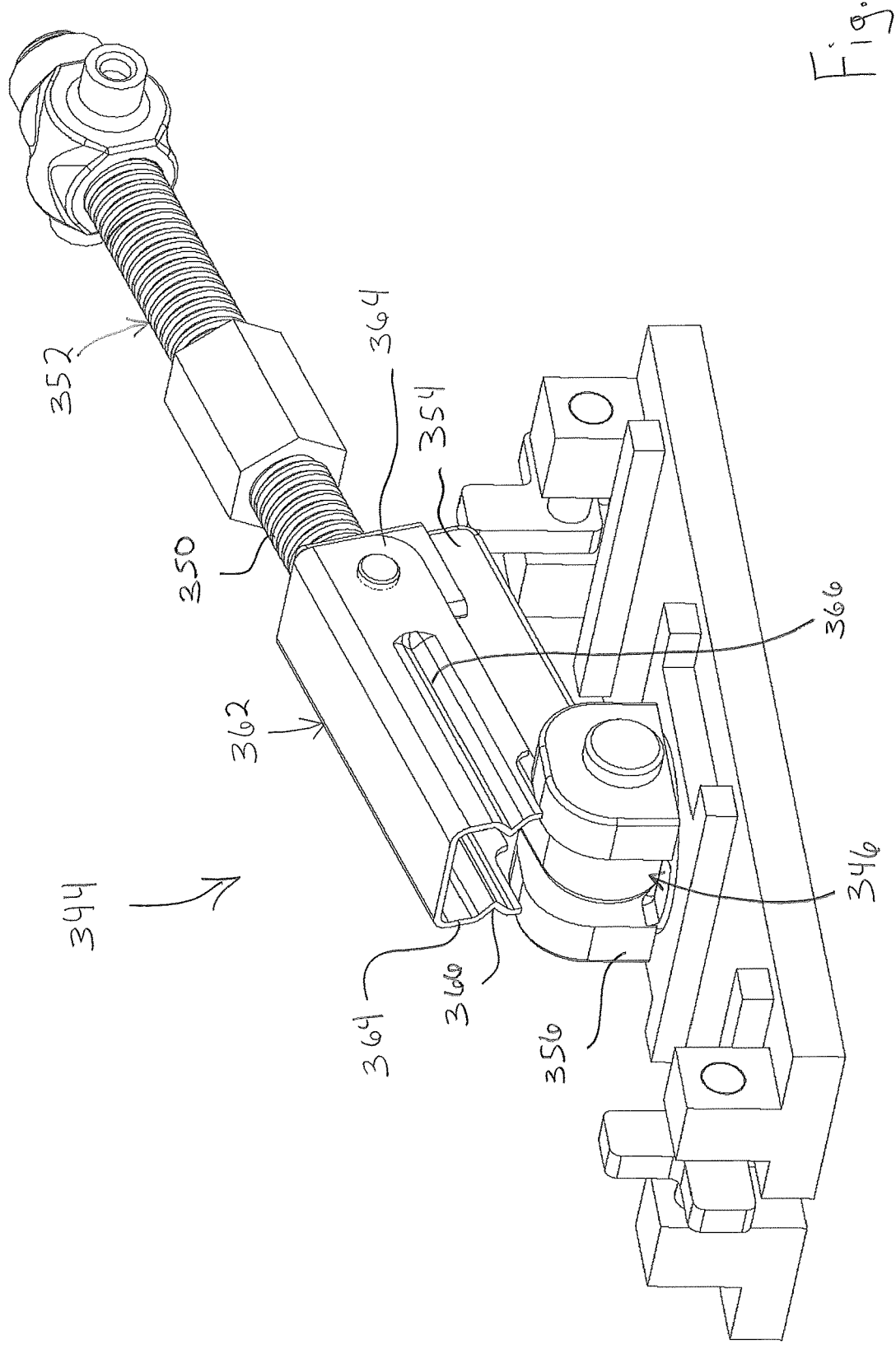
FIG. 83 is a perspective view of the tension lock assembly of FIG. 81, shown in a locked condition.

FIGS. 81-83 show another embodiment of a tension lock assembly 344. The tension lock assembly 344 of FIGS. 81-83 has a modified cannon 346 (FIG. 82). As in the other embodiments described herein, the cannon 346 includes an internally threaded bore 348 receiving an externally threaded proximal portion 350 of a tensioning rod or member 352. The cannon 346 has a relatively short bore 348, which is oriented parallel to (rather than coaxial with) a body 354 of the cannon 346, which is pivotally connected to an associated turret 356. Rather than the proximal end of the tensioning rod or member 352 having an associated retaining pin, there is instead an end stop 358 associated with the proximal end or proximal portion of the tensioning rod or member 352. The end stop 358 may be configured similarly to the end stop 226 of FIG. 64, with a plurality of longitudinal grooves 360 spaced along its outer perimeter.

The tension lock assembly 344 further includes a retainer 362 having a distal end pivotally connected to the upper portion of the cannon 346 (i.e., the portion in which the bore 348 is defined). The retainer 362 is configured as a downwardly facing channel having a pair of legs 364 each having a longitudinal notch 366 extending toward the opposing leg 364. In an unlocked condition (FIG. 81), the retainer 362 is pivotally upwardly out of engagement with the end stop 358, which allows the tensioning member or rod 352 to be rotated to adjust the tension in the chain tie down assembly. When an appropriate level of tension has been applied to the chain tie down assembly, the retainer 362 is pivoted downwardly to position the notches 366 within aligned grooves 360 of the end stop 358. If there are no grooves 360 aligned with the notches 366, the tensioning member or rod 352 may be rotated a small amount to properly orient the grooves 360 of the end stop 358. The legs 364 are configured to deform outwardly when the retainer 362 is pivoted downwardly into contact with the end stop 358. When the notches 366 are in the vicinity of the grooves 360, the legs 364 resiliently deform back toward each other to seat the notches 366 within the grooves 360. With the tension lock assembly 344 in the locked condition of FIG. 83, the retainer 362 prevents rotation of the end stop 358, thus preventing vibration-induced rotation of the tensioning member or rod 352.

Figure 84:
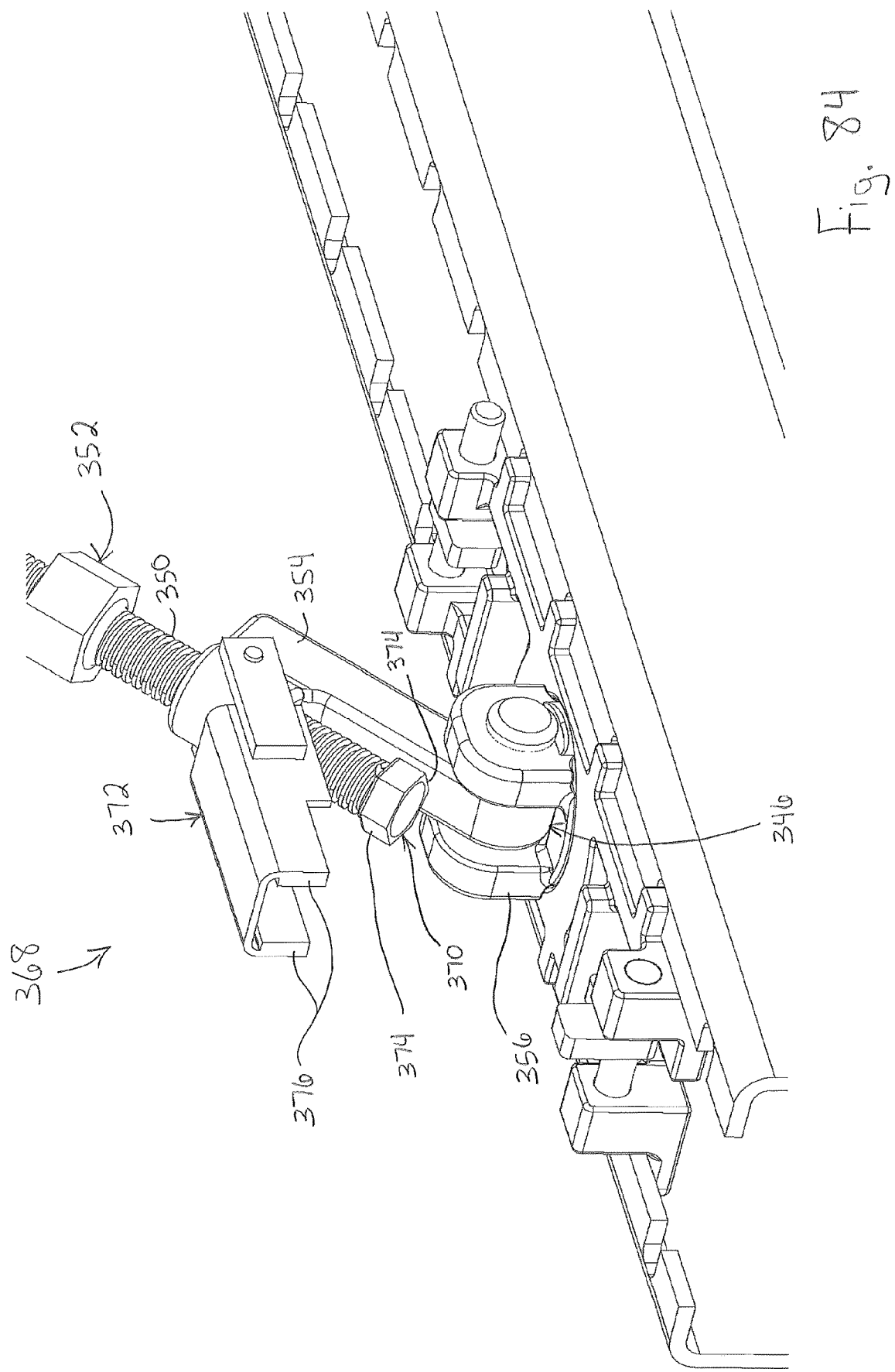
FIG. 84 is a perspective view of another alternative embodiment of a tension lock assembly suitable for incorporation into a chain tie down assembly having an elongated tensioning member, shown in an unlocked condition.
Figure 85:
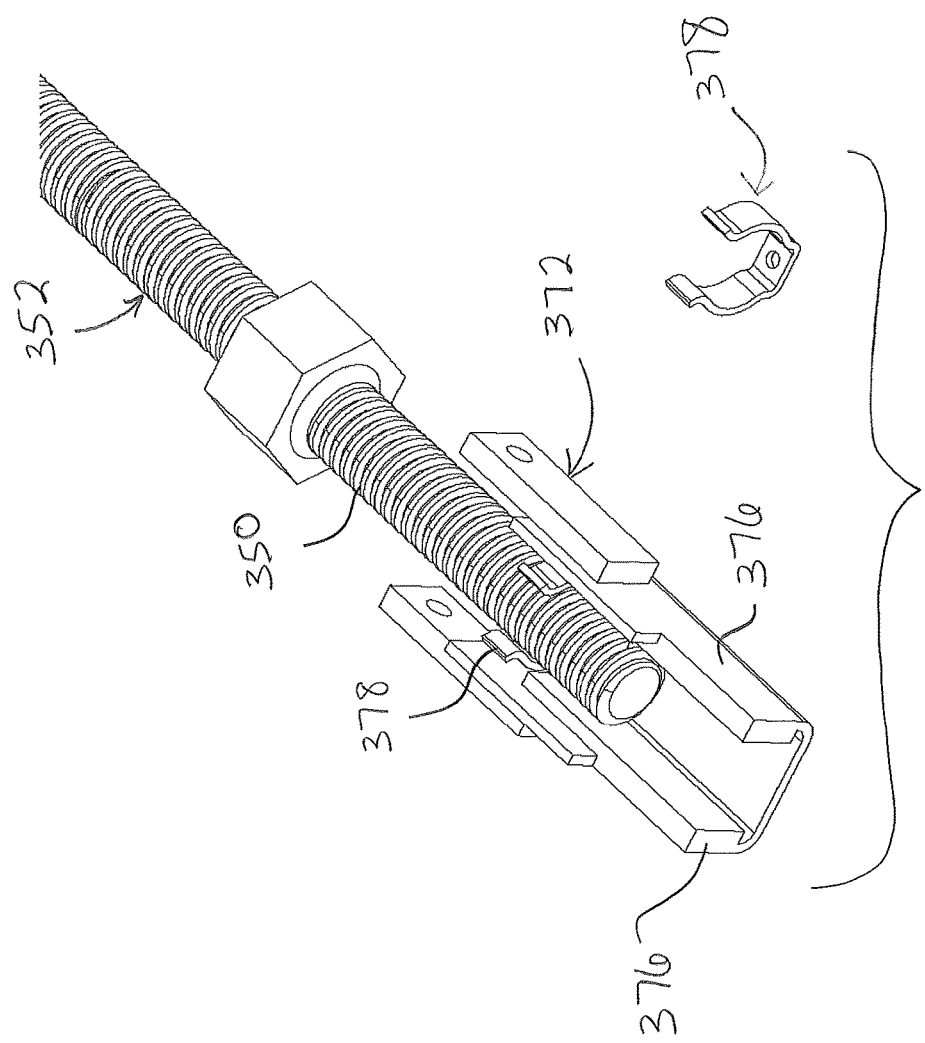
FIG. 85 is an exploded view of components of the tension lock assembly of FIG. 84.
Figure 86:
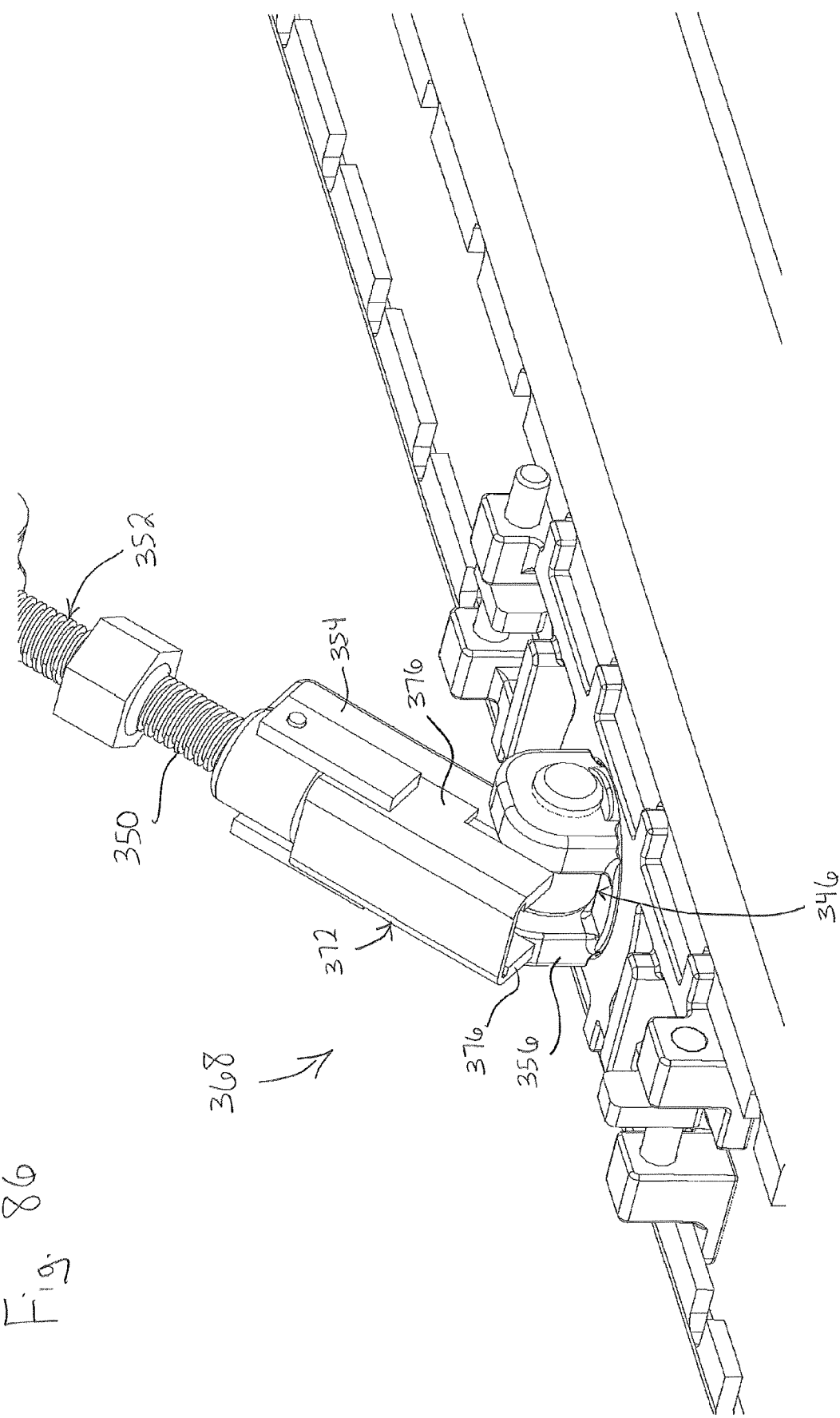
FIG. 86 is a perspective view of the tension lock assembly of FIG. 84, shown in a locked condition.

FIGS. 84-86 show a variation of the tension lock assembly 344 of FIGS. 81-83. The tension lock assembly 368 of FIGS. 84-86 differs from the tension lock assembly 344 of FIGS. 81-83 to the extent that it has a differently configured end stop 370 and retainer 372. In the embodiment of FIGS. 84-86, the end stop 370 omits grooves, but instead has at least one of pair of opposing, outwardly facing flat surfaces 374. The illustrated end stop 370 includes six such surfaces 374 (i.e., three pairs of opposing surfaces 374), which may be advantageous to provide more surfaces that can possibly be engaged by the associated retainer 372, as will be described in greater detail herein.

As for the retainer 372 (which is shown in greater detail in FIG. 85), it differs from the retainer 362 of FIGS. 81-83 by having flat, substantially parallel legs 376. The legs 376 are not intended to deform during movement of the retainer 372 between its unlocked (FIG. 84) and locked (FIG. 86) conditions, so they be more solidly constructed than the legs 364 of the retainer 362 of FIGS. 81-83.

In the unlocked condition (FIG. 84), the retainer 372 is pivotally upwardly out of engagement with the end stop 370, which allows the tensioning member or rod 352 to be rotated to adjust the tension in the chain tie down assembly. When an appropriate level of tension has been applied to the chain tie down assembly, the retainer 372 is pivoted downwardly to overlay opposing surfaces 374 of the end stop 370 with the legs 376 of the retainer 372 (FIG. 86). If there are no surfaces 374 of the end stop 370 that are aligned with the flat surfaces of the legs 376 of the retainer 372, the tensioning member or rod 352 may be rotated a small amount to more properly orient the end stop 374. With the tension lock assembly 368 in the locked condition of FIG. 86, the retainer 372 prevents rotation of the end stop 370, thus preventing vibration-induced rotation of the tensioning member or rod 352. As the legs 376 do not actively engage the end stop 370 (as in the embodiment of FIGS. 81-83), the retainer 372 may be provided with a spring clip 378 (FIG. 85), which resiliently deforms to engage the tensioning member or rod 352 in the locked condition and prevent unintended dissociation of the retainer 372 from the tensioning member or rod 352.

In addition to being desirable to avoid vibration-induced rotation of the tensioning member or rod, it is similarly desirable to avoid vibration-induced disengagement of the anchor locks 22 of an anchor base 12, as described above. In particular, it is possible for an anchor lock 22 to experience sufficient vibration that it moves from its locked condition (FIG. 7) to its aligned condition (FIG. 6) and then to its unlocked or misaligned condition (FIG. 5). An associated anti-vibration assembly may be variously configured (as in FIGS. 87-104) and configured to be moved between an unlocked condition allowing longitudinal movement and rotation of the rod 30 of the anchor lock 22 and a locked condition preventing longitudinal movement and/or rotation of the rod 30 to prevent the stop 32 associated with the rod 30 from being moved out of alignment with the associated slot 34 defined in the body 14 of the anchor base 12. The anti-vibration assembly may then be disengaged to allow for intentional movement of the anchor lock 22 to its unlocked condition.

Figure 87:
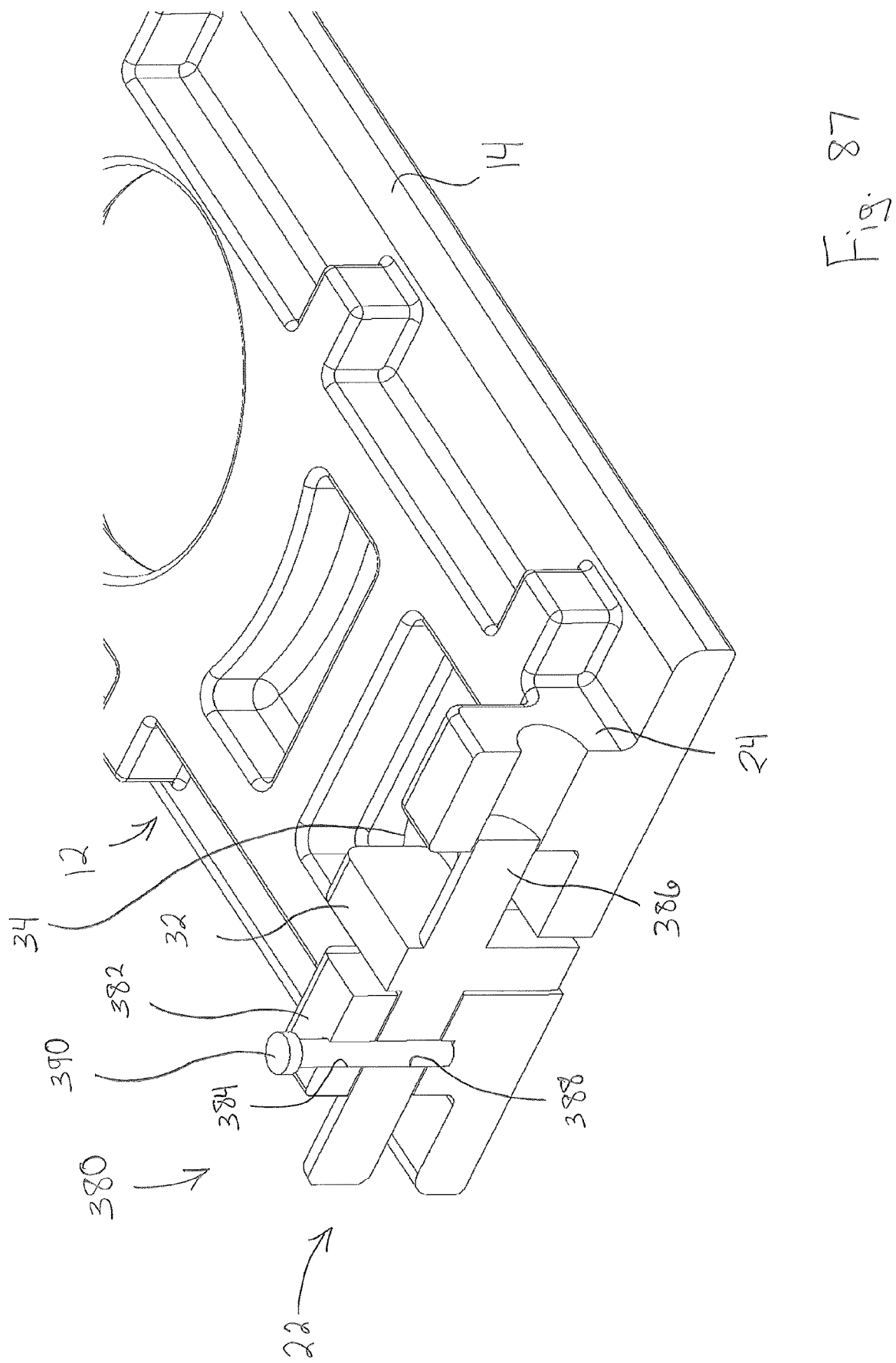
FIG. 87 is a perspective view of an anti-vibration assembly suitable for incorporation into an anchor base of a chain tie down assembly.

A first embodiment of such an anti-vibration assembly 380 is shown in FIG. 87. In the embodiment of FIG. 87, one of the supports 382 (preferably, the one adjacent to the slot 34) is provided with a vertical bore 384. A modified rod 386 includes a bore 388 configured to align with the bore 384 of the support 382 when the anchor lock 22 is in the illustrated locked condition. With the bores 384 and 388 so aligned, a pin 390 is inserted into the aligned bores 384 and 388, which prevents longitudinal movement and rotation of the rod 386, thus retaining the anchor lock 22 in its locked condition. The pin 390 may be removable or may be spring-loaded to the position of FIG. 87. If the pin 390 is spring-loaded, it must first be moved upwardly to allow for longitudinal movement of the rod 386 (from its unlocked condition to its aligned condition) and subsequent rotational movement of the rod 386 (from its aligned condition to its locked condition), with the pin 390 springing back downwardly to the position of FIG. 87 when the rod 386 has been properly positioned. While FIG. 87 shows a bore 388 extending entirely through the rod 386, it is also within the scope of the present disclosure for the bore 388 to extend only partially through the rod 386, in which case a bottom end of the pin 390 will be positioned within the bore 388 of the rod 386 in the locked condition of FIG. 87, rather than extending entirely through the bore 388, to be received by a lower portion of the bore 384 of the support 382.

Figure 88:
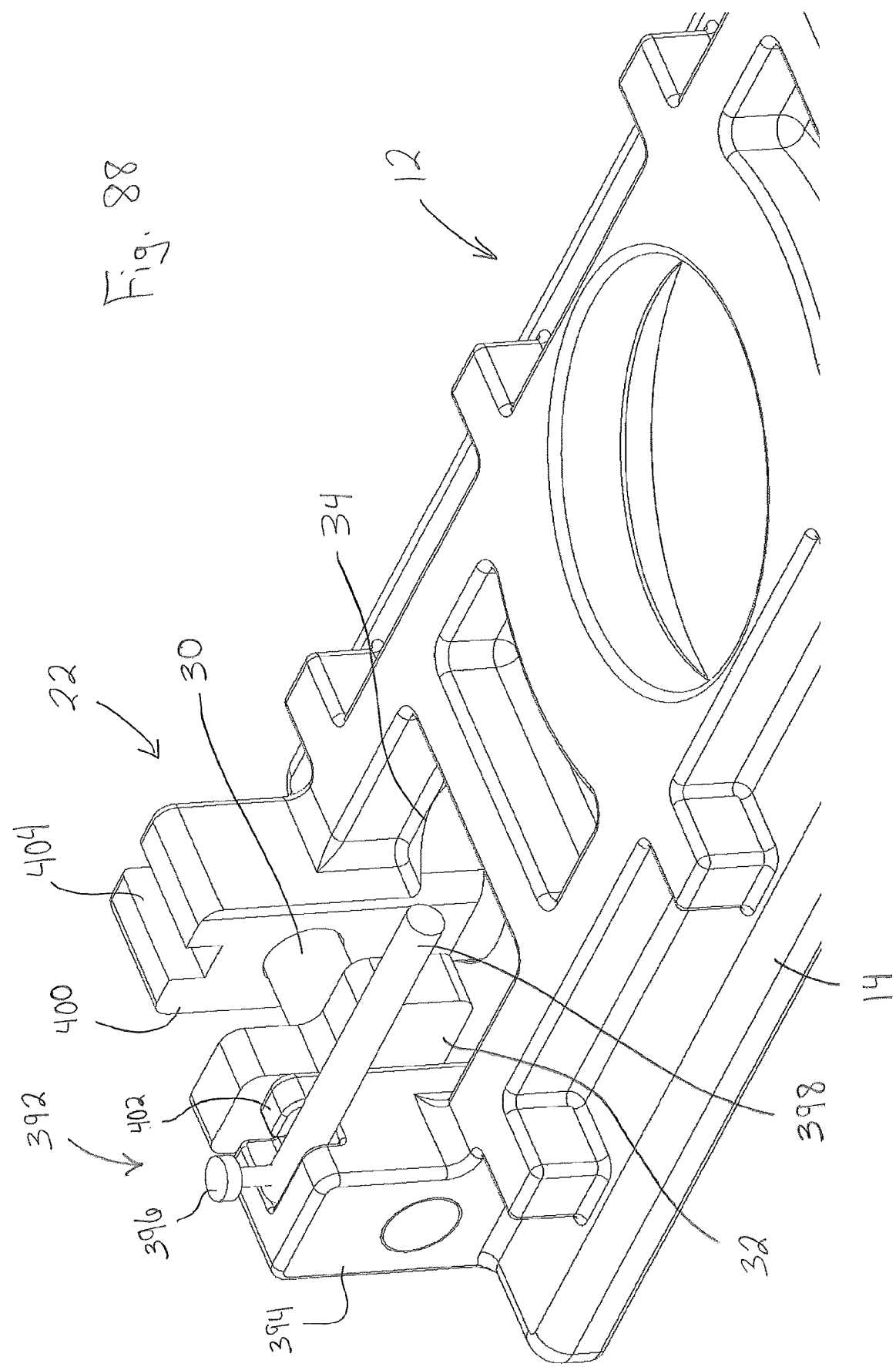
FIG. 88 is a perspective view of an alternative embodiment of an anti-vibration assembly suitable for incorporation into an anchor base of a chain tie down assembly, shown in an unlocked condition.
Figure 89:
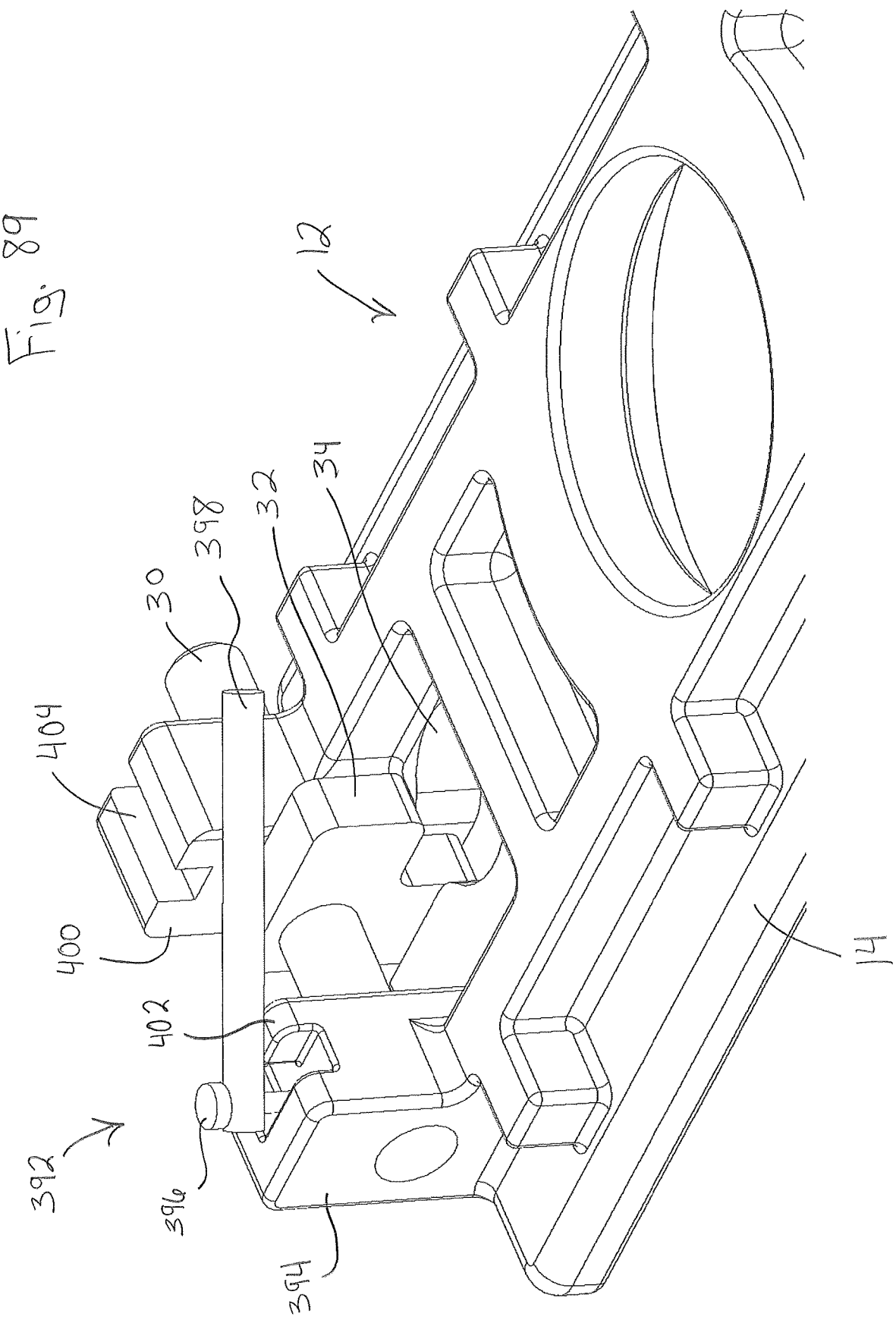
FIG. 89 is a perspective view of the anti-vibration assembly of FIG. 88, shown in an intermediate condition.
Figure 90:
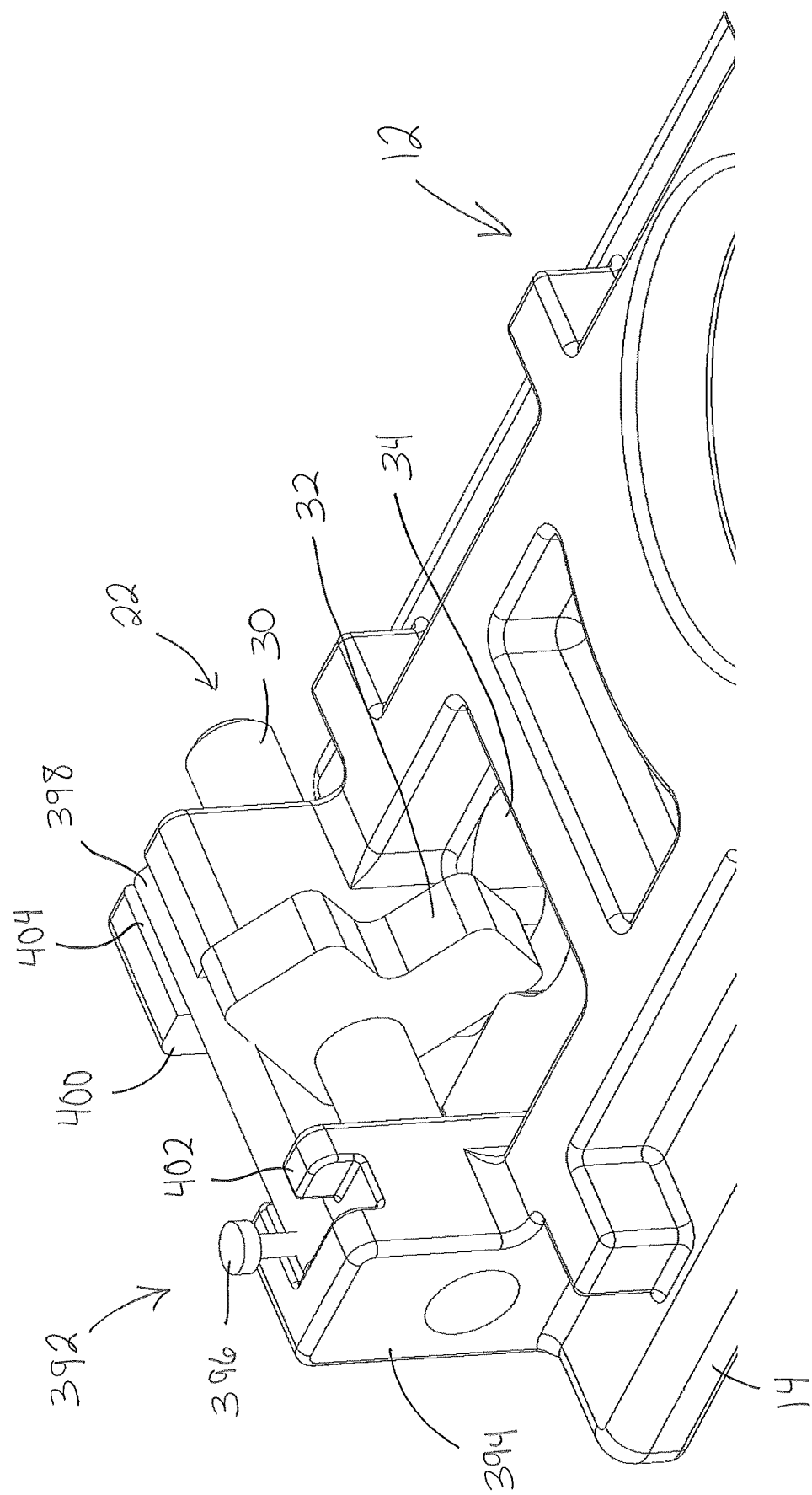
FIG. 90 is a perspective view of the anti-vibration assembly of FIG. 88, shown in a locked condition.

FIGS. 88-90 show another embodiment of an anti-vibration assembly 392 for an anchor lock 22. One of the supports 394 is modified to accommodate a vertical pivot pin 396, with a bar 398 rotatably associated with the pivot pin 396. In an unlocked condition (FIG. 88), the bar 398 is pivoted away from the other support 400 of the anchor lock 22, which may include being held in position by a barrier 402 defined by the support 394. After the anchor lock 22 has been moved to its locked condition, the bar 398 may be pivoted from its unlocked condition toward the other support 400. If a barrier 402 is provided, this may include moving the bar 398 vertically to clear the barrier 402 before pivoting the bar 398 toward the other support 400, as shown in FIG. 89.

The bar 398 is further pivoted about the pivot pin 396 until it is in the vicinity of the other support 400, as in FIG. 90. The other support 400 may define an upper channel or groove 404 in which the free end of the bar 398 is received to retain the bar 398 in the locked condition of FIG. 90. With the anti-vibration assembly 392 in the locked condition of FIG. 90, rotation of the rod 30 of the anchor lock 22 is limited by contact between the bar 398 and the stop 32 associated with the rod 30. By so limiting the rotation of the rod 30, the stop 32 cannot be fully rotated out of the slot 34, thus preventing the anchor lock 22 from being moved from its locked condition to its aligned or unlocked conditions.

Figure 91:
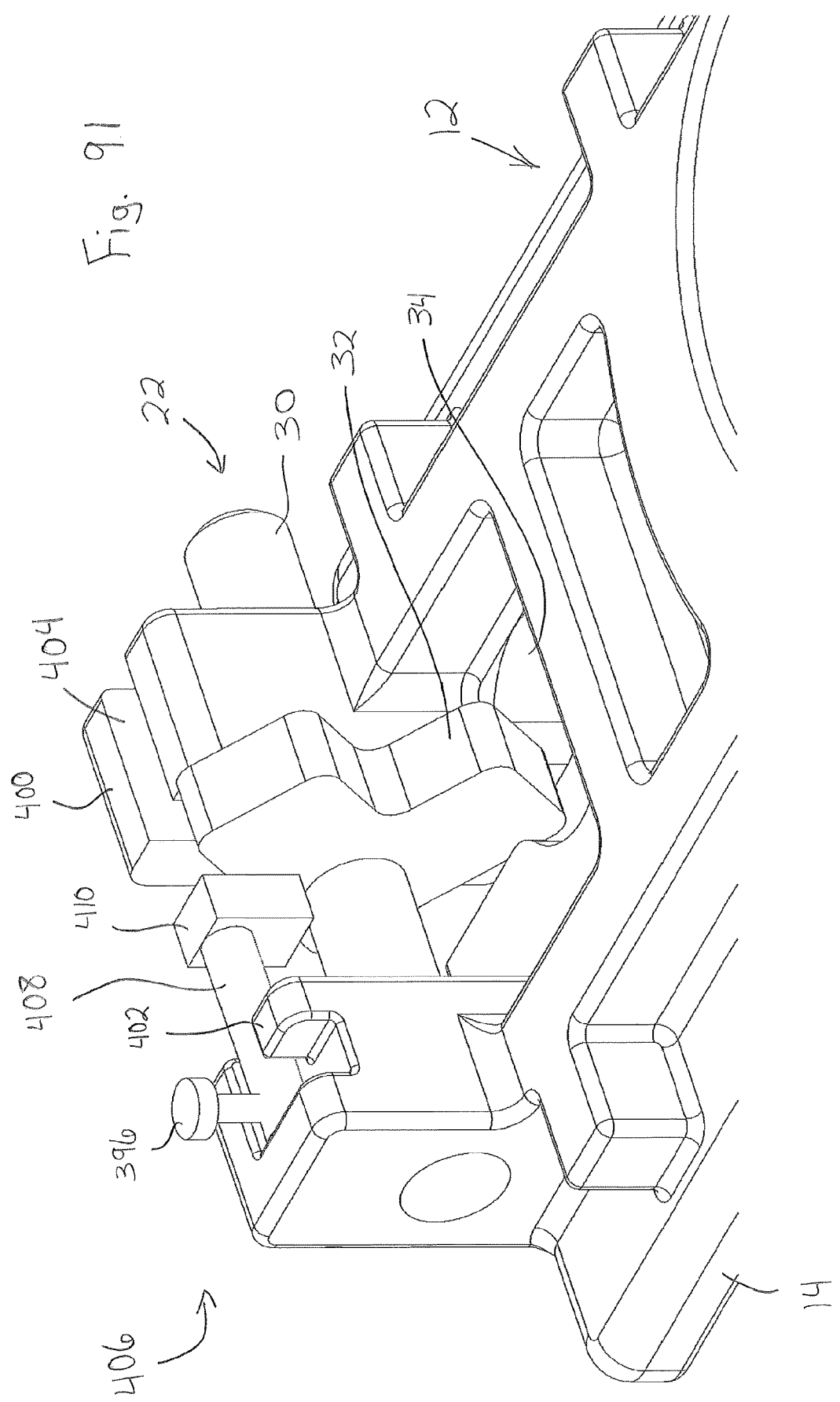
FIG. 91 is a perspective view of another alternative embodiment of an anti-vibration assembly suitable for incorporation into an anchor base of a chain tie down assembly.

FIG. 91 shows a variation of the anti-vibration assembly 392 of FIGS. 88-90. The anti-vibration assembly 406 of FIG. 91 has a modified bar 408, which is not long enough to reach the other support 400 in its illustrated locked condition. Instead, the bar 408 is short enough to allow the rod 30 of the anchor lock 22 to be rotated to the point that the associated stop 32 is rotated out of the slot 34 (i.e., to move from the locked condition to the aligned condition), but long enough to prevent longitudinal movement of the rod 30 from the aligned condition to the unlocked condition. The anchor lock 22 is capable of retaining the anchor base 12 in proper position with respect to the associated channel when in the aligned condition, so it is acceptable for the rod 30 to rotate, provided that its stop 32 does not move out of alignment with the associated slot 34. As shown in the illustrated embodiment, the free end of the bar 408 may include an enlarged tab or flange 410 configured to interfere with the stop 32 to prevent movement of the stop 32 out of alignment with the slot 34.

Figure 92:
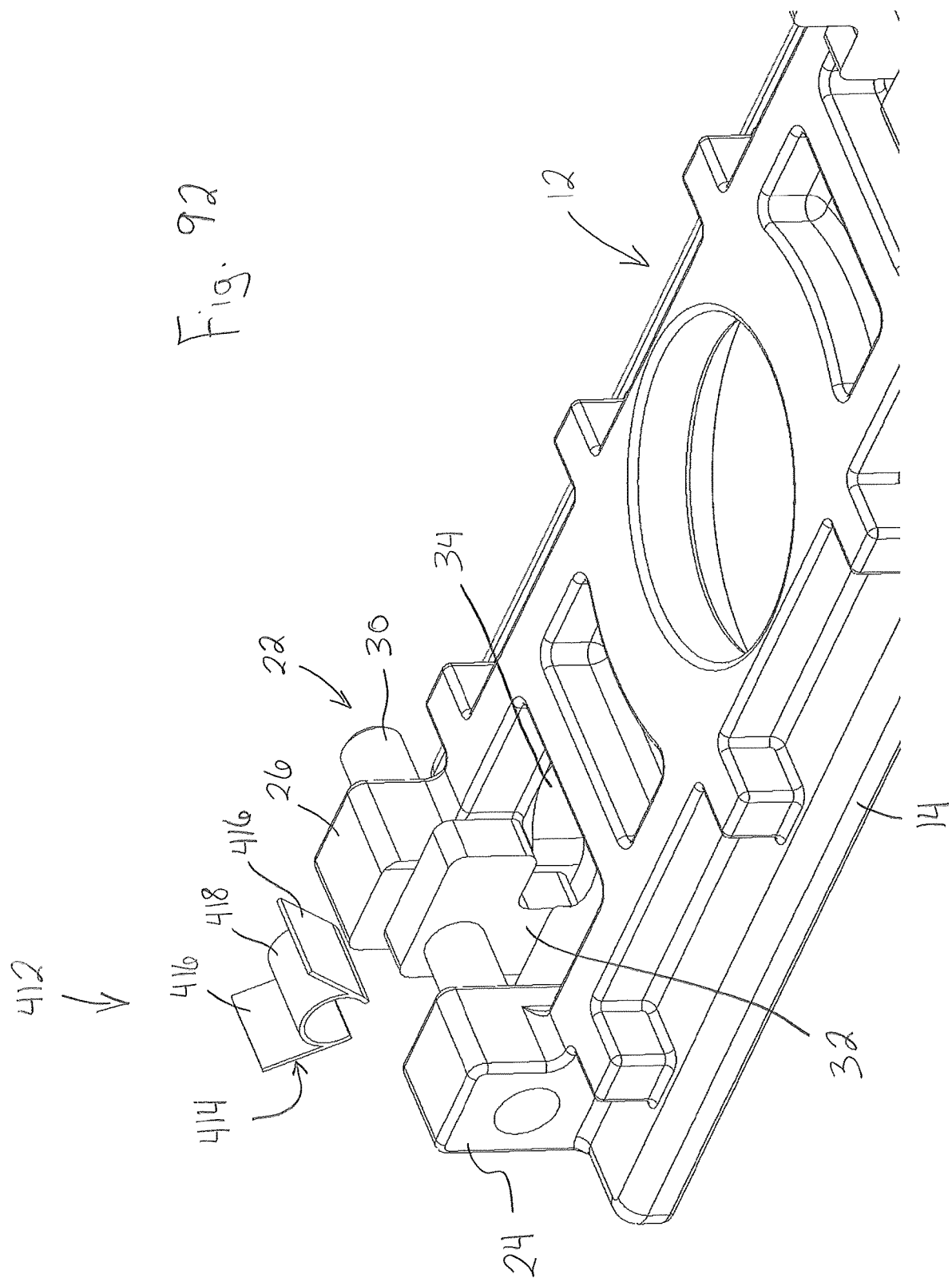
FIG. 92 is a perspective view of another alternative embodiment of an anti-vibration assembly suitable for incorporation into an anchor base of a chain tie down assembly, shown in an unlocked condition.
Figure 93:
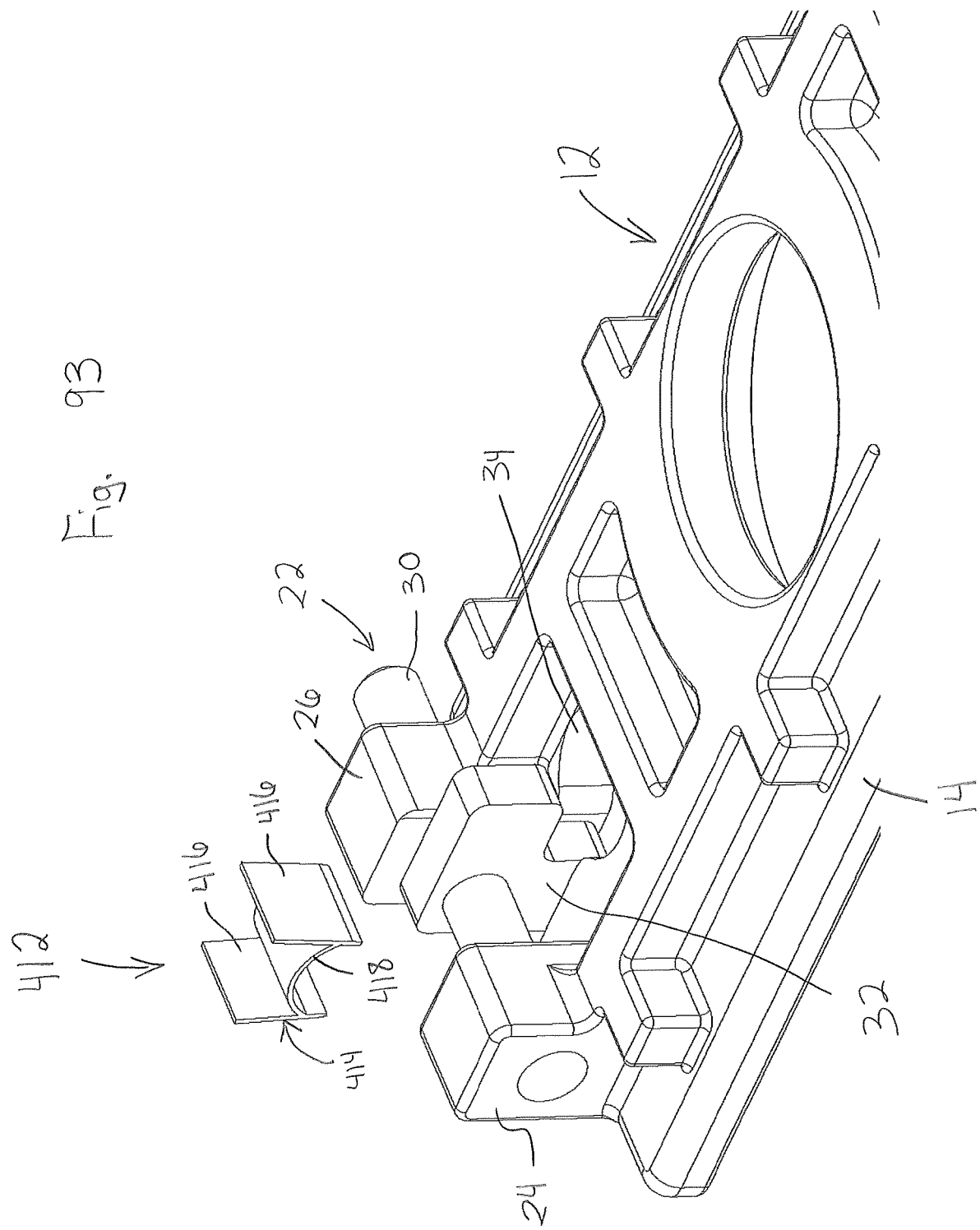
FIG. 93 is a perspective view of the anti-vibration assembly of FIG. 92, shown in an intermediate condition.
Figure 94:
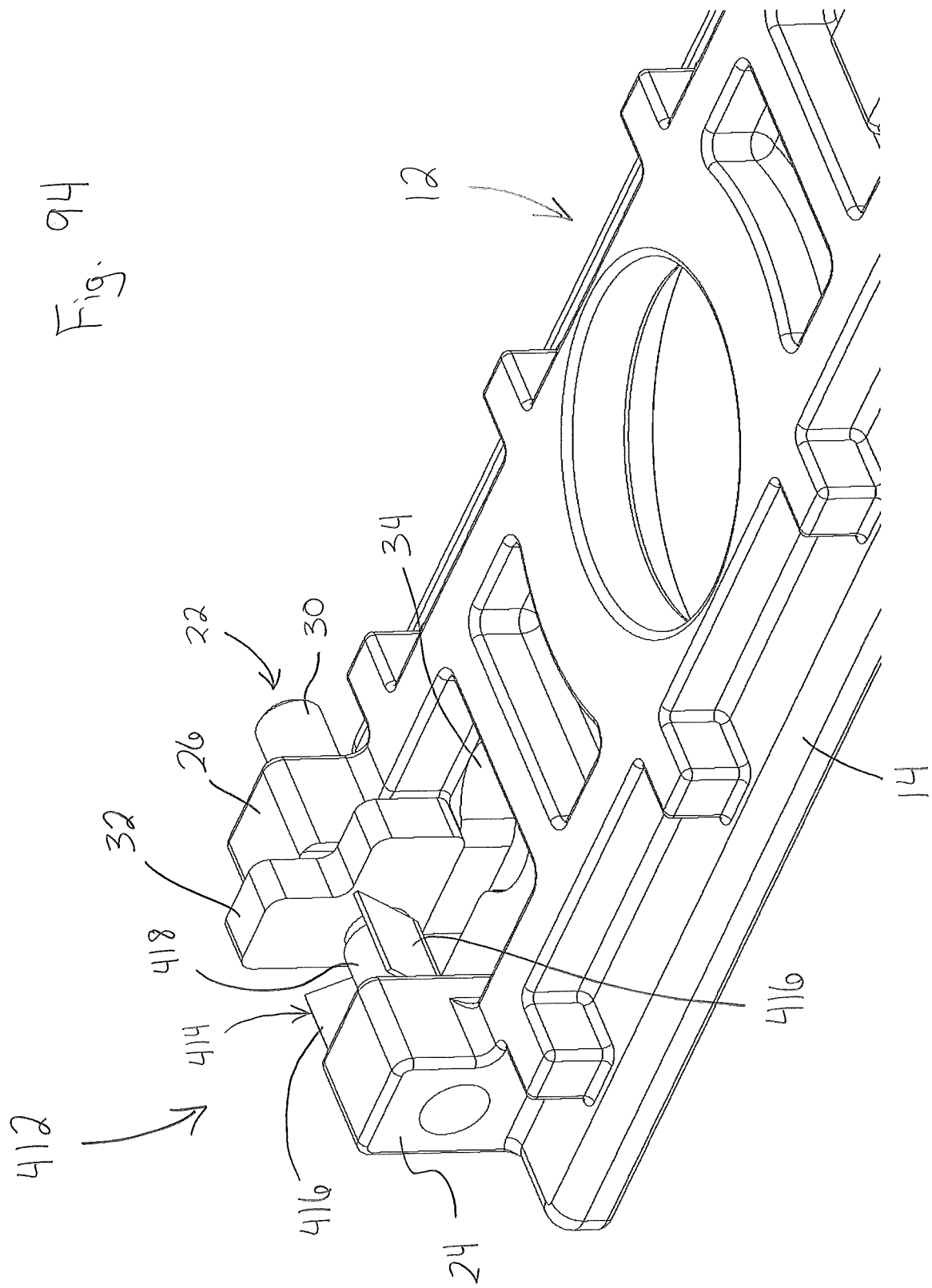
FIG. 94 is a perspective view of the anti-vibration assembly of FIG. 92, shown in a locked condition.
Figure 95:
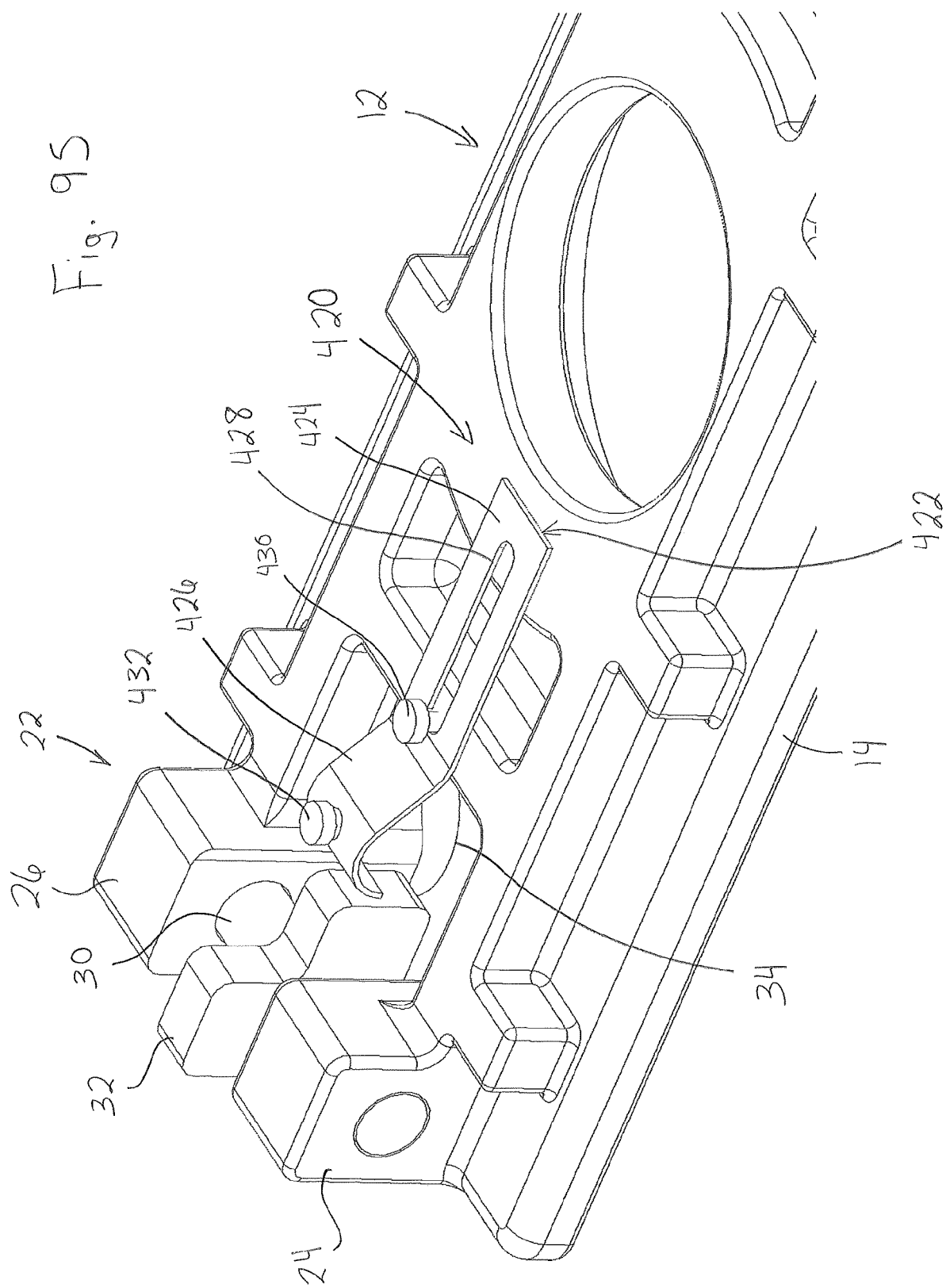
FIG. 95 is a perspective view of another alternative embodiment of an anti-vibration assembly suitable for incorporation into an anchor base of a chain tie down assembly, shown in an unlocked condition.
Figure 96:
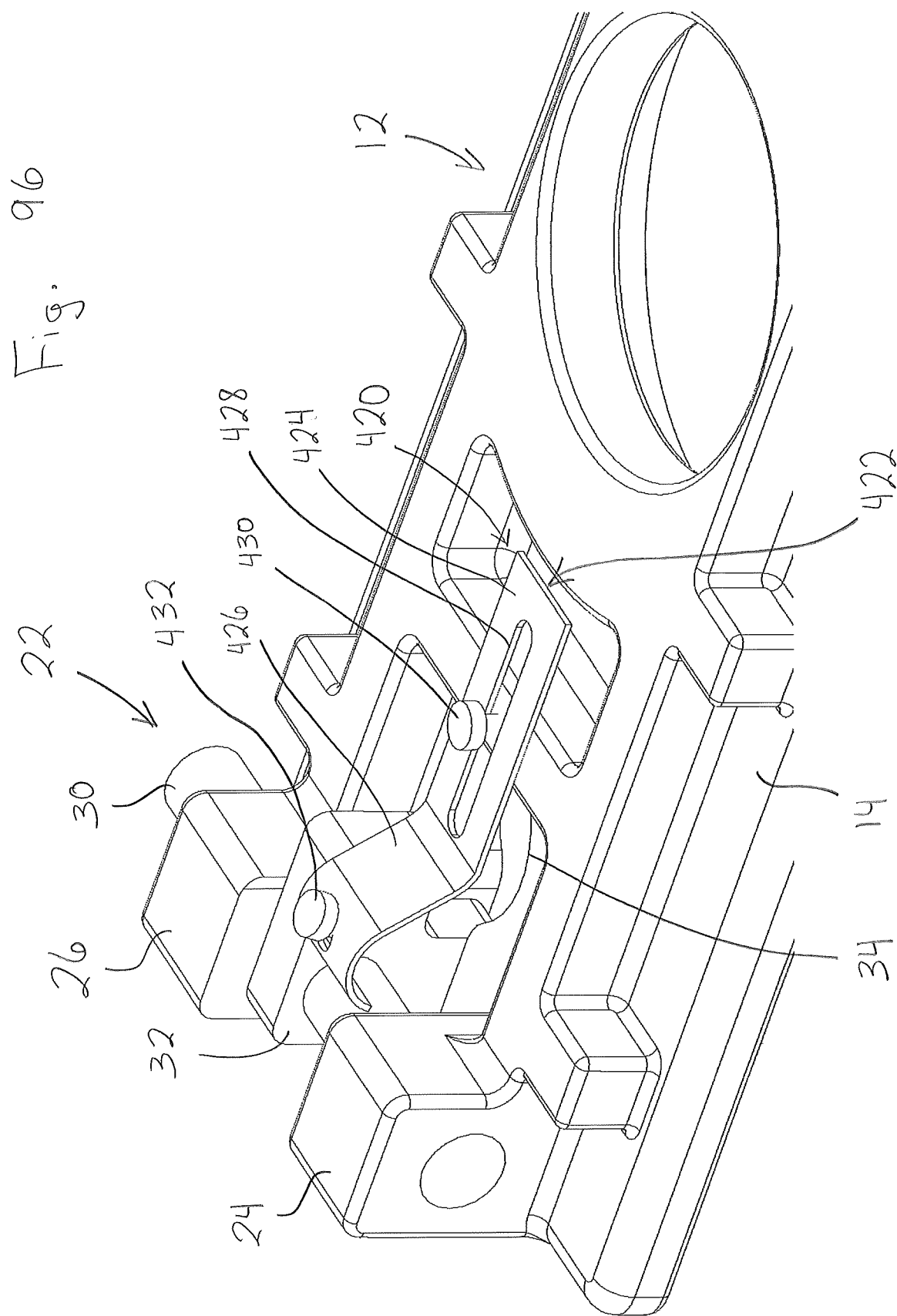
FIG. 96 is a perspective view of the anti-vibration assembly of FIG. 95, shown in an intermediate condition.

FIGS. 92-94 illustrate another embodiment an anti-vibration assembly 412 for use in combination with an anchor lock 22. The anti-vibration assembly 412 of FIGS. 92-94 comprises a spring clip 414 having a pair of tabs 416 separated by an arcuate midsection 418. The spring clip 414 is shown in a natural, unlocked condition in FIG. 92. Free ends of the tabs 416 may be pinched toward each other to move the spring clip 414 from the unlocked condition of FIG. 92 to the intermediate condition of FIG. 93. In the intermediate condition, the midsection 418 is more open than in the unlocked condition, which allows the midsection 418 to be moved onto the rod 30 of the anchor lock 22 when the anchor lock 22 is in its locked condition (FIG. 94). With the rod 30 partially positioned within the midsection 418 of the spring clip 414, the tabs 416 may be released to cause the spring clip 414 to resiliently return toward its natural state, thus gripping onto the rod 30 of the anchor lock 22.

The spring clip 414 has a width that may be approximately equal to the distance between the stop 32 of the anchor lock 22 and the support 24 that is spaced from the slot 34, such that the spring clip 414 occupies the space between the stop 32 and the support 24, as shown in FIG. 94. With the spring clip 414 so positioned, the rod 30 may be free to rotate (at least until one of the tabs 416 contacts the body 14 of the anchor base 12), but cannot move longitudinally or at least cannot move longitudinally enough so as to move the stop 32 of the anchor lock 22 out of alignment with the slot 34, thus preventing the anchor lock 22 from becoming inadvertently unlocked.

Figure 97:
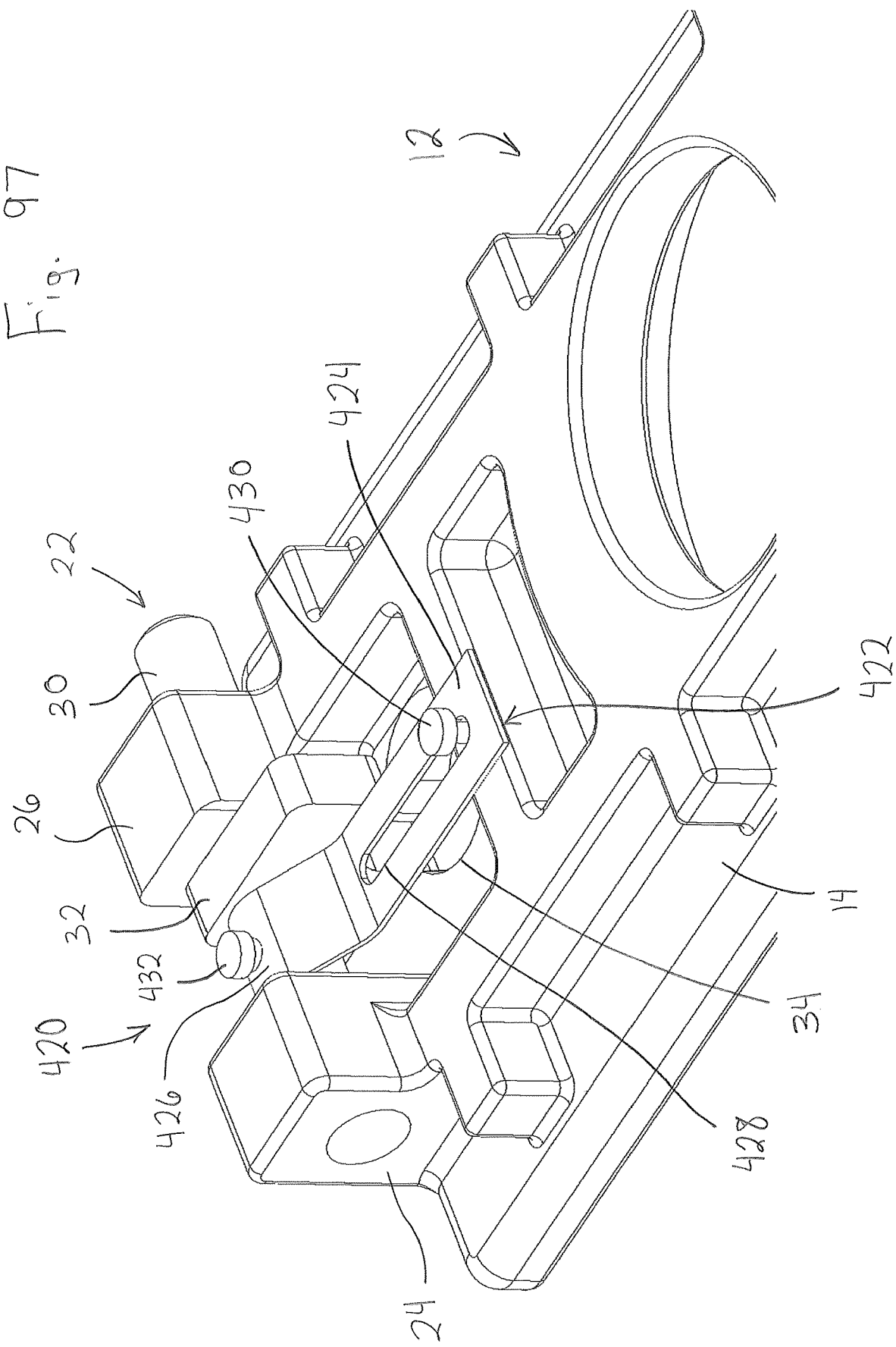
FIGS. 97 and 98 are perspective views of the anti-vibration assembly of FIG. 95, shown in locked conditions.
Figure 98:
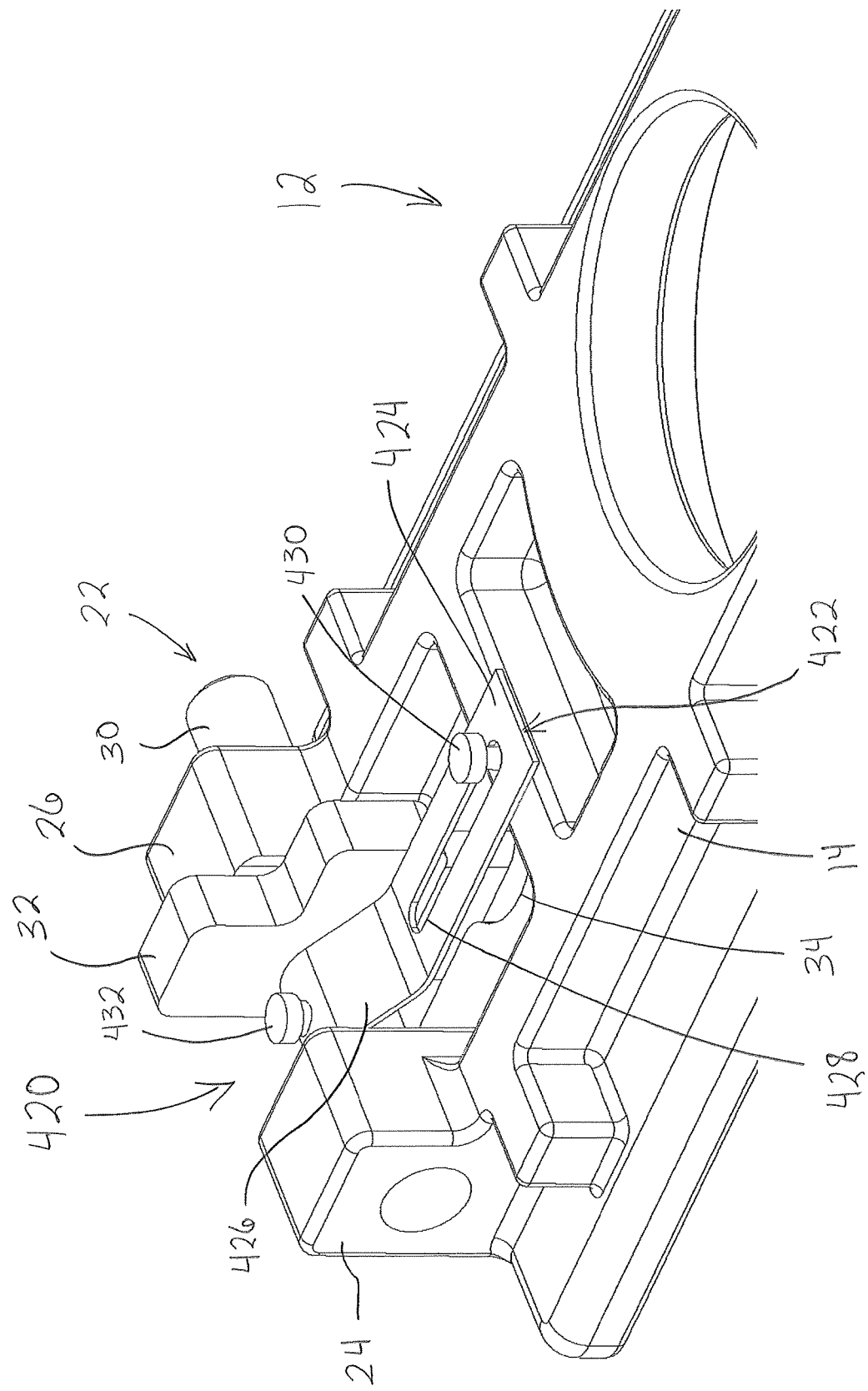

FIGS. 95-98 show another anti-vibration assembly 420, which includes a clip 422 having a slotted portion 424 and an engagement portion 426. The slotted portion 424 defines a slot 428 receiving a pin or post 430 secured to the body 14 of the anchor base 12, with the engagement portion 426 oriented toward the anchor lock 22. The slot 428 is elongated, allowing the clip 422 to be moved from an unlocked condition in which the engagement portion 426 is spaced away from the anchor lock 22 (FIG. 95) to an intermediate condition in which the engagement portion 426 is closer to the anchor lock 22 (FIG. 96) and, finally, to a locked condition in which the engagement portion 426 is mounted to the rod 30 of the anchor lock 22 (FIGS. 97 and 98).

The elongated clip 422 is aligned with the gap between the slot 34 defined in the anchor base 12 and the support 24 that is spaced from the slot 34. The configuration of the engagement portion 426 of the clip 422 may vary, depending on the configuration of the associated anchor lock 22 and the position of the clip 422 with respect to the anchor lock 22, but is shown as being generally arcuate in the illustrated embodiment. To mount the engagement portion 426 of the clip 422 to the rod 30, the engagement portion 426 is deformed or lifted upwardly to allow it to clear the rod 30 (FIG. 96), followed by the engagement portion 426 being released to allow it to resiliently return toward its natural state (FIG. 95), thereby gripping the rod 30 in the space between the stop 32 and the farther support 24 (FIG. 97). The engagement portion 426 of the clip 422 may be provided with a handle 432 for improved handling of the engagement portion 426.

The engagement portion 426 of the clip 422 has a width that may be approximately equal to the distance between the slot 34 defined in the anchor body 14 and the support 24 that is farther from the slot 34, such that the engagement portion 426 occupies the space between the stop 32 and the support 24, as shown in FIG. 97. With the spring clip 422 so positioned, the rod 30 may be free to rotate the stop 32 out of the slot 34 (FIG. 98), but cannot move longitudinally or at least cannot move longitudinally enough so as to move the stop 32 of the anchor lock 22 out of alignment with the slot 34, thus preventing the anchor lock 22 from becoming inadvertently unlocked.

Figure 99:
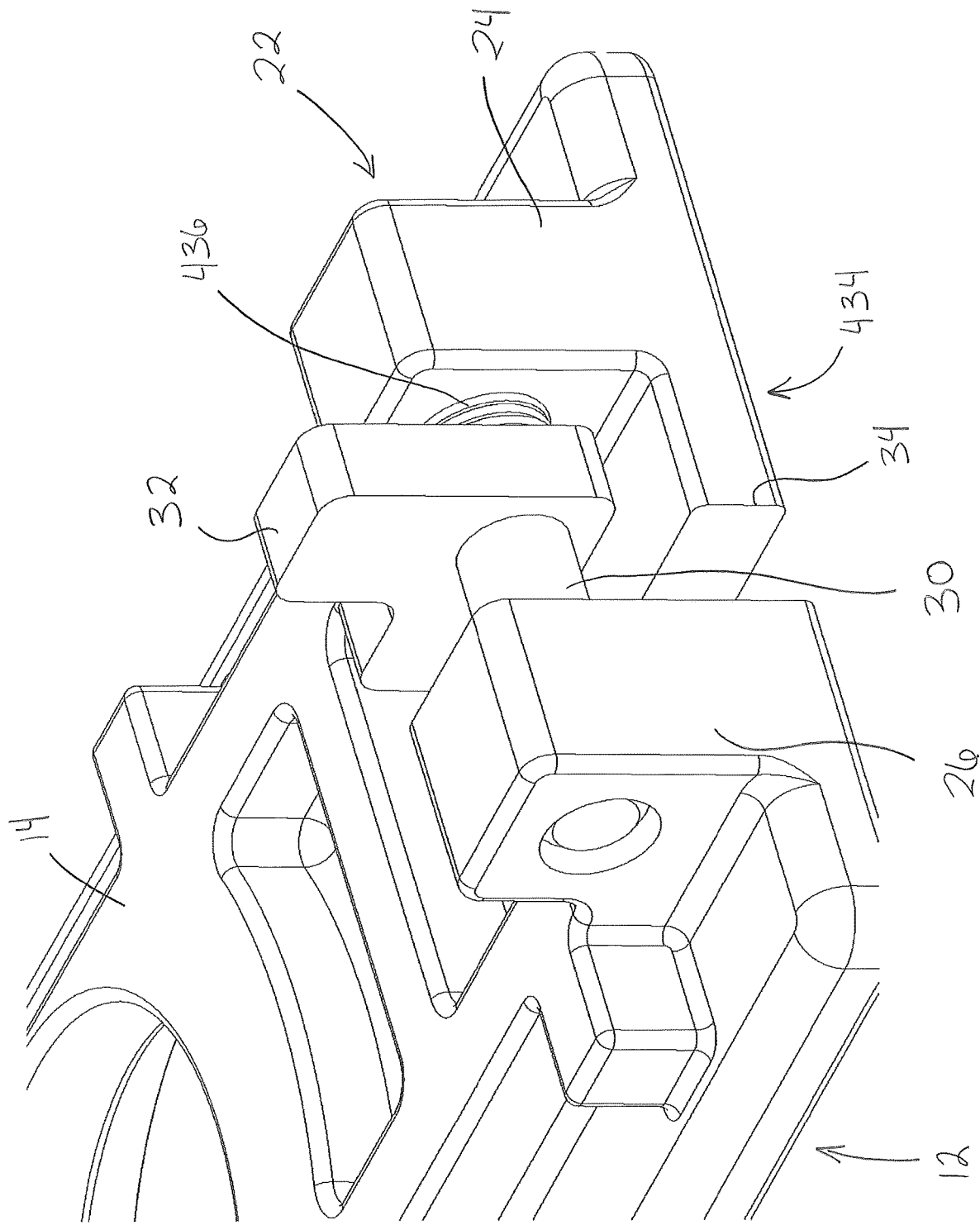
FIG. 99 is a perspective view of another alternative embodiment of an anti-vibration assembly suitable for incorporation into an anchor base of a chain tie down assembly, shown in an unlocked condition.
Figure 100:
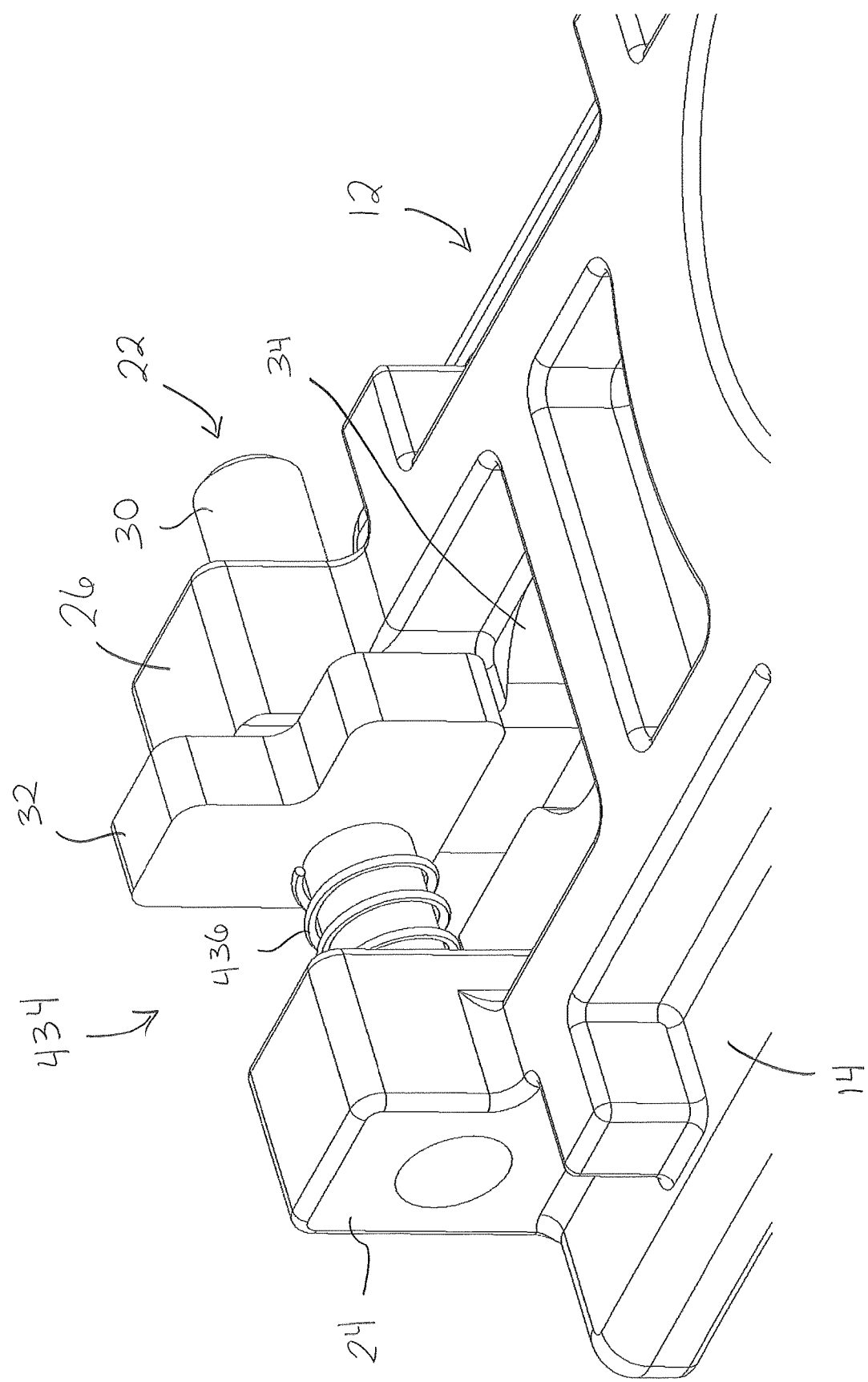
FIGS. 100 and 101 are perspective view of the anti-vibration assembly of FIG. 99, shown in locked conditions.
Figure 101:
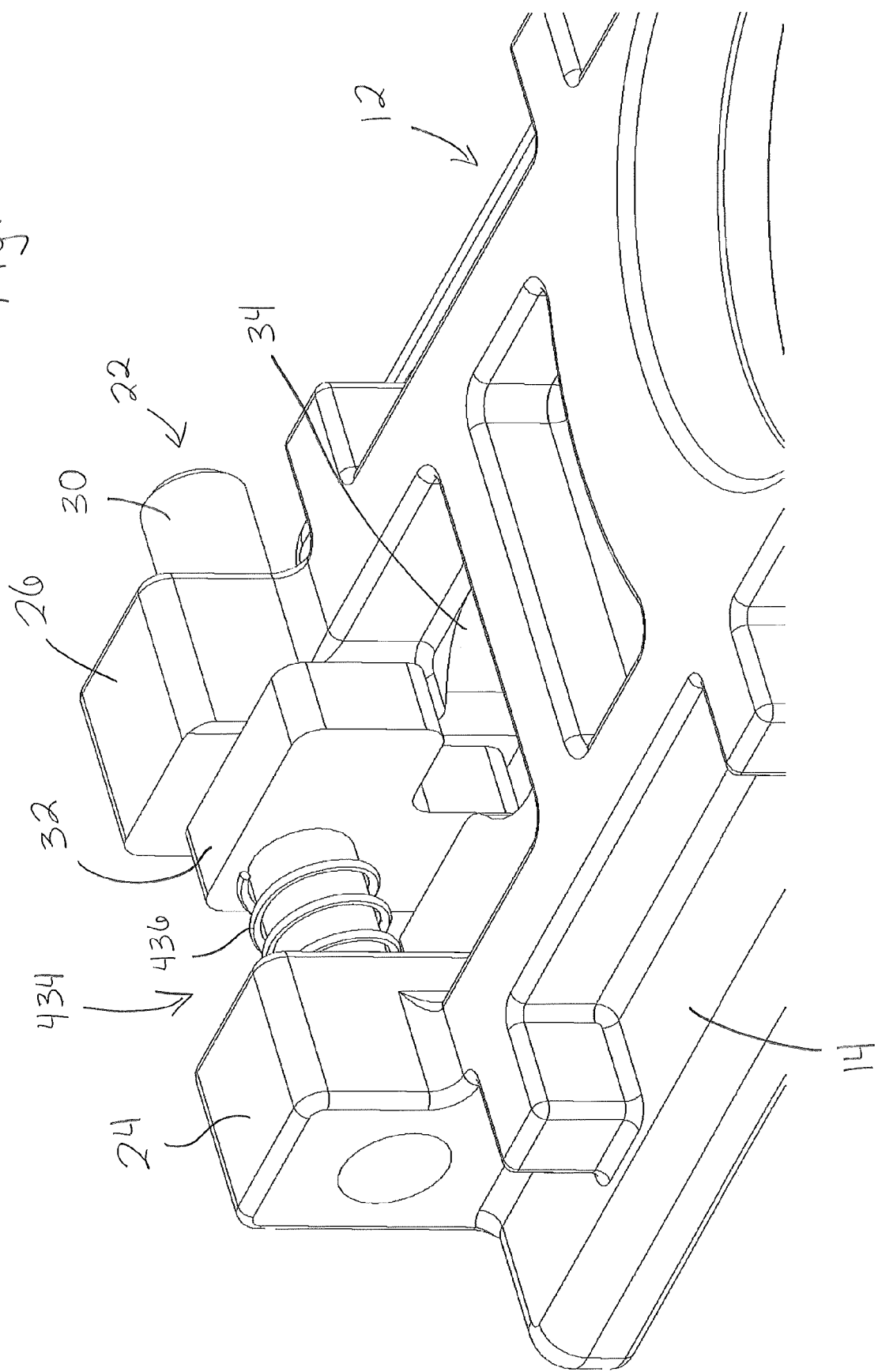

FIG. 99-101 show another embodiment of an anti-vibration assembly 434. In the embodiment of FIGS. 99-101, the anti-vibration assembly 434 includes a coil spring 436 mounted on the rod 30 of the anchor lock 22, positioned between the stop 32 and the support 24 that is farther from the slot 34. The spring 436 must be compressed to move the stop 32 out of alignment with the slot 34, to the unlocked condition of the anchor lock 22 (FIG. 99). If a compressive force is not so applied to the spring 436, it will bias the stop 32 toward the other support 26 and into alignment with the slot 34 (as in FIG. 100), where it may be rotated into the slot 34 (as in FIG. 101). The spring 436 thus prevents the stop 32 from inadvertently being moved out of alignment with the slot 34 due to vibrations.

Figure 102:
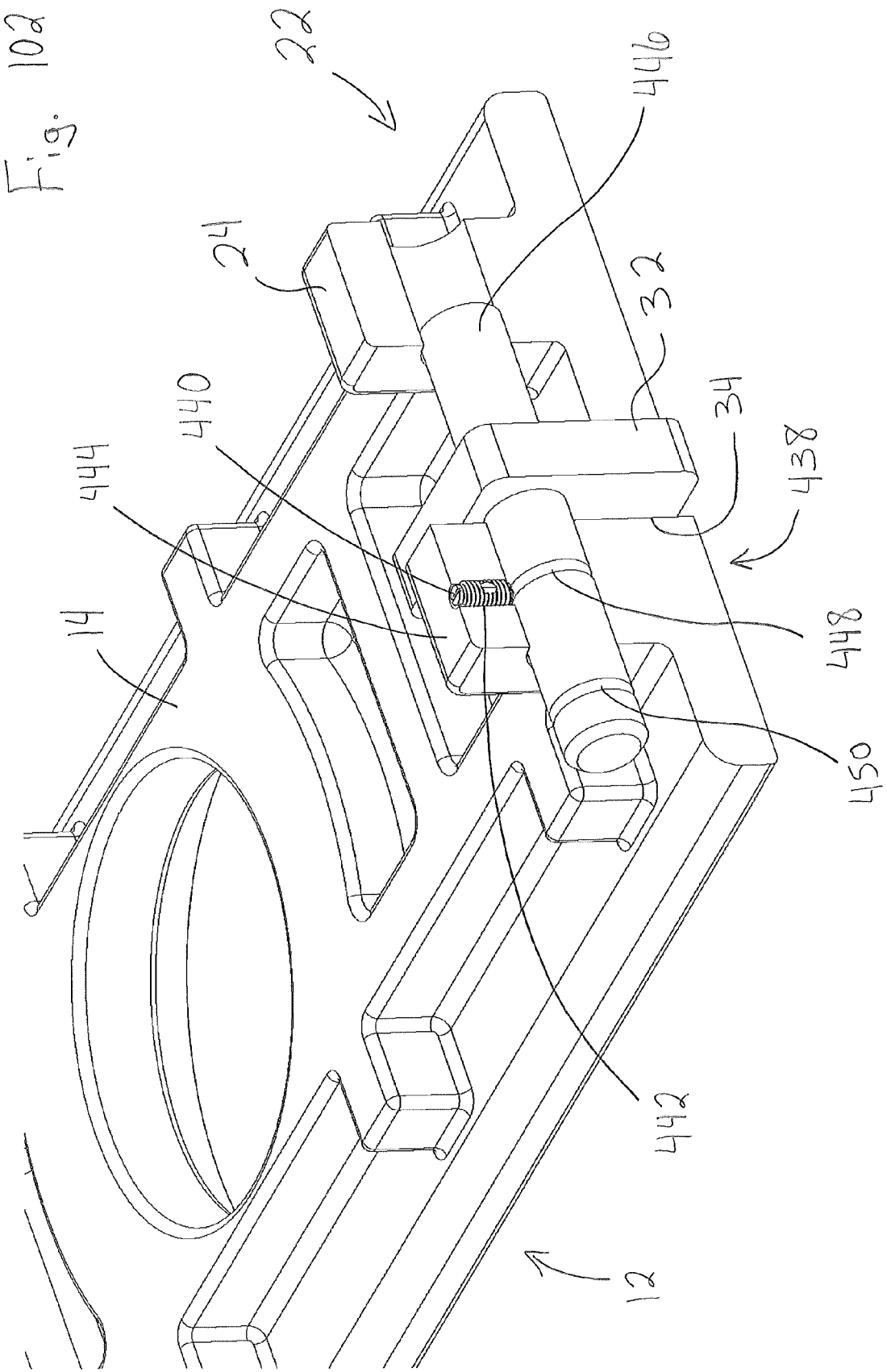
FIG. 102 is a perspective view of another alternative embodiment of an anti-vibration assembly suitable for incorporation into an anchor base of a chain tie down assembly.

FIG. 102 shows an embodiment of an anti-vibration assembly 438 employing a spring detent 440 mounted within a bore 442 of the support 444 of the anchor base 12 positioned adjacent to the slot 34. The bore 442 is shown as being vertically oriented, but it may be differently oriented (e.g., horizontal or at an angle between vertical and horizontal), provided that it is generally radially oriented with respect to the rod 446 of the anchor lock 22. The portion of the rod 446 configured to be moved through the support 444 includes a perimeter groove 448 configured to receive the bottom end of the ball detent 440, which is biased to press downwardly against the rod 446. The perimeter groove 448 receives the bottom end of the ball detent 440 when the anchor lock 22 is in its locked condition (as in FIG. 102) or aligned condition. To move the anchor lock 22 to its unlocked condition, the spring force imparted by the ball detent 440 must be overcome to move the rod 446 longitudinally and move the ball detent 440 out of the perimeter groove 448, thus preventing the anchor lock 22 from being unlocked by vibrations.

In the illustrated embodiment, the rod 446 defines a second perimeter groove 450 (spaced farther from the stop 32 than the first perimeter groove 448), which is configured to receive the bottom end of the ball detent 440 when the anchor lock 22 is in its unlocked condition. By such a configuration, the ball detent 440 cooperates with the second groove 450 to prevent inadvertent movement of the anchor lock 446 from its unlocked condition to its aligned and locked conditions.

Figure 103:
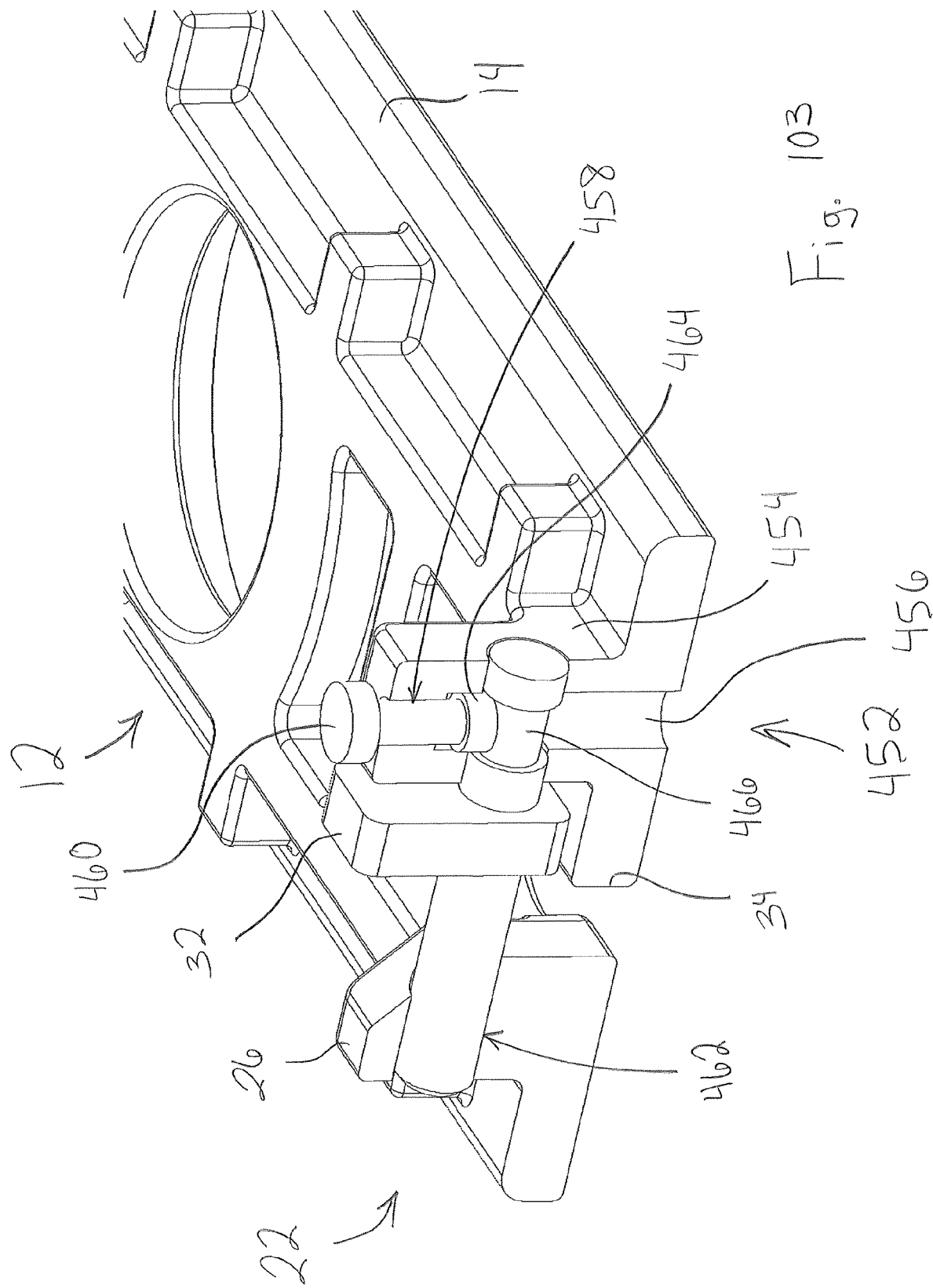
FIG. 103 is a perspective view of another embodiment of an anti-vibration assembly suitable for incorporation into an anchor base of a chain tie down assembly, shown in an unlocked condition.
Figure 104:
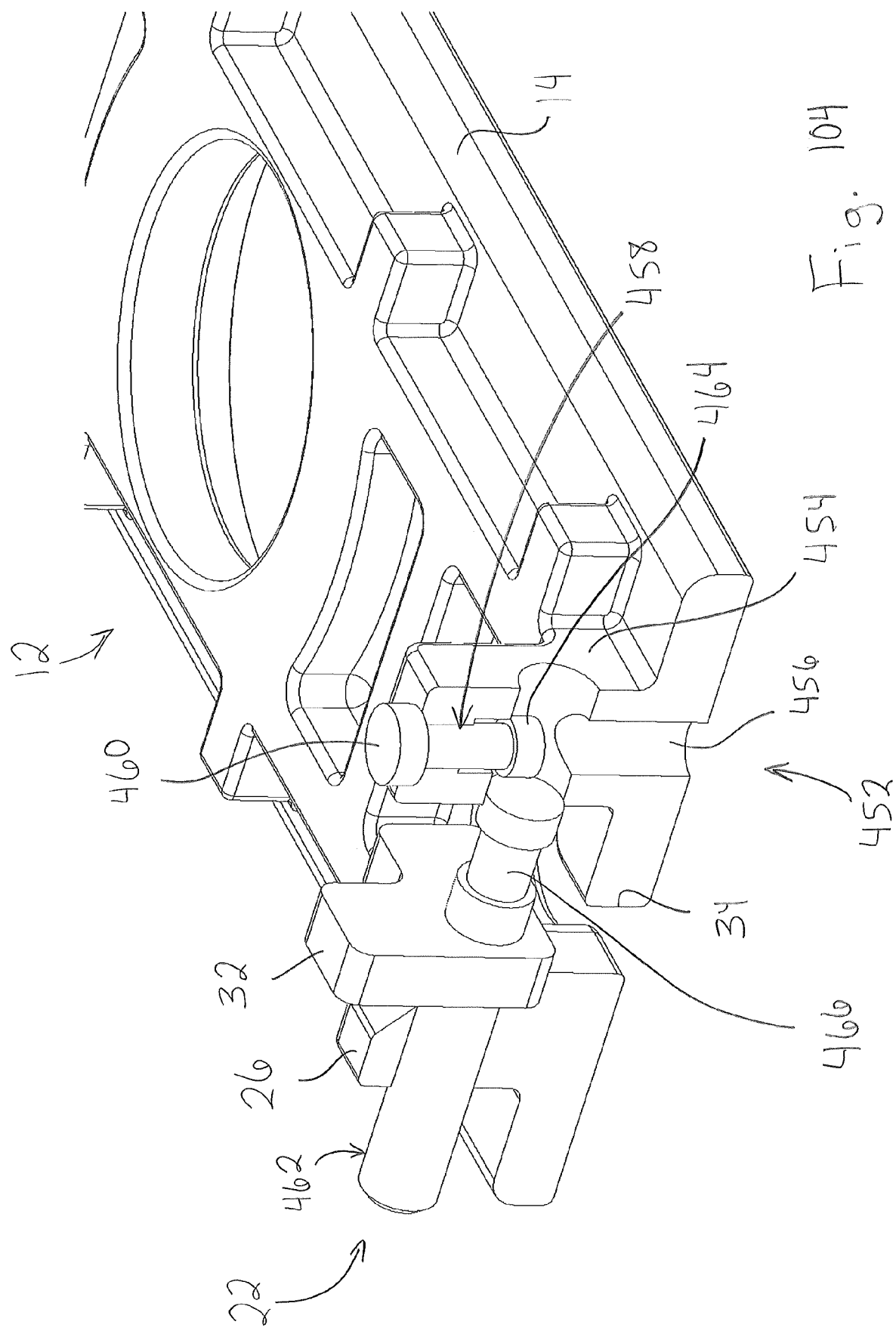
FIG. 104 is a perspective view of the anti-vibration assembly of FIG. 103, shown in a locked condition.

Finally, FIGS. 103 and 104 show an embodiment of an anti-vibration assembly 452 in which the support 454 spaced from the slot 34 is provided with a vertical bore 456. A plunger 458 is partially received within the vertical bore 454, with an upper end 460 of the plunger 458 positioned outside of the vertical bore 456. When the rod 462 of the anchor lock 22 is in its unlocked condition of FIG. 103, the lower end 464 of the plunger 458 sits upon the rod 462. In the illustrated embodiment, the rod 462 includes a perimeter groove 466 configured to align with the vertical bore 456 of the support 454 when the anchor lock 22 is in the unlocked condition of FIG. 103. The perimeter groove 466 receives the lower end 464 of the plunger 458, which prevents longitudinal movement of the rod 462, thereby retaining the anchor lock 22 in the unlocked condition.

When the rod 462 is moved longitudinally from the locked condition toward the aligned condition (which may include first raising the plunger 458 out of the perimeter groove 466, if provided), the plunger 458 drops downwardly under the force of gravity as soon as the rod 462 is clear of the plunger 458. With the plunger 458 in the downward position of FIG. 104, the rod 462 is prevented from moving back to the unlocked condition of FIG. 103. The rod 462 remains free to rotate about its central axis but, as described above, the anchor lock 22 will continue to secure the anchor base 12 to the associated channel 16 so long as the rod 462 cannot be moved back to the unlocked condition of FIG. 103. When it does become desirable to allow such movement of the rod 462, the upper end 460 of the plunger 458 is gripped and moved upwardly to move the plunger 458 out of the path of the rod 462, thus allowing the rod 462 to be moved back to the unlocked condition of FIG. 103.

It will be understood that the embodiments and examples described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A chain tie down assembly, comprising:
   an elongated tensioning member configured to be rotated about a central axis to vary the tension in the chain tie down assembly, the elongated tensioning member including a threaded portion and a disc defining at least one longitudinal opening; and
   a tension lock assembly including a rod configured to be moved between an unlocked condition allowing rotation of the tensioning member about the central axis and a locked condition preventing rotation of the tensioning member about the central axis, wherein
      a portion of the rod is received by said at least one longitudinal opening of the disc of the elongated tensioning member in the locked condition, and
      the rod is not received by said at least one longitudinal opening of the disc of the elongated tensioning member in the unlocked condition.

2. The chain tie down assembly of claim 1, wherein the rod is configured to move toward the elongated tensioning member when moved from the unlocked condition to the locked condition, and the rod is configured to move away from the elongated tensioning member when moved from the locked condition to the unlocked condition.

3. The chain tie down assembly of claim 1, wherein the rod extends between a proximal portion positioned adjacent to the disc and a distal portion spaced from the disc, and the proximal portion of the rod is at least partially received by said at least one longitudinal opening in the locked condition.

4. The chain tie down assembly of claim 1, wherein the rod includes a radially extending stop, the tension lock assembly includes a barrier, and the rod is configured to be rotated to move the stop between a first position in which the stop is aligned with and positioned behind the barrier and a second position in which the stop is not aligned with the barrier.

5. The chain tie down assembly of claim 4, wherein the rod is in the unlocked condition when the stop is aligned with and positioned behind the barrier, and the barrier engages the stop in the first position to prevent the rod from being moved from the unlocked condition to the locked condition.

6. The chain tie down assembly of claim 1, further comprising a spring encircling a portion of the rod, wherein the spring is configured to bias the rod toward the locked condition.

7. The chain tie down assembly of claim 6, wherein the spring is positioned within a chamber defined by a support of the tension lock assembly.

8. The chain tie down assembly of claim 7, wherein the spring is positioned between a distal end of the chamber and a proximal portion of the rod.

9. The chain tie down assembly of claim 8, wherein the proximal portion of the rod has a larger diameter than a distal portion of the rod.

10. The chain tie down assembly of claim 1, wherein the tension lock assembly includes a barrier, a support defining a chamber, and a spring positioned within the chamber and encircling a portion of the rod, the spring is configured to bias the rod toward the locked condition, with a proximal portion of the rod being received by one of said longitudinal openings in the locked condition, the rod includes a radially extending stop and is configured to be rotated to move the stop between a first position in which the stop is aligned with and positioned behind the barrier and a second position in which the stop is not aligned with the barrier, and the barrier engages the stop in the first position to prevent the spring from moving the rod toward the locked condition.

11. The chain tie down assembly of claim 1, wherein the tension lock assembly includes a support defining an opening, and a tether extends through one of the longitudinal openings and through said opening of the support.

* * * * *